United States Patent
Beshai

(10) Patent No.: US 9,596,524 B2
(45) Date of Patent: Mar. 14, 2017

(54) TIME-COHERENT GLOBAL NETWORK EMPLOYING SPECTRAL ROUTERS

(71) Applicant: Maged E. Beshai, Maberly (CA)

(72) Inventor: Maged E. Beshai, Maberly (CA)

(*) Notice: Subject to any disclaimer, the term of this patent is extended or adjusted under 35 U.S.C. 154(b) by 947 days.

(21) Appl. No.: 13/656,667

(22) Filed: Oct. 20, 2012

(65) Prior Publication Data

US 2013/0045009 A1 Feb. 21, 2013

Related U.S. Application Data

(63) Continuation-in-part of application No. 12/548,466, filed on Aug. 27, 2009, now Pat. No. 8,295,698.

(51) Int. Cl.
| | |
|---|---|
| H04B 10/24 | (2006.01) |
| H04J 14/00 | (2006.01) |
| H04J 14/02 | (2006.01) |
| H04Q 11/00 | (2006.01) |

(52) U.S. Cl.
CPC .. *H04Q 11/0005* (2013.01); *H04Q 2011/0024* (2013.01); *H04Q 2011/0032* (2013.01); *H04Q 2011/0033* (2013.01); *H04Q 2011/0039* (2013.01); *H04Q 2011/0045* (2013.01); *H04Q 2011/0058* (2013.01)

(58) Field of Classification Search
CPC .. H04Q 11/0005; H04J 14/00; H04J 14/0284; H04J 14/0212
USPC ................. 398/49, 52, 79, 51, 42
See application file for complete search history.

(56) References Cited

U.S. PATENT DOCUMENTS

| | | | | |
|---|---|---|---|---|
| 6,430,179 B1* | 8/2002 | Meyer | ............... | H04Q 3/68 340/2.21 |
| 6,819,870 B1* | 11/2004 | Ge | ............... | H04Q 11/0005 398/49 |
| 6,826,368 B1* | 11/2004 | Koren | ............... | H04J 14/0227 370/466 |
| 6,831,895 B1* | 12/2004 | Ji | ............... | H04L 45/00 370/229 |
| 8,228,930 B1* | 7/2012 | Kim | ............... | H04L 12/56 370/413 |
| 8,428,071 B2* | 4/2013 | Beshai | ............... | H04Q 11/0005 370/400 |
| 8,792,787 B1* | 7/2014 | Zhao | ............... | H04B 10/2575 398/48 |
| 2002/0163693 A1* | 11/2002 | Rubissa | ............... | H04Q 11/0005 398/82 |

(Continued)

*Primary Examiner* — David Payne
*Assistant Examiner* — Pranesh Barua

(57) ABSTRACT

A network of global coverage, scalable to an access capacity of hundreds of petabits per second, is configured as independent bufferless switches with spectral routers connecting edge nodes to the switches. The switches are logically arranged in at least one matrix, the spectral routers are logically arranged into a matrix of upstream spectral routers and a matrix of downstream spectral routers. Each edge node has a link to an upstream spectral router in each column of the matrix of upstream spectral routers and a link from a downstream spectral router in each row of the matrix of downstream spectral routers. Preferably, all sets of edge nodes connecting to the upstream spectral routers are selected to be mutually orthogonal. Each switch is coupled to a respective switch controller and a respective time indicator. Each switch controller entrains time indicators of a set of subtending edge nodes to enable coherent switching.

24 Claims, 99 Drawing Sheets

(56) References Cited

U.S. PATENT DOCUMENTS

| | | | |
|---|---|---|---|
| 2003/0193937 A1* | 10/2003 | Beshai | H04Q 11/0005 370/372 |
| 2004/0076151 A1* | 4/2004 | Fant | H04J 3/085 370/389 |
| 2004/0165887 A1* | 8/2004 | Beshai | H04L 49/10 398/42 |
| 2005/0008014 A1* | 1/2005 | Mitra | H04L 45/124 370/392 |
| 2005/0078666 A1* | 4/2005 | Beshai | H04L 45/62 370/380 |
| 2006/0008273 A1* | 1/2006 | Xue | H04L 45/00 398/51 |
| 2006/0120342 A1* | 6/2006 | Christensen | H04L 45/00 370/351 |
| 2008/0075071 A1* | 3/2008 | Beshai | H04Q 11/0005 370/386 |
| 2008/0082786 A1* | 4/2008 | Lovell | G06F 15/76 712/15 |
| 2008/0138067 A1* | 6/2008 | Beshai | H04L 49/357 398/45 |
| 2010/0014863 A1* | 1/2010 | Zami | H04J 14/0204 398/79 |
| 2014/0321853 A1* | 10/2014 | Beshai | H04Q 11/0005 398/52 |

* cited by examiner

Edge-node connectivity to upstream spectral routers
*(continued from FIG. 41)*

| Indices of edge nodes connecting to upstream spectral router 2830(0,9) | | Indices of edge nodes connecting to upstream Spectral router 2830(4,9) |
|---|---|---|

Row 9 of matrix 3000 → | 36 37 38 39 | To 2830(1,9) | 20 25 30 35 | To 2830(2,9) | 22 24 31 33 | To 2830(3,9) | 21 27 28 34 | | 23 26 29 32 |

| 32 33 34 35 | | 21 26 31 36 | | 20 27 29 38 | | 23 24 30 37 | 2830(4,8) | 22 25 28 39 |
| To 2830(0,7) | | To 2830(1,7) | | To 2830(2,7) | | To 2830(3,7) | | To 2830(4,7) |

Row 7 of matrix 3000 → | 28 29 30 31 | To 2830(1,6) | 22 27 32 37 | To 2830(2,6) | 23 25 34 36 | To 2830(3,6) | 20 26 33 39 | | 21 24 35 38 |

| 24 25 26 27 | | 23 28 33 38 | | 21 30 32 39 | | 22 29 35 36 | To 2830(4,6) | 20 31 34 37 |
| To 2830(0,6) | | | | | | | | |
| To 2830(0,5) | | To 2830(1,5) | | To 2830(2,5) | | To 2830(3,5) | | |

| 20 21 22 23 | | 24 29 34 39 | | 26 28 35 37 | | 25 31 32 38 | | 27 30 33 36 |

| Indices of edge nodes connecting to upstream spectral router 2830(0,5) | | Row 5 of matrix 3000 of upstream spectral routers | | Indices of edge nodes connecting to upstream spectral router 2830(4,5) |

*FIG. 42*

Edge-node connectivity to upstream spectral routers
*(continued from FIG. 42)*

| Indices of edge nodes connecting to upstream spectral router 2830(0,14) | To 2830(1,14) | To 2830(2,14) | To 2830(3,14) | Indices of edge nodes connecting to upstream Spectral router 2830(4,14) |
|---|---|---|---|---|
| 56 57 58 59 | 40 45 50 55 | 42 44 51 53 | 41 47 48 54 | 43 46 49 52 |

Row 14 of matrix 3000

| | To 2830(0,13) | To 2830(1,13) | To 2830(2,13) | To 2830(3,13) | 2830(4,13) |
|---|---|---|---|---|---|
| | 52 53 54 55 | 41 46 51 56 | 40 47 49 58 | 43 44 50 57 | 42 45 48 59 |

| | To 2830(0,12) | To 2830(1,12) | To 2830(2,12) | To 2830(3,12) | To 2830(4,12) |
|---|---|---|---|---|---|
| | 48 49 50 51 | 42 47 52 57 | 43 45 54 56 | 40 46 53 59 | 41 44 55 58 |

Row 12 of matrix 3000

| | To 2830(0,11) | To 2830(1,11) | To 2830(2,11) | To 2830(3,11) | To 2830(4,11) |
|---|---|---|---|---|---|
| | 44 45 46 47 | 43 48 53 58 | 41 50 52 59 | 42 49 55 56 | 40 51 54 57 |

| Indices of edge nodes connecting to upstream spectral router 2830(0,10) | To 2830(1,10) | To 2830(2,10) | To 2830(3,10) | Indices of edge nodes connecting to upstream spectral router 2830(4,10) |
|---|---|---|---|---|
| 40 41 42 43 | 44 49 54 59 | 46 48 55 57 | 45 51 52 58 | 47 50 53 56 |

Row 10 of matrix 3000 of upstream spectral routers

*FIG. 43*

Edge-node connectivity to upstream spectral routers
*(continued from FIG. 43)*

FIG. 44

FIG. 56  Row 0 of matrix 3000: Upstream spectral routers connecting to row 0 of matrix 3200 of switches

| Switch Configuration | 6900 FIG. 69 (state 0) | 6900 FIG. 69 (state 1) |
|---|---|---|
| Static connection from switch elements to rotator | Ordinary | Transposed |
| Static connection from rotator to switch elements | Transposed | Ordinary |
| Index of rotator inlet { To Intermediate switch element | $j$ | $L-j$ |
| Index of rotator outlet { To Intermediate switch element | $\{j+t_1\}$ Modulo $N$ | $\{L-j+t_1\}$ Modulo $N$ |
| Index of transit switch element | $L-(j+t_1)$ | $L-j+t_1$ |
| Index of rotator inlet { From Intermediate switch element | $L-(j+t_1)$ | $j-t_1$ |
| Index of rotator outlet { From Intermediate switch element | $L-k$ | $k$ |
| Transit time $t_2$ | $\{j-k+t_1\}_{\text{modulo N}}$ | $\{k-j+t_1\}_{\text{modulo N}}$ |
| Transit delay $(t_2-t_1)$ | $\{j-k\}_{\text{modulo N}}$ | $\{k-j\}_{\text{modulo N}}$ |

*FIG. 73*

| Switch Configuration | 7720, 7920, 8120 Figures 77, 79, 81 | 7820, 8020, 8220 Figures 78, 80, 82 |
|---|---|---|
| Static connection from first rotator to transit-memory devices | Transposed | Direct |
| Static connection from transit-memory devices to second rotator | Direct | Transposed |
| Index of first-rotator inlet | $j$ | $j$ |
| Index of first-rotator outlet | $j+t_1$ | $\{j+t_1\}\ modulo\ N$ |
| Index of transit-memory device | $L-(j+t_1)$ | $j+t_1$ |
| Index of second-rotator inlet | $L-(j+t_1)$ | $L-j-t_1$ |
| Index of second-rotator outlet | $k$ | $k$ |
| Transit time $t_2$ | $\{j+k-L+t_1\}_{modulo\ N}$ | $\{j+k-L+t_1\}_{modulo\ N}$ |
| Transit delay $(t_2-t_1)$ | $\{j+k-L\}_{modulo\ N}$ | $\{j+k-L\}_{modulo\ N}$ |

*FIG. 83*

| Switch Configuration | 8420 FIG. 84 | 8620, 8820 FIG. 86, FIG. 88 |
|---|---|---|
| Static connection from transit-memory devices to rotator | Transposed | Ordinary |
| Static connection from rotator to transit-memory devices | Ordinary | Transposed |
| Index of rotator inlet — State(0) | $j$ | $j$ |
| Index of rotator outlet | $j + t_1$ | $j + t_1$ |
| Index of transit-memory device | $\{j + t_1\}_{modulo\ N}$ | $\{L - (j + t_1)\}_{modulo\ N}$ |
| Index of rotator inlet — State(1) | $L - (j + t_1)$ | $L - (j + t_1)$ |
| Index of rotator outlet | $k$ | $k$ |
| Transit time $t_2$ | $\{j + k - L + t_1\}_{modulo\ N}$ | $\{j + k - L + t_1\}_{modulo\ N}$ |
| Transit delay $(t_2 - t_1)$ | $\{j + k - L\}_{modulo\ N}$ | $\{j + k - L\}_{modulo\ N}$ |

*FIG. 93*

| Switch Configuration | 8920 FIG. 89 (transposed egress) | 9020 FIG. 90 (transposed egress) |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $j+t_1$ | $j+t_1$ |
| Index of transit-memory device | $j+t_1$ $\}$ modulo $N$ | $L-(j+t_1)$ |
| Index of rotator inlet $\Big\}$ State(1) | $L-(j+t_1)$ | $L-(j+t_1)$ |
| Index of rotator outlet | $\boxed{L-k}$ | $\boxed{L-k}$ |
| Transit time $t_2$ | $\{j-k+t_1\}_{modulo\ N}$ | $\{j-k+t_1\}_{modulo\ N}$ |
| Transit delay $(t_2-t_1)$ | $\{j-k\}_{modulo\ N}$ | $\{j-k\}_{modulo\ N}$ |

*FIG. 94*

| Switch Configuration | FIG. 84 with a descending rotator | Figures 86-88 with descending rotator |
|---|---|---|
| Static connection from transit-memory devices to rotator | Transposed | Ordinary |
| Static connection from rotator to transit-memory devices | Ordinary | Transposed |
| Index of rotator inlet — State(0) | $j$ | $j$ |
| Index of rotator outlet — State(0) | $j - t_1$ | $j - t_1$ |
| Index of transit-memory device | $\{j - t_1\}_{modulo\ N}$ | $\{L - (j - t_1)\}_{modulo\ N}$ |
| Index of rotator inlet — State(1) | $L - (j - t_1)$ | $L - (j - t_1)$ |
| Index of rotator outlet — State(1) | $k$ | $k$ |
| Transit time $t_2$ | $\{L - j - k + t_1\}_{modulo\ N}$ | $\{L - j - k + t_1\}_{modulo\ N}$ |
| Transit delay $(t_2 - t_1)$ | $\{L - j - k\}_{modulo\ N}$ | $\{L - j - k\}_{modulo\ N}$ |

*FIG. 95*

| Switch Configuration | FIG. 89 with a descending rotator (transposed egress) | FIG. 90 with a descending rotator (transposed egress) |
|---|---|---|
| Static connection from transit-memory devices to rotator | Transposed | Ordinary |
| Static connection from rotator to transit-memory devices | Ordinary | Transposed |
| Index of rotator inlet $\Big\}$ State(0) | $j$ | $j$ |
| Index of rotator outlet | $j - t_1$ | $j - t_1$ |
| Index of transit-memory device | $\{L-(j-t_1)\}$ modulo $N$ | $\{L-(j-t_1)\}$ modulo $N$ |
| Index of rotator inlet $\Big\}$ State(1) | $\boxed{L-k}$ | $\boxed{L-k}$ |
| Index of rotator outlet | $\{k-j+t_1\}$ modulo $N$ | $\{k-j+t_1\}$ modulo $N$ |
| Transit time $t_2$ | $\{k-j\}$ modulo $N$ | $\{k-j\}$ modulo $N$ |
| Transit delay ($t_2 - t_1$) | | |

FIG. 96

TIME-COHERENT GLOBAL NETWORK EMPLOYING SPECTRAL ROUTERS

CROSS-REFERENCE TO RELATED APPLICATIONS

The present application is a continuation-in-part of U.S. patent application Ser. No. 12/548,466, filed on Aug. 27, 2009, now U.S. Pat. No. 8,295,698, the content of which is incorporated herein by reference.

FIELD OF THE INVENTION

The present invention relates to high-capacity networks employing fast-switching bufferless core nodes.

BACKGROUND

Wide-coverage data networks are typically multi-hop networks of large diameter where a path from one edge node to another may traverse several intermediate nodes. Such networks are inefficient and have performance challenges. A multi-hop packet-switching network suffers from cumulative performance degradation as a path from source to destination traverses numerous routing nodes. It is well known that structural simplicity reduces network cost and improves its performance. In order to facilitate the introduction of high-quality broadband services, the network structure need be simplified and the network diameter need be reduced. It is desirable that a path from one edge node to another traverse a small number of intermediate nodes. It is also desirable, given the dominance of fiber-optic transport, that modulated optical carrier signals received at a core node be switched towards its destination edge node without the need for extracting the baseband signals for switching in the electronic domain.

There is a need, therefore, for a high-capacity network of small diameter that employs fast-switching optical core nodes, and it may be argued that it is more efficient to create an entirely new global broadband network of high quality and relatively low cost.

SUMMARY

A high-capacity time-coherent network of global coverage interconnects edge nodes distributed over a vast area through spectral routers and independent bufferless switches. The network provides a path from any edge node to any other edge node traversing one of the switches.

In accordance with one aspect, the present invention provides a time-coherent network of global coverage. The network comprises edge nodes interconnected by independent switches. None of the switches need connect directly to any other switch. The edge nodes preferably connect to the switches through upstream spectral routers (also called upstream wavelength routers) and downstream spectral routers (downstream wavelength routers).

The upstream spectral routers are preferably logically arranged in a matrix, herein referenced as a "first matrix", and the downstream spectral routers are preferably logically arranged in a matrix, herein referenced as a "second matrix". The switches are logically arranged in a matrix, herein referenced as a "third matrix".

Each edge node has an upstream link to an upstream spectral router in each column of the first matrix and a downstream link from a downstream spectral router in each row of the second matrix.

Each upstream spectral router has a WDM link (wavelength-division-multiplexed link) to each switch of a respective set of switches of different columns of the third matrix, with the upstream spectral routers of a same column of the first matrix connecting to switches of a respective set of columns of the third matrix. Each of the switches of a same column of the third matrix has a WDM link to each downstream spectral router of a respective column of the second matrix.

Preferably, all sets of edge nodes connecting to the upstream spectral routers are mutually orthogonal in order to induce balanced switching loads. An edge node combines a source node and a sink node sharing an edge controller. An edge node may be configured as a single-rotator circulating switch.

Each switch is coupled to a respective switch controller, and the switch controllers of the switches of the third matrix are independent of each other. A spectral demultiplexer precedes each switch and a spectral multiplexer succeeds each switch. The spectral demultiplexer preceding a switch distributes multiplexed optical signals of a WDM link from a respective upstream spectral router to inlet ports of the switch. A spectral multiplexer succeeding a switch combines output optical signals of outlet ports of the switch onto a WDM link directed to a respective downstream spectral router of the second matrix.

The connectivity of edge nodes to upstream spectral routers may be devised so that all sets of edge nodes connecting to upstream spectral routers of a same row of the first matrix are mutually disjoint. To simplify addressing of edge nodes and routing data to the edge nodes, downstream spectral routers of a same column of the second matrix may connect to a same set of edge nodes and switches of a same column of the third matrix may connect to downstream spectral routers of a same column of the second matrix.

The WDM links from an upstream spectral router connect to a respective set of switches of different columns of the third matrix. However, the respective set of switches may belong to arbitrarily selected rows of the third matrix. Thus, upstream spectral routers of a same row of the first matrix may connect to switches of a same row of the third matrix.

Each switch of the third matrix is coupled to a respective independent time indicator. Each upstream WDM link from an edge node carries multiple upstream wavelength channels directed to different switches and each upstream wavelength channel is time locked to a respective time indicator of a respective switch.

A switch of the third matrix may be configured as an optical switch or an electronic switch. The third matrix may include both optical switches and electronic switches. An inlet port of an optical switch connects to an optical channel from a spectral demultiplexer preceding the optical switch and an outlet port of an optical switch connects to an optical channel to a spectral multiplexer succeeding the optical switch. An inlet port of an electronic switch connects to an optical-to-electrical converter which detects a baseband signal of a modulated optical carrier at a respective output of a spectral demultiplexer preceding the electronic switch. An outlet port of an electronic switch connects to an electrical-to-optical converter which modulates an optical carrier with a switched baseband signal and submits the modulated optical carrier to a spectral multiplexer succeeding the electronic switch. An electronic switch of the third matrix may be implemented as single-rotator latent space switch.

Each upstream spectral router connects to W switches of different columns of the third matrix and each downstream spectral router connects to W switches of a column of the third matrix, W>1. With the first matrix having $\Lambda$ columns, the second matrix has $\Lambda$ rows, $\Lambda$>1, and each switch of the third matrix of switches having m inlet ports and m outlet ports, m>1, the number of edge nodes of the network is limited to $\Lambda \times W \times m$ edge nodes.

Numerical methods based on algorithmic procedures may be employed to assign edge nodes to the upstream spectral routers of the first matrix. However, if $\Lambda$ is selected as a prime number, orthogonal sets of edge nodes, characterized by an orthogonality index of $\lceil W/\Lambda \rceil$ may be determined analytically. In one realization, an upstream spectral router in column c, $0 \le c < \Lambda$, and row r, $0 \le r < (\Lambda \times W)$, of the first matrix may connect to edge nodes of indices determined from the expression:

$$E(c,r,m) = S \times \lfloor r/\Lambda \rfloor + \{j \times (1+m \times c) + m \times (\rho + c)\}_{modulo\ S}, 0 \le j < m,$$

where $S = \Lambda \times m$, and $\rho = r_{modulo\ \Lambda}$; the edge nodes of the network being indexed sequentially between 0 and ($\Lambda \times m \times W - 1$).

An upstream spectral router of column c, $0 \le c < \Lambda$, and row r, $0 \le r < (\Lambda \times W)$, of the first matrix may connect to a set of W switches in columns $\{c \times W\}$ to $\{(c \times W)+W-1\}$ of the third matrix; the columns of the third matrix being indexed sequentially between 0 and ($\Lambda \times W - 1$).

In accordance with another aspect, the present invention provides a time-coherent network, comprising edge nodes interconnected by independent switches; none of the switches need be directly connected to any other switch. The edge nodes preferably connect to the switches through upstream spectral routers and downstream spectral routers.

The upstream spectral routers may be logically arranged in a matrix, herein referenced as a "first matrix", and the downstream spectral routers may be logically arranged in a matrix, herein referenced as a "second matrix". The switches are logically arranged in a matrix, herein referenced as a "third matrix".

Each edge node has an upstream link to an upstream spectral router in each column of the first matrix and a downstream link from a downstream spectral router in each row of the second matrix.

Upstream spectral routers of a same row of the first matrix have WDM links to switches of a same row of the third matrix. Each downstream spectral router has a WDM link from each switch of a respective set of switches of different rows of the third matrix, with the downstream spectral routers of a same row of the second matrix connecting to switches of a respective set of rows of the third matrix.

Preferably, all sets of edge nodes connecting to the downstream spectral routers are mutually orthogonal in order to induce balanced switching loads. The upstream spectral routers of a same row of the first matrix connect to a same set of edge node. The sets of edge nodes connecting to the downstream spectral routers of a same column of the second matrix may be selected to be mutually disjoint.

In accordance with a further aspect, the present invention provides a time-coherent network of global coverage. The network comprises a plurality of edge nodes interconnected by independent switches not connected to each other. The edge nodes preferably connect to the switches through upstream spectral routers and downstream spectral routers. Each edge node has a WDM link to an upstream spectral router in each column of the first matrix and a downstream WDM link from a downstream spectral router in each row of the second matrix.

The upstream spectral routers are preferably logically arranged in a matrix, herein referenced as a "first matrix", and the downstream spectral routers are preferably logically arranged in a matrix, herein referenced as a "second matrix". The switches are logically arranged into two matrices herein referenced as a "third matrix" and a "fourth matrix". The switches of the third matrix are referenced as primary switches and the switches of the fourth matrix are referenced as secondary switches.

Each upstream spectral router has a WDM link to each primary switch of a respective set of primary switches of different columns of the third matrix, and a WDM link to each secondary switch of a respective set of secondary switches of different columns of the fourth matrix. The upstream spectral routers of a same column of the first matrix connect to primary switches of a respective set of columns of the third matrix and secondary switches of a respective set of columns of the fourth matrix. The downstream spectral routers of a column of the second matrix has WDM links from primary switches of a respective column of the third matrix and secondary switches from a respective column of the fourth matrix.

Preferably, the upstream spectral routers to which an edge node connects are selected so that all sets of edge nodes connecting to the upstream spectral routers of the first matrix are mutually orthogonal with an orthogonality index of 1.

A WDM link originating from each edge node carries upstream wavelength channels divided into a first number of upstream wavelength channels individually time-locked to time indicators of respective primary switches and a second number of upstream wavelength channels individually time-locked to time indicators of respective secondary switches.

In a network configuration where each primary switch has m inlet ports and m outlet ports, each secondary switch has n inlet ports and n outlet ports, each upstream spectral router connects to $\Omega_1$ primary switches and $\Omega_2$ secondary switches, m>1, n>1, $\Omega_1$>1, $\Omega_2$>1, the values of m, n, $\Omega_1$, and $\Omega_2$ are selected so that $m \times \Omega_1 = n \times \Omega_2$. With the first matrix having $\Lambda$ columns, the second matrix having $\Lambda$ rows, $\Lambda$>1, the number of edge nodes of the network is limited to $(\Lambda \times m \times \Omega_1) = (\Lambda \times n \times \Omega_2)$.

Selecting $\Lambda$ as a prime number, $\Omega_1 \ge \Omega_2$, and with the edge nodes sequentially indexed between 0 and $(\Lambda \times m \times \Omega_1 - 1)$, orthogonal sets of edge nodes, characterized by an orthogonality index of $\lceil \Omega_1/\Lambda \rceil$, connecting to an upstream spectral router in column c, $0 \le c < \Lambda$, and row r, $0 \le r < (\Lambda \times \Omega_1)$, of the first matrix may be determined using the expression:

$$E(c,r,n) = S \times \lfloor r/\Lambda \rfloor + \{j \times (1+m \times c) + m \times (\rho + c)\}_{modulo\ S}, 0 \le j < m,$$

where $S = \Lambda \times m$, and $\rho = r_{modulo\ \Lambda}$.

With $n \ge m$, since $\Omega_1 \ge \Omega_2$, upstream spectral routers of a same row of the first matrix connect to primary switches of a same row of the third matrix, and primary switches of a same column of the third matrix connect to downstream spectral routers of a same column of the second matrix.

If n is an integer multiple of m, upstream spectral routers of (n/m) rows of the first matrix may connect to secondary switches of a same row of the fourth matrix, and secondary switches of a same column of the fourth matrix connect to downstream spectral routers of (n/m) columns of the second matrix. For example, upstream spectral routers of a row of index r of the first matrix connect to primary switches of a row of index $\lfloor r \times m/n \rfloor$ of the fourth matrix, $0 \le r < (\Lambda \times \Omega_1)$, and downstream spectral routers of a column of index c of the second matrix connects to secondary switches of a column of index $\lfloor c \times m/n \rfloor$ of the fourth matrix, $0 \le c < (\Lambda \times \Omega_1)$.

BRIEF DESCRIPTION OF THE DRAWINGS

Embodiments of the present invention will be further described with reference to the accompanying exemplary drawings, in which:

Figure 44:
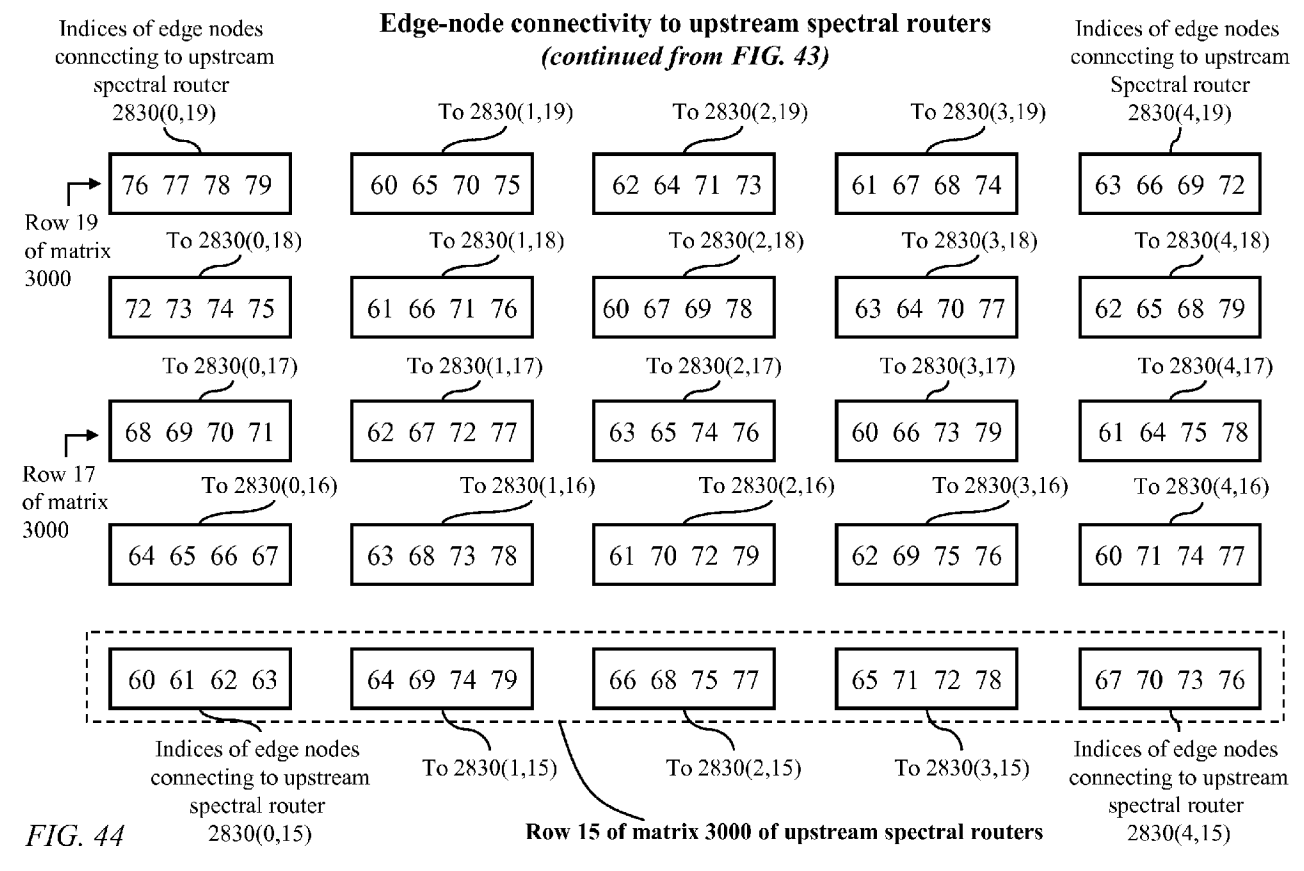

FIGS. 41 to 44 define preferred orthogonal upstream connectivity patterns of edge nodes to upstream spectral routers, in a network having switches arranged in a single matrix, in accordance with an embodiment of the present invention;

FIG. 73 tabulates data-transfer timing of the two-phase single-rotator circulating switch of FIG. 69;

FIG. 83 tabulates data-transfer timing of a latent space switch of the type illustrated in FIG. 77 to FIG. 82, with an arbitrary number of switch elements and an arbitrary value of the order of transposed connections, in accordance with an embodiment of the present invention;

FIG. 93 tabulates data-transfer timing of a single-rotator latent space switch of the type illustrated in FIG. 84, FIG. 86, and FIG. 88, with an arbitrary number of switch elements and an arbitrary value of the order of transposed connections, in accordance with an embodiment of the present invention;

FIG. 94 tabulates data-transfer timing of a single-rotator latent space switch of the type illustrated in FIG. 84, FIG. 86, 88, 89, and FIG. 90, with an arbitrary number of switch elements and an arbitrary value of the order of transposed connections, with transposed connections from the outlets of the single rotator to the output ports of the single-rotator latent space switch, in accordance with an embodiment of the present invention;

FIG. 95 tabulates data-transfer timing of a single-rotator latent space switch of the type illustrated in FIG. 84, FIG. 86, and FIG. 88, but using a descending rotator, in accordance with an embodiment of the present invention;

FIG. 96 tabulates data-transfer timing of a single-rotator latent space switch of the type illustrated in FIG. 89 and FIG. 90, using a descending rotator, in accordance with an embodiment of the present invention;

DETAILED DESCRIPTION

Terminology

Figure 1:
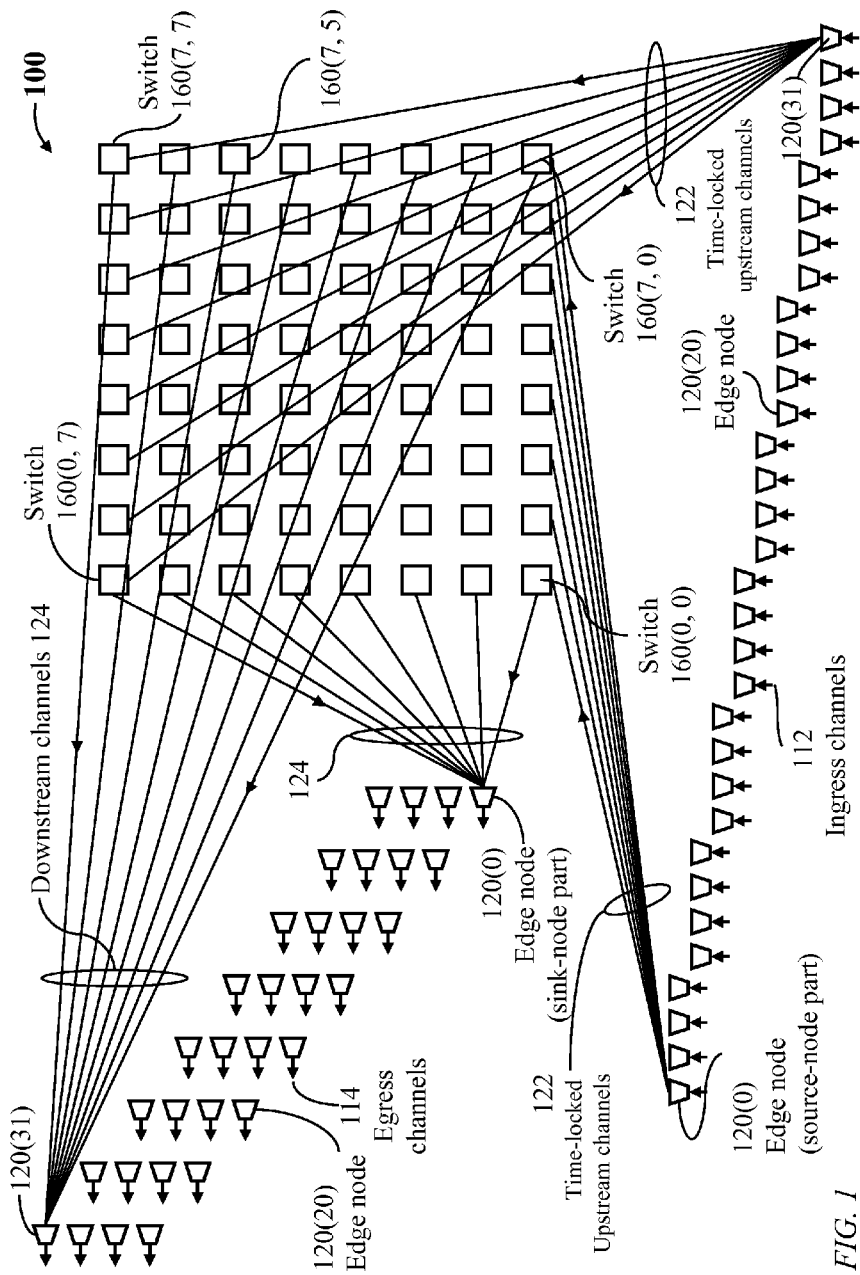
FIG. 1 illustrates a time-coherent network comprising edge nodes interconnected through independent switches arranged in a matrix where each edge node has upstream communication channels to switches of a row and downstream communication channels from switches of a column of the matrix, in accordance with an embodiment of the present invention.

Edge node: A switching node connecting data sources and data sinks to external switching nodes is referenced as an edge node. An edge node may also switch data directly from a data source to a data sink.

Space switch: A space switch has input ports (inlet ports) and output ports (outlet ports) and is configured to connect any input port to any output port. An instantaneous space switch transfers data from an input port to a selected output port with negligible delay. A latent space switch transfers data from an input port to an output port after a systematic switching delay.

Switch unit: A switching node having bufferless input ports (inlet ports) receiving signals from a first group of edge nodes and output ports (outlet ports) transmitting signals to a second group of edge nodes is hereinafter referenced as a "switch unit". A switch unit may be implemented as a fast optical space switch or an electronic space switch. The electronic space switch may have internal memory devices.

Switch: A switch unit may be referenced as a "switch" for brevity, and "switch units" may be referenced as "switches" for brevity. A switch may have an electronic fabric or a photonic fabric. The terms "photonic switch" and "optical switch" are used interchangeably in the specification.

Bufferless switch: A switch having bufferless input ports (inlet ports) is referenced as a bufferless switch. Signals received at the bufferless input ports may include payload data and control data. A controller of a bufferless switch may have a processor and memory devices for holding control data extracted from signals received at the bufferless input ports. A bufferless switch having both bufferless input ports and output ports (outlet ports) is said to provide bufferless access.

Switch dimension: The number of input ports (inlet ports) and the number of output ports (outlet ports) define a "dimension" of a switch; a switch having $n_1$ input ports and $n_2$ output ports is said to be of dimension $n_1 \times n_2$.

Temporal multiplexer: A temporal multiplexer time-interleaves multiple signals each occupying at least one time-slot in a time-slotted frame.

Temporal demultiplexer: A temporal demultiplexer separates time-interleaved signals, each occupying at least one time-slot in a time-slotted frame, into individual signals.

Spectral multiplexer: A spectral multiplexer (also called wavelength multiplexer) combines optical signals of separate wavelength-bands onto a wavelength-division-multiplexed (WDM) link. An optical signal occupying a respective wavelength band is said to occupy a wavelength channel.

Spectral demultiplexer: A spectral demultiplexer (also called wavelength demultiplexer) separates individual wavelength channels of a WDM link.

Spectral router (wavelength router): A spectral router (also called a wavelength router) is a device, well known in the art, which directs individual wavelength channels of a set of input wavelength-division-multiplexed links (WDM links) to a set of output WDM links so that wavelength channels of an input WDM link are directed to wavelength channels of different output WDM links.

Upstream spectral routers: The term refers to a spectral router connecting input WDM links originating from a set of edge nodes to output WDM links connecting to switches (switch units).

Downstream spectral routers: The term refers to a spectral router connecting input WDM links originating from switches (switch units) to output WDM links connecting to a set of edge nodes.

Switch matrix: The term "switch matrix", used extensively in the art, refers to any switching device providing a controllable connection from any input port of a set of input ports to any output port of a set of output ports. A switch matrix typically comprises interconnected switch elements. The switching device is called a "matrix" for historical reasons as one of the early switching devices, the cross-bar switch, had the form of a matrix of switch elements at cross points of intersecting bars. Herein, the term "switch" refers to a switching device, photonic or electronic, of multiple inputs and multiple outputs; the term "switch matrix" is not used herein.

Matrix of switches: The term "matrix of switches" refers to an arrangement of independent switches (independent switch matrices) logically organized into rows and columns. Each row of a matrix of switches has a same number of switches and each column has a same number of switches. None of the switches of a matrix of switches need be connected to any other switch.

Matrix of spectral routers: The term "matrix of spectral routers" refers to an arrangement of independent spectral routers logically organized into rows and columns. Each row of a particular matrix of spectral routers has a same number of spectral routers and each column has a same number of spectral routers. A spectral router may be an upstream spectral router or a downstream spectral router.

Subtending edge nodes: Edge nodes accessing a switch of the matrix of switches, directly or through an upstream spectral router, are said to be subtending edge nodes of the switch.

Orthogonal sets: Any two sets of nodes are said to be orthogonal if the two sets have a number of common nodes not exceeding a predefined upper bound.

Mutually orthogonal sets: Multiple sets of nodes are said to be "mutually orthogonal" if each set is orthogonal to each other set.

Orthogonality Index: A preset upper bound of a number of common nodes in any two sets of nodes defines an orthogonality index; an orthogonality index preferably equals 1.

Time-Coherent switching: A process of contemporaneous switching of signals from bufferless input ports of a switch to output ports of the switch is a time-coherent switching process. The signals may originate from geographically distributed sources and each source controls the timing of signal transmission so that a transmitted signal arrives at the switch at an instant of time dictated by a controller of the switch. A source need not be aware of the magnitude of the propagation delay along the path to the switch. The controller of the switch dictates the time at which signals are transmitted from respective distributed sources.

Entraining: The term refers to a process of exchanging timing data between a controller of a switch of the matrix of switches and a controller of a subtending edge node of the switch to enable a time indicator of the edge node to time-lock to the time indicator of the switch.

Time-coherent network: A network having a set of switches, each switch in the set having bufferless input ports and enforcing time-coherent switching is herein referenced as a time-coherent network.

Upstream direction: The direction of signal flow from an edge node towards a switch is referenced as the upstream direction.

Downstream direction: The direction of signal flow from a switch towards an edge node is referenced as the downstream direction.

Master controller: A controller coupled to a switch is herein called a master controller. A master controller of a switch dictates the timing of transmission of signals from subtending edge nodes, hence the classification as a master controller.

Edge controller: A controller coupled to an edge node is herein referenced as an edge controller. An edge controller communicates with master controllers of switches to which the edge node connects. The edge controller also communicates with element controllers associated with switch elements of the edge node.

Master time indicator: A time indicator coupled to a master controller of a switch is herein referenced as a master time indicator. The master time indicator may be implemented as a cyclic c-bit-wide clock-driven time counter which resets to zero every $2^c$ clock intervals. The duration of a cycle of the time counter exceeds the propagation delay between any edge node and a switch to which the edge node connects. The master time indicators of all switches in a time-coherent network are functionally identical.

Edge time indicator: A time indicator coupled to an edge controller is herein referenced as an edge time indicator. An edge time indicator is functionally identical to a master time indicator.

Time locking: A process of adjusting sending times of signals from each outbound port of an edge node to a switch to which the each outbound port connects is a time-locking process.

Time-locked channel: A channel from an edge node to a switch, where the edge node is time-locked to the switch, is herein called a time-locked channel.

$\lfloor\alpha\rfloor$: $\lfloor\alpha\rfloor$ denotes the nearest integer lower than or equal to a real number "$\alpha$", $\lceil\alpha\rceil$: $\lceil\alpha\rceil$ denotes the nearest integer higher than or equal to a real number "$\alpha$", Modulo operation: The operation X modulo W, herein denoted $X_{modulo\ W}$, where X is any integer, which may be a positive integer or a negative integer, and W is a positive integer is a remainder determined as: $X_{modulo\ W} = X - W \times \lfloor X/W \rfloor$, where $\lfloor R \rfloor$ is the nearest integer that is less than R or equal to R if R is an integer. For example: $\lfloor 7/8 \rfloor = 0$, $\lfloor -7/8 \rfloor = -1$, $\lfloor 8/8 \rfloor = 1$, $\lfloor -8/8 \rfloor = -1$, $\lfloor 9/8 \rfloor = 1$, $\lfloor -9/8 \rfloor = -2$.

Thus, $7_{modulo\ 8} = 7$, $(-7)_{modulo\ 8} = \{-7 - (-1) \times 8\} = 1$, $8_{modulo\ 8} = 0$, $(-8)_{modulo\ 8} = 0$, $9_{modulo\ 8} = 1$, and $(-9)_{modulo\ 8} = 7$.

Circular sum: The circular sum of two arbitrary integers X and Y, with respect to a positive integer J, is defined as $(X+Y)_{modulo\ J}$. In the present application, a circular sum is determined with respect to a positive number N of inlets (or outlets) of a rotator. Thus, hereinafter, a circular sum is understood to be with respect to N. The circular sum is a non-negative integer between 0 and (N-1).

Circular difference: The circular difference between two arbitrary integers X and Y, with respect to a positive integer J, is defined as $(X-Y)_{modulo\ J}$. In the present application, a circular difference is determined with respect to a positive number N of inlets (or outlets) of a rotator. Thus, hereinafter, a circular difference is understood to be with respect to N. Like the circular sum, a circular difference is a non-negative integer between 0 and (N-1).

Rotator: A rotator is a simple device having multiple inlets and multiple outlets. The rotator cyclically connects each inlet to each outlet during every rotation cycle. The rotator itself is not a switching device because it lacks the steering capability.

Uniform rotator: Consider a rotator having N inlets and N outlets with the N inlets indexed as inlets 0 to (N-1) and the N outlets indexed as outlets 0 to (N-1). During a rotation cycle of N time slots, each inlet connects to each outlet. A uniform rotator connects an inlet of index j to an outlet of index $k=(j+\beta \times t)_{modulo\ N}$, where $\beta$ is wither 1 or -1.

Transposing rotator: A transposing rotator connects an inlet of index j to an outlet of index $k=(L-j+\beta \times t)_{modulo\ N}$, where $\beta$ is wither 1 or -1, and L is a transposition order, $0 \leq L < N$. Hereinafter, a rotator is considered uniform unless explicitly described as a transposing rotator.

Peer inlet-outlet pair: An inlet and an outlet of a same index are herein called a peer inlet-outlet pair or an aligned inlet-outlet pair.

Transposed inlet-outlet pair: Where the circular sum of indices of an inlet and an outlet equals a predefined transposition order L, $0 \leq L < N$, the inlet and outlet are said to form a transposed inlet-outlet pair.

Access capacity: The access capacity of a network is the total capacity of ingress ports or egress ports of the edge nodes accessible to data sources and data sinks.

It is noted that a reference numeral may individually or collectively refer to items of a same type. A reference numeral may be further indexed to distinguish individual items of a same type.

Network Structure

FIG. 1 illustrates a time-coherent network 100 comprising edge nodes, collectively referenced as 120 and individually identified as 120(0), 120(1), . . . , 120(Q-1) and switches, collectively referenced as 160, logically arranged in a matrix of switches having μ rows and μ columns of independent switches. None of the switches 160 need be directly connected to any other switch 160. The rows of the matrix are indexed as row 0 to row (μ-1), where row 0 is the bottom row and row (μ-1) is the top row. The columns are indexed as column 0 to column (μ-1), where column 0 is the leftmost column and column (μ-1) is the rightmost column; μ=8 in the exemplary network of FIG. 1. The switches 160 are individually identified as 160(j, k), j being a column identifier and k a row identifier in the matrix. An edge node 120 has a number of ingress channels 112 for receiving data from data sources, a number of egress channels 114 for transmitting data to data sinks. An edge node 120 has a number κ≥μ of upstream channels 122 connecting the edge node to μ switches 160, and a number κ of downstream channels 124 connecting μ switches 160 to the edge node. The κ upstream channels 122 connect the edge node to a switch 160 in each of the ν columns. The downstream channels 124 connect μ switches, one from each of the μ rows, to the edge node. Preferably κ=μ so that an edge node has one upstream channel 122 to each of μ switches 160 of different columns and one downstream channels from μ switches 160 of different rows. To simplify addressing and routing, the κ downstream channels leading to the edge node originate from switches belonging to a same column.

Figure 20:
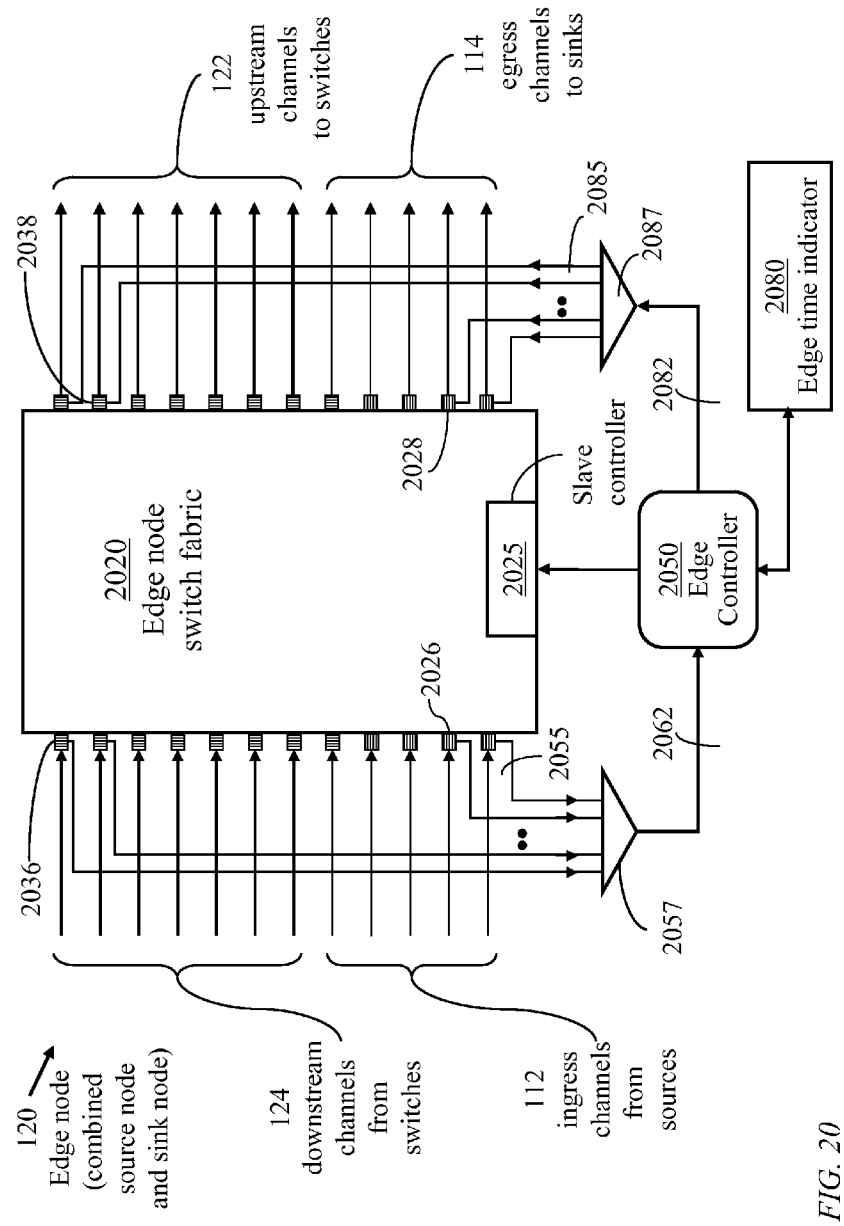
FIG. 20 illustrates an edge node in any of the networks of FIG. 1, FIG. 3, FIG. 5, FIG. 7, FIG. 12, and FIG. 13, in accordance with an embodiment of the present invention.

An edge node 120 comprises a source node integrated with a sink node. For clarity, each edge node 120 is indicated in FIG. 1 as a source-node side having upstream channels 122 and a sink-node side connecting to downstream channels 124. It is understood, however, that a source-node side and a corresponding sink-node side, though illustrated as separate entities, together constitute one of the edge nodes 120. Each edge node 120 comprises an integrated switch fabric to switch data from any ingress channel 112 or from any downstream channel 124 to any egress channel 114 or any upstream channel 122 as illustrated in FIG. 20. An edge node 120 has ingress ports for receiving data from data sources, egress ports for transmitting data to data sinks, inbound ports for receiving signals from respective switches 160 through downstream channels 124, and outbound ports for transmitting signals to respective switches 160 through upstream channels 122.

In the network configuration of FIG. 1, edge node 120(0) has eight upstream channels 122 to eight switches 160(0,0) to 160(7,0) of row 0. Edge node 120(31) has eight upstream channels 122 to eight switches 160(0, 7) to 160(7,7) of row 7 of the matrix of switches. Edge node 120(0) has downstream channels 124 from eight switches 160(0,0) to 160(0, 7) of column 0. Edge node 120(31) has downstream channels 124 from eight switches 160(7,0) to 160(7,7) of column 7.

Figure 2:
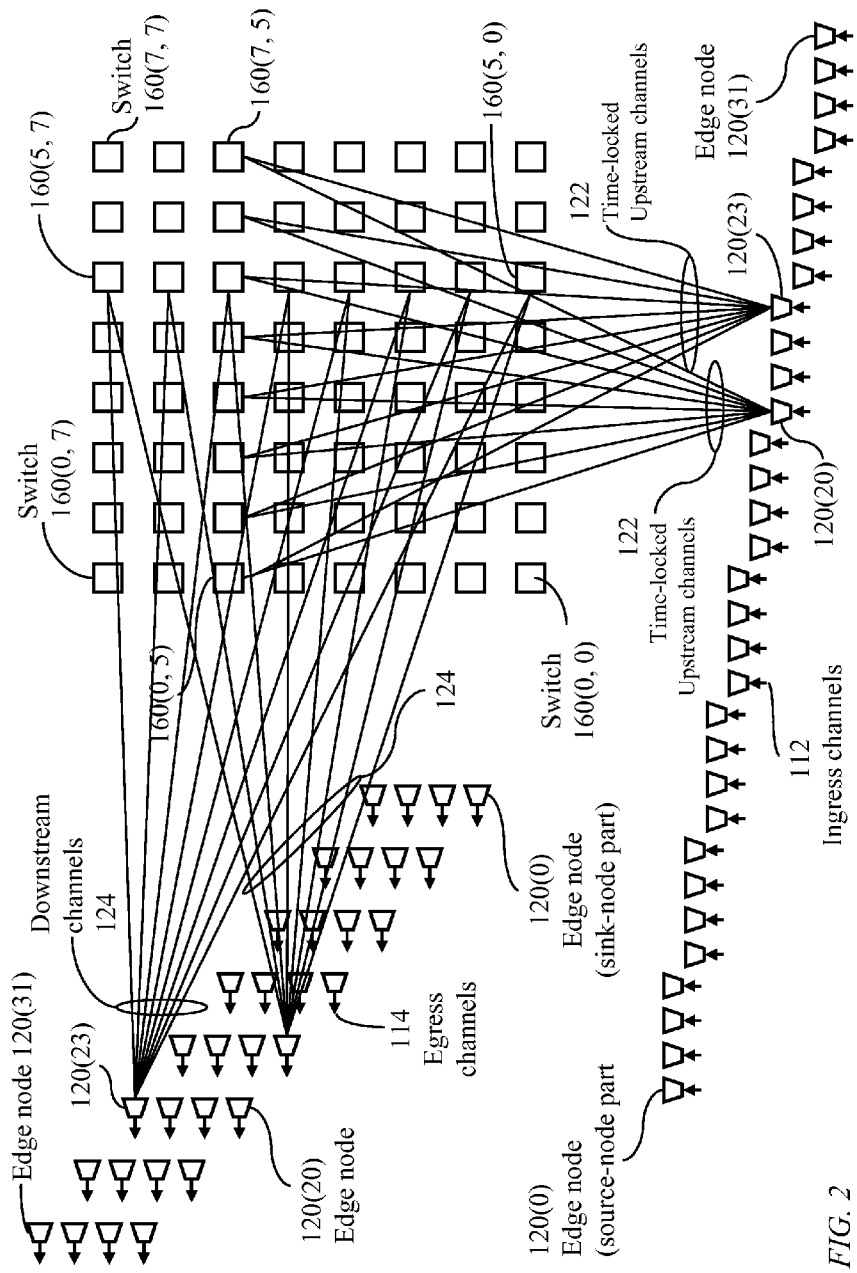
FIG. 2 further illustrates edge-node connections to the independent switches of the time-coherent network of FIG. 1.

FIG. 2 illustrates the connectivity of a set of edge nodes {120(20), . . . , 120(23)} where each edge node in the set has eight upstream channels 122, one to each of eight switches 160(0,5) to 160(7,5) and eight downstream channels 124, one from each of eight switches 160(5,0) to 160(5,7).

Figure 3:
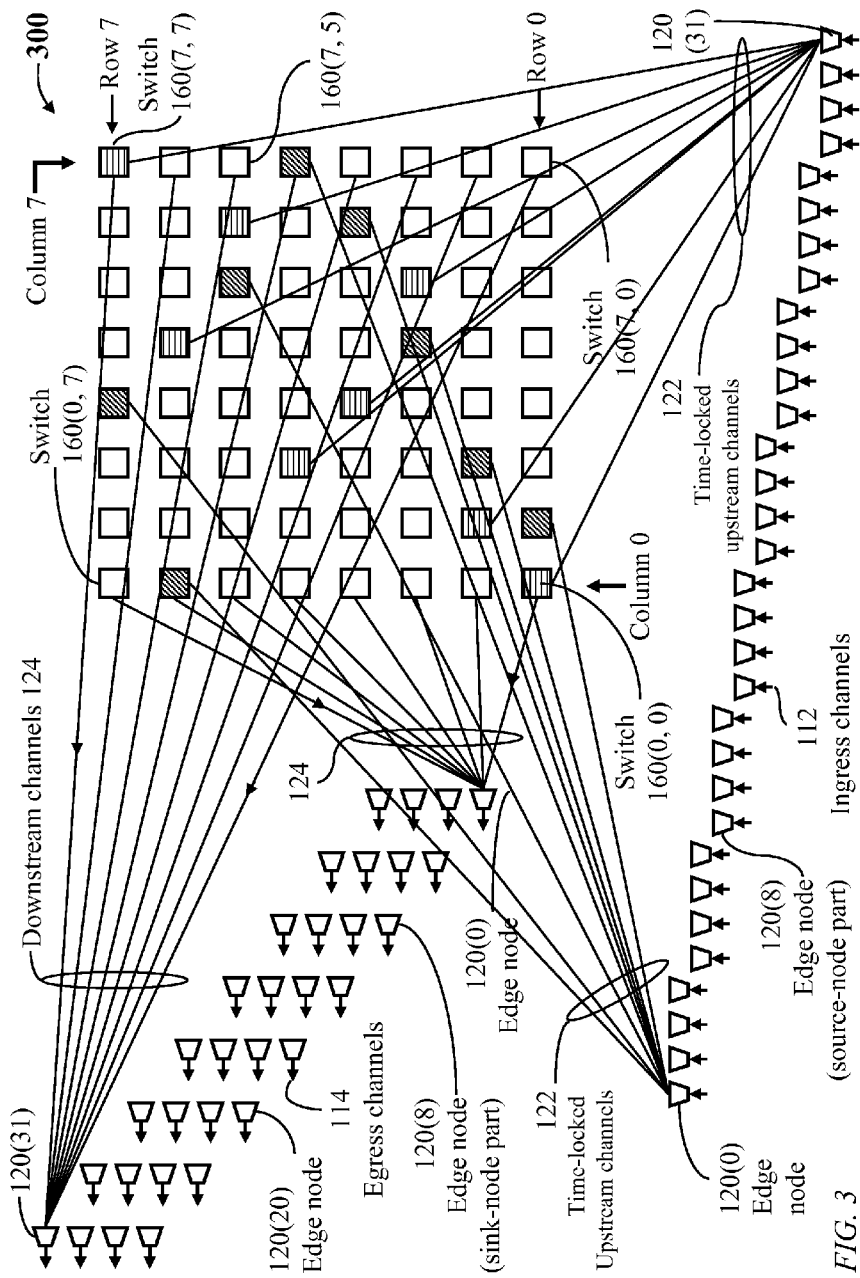
FIG. 3 illustrates a time-coherent network comprising edge nodes interconnected through independent switches arranged in a matrix where each edge node has upstream communication channels to switches in different columns and downstream communication channels from switches of one column of the matrix, in accordance with an embodiment of the present invention.

FIG. 3 illustrates a time-coherent network 300 having a configuration similar to that of the time-coherent network 100 of FIG. 1 except that each of edge nodes 120 has time-locked upstream channels 122 to switches 160 of different rows and different columns of the matrix of switches instead of time-locked upstream channels 122 to switches 160 of a single row. The downstream connectivity from switches 160 to the edge nodes 120 is the same as that of network 100 of FIG. 1. In the exemplary configuration of FIG. 3, edge node 120(0) has eight upstream channels 122 to eight switches 160(0,6), 160(1,0), 160(2, 1), 160(3,7), 160(4,2), 160(5,5), 160(6,3) and 160(7, 4). Edge node 120(31) has eight upstream channels 122 to eight switches 160(0, 0), 160(1,1), 160(2,4), 160(3,3), 160(4,6), 160(5,2), 160(6,5), and 160(7,7). The downstream connectivity of edge nodes 120(0) and 120(31) is identical to that of FIG. 1.

A major advantage of the network configuration of FIG. 1 or FIG. 3 is that each edge node 120 has a simple path to each other edge node 120 traversing a single switch 160. This greatly simplifies signaling, connection setup, and connection tracking. Several compound paths may be established between a source edge node and a destination edge node. A compound path comprises two simple paths joined at an intermediate edge node 120. There are (2μ-2) compound paths from any edge node 120(j) to any other edge node 120(k), j≠k. However, the (2μ-2) compound paths include partly overlapping paths. Each edge node has μ upstream channels and μ downstream channels. Therefore, a maximum of (μ-1) non-overlapping compound paths may be established from any edge-node to any other edge node.

In the configuration of FIG. 1, each edge node 120 has an upstream channel to each switch 160 of a respective row and a downstream channel 124 from each switch 160 of a respective column of the matrix of switches 160. In the configuration of FIG. 3 an edge node may have upstream channels 122 to switches in different columns and different rows instead of switches of different columns but a same row. Connecting upstream channels to switches of different rows may be a result of implementing orthogonal upstream connectivity where the sets of edge nodes connecting the switches 160 are selected to be mutually orthogonal in order to balance the traffic loads offered to the switches. FIG. 3 illustrates upstream channels 122 from edge nodes 120(0) and 120(31) and downstream channels 124 to edge nodes 120(0) and 120(31).

Figure 4:
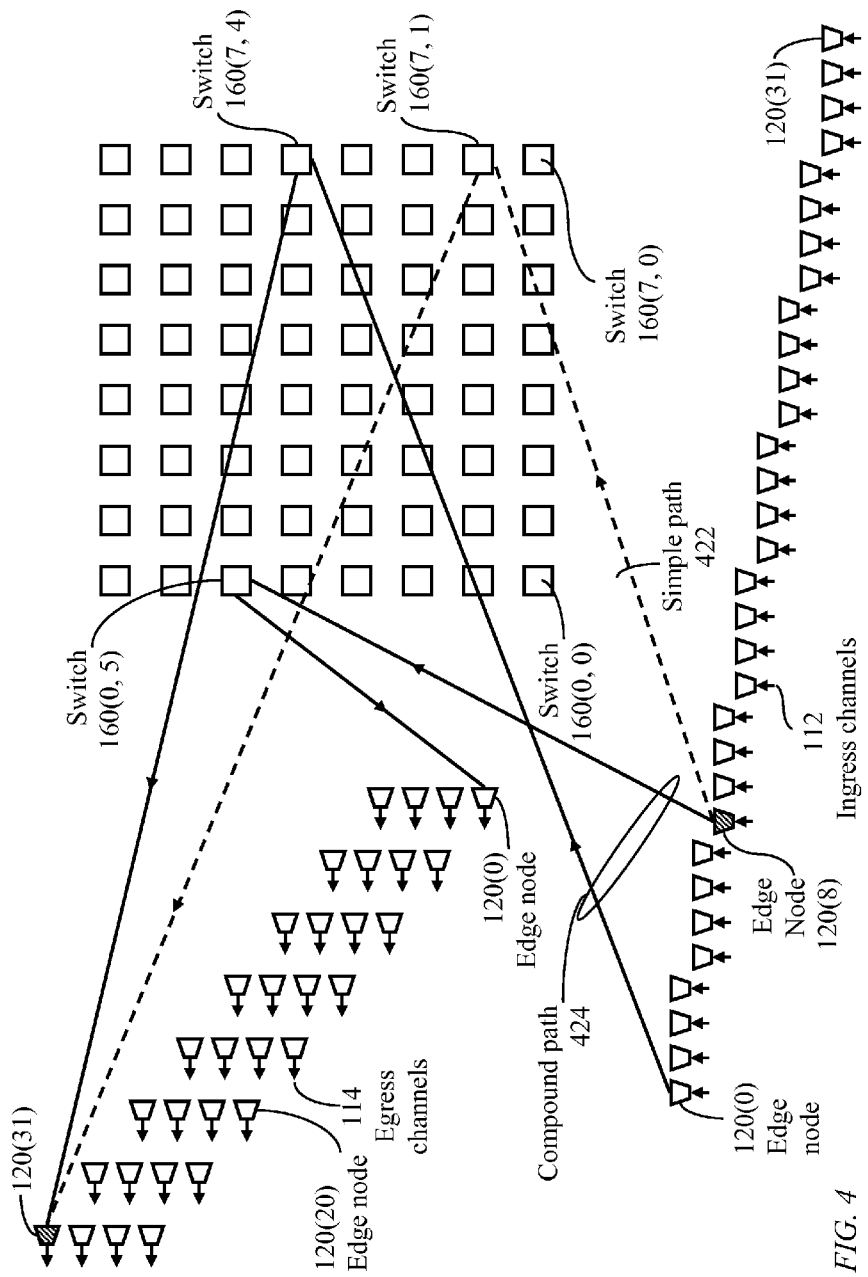
FIG. 4 illustrates a simple connection and a compound connection in the network of FIG. 3, in accordance with an embodiment of the present invention.

FIG. 4 illustrates a simple path 422 from an originating edge node 120(8) to a destination edge node 120(31) traversing switch 160(7,1), where edge node 120(8) has eight upstream channels 122 to eight switches 160(0,5), 160(1,2), 160(2, 3), 160(3,4), 160(4,6), 160(5,7), 160(6,1) and 160(7, 0). An exemplary compound path 424 from originating edge node 120(8) to destination edge node 120(31) traverses switch 160(0,5), intermediate edge node 120(0), and switch 160(7,4).

The network of FIG. 1 or FIG. 3 comprises a single matrix of independent switches 160 connecting edge nodes 120. Preferably, the switches 160 are fast optical switches. A fast optical switch may be limited to a medium dimension, 64×64 for example. It may be desirable, however, to provide a parallel matrix of electronic switches. An electronic switch may be implemented as a single-rotator latent space switch, to be described below with reference to FIG. 84 to FIG. 92. The single-rotator latent space switch has a simple structure and scales gracefully to relatively large dimensions; 8192× 8192 for example.

Figure 5:
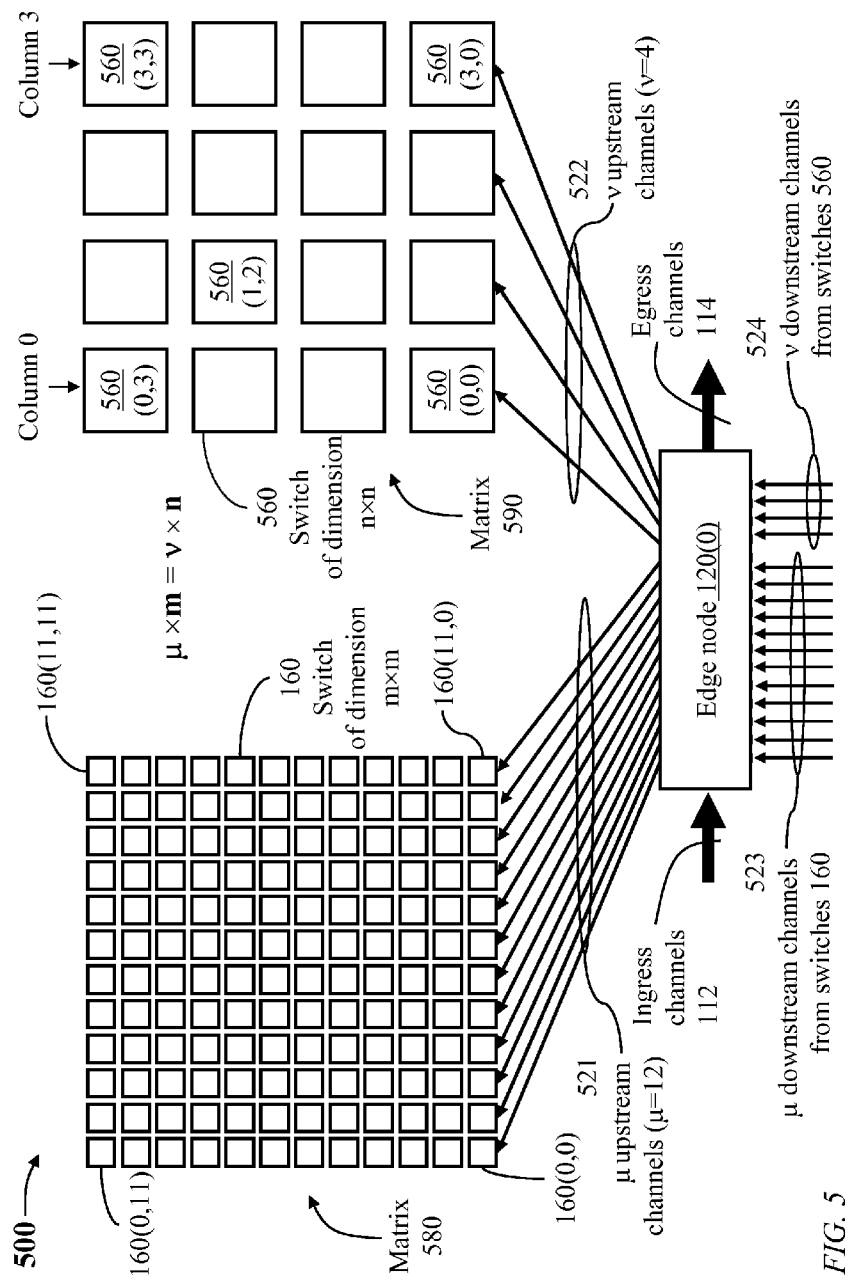
FIG. 5 illustrates a time-coherent network comprising edge nodes interconnected through a network core comprising a first matrix of photonic switches, each photonic switch having a first number of dual inlet-outlet ports, and a second matrix of electronic switches, each electronic switch having a second number of dual inlet-outlet ports, each edge node having time-locked upstream channels to photonic switches of a row of the first matrix and time-locked upstream channels to electronic switches of a row of the second matrix where the second number is an integer multiple of the first number, in accordance with an embodiment of the present invention.

FIG. 5 illustrates a network 500 employing two matrices of switches. An edge node 120 has μ upstream channels 521 to μ switches 160, each of dimension m×m (m=4), arranged in a first matrix 580 of μ columns and μ rows (for the case of μ=12). The edge node also has ν upstream channels 522 to ν switches 560, each of dimension n×n (n=12), arranged in a second matrix 590 of ν columns and ν rows (for the case of ν=4). The edge node has μ downstream channels 523 from switches 160 and ν downstream channels 424 from switches 160. The edge node receives data from data sources through ingress channels 112 and transmits data to data sinks through egress channels 114. The total number of edge nodes is μ×m=ν×n=48. The switches of matrices 580 and 590 are independent; none of switches 160 need be directly connected to any other switch 160 or 560, and none of switches 560 need be directly connected to any other switch 160 or 560.

Figure 6:
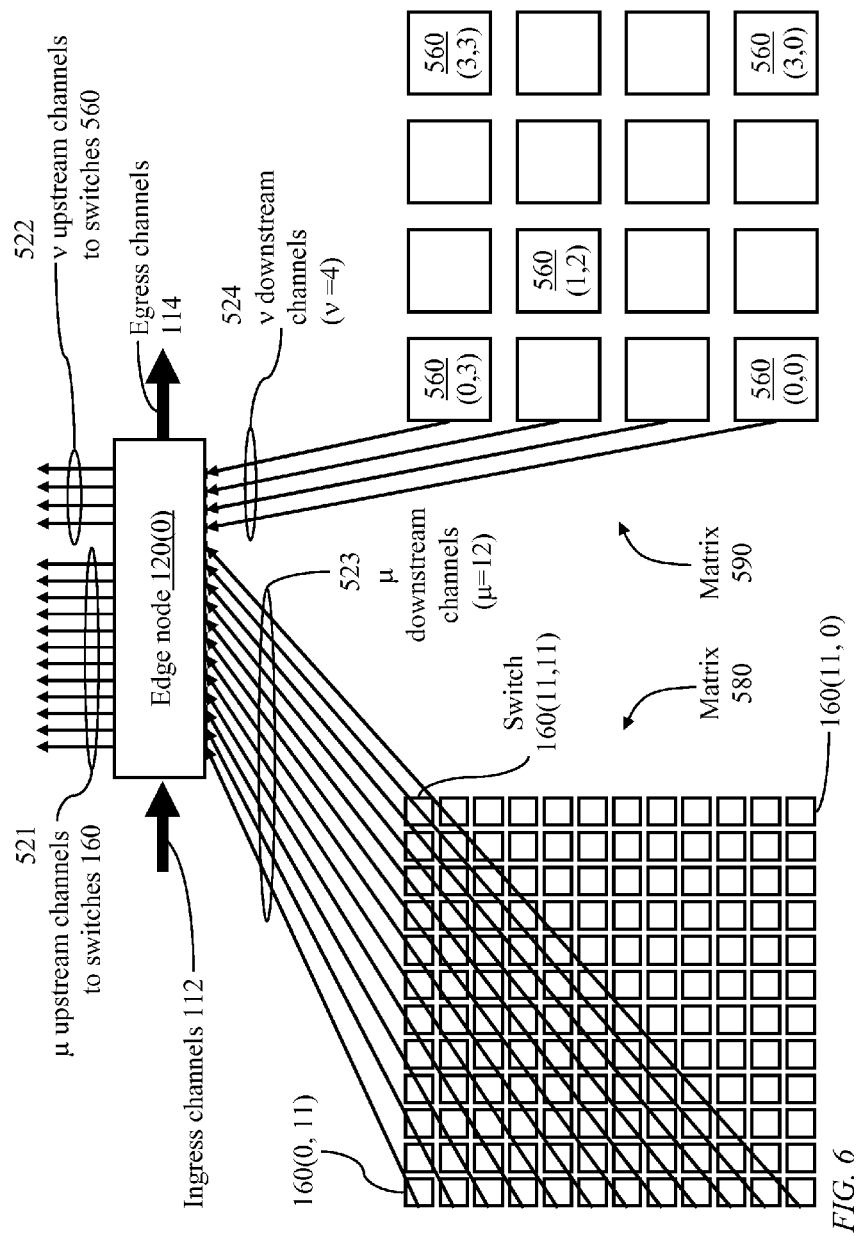
FIG. 6 illustrates downstream channels, in the network of FIG. 5, from photonic switches of a column of the first matrix to an edge node and downstream channels from electronic switches of a column of the second matrix to the edge node, in accordance with an embodiment of the present invention.

FIG. 6 illustrates downstream connectivity of the edge node 120 of FIG. 5 where the edge node connects to μ downstream channels 523 from μ switches 160 of column 11 of the first matrix 580 and ν downstream channels 524 to ν switches 160 in column 0 of the second matrix 590.

Figure 7:
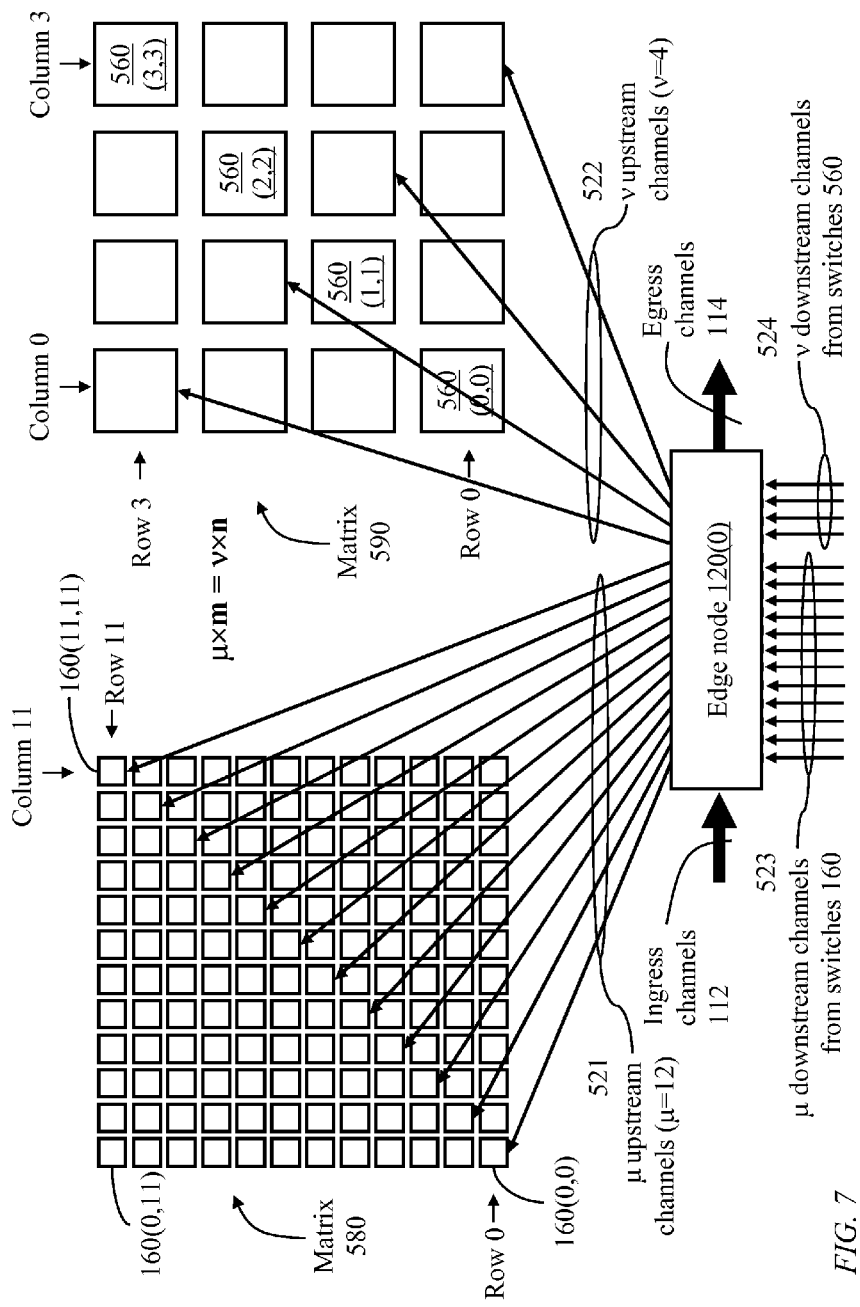
FIG. 7 illustrates upstream channels from an edge node to switches in different rows and different columns of the two matrices of switches of the network of FIG. 5, in accordance with an embodiment of the present invention.

FIG. 7 illustrates an alternative upstream connectivity of the edge node 120 of FIG. 5 where the upstream channels 521 connect to switches 160 in different rows and different columns in the first matrix 580 and the upstream channels 522 connect to switches 560 in different rows and different columns in the second matrix 590.

Figure 8:
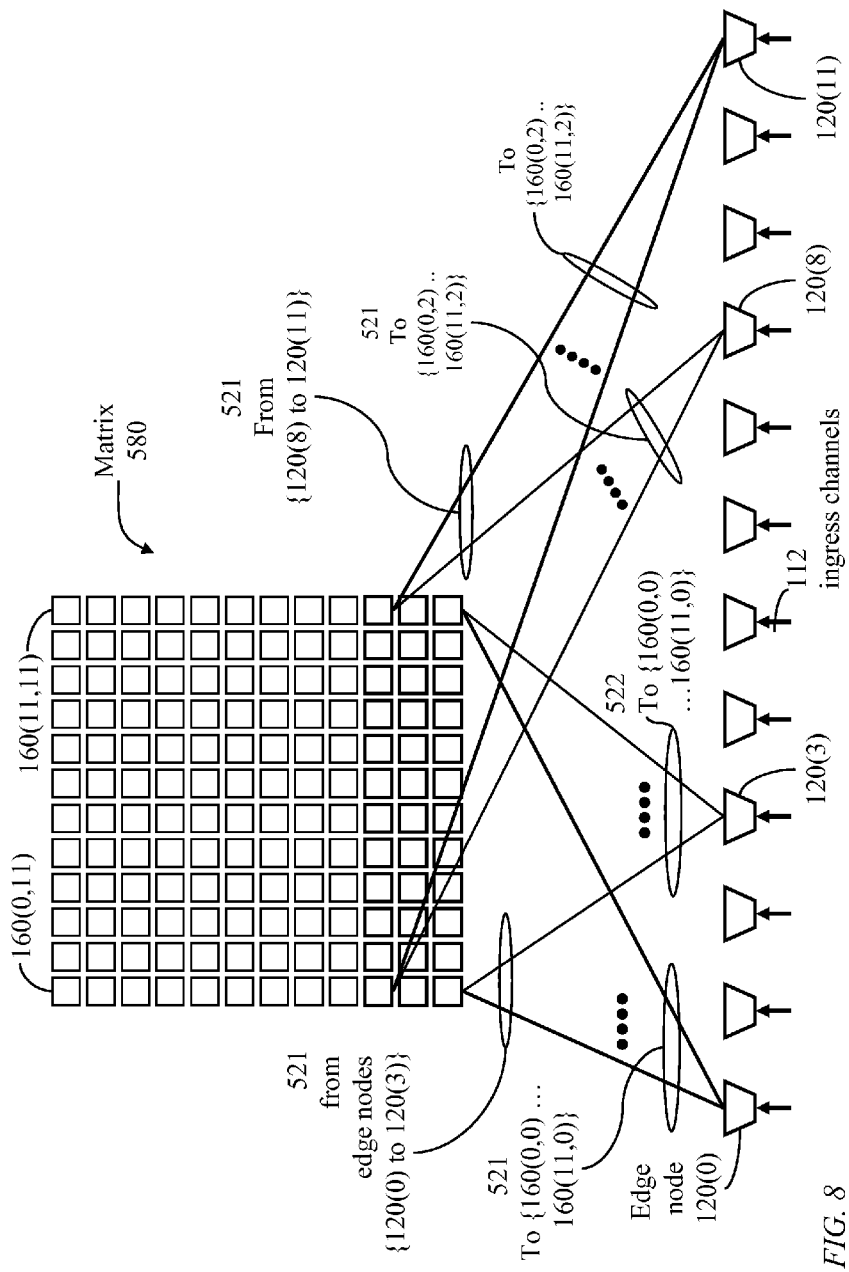
FIG. 8 illustrates time-locked upstream channels from a set of edge nodes to respective switches of the first matrix of switches of the network of FIG. 5, in accordance with an embodiment of the present invention.

FIG. 8 illustrates upstream connectivity of 12 edge nodes {120(0) to 120(11)}, of the total of 48 edge nodes, to the first matrix 580 of FIG. 5. The upstream channels 522 connect to switches 160 of three rows of matrix 580. Each edge node has 12 upstream channels 521 to switches 160 in a row of the first matrix 580 and 4 upstream channels 522 to switches 560 in a row of the second matrix 590. The total number of upstream channels from the 12 edge nodes to the first matrix is 12×μ=144 and the total number of upstream channels from the 12 edge nodes to the second matrix is 12×μ=48.

Figure 9:
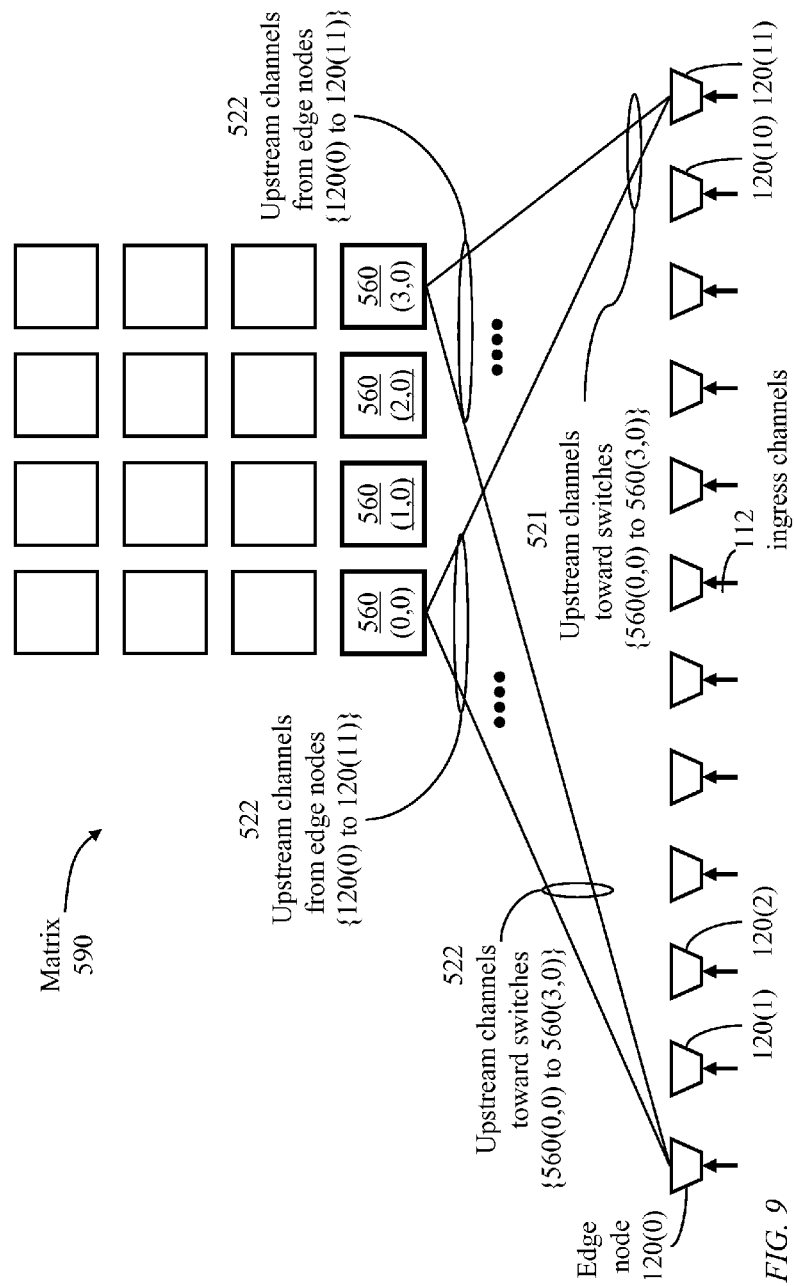
FIG. 9 illustrates time-locked upstream channels from a set of edge nodes to respective switches of the second matrix of switches of the network of FIG. 5, in accordance with an embodiment of the present invention.

FIG. 9 illustrates upstream channels from the 12 edge nodes {120(0) to 120(11)} to the second matrix 590 of FIG. 5. The upstream channels 522 connect to switches 160 of one row of matrix 590. The switches 160 in a row of the first matrix collectively connect to 48 upstream channels and, similarly, the switches 560 in a row of the second matrix collectively connect to 48 upstream channels.

Figure 10:
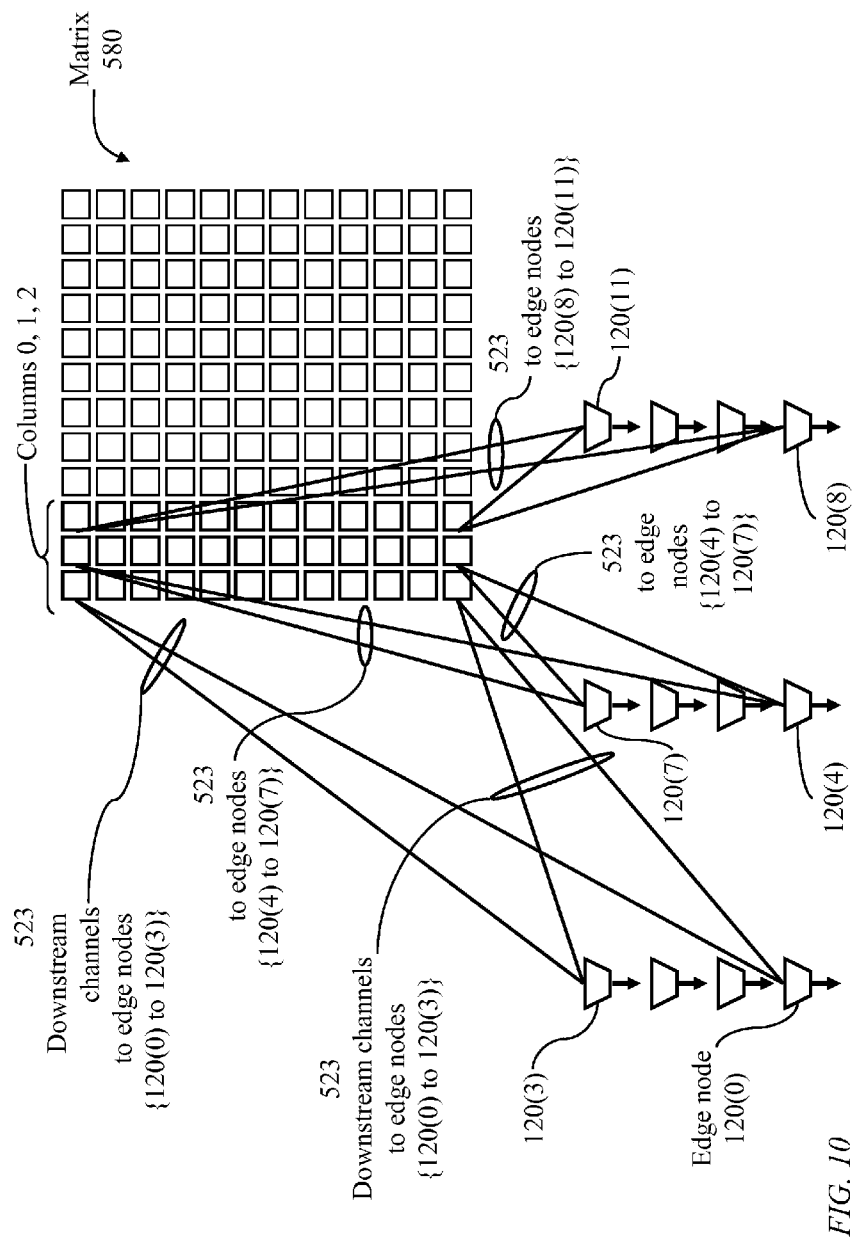
FIG. 10 illustrates downstream channels from the first matrix of switches of the network of FIG. 5 to a set of edge nodes, in accordance with an embodiment of the present invention.

FIG. 10 illustrates downstream channels from the first matrix 580 of switches of the network of FIG. 5 to each of the 12 edge nodes 120(0) to 120(11). The 12 edge nodes have downstream channels from switches 160 of three columns (column 0, column 1, and column 2).

Figure 11:
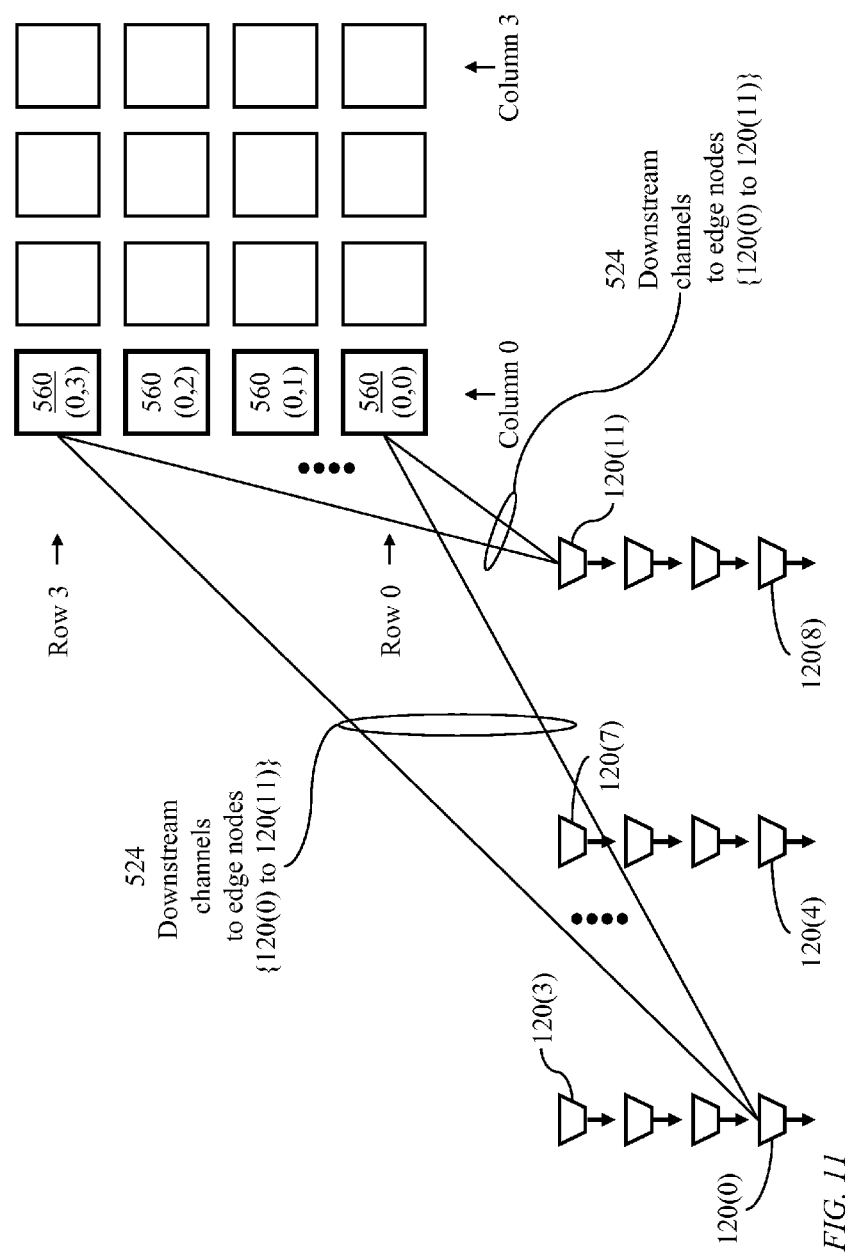
FIG. 11 illustrates downstream channels from the second matrix of switches of the network of FIG. 5 to a set of edge nodes, in accordance with an embodiment of the present invention.

FIG. 11 illustrates downstream channels from the second matrix 590 of switches of the network of FIG. 5 to each of the 12 edge nodes 120(0) to 120(11). The 12 edge nodes have downstream channels from switches 560 of one column (column 0).

Global Coverage

One may envisage a global network initially serving one billion users each equipped to transmit and receive data at a rate of 100 megabits per second in any format; which is likely to be the network-user's expectation in the near future. The access capacity of such a network would be 100 petabits per second. With a user utilization factor of 0.1 for example, and with traffic efficiency of the order of 0.8, the network should have a core capacity (throughput) of at least 12.5 petabits per second.

An edge node providing traffic-switching capacity of 10 terabits per second, for example, would support one million users, and only 1000 edge nodes of such capacity would be needed to serve a user population of one billion. However, with Earth's land area of 150 million km², the use of only 1000 edge nodes may necessitate long access lines from the users' premises to the edge nodes, taking into account the uneven population distribution and the uninhabited areas. A more realistic number of edge nodes would be of the order of 50,000. Within the United States, 10000 edge nodes would be quite adequate to cover the land area of 9 million km², and the required capacity of an edge node would vary from a hundred gigabits per second to tens of terabits per second.

Thus, in a network of global coverage, the number ν of upstream channels 122 connecting an edge node 120 to ν switches 160 or downstream channels 124 connecting ν switches 160 to an edge node 120 may be significantly large; 1024 for example. Each upstream channel 122 or downstream channel 124 is a wavelength channel within a respective fiber-optic link. A group of upstream channels 122 occupying separate spectral bands may share a wavelength-division-multiplexed (WDM) fiber link. Likewise, a group of downstream channels 124 occupying separate spectral bands may share a wavelength-division-multiplexed (WDM) fiber link. Spectral routers may be used to connect the edge nodes 120 to the switches 160 or 560 (FIG. 5) using a relatively small number of WDM links as will be illustrated in FIG. 12 and FIG. 13.

Figure 12:
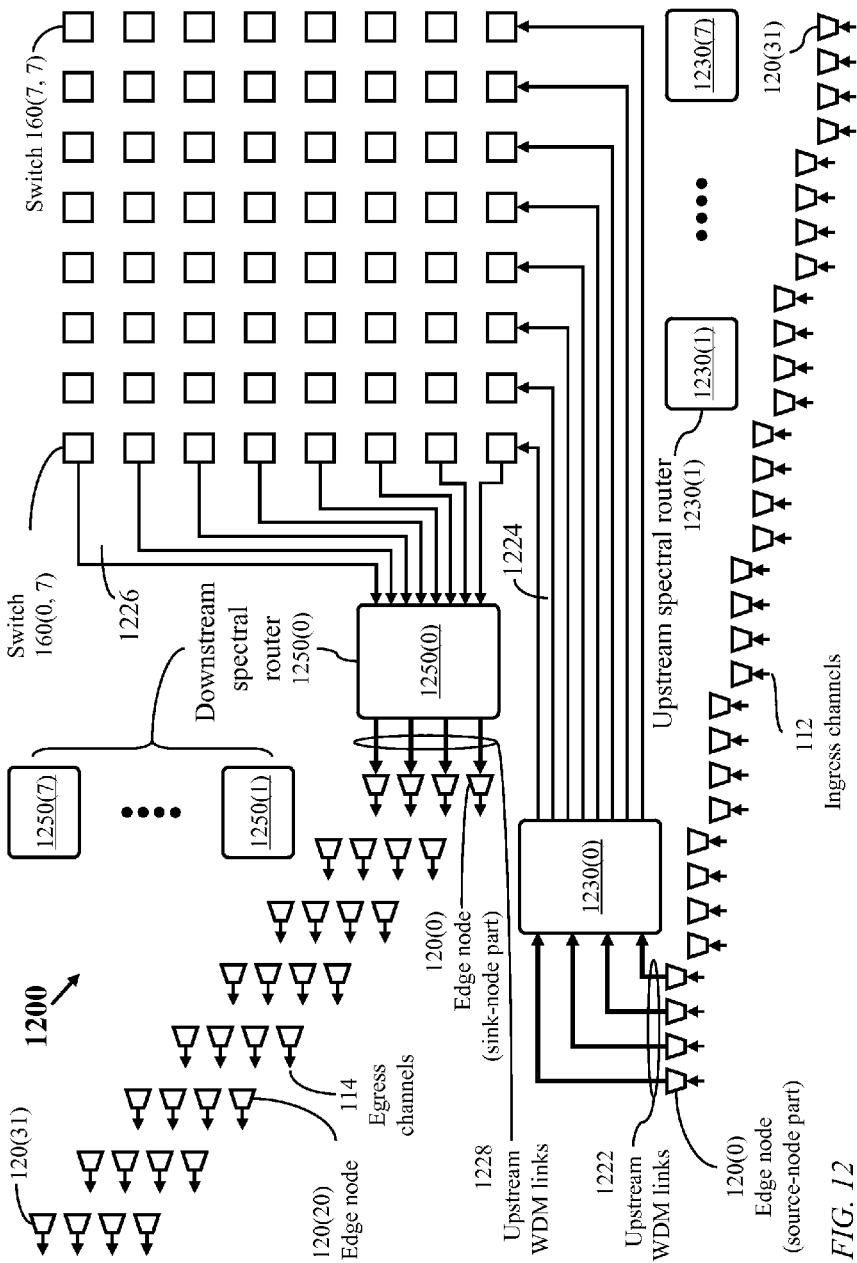
FIG. 12 illustrates a network comprising edge nodes and switches arranged in a matrix, each edge node having upstream wavelength-division-multiplexed (WDM) links to upstream spectral routers and downstream WDM links from downstream routers, each upstream spectral router having WDM links to switches of one row and each downstream spectral router having WDM links from switches of one column, in accordance with an embodiment of the present invention.

FIG. 12 illustrates a network 1200 comprising edge nodes 120 and switches 160 arranged in a single matrix. The edge nodes 120 are individually identified as 120(0) to 120(Q−1), Q being the total number of edge nodes. The switches 160 are logically arranged in a single matrix having μ columns and μ rows, μ>1. Each switch 160 has m input ports and m output ports, m>1. Each edge node 120 comprises an edge controller as will be described with reference to FIG. 20 and each switch 160 comprises a switch controller as will be described with reference to FIG. 22. In the exemplary network of FIG. 12, μ=8 and m=4, hence Q=μ×m=32.

Each edge node 120 has upstream wavelength-division-multiplexed (WDM) links to upstream spectral routers 1230 and downstream WDM links from downstream spectral routers 1250. Each upstream spectral router 1230 has WDM links to switches 160 of one row of the matrix and each downstream spectral router 1250 has WDM links from switches 160 of one column of the matrix.

Upstream spectral routers 1230 may be used to connect the edge nodes 120 to the switches 160 and downstream spectral routers 1250 may be used to connect the switches 160 to the edge nodes 120. For example, an upstream spectral router 1230 may connect 32 upstream WDM links 1222 from a set of 32 edge nodes 120 to 32 WDM links 1224 leading to 32 switches 160. Each WDM link 1222 carries 32 wavelength channels from a single edge node 120 and each WDM link 1224 carries a wavelength channel from each edge node in the set of 32 edge nodes. Likewise, a downstream spectral router 1250 may connect 32 WDM links 1226 from 32 switches 160 to 32 WDM links 1228 leading to 32 edge nodes 120. Each WDM link 1228 carries channels directed to a single edge node 120. Thus, with μ=1024, for example, an edge node 120 would have 32 upstream links 1222 leading to 32 upstream spectral routers 1230 and 32 downstream links 1228 from 32 downstream wavelength routes 1250.

Figure 13:
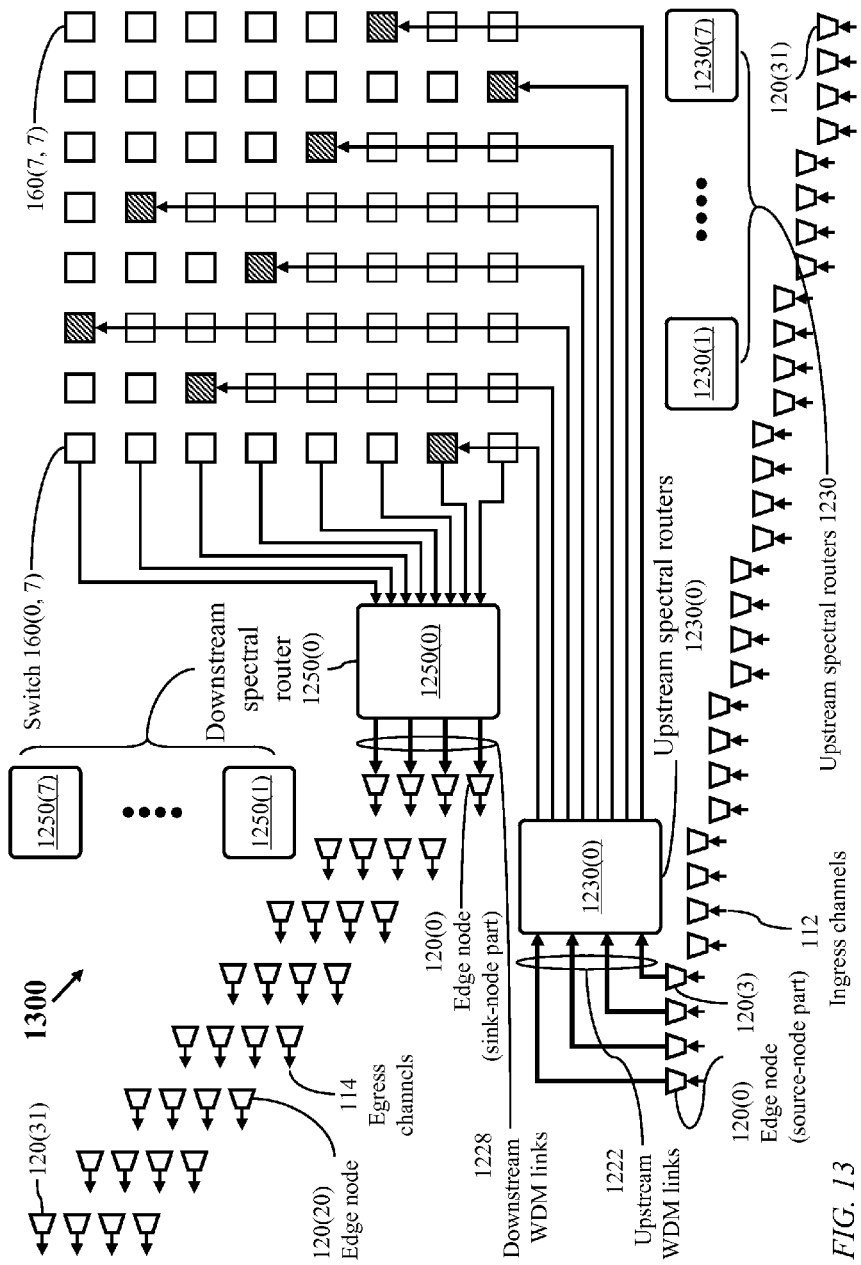
FIG. 13 illustrates a network comprising edge nodes and switches arranged in a matrix, each edge node having upstream wavelength-division-multiplexed (WDM) links to upstream spectral routers and downstream WDM links from downstream routers, each upstream spectral router having WDM links to switches in different rows and different columns of the matrix of switches and each downstream spectral router having WDM links from switches of one column of the matrix of switches, in accordance with an embodiment of the present invention.

FIG. 13 illustrates a network 1300 similar to the network of FIG. 12 but with a different upstream connectivity. Each upstream spectral router 1230 has WDM links to switches in different rows and different columns. Each downstream spectral router 1250 has WDM links from switches of one column as in the network of FIG. 12.

As will be described below, with reference to FIG. 20, an edge node 120 has ingress ports, connecting to ingress channels 112, for receiving data from data sources, egress ports, connecting to egress channels 114, for transmitting data to data sinks, inbound ports, connecting to downstream channels 124, for receiving signals from respective switches 160 through downstream spectral routers 1250, and outbound ports, connecting to upstream channels 122, for transmitting signals to respective switches 160 through upstream spectral routers 1230.

The connections of the upstream spectral routers 1230 to the edge nodes 120 are configured so that each edge node 120 connects to a respective set of μ switches, one in each of the μ columns. The connections of the downstream spectral routers 1250 to the edge nodes 120 are configured so that each edge node 120 connects to a respective group of μ switches, one in each of the μ rows. Preferably, each group of μ switches connecting to an edge node in the downstream direction belongs to a single column in the matrix of switches.

With identical switches 160, the number Q of edge nodes 120 is determined by the dimension of a switch 160 and the number μ of rows or columns in the matrix of switches. With each switch having m inlet ports and m outlet ports, the number Q of edge nodes is determined as Q=µ×m, and the number of switches 160 is µ².

A switch 160 may be: (1) a bufferless electronic space switch; (2) a single-rotator latent space switch (to be described below with reference to FIG. 84 to FIG. 92) or (3) a fast switching optical space switch. Preferably, the switches 160 of network 1200 are fast optical switches.

In the network of FIG. 12, an upstream spectral router 1230 connects a subset of edge nodes 120 to switches 160 of one row. It may be desirable to connect the subset of edge nodes 120 to switches in different rows and different columns. In the network of FIG. 13, upstream spectral router 1230(0) connects the subset of edge nodes {120(0), 120(1), 120(2), 120(3)} to eight switches {160(0,1), 160(1,5), 160(2,7), 160(3,4), 160(4,6), 160(5,3), 160(6,0), 160(7,2)} so that each edge node in the subset has one upstream channel to each of the eight switches.

Figure 14:
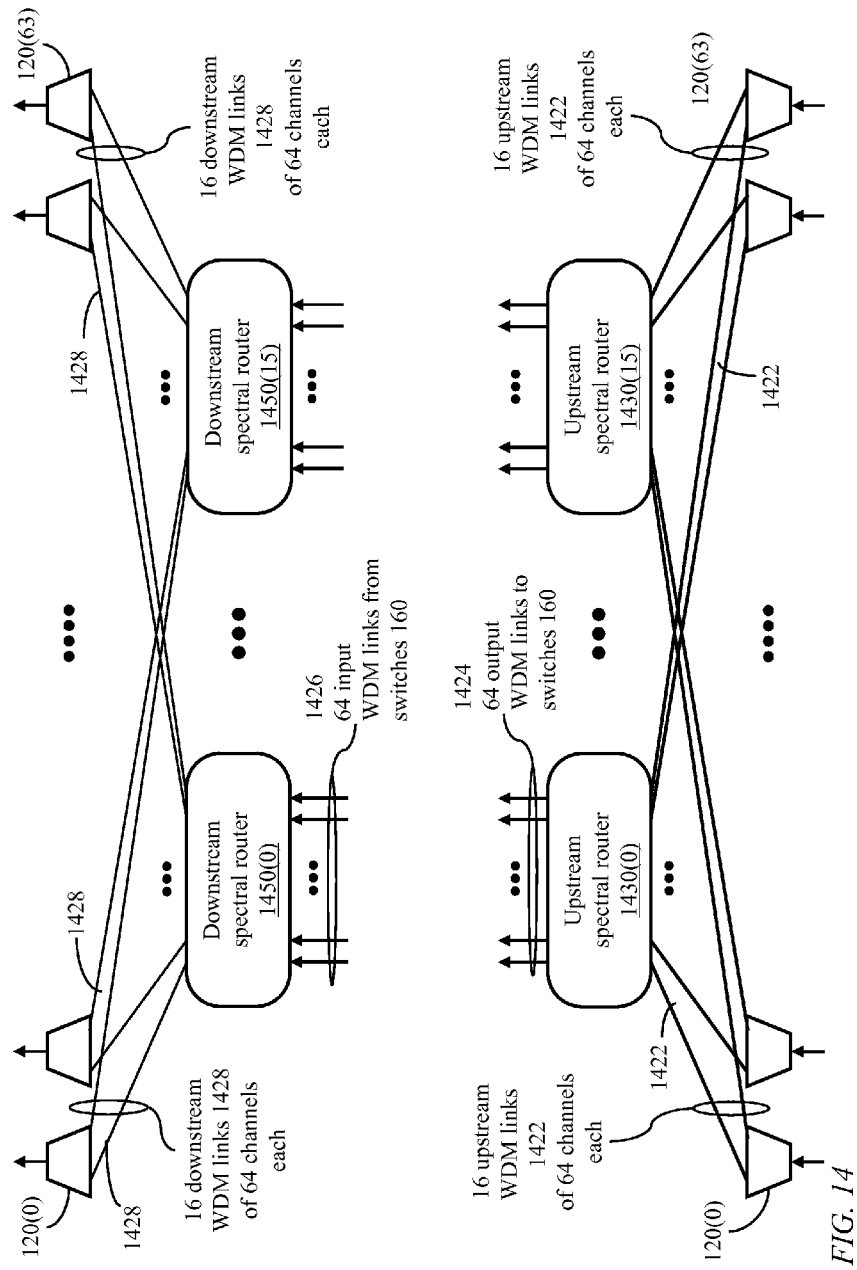
FIG. 14 illustrates edge-node connectivity to arrays of spectral routers connecting to switches of the matrix of switches of the network of FIG. 12 where each edge node connects to an array of upstream spectral routers and an array of downstream spectral routers, in accordance with an embodiment of the present invention.

FIG. 14 illustrates exemplary connections of a group of 64 edge nodes 120 arbitrarily indexed as 120(0) to 120(63) each having 1024 upstream wavelength channels to switches 160 through upstream spectral routers 1430 and 1024 downstream wavelength channels from switches 160 through downstream spectral routers 1450. The 1024 upstream wavelength channels emanating from an edge node are grouped into 16 upstream WDM links 1422 each WDM link 1422 multiplexing 64 wavelength channels and terminating onto one upstream spectral router 1430. Likewise, the 1024 downstream wavelength channels terminating on an edge node 120 are grouped into 16 downstream WDM links 1428 each WDM link 1428 multiplexing 64 wavelength channels, each downstream WDM link 1428 emanating from a downstream spectral router 1450. Each switch 160 is of dimension 64×64, having 64 input ports (inlet ports) and 64 output ports (outlet ports), each input port supporting one upstream wavelength channel and each output port supporting one downstream wavelength channel. Each switch 160 has a spectral demultiplexer at input (not illustrated in FIG. 14) for demultiplexing wavelength channels of an input WDM link 1424 from an upstream spectral router 1430 and directing each wavelength channel to a respective input port of the switch 160. Each switch 160 has a spectral multiplexer at output (not illustrated in FIG. 14) for multiplexing output wavelength channels onto an output WDM link 1426.

Sixteen upstream spectral routers 1430, individually identified as 1430(0) to 1430(15) are used to direct the 1024 upstream wavelength channels emanating from each of edge nodes 120(0) to 120(63) to 1024 different switches 160, subject to the connectivity conditions described with reference to FIG. 1 and FIG. 3. An upstream spectral router 1430 connects at input to 64 incoming WDM links 1422 each carrying 64 wavelength channels from 64 edge nodes 120, and connects at output to 64 output WDM links 1424 each carrying one wavelength channel from each of the 64 WDM links 1422 to which the upstream spectral router 1430 connects.

Likewise, sixteen downstream spectral routers 1450, individually identified as 1450(0) to 1450(15) are used to direct downstream wavelength channels of 1024 downstream WDM links 1426 emanating from 1024 different switches 160 to edge nodes 120(0) to 120(63), so that each edge node 120 receives wavelength channels from switches 160 belonging to one column of the matrix of switches as described with reference to FIG. 1 and FIG. 3. A spectral router 1450 connects at input to 64 downstream WDM links 1426 each carrying 64 wavelength channels and connects at output to 64 output WDM links 1428 each carrying one downstream wavelength channel from each of 64 downstream WDM links 1426 to which the downstream spectral router 1450 connects.

Figure 15:
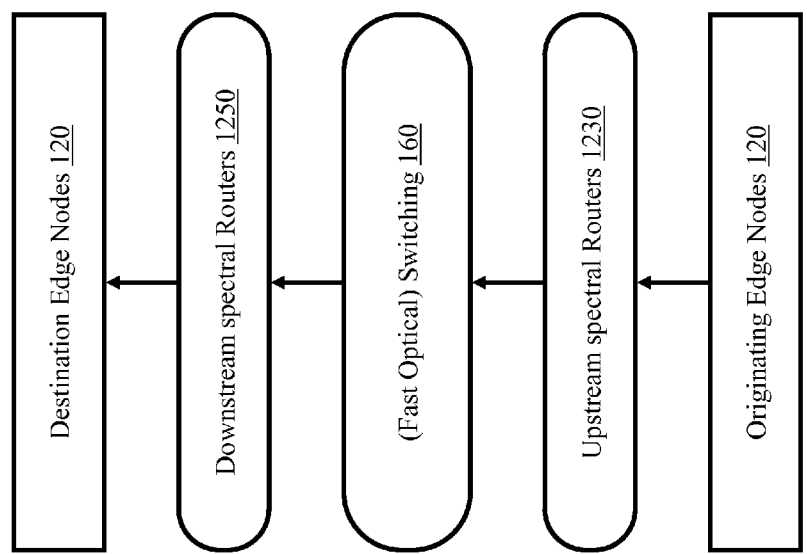
FIG. 15 illustrates signals flow from originating edge nodes to destination edge nodes in the network of FIG. 12 or FIG. 13, where a signal traverses an upstream spectral router, a switch, and a downstream spectral router.

FIG. 15 provides an overview of simple paths in the network of FIG. 12 or the network of FIG. 13. Each simple path originates from a source edge node 120 and terminates in a destination edge node 120. A simple path traverses an upstream spectral router 1230, a switch 160, and a downstream spectral router 1250.

Time-Coordination

A switch 160 has a master time indicator which provides a time reference to be observed by each edge node 120 having an upstream channel to the switch 160. The master time indicators of the µ² switches are independent of each other.

Each edge node 120 has µ output ports connecting to µ switches in µ different columns through upstream channels. An output port of an edge node 120 has a slave time indicator which time locks to a master time indicator of a switch 160 to which the output port connects.

Figure 22:
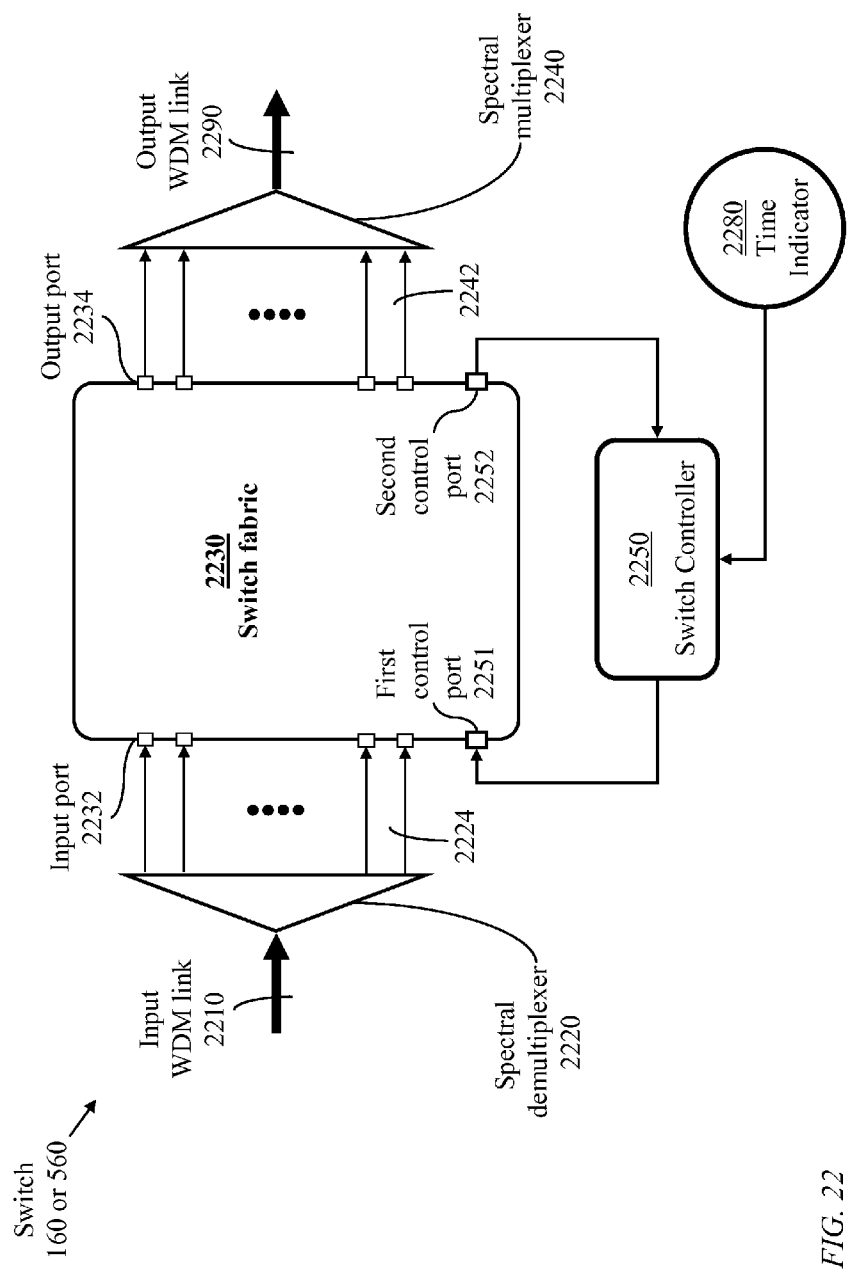
FIG. 22 illustrates a switch in any of the networks of FIG. 1, FIG. 3, FIG. 5, FIG. 7, FIG. 12, and FIG. 13, in accordance with an embodiment of the present invention.

Data units arrive at the m inlet ports of a switch 160 at time instants dictated by a controller of the switch 160. The time instants are specified according to a time reference of the master time indicator of the switch (FIG. 22). Thus, no signal buffering is needed at the switch and the switching function at the switch is time coherent. A latent space switch has a constant transit delay specific to each input-output connection. However, an arriving data unit is not buffered at input and the switching function at the latent space switch is also time coherent.

Wavelength-Routers Configuration

Figure 16:
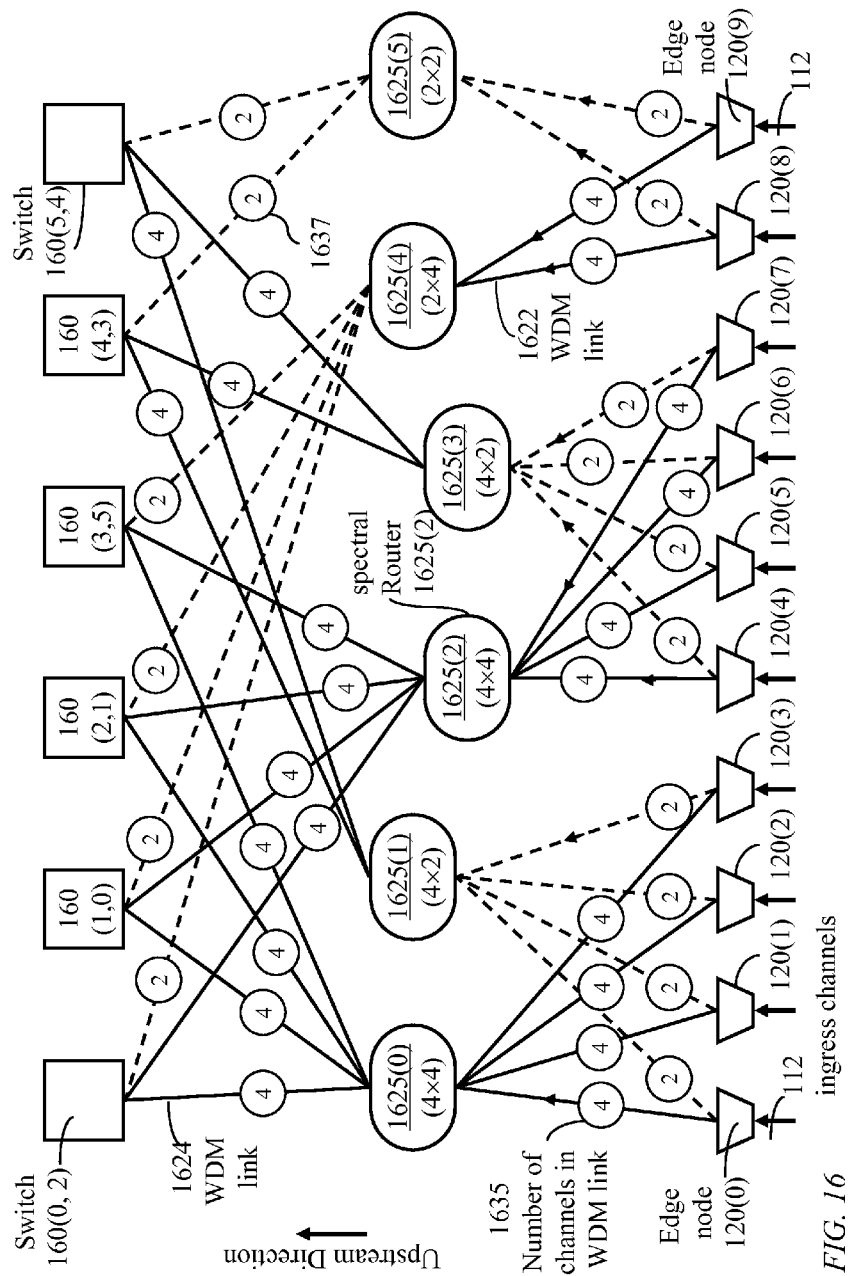
FIG. 16 illustrates an exemplary arrangement of upstream spectral routers connecting a set of edge nodes to a set of switches, in accordance with an embodiment of the present invention.

FIG. 16 illustrates a configuration of upstream spectral routers 1625 connecting ten edge nodes 120(0) to 120(9) to six switches 160(0,2), 160(1, 0), 160(2, 1), 160(3, 5), 160(4, 3), and 160(5,4), belonging to different columns in a matrix of switches 160. Each spectral router 1625 has at most four input WDM links 1622 and at most four output WDM links 1624, where each output WDM link 1624 carries a wavelength channel from each input WDM link 1622. Each switch 160 is of dimension 10×10 (having 10 inlet ports and 10 outlet ports). The spectral routers 1625 are configured so that each edge node 120 has an upstream channel to each of the six switches 160. As illustrated, six spectral routers 1625(0) to 1625(5) of dimensions (4×4), (4×2), (4×4), (4×2), (2×4), and (2×2) are used, where the dimension of a spectral router is defined by the number of input WDM links and the number of output WDM links. The number of wavelength channels carried an input WDM link 1622 and the number of channels carried by an output WDM link 1624 are indicated (reference numerals 1635 and 1637 respectively).

Figure 17:
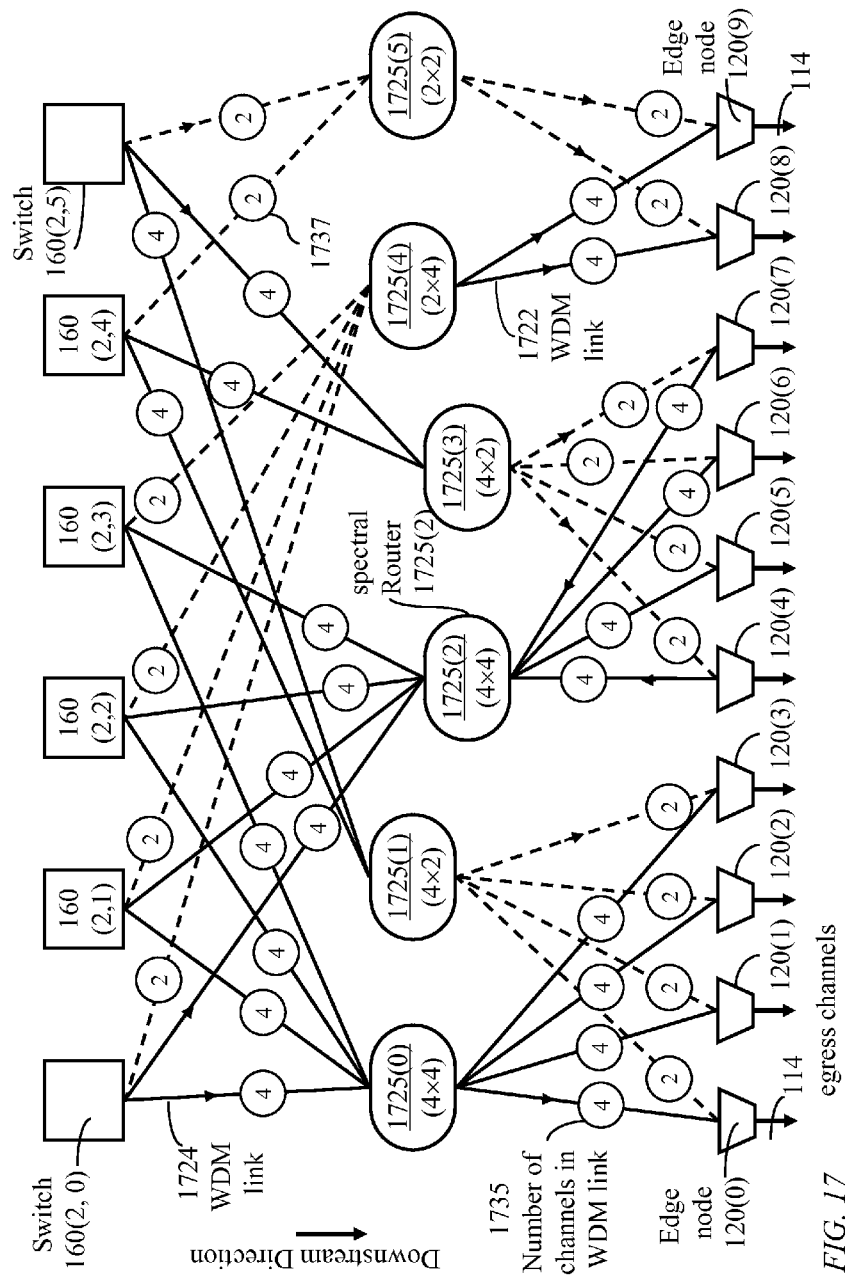
FIG. 17 illustrates an exemplary arrangement of downstream spectral routers connecting a set of switches to a set of edge nodes, in accordance with an embodiment of the present invention.

FIG. 17 illustrates a configuration of downstream spectral routers 1725 connecting six switches 160(2,0), 160(2,1), 160(2, 2), 160(2,3), 160(2,4), and 160(2,5), all belonging to column 2, to the ten edge nodes 120(0) to 120(9) using spectral routers 1725 each having at most four input WDM links 1724 and at most four output WDM links 1722, where each output WDM link 1722 carries a wavelength channel from each input WDM link 1724. Each switch 160 is of dimension 10×10 (m=10). The spectral routers 1725 are configured so that each edge node 120 has a downstream channel from each of the six switches 160. As illustrated, six spectral routers 1725(0) to 1725(5) of dimensions (4×4), (4×2), (4×4), (4×2), (2×4), and (2×2) are used. The number of wavelength channels carried an input WDM link 1724 and the number of channels carried by an output WDM link 1722 are indicated (reference numerals 1735 and 1735 respectively).

The maximum dimension of a spectral router 1625 or 1725 in the exemplary configurations of FIG. 16 and FIG. 17 is selected to be only 4×4 for clarity. In a wide-coverage network, spectral routers each of a dimension of 32×32, for example, may be used.

Figure 18:
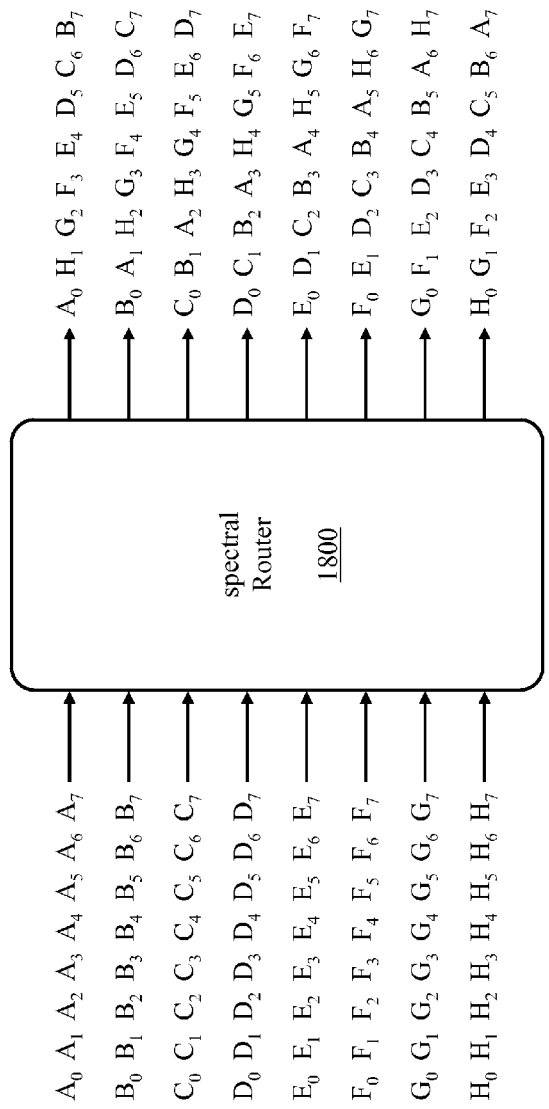
FIG. 18 illustrates wavelength-channel assignments in a conventional spectral router having a number of input wavelength-division-multiplexed links equal to a number of output wavelength-division-multiplexed links.

FIG. 18 illustrates wavelength-channel assignments in a conventional spectral router. The figure illustrates an exemplary spectral router 1800 of a small dimension. Network 1200 (FIG. 12) would employ spectral routers of significantly larger dimensions. Exemplary spectral router 1800 may be employed as an upstream spectral router or a downstream spectral router. Spectral router 1800 has eight input wavelength-division-multiplexed (WDM) links each carrying a multiplex of eight wavelength channels and eight output WDM links each carrying a wavelength channel from each input WDM link. The wavelength channels of a first input WDM links are denoted $\{A_0, A_1, \ldots, A_7\}$, the wavelength channels of a second input WDM link are denoted $\{B_0, B_1, \ldots, B_7\}$, and so on, where a character A, B, . . . , identifies an input WDM link and a subscript $\{0, 1, \ldots, 7\}$ identifies a spectral band allocated to a respective wavelength channel. As illustrated, each output WDM link carries channels from different input WDM links and of different spectral bands.

Figure 19:
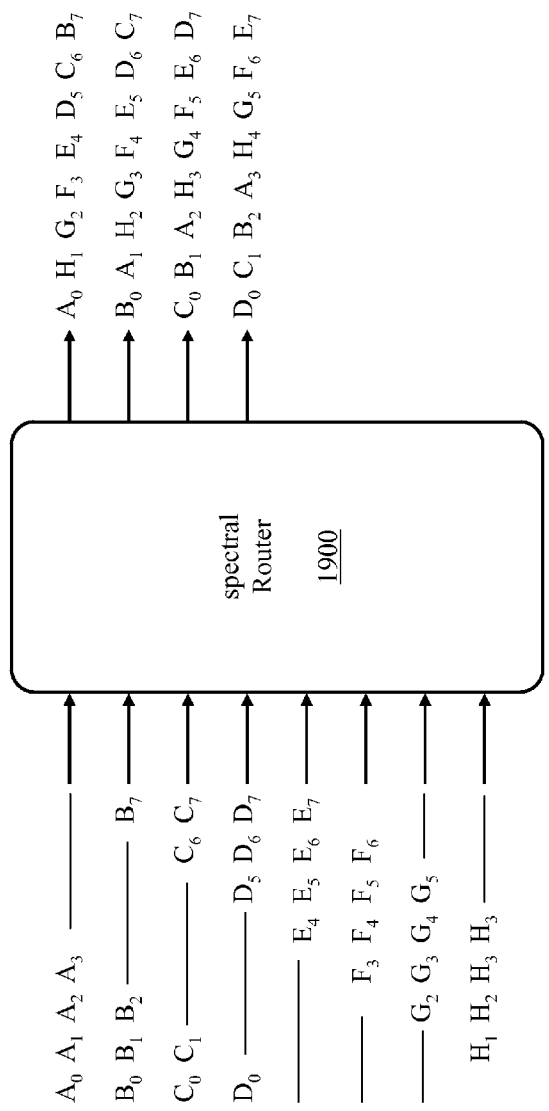
FIG. 19 illustrates wavelength-channel assignments in a spectral router having a number of input wavelength-multiplexed links exceeding a number of output wavelength-division-multiplexed links.

FIG. 19 illustrates wavelength-channel assignments in a spectral router 1900, structurally identical to spectral router 1800 except that only four output WDM links are used. Each input WDM link carries four wavelength channels selected so that each of the four output WDM links carries eight wavelength channels of different spectral bands, one wavelength channel from each input WDM link. As illustrated in FIG. 16 and FIG. 17, some spectral routers may be partially provisioned depending on the network configuration.

FIG. 20 illustrates an edge node 120 for use in any of the networks of FIG. 1, FIG. 3, FIG. 5, FIG. 7, FIG. 12, and FIG. 13. Edge node 120 has a switch fabric 2020, an edge controller 2050, input ports, and output ports. The input ports include ingress ports 2026 for receiving data from data sources through ingress channels 112 and inbound ports 2036 for receiving data from switches through downstream channels 124. The output ports include egress ports 2028 for transmitting data to data sinks through egress channels 114 and outbound ports 2038 for transmitting data to switches 160 or 560 through upstream channels 122.

Control signals from input ports 2026 and 2036 sent on control channels 2055 are time multiplexed in temporal multiplexer 2057 onto a channel 2062 connecting to edge controller 2050. Control signals from edge controller 2050 to egress ports 2028 and outbound ports 2038 are transferred through a channel 2082, a temporal demultiplexer 2087 and channels 2085.

Each egress port 2028 is preferably paired with an ingress port 2026, and each outbound port 2038 is preferably paired with an inbound port 2036. Control signals from the edge controller 2050 to the ingress ports 2026 and inbound ports 2036 may be transferred through corresponding paired output ports (egress ports 2028 and outbound ports 2038).

Other arrangements for exchanging control signals between the edge controller 2050 and the input or output ports of the edge node may be devised; for example the control signals may be transferred through the switch fabric instead of channels 2055 and 2085.

Edge controller 2050 schedules connections from input ports (ingress and inbound ports) to output ports (egress and outbound ports) and instructs a configuration controller (slave controller) 2025 associated with the switch fabric 2020 to establish scheduled connections. Configuration controllers associated with switch fabrics are well known in the art. The edge controller 2050 is coupled to an edge time indicator 2080 which distributes timing data to the outbound ports 2038. Each outbound port adjusts transmission time of data sent to a specific switch 160 or 560 according to the time data and time indications received from a master time indicator of the specific switch 160 or 560. The edge time indicator has the same periodicity and granularity of the master time indicator.

Control Time Slots

The time domain may be organized into time frames each divided into a number T of time slots of equal duration. Each connection (data stream) is allocated a respective number σ of time slots per time frame, 0<σ<T. A connection is preferably confined to a single upstream channel 122 from a source edge node 120 to a switch 160. Control time slots from edge controller 2050 to a switch controller and vice versa may be transferred through dedicated control channels. A number $\Lambda_1$ of upstream control time slots per time frame may be reserved in each upstream channel 122 from a source node 120 to a respective switch 160 or 560 (directly or through an upstream spectral router) and a number $\Lambda_2$ of downstream control time slots per time frame may be reserved in each downstream channel 124 from a switch 160 or 560 (directly or through a downstream spectral router). Although the flow rate of control signals sent from edge controller 2050 to a switch controller may differ from the flow rate of control signals the edge node receives from the switch controller, it may be desirable to select $\Lambda_2$ to be equal to $\Lambda_1$.

Figure 21:
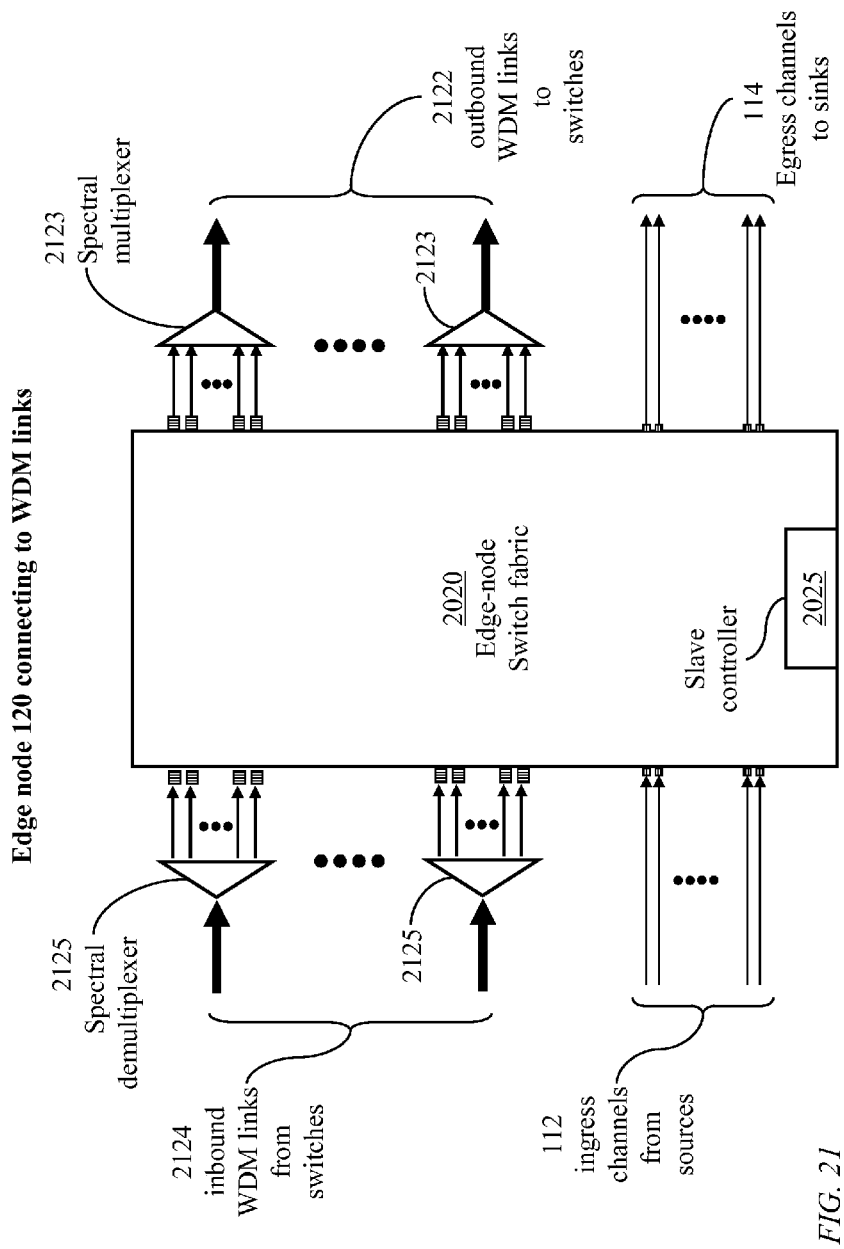
FIG. 21 illustrates an edge node connecting to WDM links, in accordance with an embodiment of the present invention.

As illustrated in FIG. 12, upstream channels 122 from an edge node 120 are multiplexed onto an upstream WDM link 1222 connecting to a spectral router 1230 and a downstream WDM link 1228 carries downstream channels 124 directed to an edge node 120. Each inbound port 2036 of edge node 120 of FIG. 20 has an optical-to-electrical converter and each outbound port 2038 has an electrical-to-optical converter (not illustrated). An edge node 120 may have a large number of upstream channels 122 and downstream channels 124. Thus, upstream WDM link 1222 may actually comprise a number of WDM links each carrying a smaller number of upstream channels 122. For example, with 1024 upstream channels 122 emanating from a single edge node 120 and 1024 downstream channels 124 terminating on the edge node, WDM link 1222 may be implemented as 16 WDM links each multiplexing 64 upstream channels 122 and WDM link 1228 may be implemented as 16 WDM links each multiplexing 64 downstream channels 124. Thus, an edge node 120 may have a number of spectral multiplexers each for multiplexing outputs of a number of electrical-to-optical convertors onto a respective upstream WDM link and a number of spectral demultiplexers for demultiplexing optical signals received through a downstream WDM link. FIG. 21 illustrates an edge node 120 equipped with a number of spectral multiplexers 2123 and a number of spectral demultiplexers 2125. The edge node connects at input to ingress channels 112 from data sources and to a set 2124 of inbound WDM links from upstream spectral routers. The edge node connects at output to egress channels 114, connecting to data sinks, and a set 2122 of outbound WDM links directed to upstream spectral routers. A spectral demultiplexer 2125 separates wavelength channels of an inbound WDM link and directs the signal of each wavelength channel to a respective inbound port where optical-to-electrical conversion may take place. A spectral multiplexer 2123 combines signals received from a number of outbound ports of the edge node, after undergoing electrical-to-optical conversion, onto an outbound WDM link directed to an upstream spectral router.

FIG. 22 illustrates a switch configuration for use as a switch 160 in any of the networks of FIG. 1, FIG. 3, FIG. 5, FIG. 7, FIG. 12, and FIG. 13 or as a switch 560 in the networks of FIG. 12 and FIG. 13. The switch may have a photonic or electronic switching fabric 2230. Spectral demultiplexers 2220 (only one is illustrated) are employed at input and spectral multiplexers 2240 (only one is illustrated) may be employed at output. With an electronic fabric, optical-to-electrical converters are employed at input and electrical-to-optical converters are employed at output. A spectral demultiplexer 2220 separates wavelength channels of an input WDM link 2210 from an upstream spectral router and directs respective optical signals to input ports 2232 through internal links 2224 if the switch fabric 2230 is photonic or through optical-to-electrical converters and internal links 2224 if the switch fabric 2230 is electronic. A spectral multiplexer 2240 combines optical signals carried on internal links 2242 from output ports 2234 if the switch fabric 2230 is photonic or from output ports 2234 and electrical-to-optical converters if the switch fabric 2230 is electronic. A fast-switching optical switch fabric may be limited to a relatively small dimension; 64×64, for example.

A switch controller 2250 may be accessed through the switch fabric 2230 or through other arrangements known in the art. A first control port 2251 may have reserved control time slots for switching downstream control signals from switch controller 2250 to output ports 2234 (hence to edge nodes 120) through the switch fabric 2230. The input ports 2232 may have reserved control time slots for switching upstream control signals received from edge nodes 120 to a second control port 2252 connecting to the switch controller 2250. The switch controller 2250 receives connection requests from edge nodes 120, allocates time slots for each connection, and communicates relevant information to the edge nodes 120. A switch 160 or 560 does not buffer payload signals received from the edge nodes 120. Thus, to enable time-coherent switching of signals received at a switch 160 or 560 from multiple edge nodes 120, outbound ports 2038 of the edge nodes are time-locked to the switch. The switch controller 2250 is coupled to a master time indicator 2280 and exchanges time indications with edge controllers 2050 coupled to respective time indicators 2080 to time-lock outbound ports 2038 of each subtending edge node to the switch.

Figure 23:
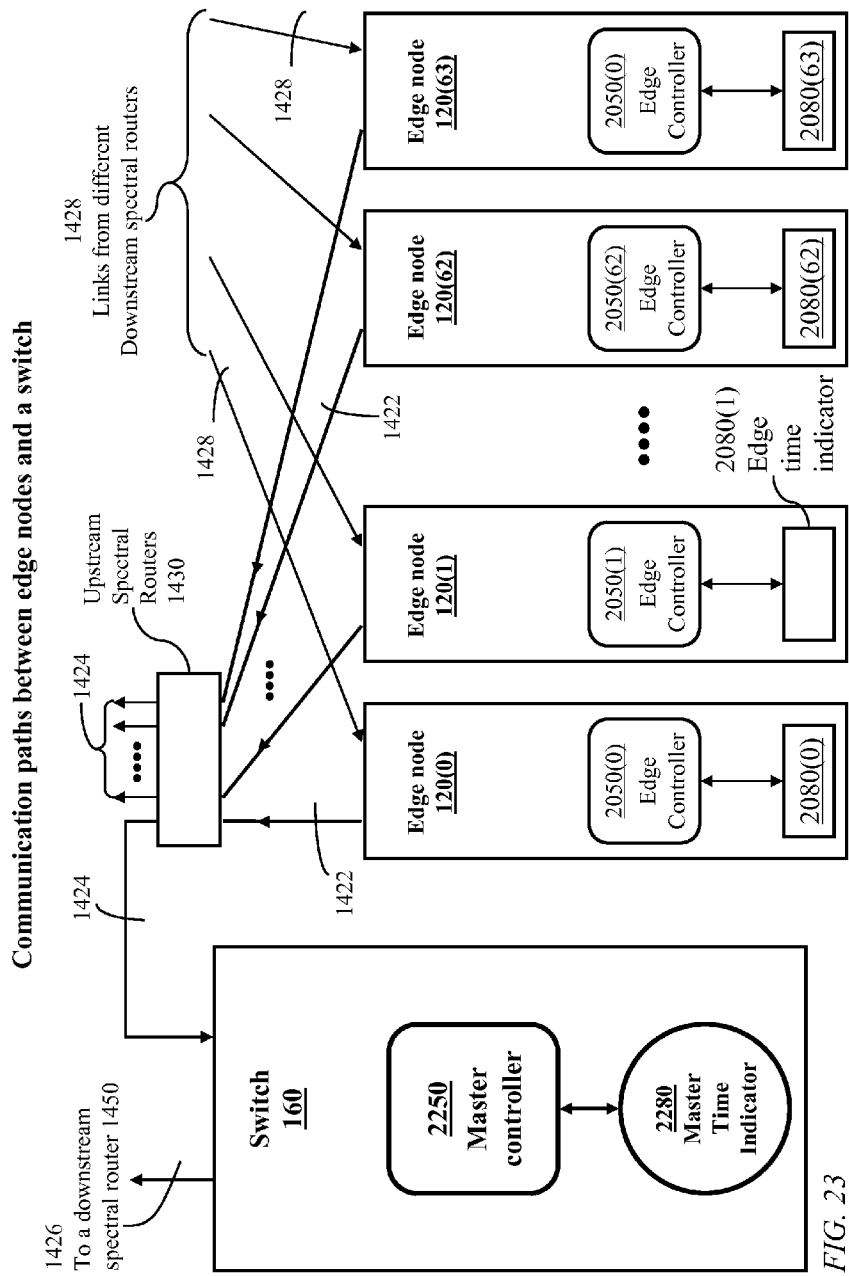
FIG. 23 illustrates exchange of control signals between edge nodes and switches.

FIG. 23 illustrates communication paths between a switch 160 and subtending edge nodes 120 through upstream spectral routers 1430 and downstream spectral routers 1450. In the exemplary configuration of FIG. 14, each edge node 120 connects to 16 upstream WDM links 1422, each WDM link 1422 comprising 64 wavelength channels. Each edge node connects to 16 downstream WDM links 1428, each WDM link 1428 comprising 64 wavelength channels. Each upstream spectral router 1430 connects 64 upstream WDM links 1422, each carrying 64 wavelength channels originating from a respective edge node, to 64 output WDM links 1424, each directed to a switch 160 and carrying one wavelength channel from each of the 64 upstream WDM links 1422. Each downstream spectral router 1450 connects 64 input WDM links 1426, each carrying 64 wavelength channels emanating from a respective switch 160, to 64 output WDM links 1428 each directed to an edge node 120 and carrying one wavelength channel from each of the 64 input WDM links 1426.

The illustrated upstream spectral router 1430 of FIG. 23 connects 64 edge nodes {120(0), 120(1), . . . , 120(63)} to 64 switches 160 of which only one switch is illustrated. Each edge node 120 has links 1422 to 16 upstream spectral routers 1430 of which only one upstream spectral router is illustrated. Each edge node 120 connects to links 1428 from 16 downstream spectral routers 1450. Only one WDM link 1428 from a respective downstream spectral router 1450 is illustrated for each of edge nodes 120(0), 120(1), 120(62), and 120(63). The illustrated WDM link 1424 connecting the upstream spectral router 1430 to the switch 160 comprises one wavelength channel from each of the 64 edge nodes. Each wavelength channel of link 1424 connects to master controller 2250 during a designated upstream control time slot of a repetitive slotted time frame. The resulting 64 upstream control time slots are staggered to arrive at the master controller at consecutive time slots of the time frame. The master controller communicates with the 64 edge nodes 120(0) to 120(63) during consecutive downstream control time slots. A path from the master controller 2250 of the switch 160 to a controller 2080 of an edge node may traverse an intermediate edge node and an intermediate switch 160. Each edge node 120 in the entire network has a path to itself and a path to each other edge node traversing only one switch 160. WDM link 1426 from the switch 160 connects to a respective downstream spectral router 1450 and has 64 wavelength channels directed to 64 downstream edge nodes which may not include any of edge nodes 120(0) to 120(63). The master controller 2250 of a switch 160 may choose any of its downstream edge nodes to relay downstream control messages to a specific edge node 120. An upstream control message from an edge node may include a connection request or a reading of an edge time indicator 2080. A downstream control message to an edge node may include scheduling decisions or a specific reading of the master time indicator 2280.

Figure 24:
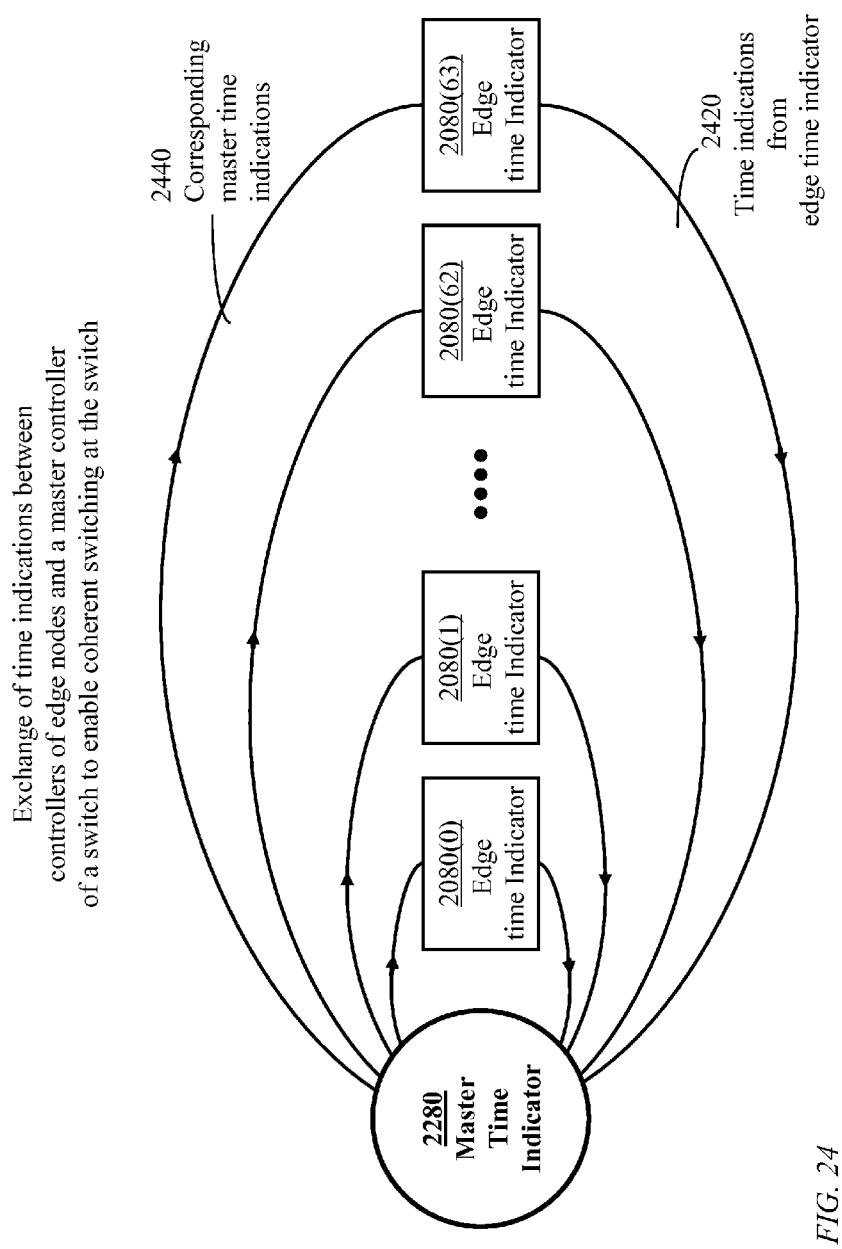
FIG. 24 illustrates exchange of time indications between a master controller of a switch and edge controllers to enable coherent switching at the switches in any of the networks of FIG. 1, FIG. 3, FIG. 5, FIG. 7, FIG. 12, and FIG. 13, in accordance with an embodiment of the present invention.

FIG. 24 illustrates exchange of edge time indications 2420 from edge time indicators {2080(0), 2080(1), . . . , 2080(63)} coupled to respective edge controllers 2050 and corresponding master time indications 2440 of a master time indicator 2280 of a switch 160 or 560 (FIG. 22) to enable coherent switching at a switch in any of the networks of FIG. 1, FIG. 3, FIG. 5, FIG. 7, FIG. 12, and FIG. 13. In the example of FIG. 24, the switch receives upstream control signals from 64 edge nodes.

The edge controller 2050 has an edge processor and an edge scheduling module which includes a memory device storing processor executable instructions which cause the edge processor to implement time-locking and scheduling functions of an edge node. The switch controller 2250 has a switch processor and a switch scheduling module which includes a memory device storing processor executable instructions which cause the processor to implement time-locking and scheduling functions of a switch.

Figure 25:
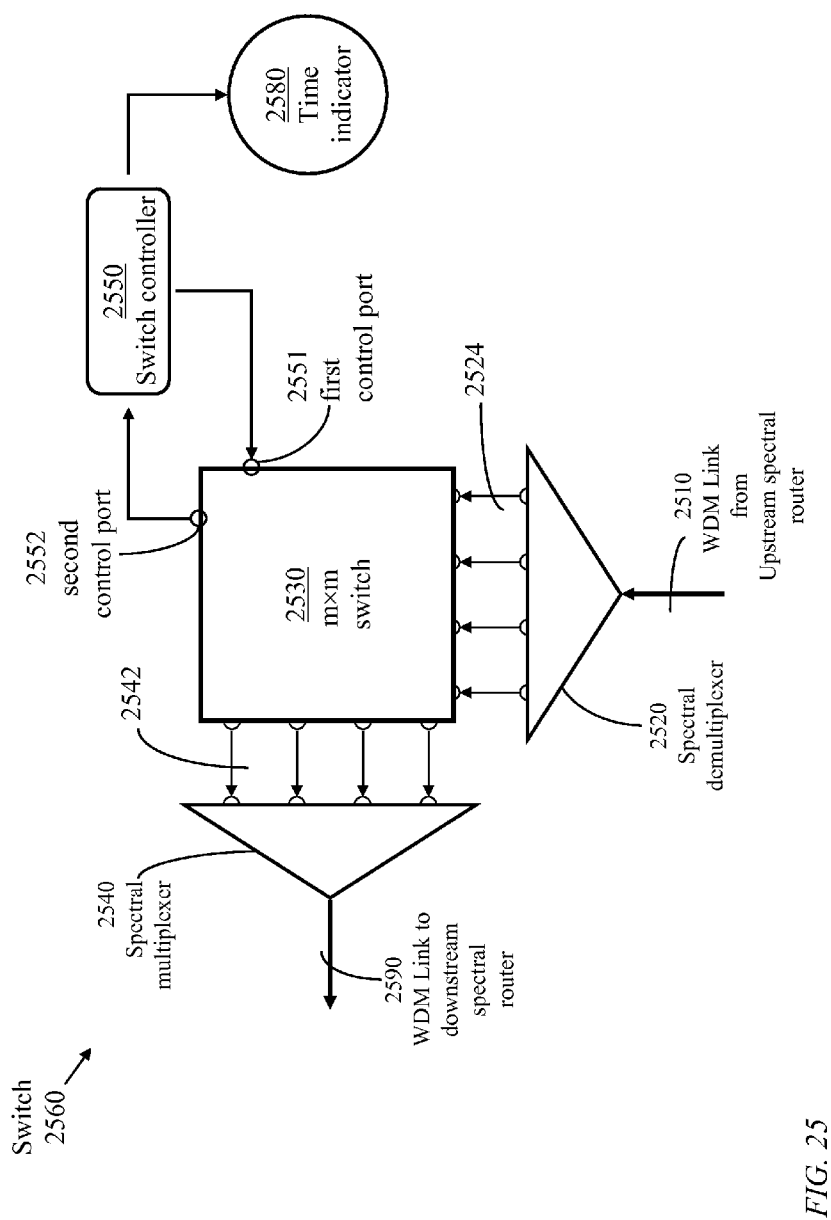
FIG. 25 illustrates a spectral demultiplexer preceding a photonic switch and a spectral multiplexer succeeding the photonic switch for use in an embodiment of the present invention.

FIG. 25 illustrates an alternate presentation 2560 of the switch of FIG. 22. A spectral demultiplexer 2520 precedes an optical switch fabric 2530 of a first matrix of switches and a spectral multiplexer 2540 succeeds the switch fabric. Spectral demultiplexer 2520 directs wavelength bands of an input WDM link 2510 to individual input channels 2524 and each spectral multiplexer 2540 combines wavelength bands carried by output channels 2542 onto an output WDM link 2590. Each input channel 2524 connects to a respective inlet of the switch and each output channel 2542 of an outlet of the switch connects to the spectral multiplexer 2540. A switch controller 2550 receives upstream control signals from edge nodes through outlet ports 2552 (only one is illustrated) of the switch fabric 2530 and transmits downstream control signals to the edge nodes through inlet ports 2551 (only one is illustrated) of the switch fabric 2530. A time indicator 2580 coupled to the switch controller 2550 provides a reference time to edge nodes connecting to switch 2560.

Figure 26:
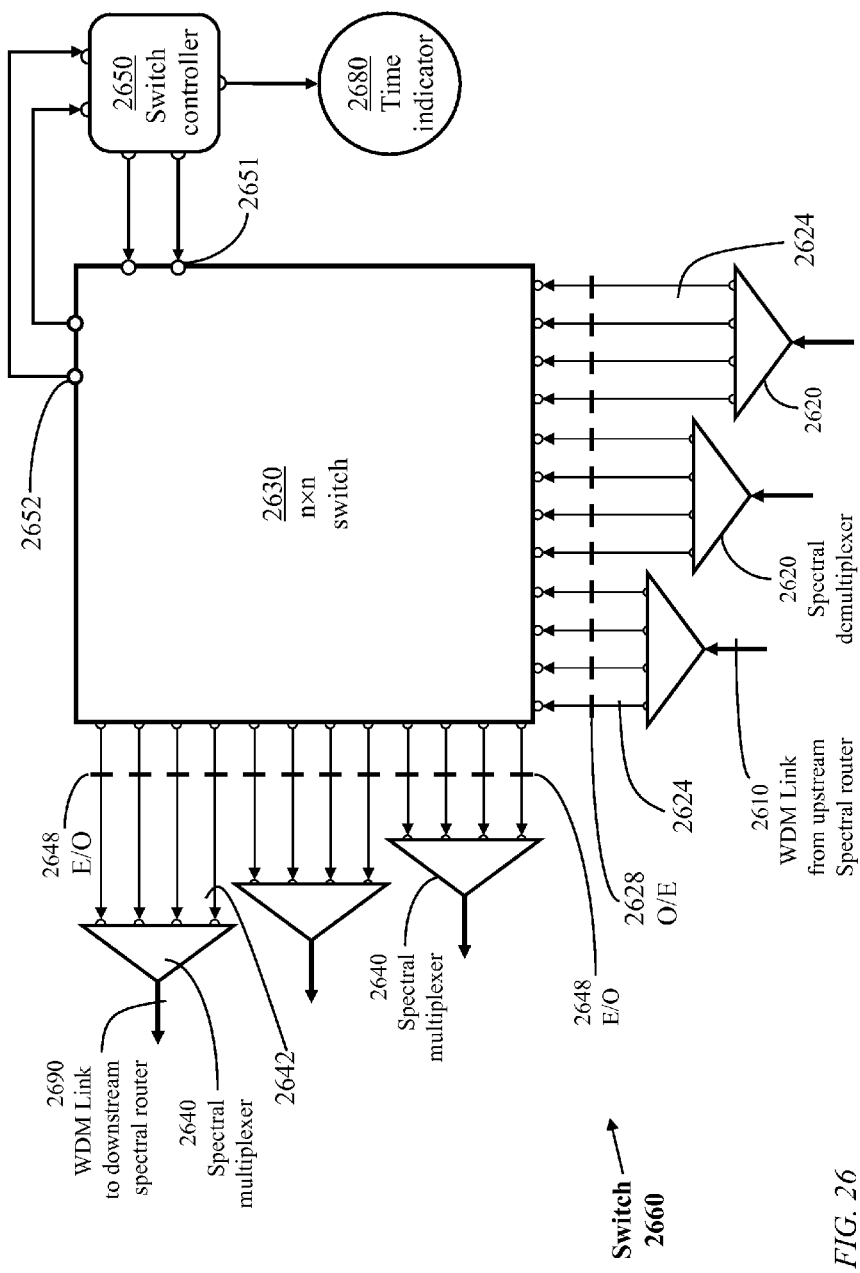
FIG. 26 illustrates spectral demultiplexers preceding an electronic switch and spectral multiplexers succeeding the electronic switch for use in an embodiment of the present invention.

FIG. 26 illustrates a switch 2660 having a set of spectral demultiplexers 2620 preceding an electronic switch fabric 2630 of a second matrix of switches and a spectral multiplexer 2640 succeeding the switch fabric. Each spectral demultiplexer 2620 directs wavelength bands of an input WDM link 2610 to individual input channels 2624 and each spectral multiplexer 2640 combines wavelength bands carried by output channels 2642 onto an output WDM link 2690. Each input channel 2624 connects to a respective inlet of the switch through a respective optical-to-electric interface 2628. Each output channel 2642 of an outlet of the switch connects to the spectral multiplexer 2640 through an electrical-to-optical converter 2648. A switch controller 2650 receives upstream control signals from edge nodes connecting to the switch through outlet ports 2652 of the switch fabric 2630 and transmits downstream control signals to the edge nodes through inlet ports 2651 of the switch fabric. A time indicator 2680 provides a reference time to edge nodes connecting to switch 2660.

A switch controller 2250, 2550, or 2650 employs at least one processor and at least one memory device. A memory device may store state maps of a switch and other data relevant to data routing. A memory device may also store processor-executable instructions for implementing encoded routing and control methods.

An edge controller 2050 also employs processors, memory devices storing routing and control data, and memory devices storing processor executable instructions for performing the functions of a respective edge node. An edge controller of an edge node operates in coordination with switch controllers of switches to which the edge node connects. A slave controller (also called a configuration controller) 2025 of an edge node implements instructions from a respective edge controller regarding input-to-output connectivity of a switch fabric 2020 of the edge node. A slave controller 2025 need not be aware of the state of, or presence of, any other network component.

Figure 27:
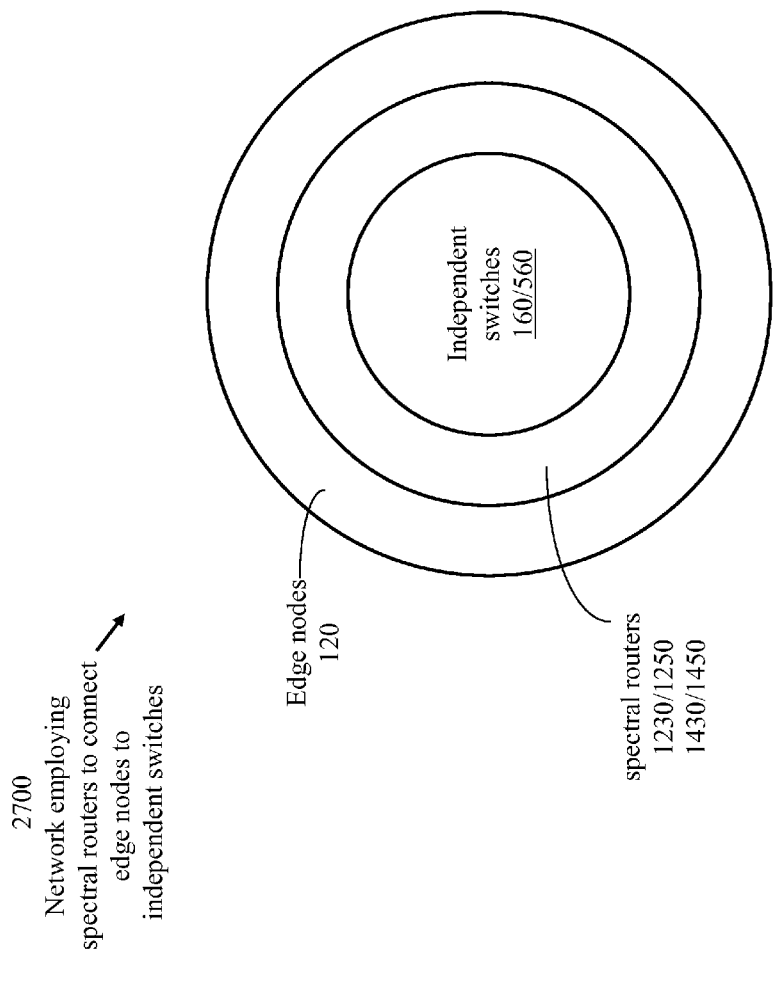
FIG. 27 illustrates an overview of a network employing spectral routers, routing wavelength-division channels, to connect edge nodes to a matrix of independent switches, in accordance with an embodiment of the present invention.

FIG. 27 illustrates an overview of a network 2700 employing spectral routers for routing upstream WDM channels (wavelength-division-multiplexed channels) from edge nodes 120 to a set of independent switches, such as switches 160 of the networks of FIG. 1 and FIG. 5, or switch 560 of the network of FIG. 5, and routing downstream WDM channels from the independent switches to the edge nodes 120. As illustrated in FIG. 12 and FIG. 13, upstream spectral routers 1230 connect edge nodes 120 to the switches 160 of a matrix of switches and downstream spectral routers 1250 connect the switches 160 of the switch matrix to the edge nodes. An upstream spectral router 1230 connects each edge node 120 of a respective set of edge nodes to a switch 160 in each column of the matrix of switches. A downstream spectral router 1250 connects each switch 160 of a respective column of the matrix of switches to a respective set of edge nodes 120.

With a large number of switches 160 per row in network configuration 1200, an upstream spectral router 1230 may be replaced with an array of upstream spectral routers as will be described with reference to FIG. 30. Likewise, a downstream spectral router 1250 may be replaced with an array of downstream spectral routers as will be described with reference to FIG. 31.

Figure 28:
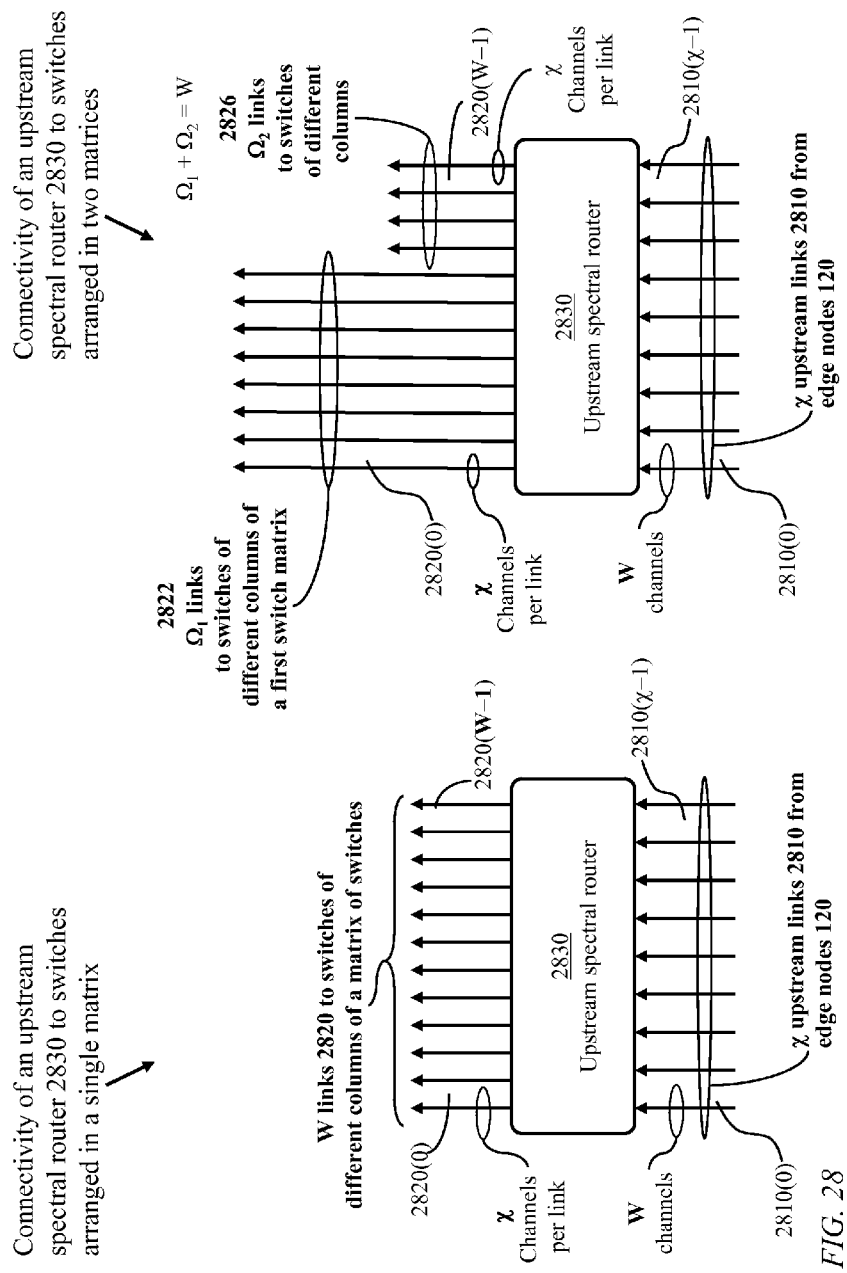
FIG. 28 illustrates connectivity of an upstream spectral router to switches of a single matrix of switches, and connectivity of an upstream spectral router to switches of two matrices of switches, in accordance with an embodiment of the present invention.

FIG. 28 illustrates connectivity of an upstream spectral router 2830 to switches of a single matrix of switches, and connectivity of an upstream spectral router 2830 to switches of two matrices of switches. Each of $\chi$ input WDM links 2810, $\chi>1$, of the upstream spectral router 2830 carries W wavelength channels, W>1, and each of W output links 2820 carries $\chi$ wavelength channels. Upstream spectral router 2830 distributes the wavelength channels of the $\chi$ input WDM links 2810 to the W output WDM links 2820 so that each output WDM link 2820 carries a wavelength channel from each of the $\chi$ input WDM links 2810. In a network configuration having one matrix of switches, the W output WDM links 2820 individually connect to W switches of different columns of the matrix of switches. In a network configuration having two matrices of switches, the W output WDM links may be divided into a set 2822 of $\Omega_1$ WDM links directed to $\Omega_1$ switches of one matrix of switches and a set 2826 of $\Omega_2$ WDM links directed to $\Omega_2$ switches of the other matrix of switches; $\Omega_1+\Omega_2=W$.

Figure 29:
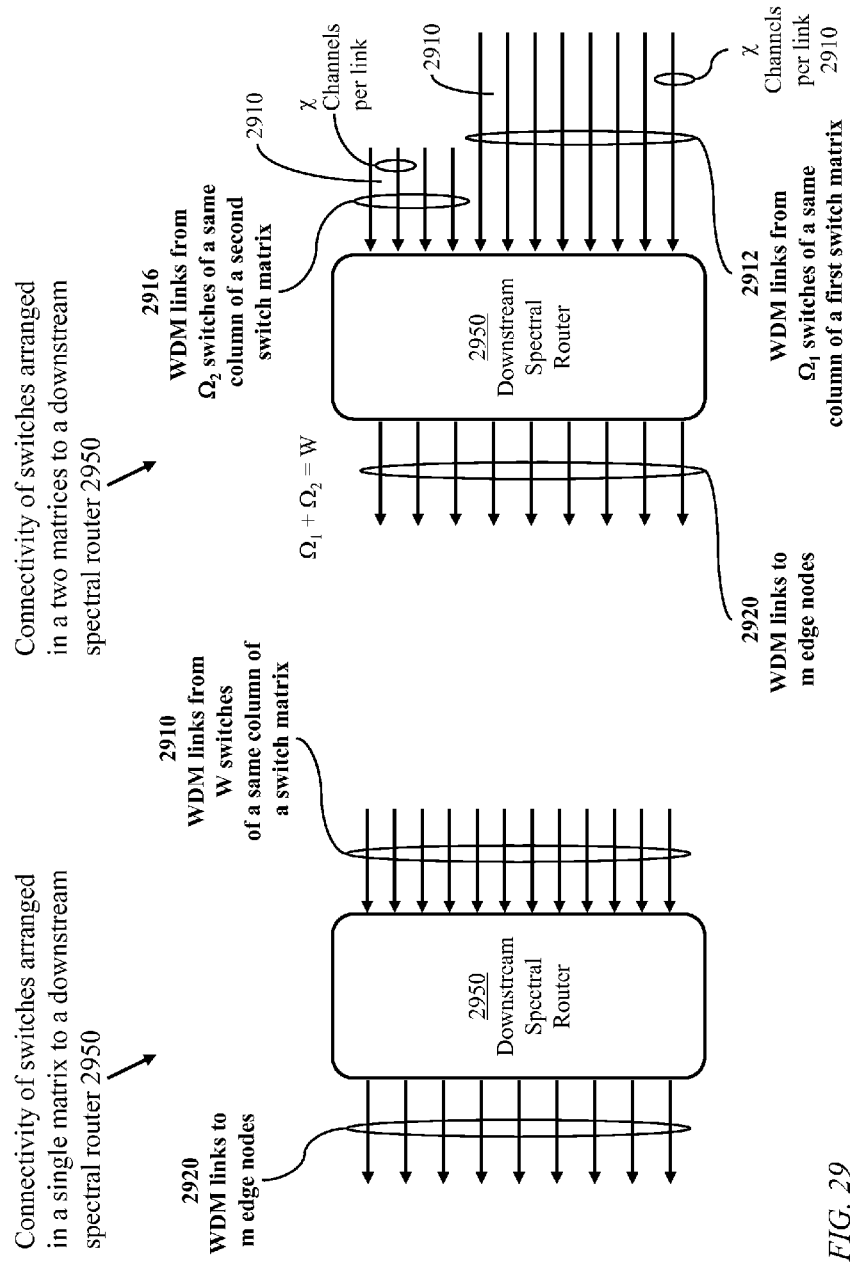
FIG. 29 illustrates connectivity of switches of a single matrix of switches to a downstream spectral router, and connectivity of switches of two matrices of switches to a downstream spectral router, in accordance with an embodiment of the present invention.

FIG. 29 illustrates connectivity of switches of a single matrix of switches to a downstream spectral router 2950, and connectivity of switches of two matrices of switches to a downstream spectral router 2950.

Each of W input WDM links 2910 of the downstream spectral router carries $\chi$ wavelength channels and each of $\chi$ output links 2920 carries W wavelength channels. Downstream spectral router 2950 distributes the wavelength channels of the W input WDM links 2910 to the $\chi$ output WDM links 2920 so that each output WDM link 2920 carries a wavelength channel from each of the W input WDM links 2910. In a network configuration having one matrix of switches, the W input WDM links emanate from W switches of different rows of the matrix of switches. The $\chi$ output WDM links 2920 individually connect to $\chi$ edge nodes 120.

In a network configuration having two matrices of switches, the W input WDM links 2910 may be divided into a set 2912 of $\Omega_1$ WDM links from $\Omega_1$ switches of one matrix of switches and a set 2916 of $\Omega_2$ WDM links from $\Omega_2$ switches of the other matrix of switches.

Figure 30:
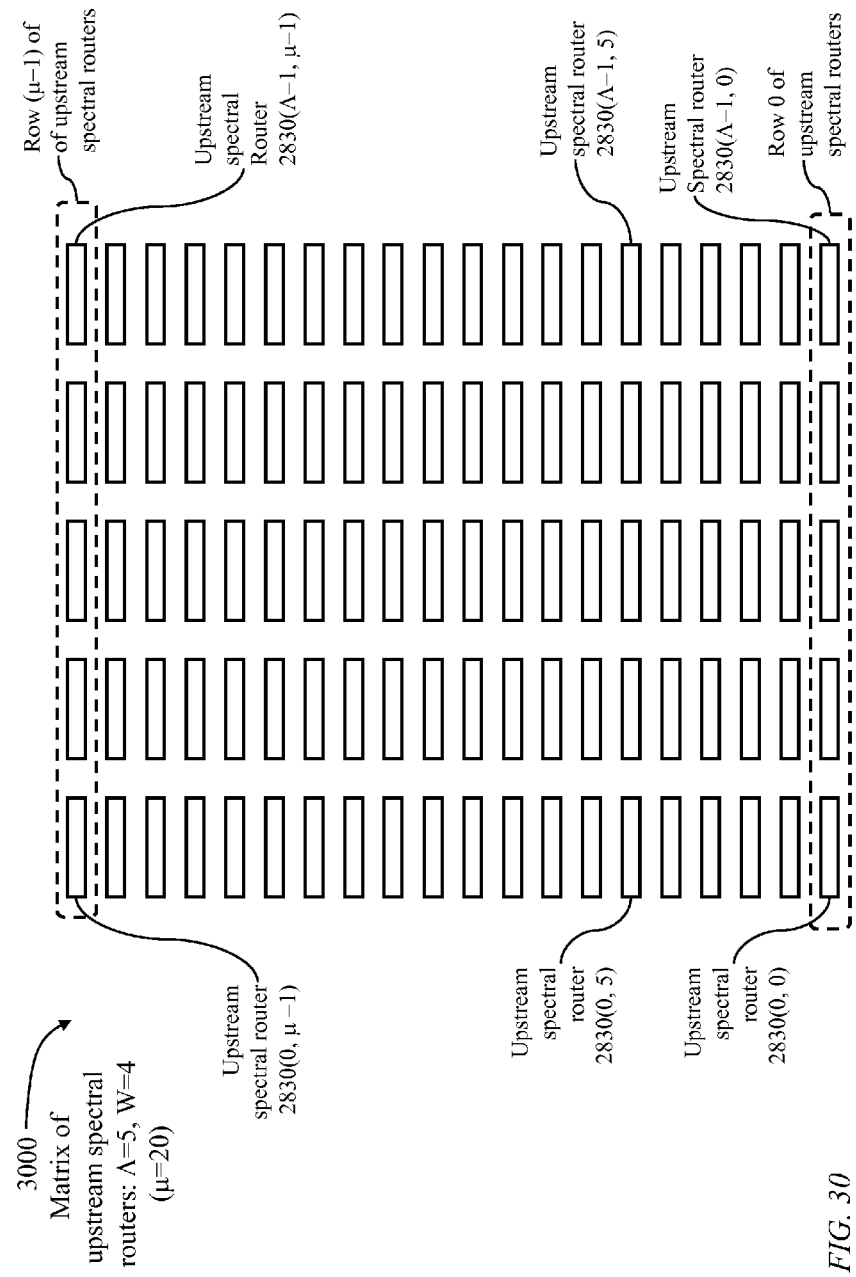
FIG. 30 illustrates upstream spectral routers, arranged in a matrix, connecting edge nodes to independent switches in the network of FIG. 27, in accordance with an embodiment of the present invention.

FIG. 30 illustrates upstream spectral routers 2830, arranged in a matrix 3000 connecting edge nodes 120 to independent switches. Matrix 3000 has $\Lambda$ columns, $\Lambda \geq 1$, and $\Lambda \times W$ rows of upstream spectral routers 2830.

Figure 31:
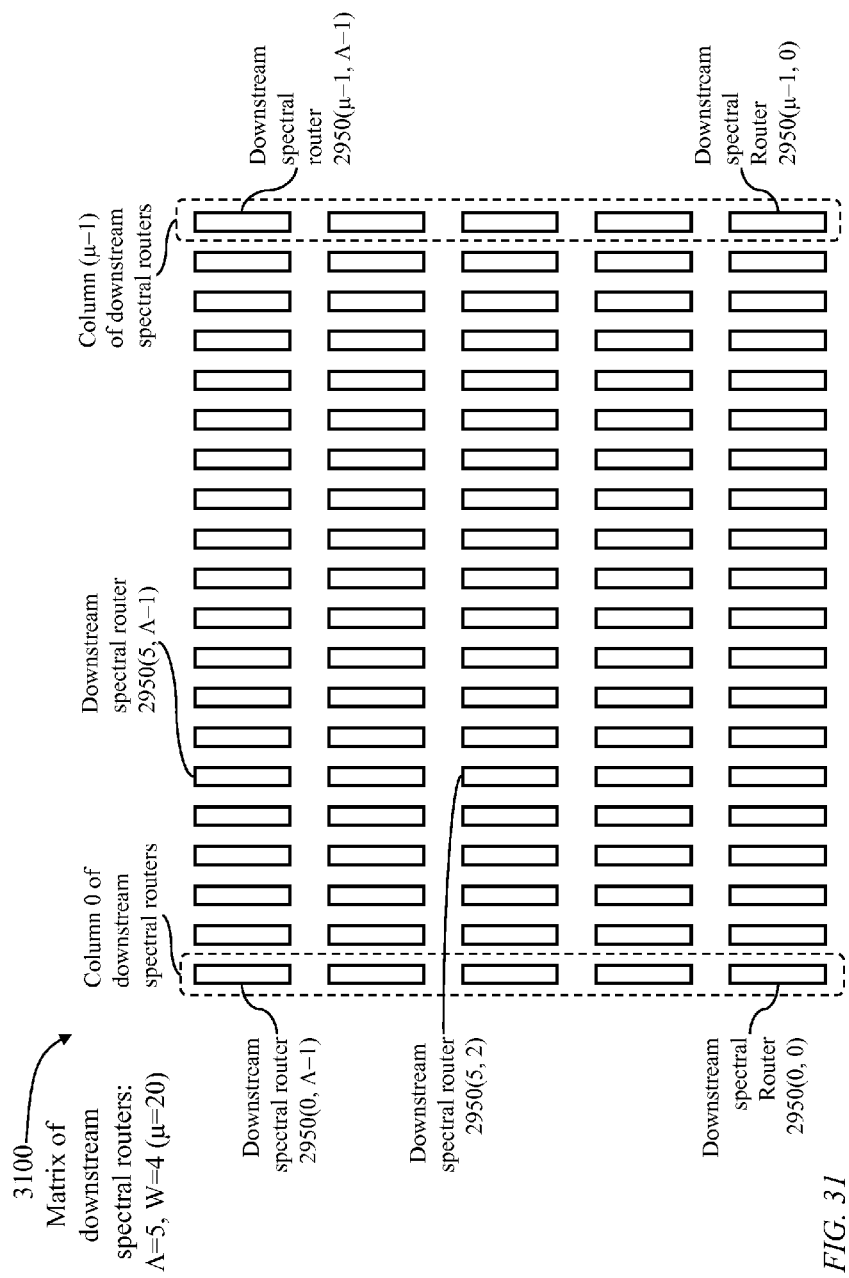
FIG. 31 illustrates downstream spectral routers, arranged in a matrix, connecting independent switches to edge nodes in the network of FIG. 27, in accordance with an embodiment of the present invention.

FIG. 31 illustrates downstream spectral routers 2950, arranged in a matrix 3100 connecting independent switches to edge nodes. Matrix 3100 has $\Lambda$ rows and $\Lambda \times W$ columns of downstream spectral routers 2950.

Figure 32:
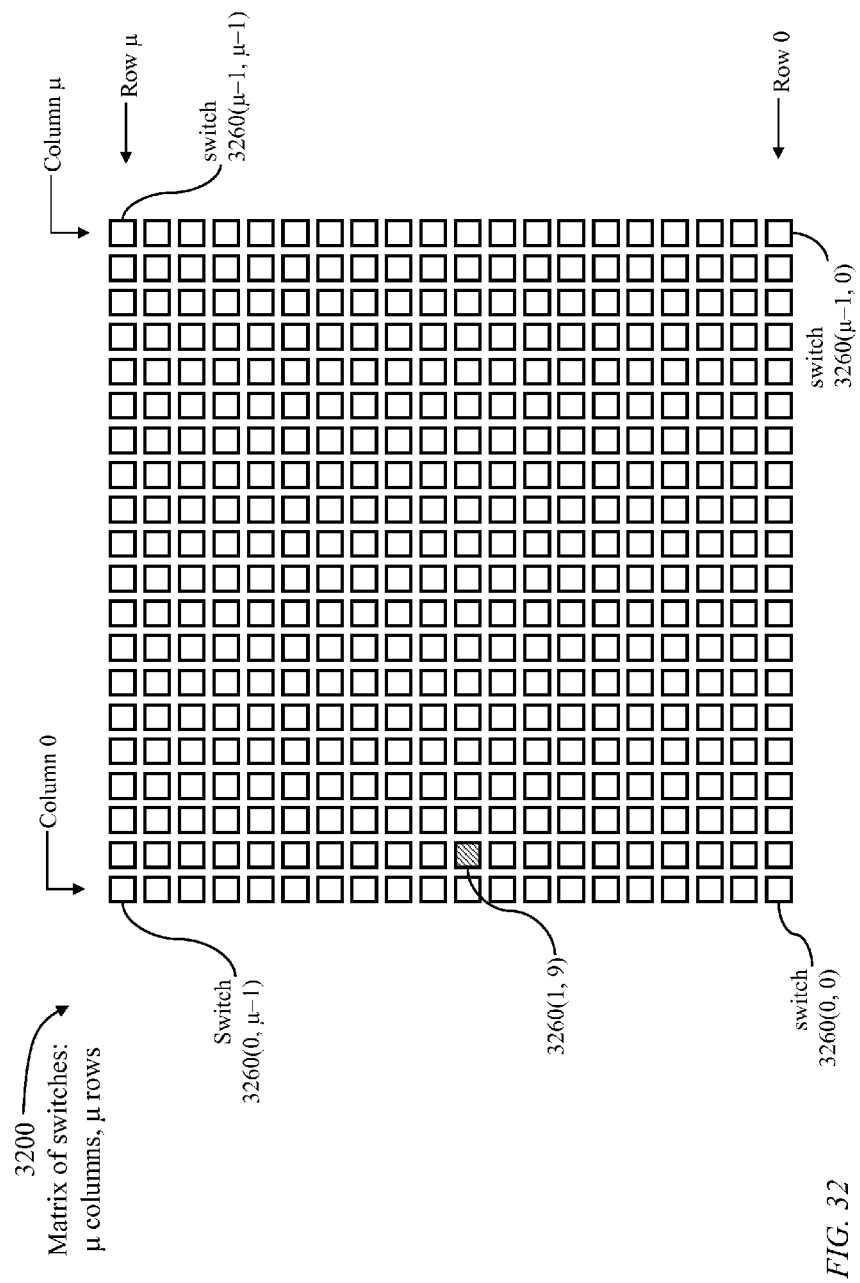
FIG. 32 illustrates a first matrix of switches in the network of FIG. 27, in accordance with an embodiment of the present invention.

FIG. 32 illustrates a matrix 3200 of switches 3260, each of dimension m×m, m>1. Matrix 3200 has $\mu=\lceil \Lambda \times W \times \chi/m \rceil$ columns and $\mu$ rows of switches 3260.

Figure 33:
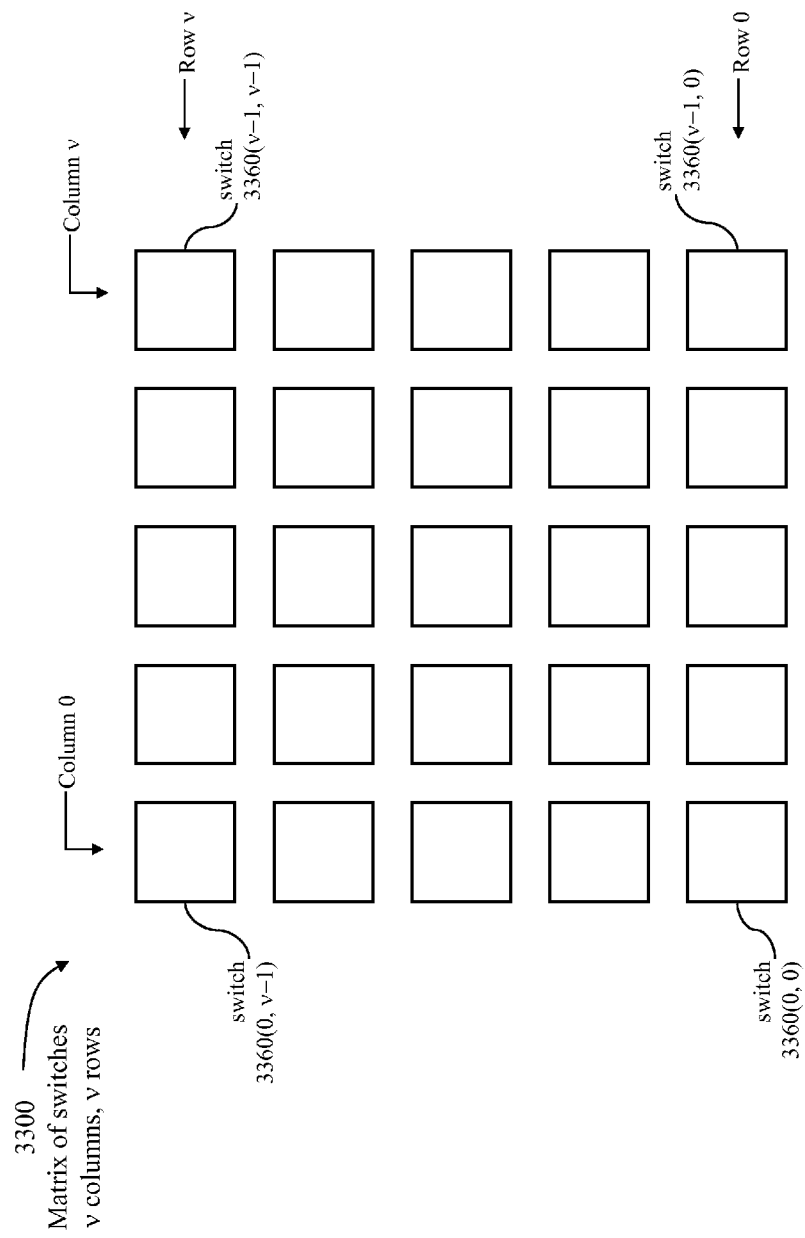
FIG. 33 illustrates a second matrix of switches in the network of FIG. 27, in accordance with an embodiment of the present invention.

FIG. 33 illustrates another matrix 3300 of switches 3360, each of dimension n×n, n≥m. Matrix 3300 has $\nu=\lceil \Lambda \times W \times \chi/n \rceil$ columns and $\nu$ rows of switches 3360.

Selecting $\chi$ to equal m, each upstream spectral router 2830 of matrix 3000 connects m input WDM links 2810 emanating from m edge nodes 120 to W output WDM links directed to W switches in different columns of the matrix 3200 of switches. Each input WDM link 2810 carries at most W wavelength channels, each output WDM link 2820 carries at most m wavelength channels, m>1, W>1. Each downstream spectral router 2950 of matrix 3100 connects W output WDM links emanating from W switches of a column of matrix 3200, each output WDM link carrying at most m wavelength channels, to m edge nodes.

Consider a network configuration where each upstream spectral router 2830 has m input WDM links 2810 emanating from m edge nodes and W output WDM links directed to W switches of different columns of matrix 3200 of switches. Each input WDM link 2810 carries W wavelength channels and each output WDM link 2820 carries m wavelength channels, m>1, W>1. Each downstream spectral router 2950 has W input WDM links emanating from W switches of a column of matrix 3200 and m output WDM links directed to m edge nodes. Each input WDM link 2910 carries m wavelength channels and each output WDM link carries W wavelength channels.

Matrix 3000 has Λ×W rows and matrix 3100 has Λ×W columns. Matrix 3200 of switches has Λ×W columns and Λ×W rows. Each switch has m inlets and m outlets. The number of edge nodes 120 connecting to the upstream spectral routers 2830 of matrix 3000 and the downstream spectral routers 2950 of matrix 3100 is Λ×W×m.

The matrix 3000 of upstream spectral routers connects Λ×W×m edge nodes 120 to the switches of the matrix 3200 of switches so that each edge node 120 has a wavelength channel to each of Λ×W switches 3260, one in each column of the matrix 3200 of switches. An edge node 120 is an electronic device and may be configured to time-lock to a time indicator of each of the Λ×W switches to which the edge node connects. Time locking enables scheduled switching without buffering data at the switches, resulting in a time-coherent network where data buffering is only performed at the edge nodes 120.

The matrix 3100 of downstream spectral routers connects the switches of matrix 3200 to Λ×W×m edge nodes 120 so that each edge node 120 has a wavelength channel from each of Λ×W switches, one in each row of the matrix 3200 of switches.

Each upstream spectral router 2830 has a WDM link to a respective set of switches 3260 of different columns matrix 3200 of switches 3260. The respective set of switches is selected so that upstream spectral routers of a same column of the matrix 3000 of upstream spectral routers connect to switches of a same set of columns of the matrix of switches. For example, if each upstream spectral router 2830 connects to W=4 upstream WDM links 2820, then each upstream spectral router of column 0 of matrix 3000 may connect to a respective switch 3260 in each of columns 0, 2, 8, and 12 of matrix 3200, while each upstream spectral router of column 1 of matrix 3000 may connect to a respective switch 3260 in each of columns 1, 5, 9, and 10 of matrix 3200. The switches of a same column of the matrix 3200 of switches connect to downstream spectral routers 2950 of a respective column of the matrix 3100 of downstream spectral routers.

Each switch of matrix 3200 of switches is coupled to a respective switch controller 2250. Each switch of matrix 3200 is coupled to a respective independent time indicator 2280. Each upstream wavelength channel, connecting an edge node 120 to a switch through a respective upstream spectral router is time locked to a respective time indicator of a respective switch.

The matrix 3200 of switches may comprise optical switches. An optical switch is coupled to a respective spectral demultiplexer 2220 which distributes multiplexed optical signals of a WDM link 2210 (which is an output link 2820 from a respective upstream spectral router 2830) to inlets of the switch. The optical switch is also coupled to a respective spectral multiplexer 2240 which combines output optical signals of outlets of the switch onto a WDM link 2290 (which is an input link 2910 of a respective downstream spectral router 2950).

Preferably, to simplify addressing and routing, each downstream spectral router 2950 has WDM links from a respective group of switches of a respective column of the matrix 3200 of switches. It is also desirable that each edge node 120 connect to downstream channels, through a column of downstream spectral routers 2950 of matrix 3100, from switches of a same column of the matrix 3200 of switches. Thus, downstream spectral routers 2950 of a column of the matrix 3100 of downstream spectral routers connect to a same set of edge nodes.

Switches of a same column of the matrix 3200 of switches connect to downstream spectral routers 2950 of a same column of the matrix 3100 of downstream spectral routers. The connectivity of upstream spectral routers 2830 may be selected so that upstream spectral routers of a same row of the matrix 3000 of upstream spectral routers connect to switches of a same row of the matrix 3200 of switches.

Figure 34:
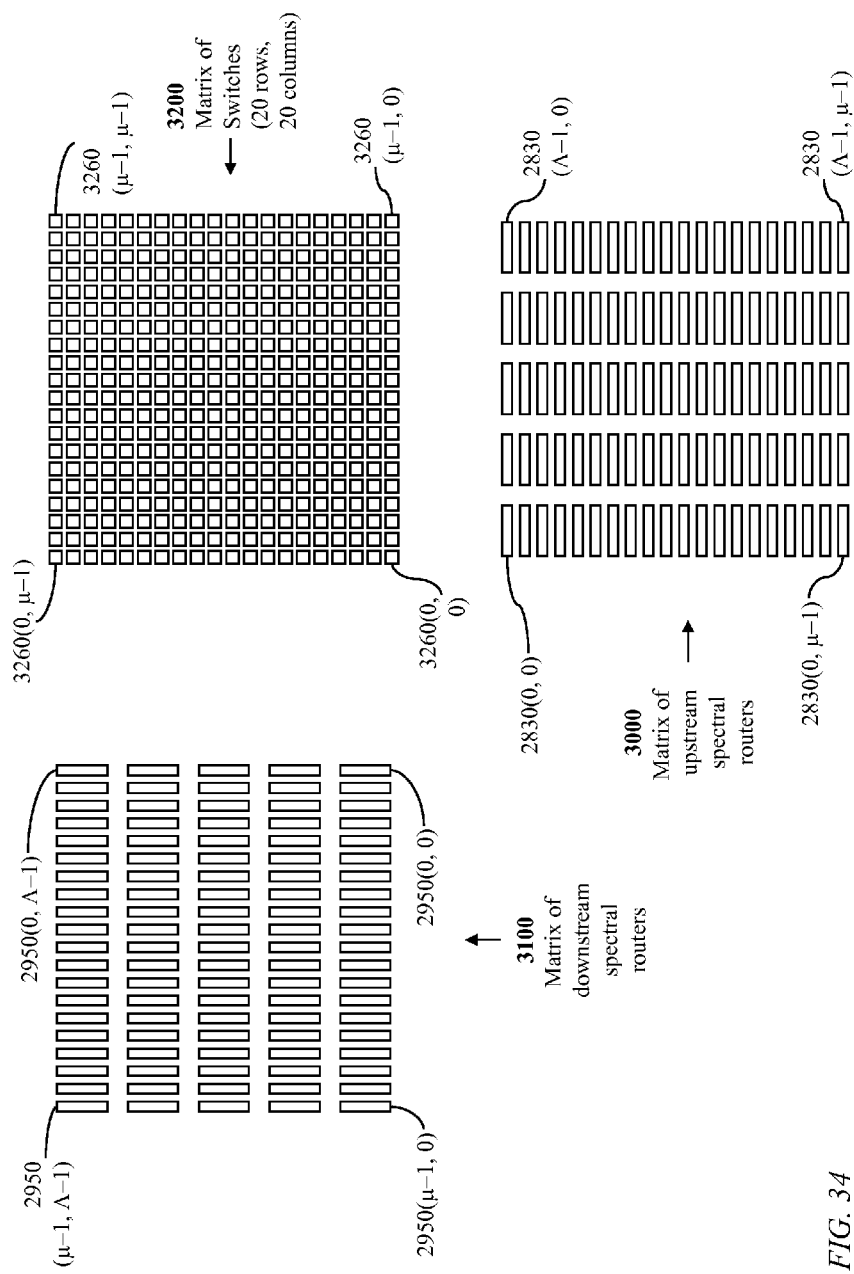
FIG. 34 illustrates an arrangement of the upstream spectral routers of FIG. 30, the first matrix of switches of FIG. 32, and the downstream spectral routers of FIG. 31, in accordance with an embodiment of the present invention.

FIG. 34 illustrates an arrangement of a matrix 3000 of upstream spectral routers 2830, a matrix 3200 of switches 3260, and a matrix 3100 of downstream spectral routers 2950, forming a network core interconnecting edge nodes 120. Each switch 3260 has m inlets and m outlets, m>1. Each upstream spectral router connects χ input WDM links 2810 to W output WDM links 2820. Each input WDM link 2810 comprises W channels from a respective edge node 120 and each output WDM link 2820 comprises χ channels. Matrix 3000 has Λ upstream spectral routers 2830 per row (i.e., Λ columns). The number of channels at the input or output of upstream spectral routers 2830 of a row in matrix 3000 is Λ×χ×W. The edge nodes 120 may be geographically distributed, it is therefore preferable to select χ so that the number m of inlets of a switch 3260 is an integer multiple of χ so that an output WDM link 2820 of a spectral router 2830 connects to a single switch 3260. Thus, the number μ of switches 3260 per row is μ=(Λ×W). The number of switches per column may be equal to the number of switches per row in matrix 3200. FIG. 34 illustrates an arrangement where Λ=5, W=4, hence μ=20.

Figure 35:
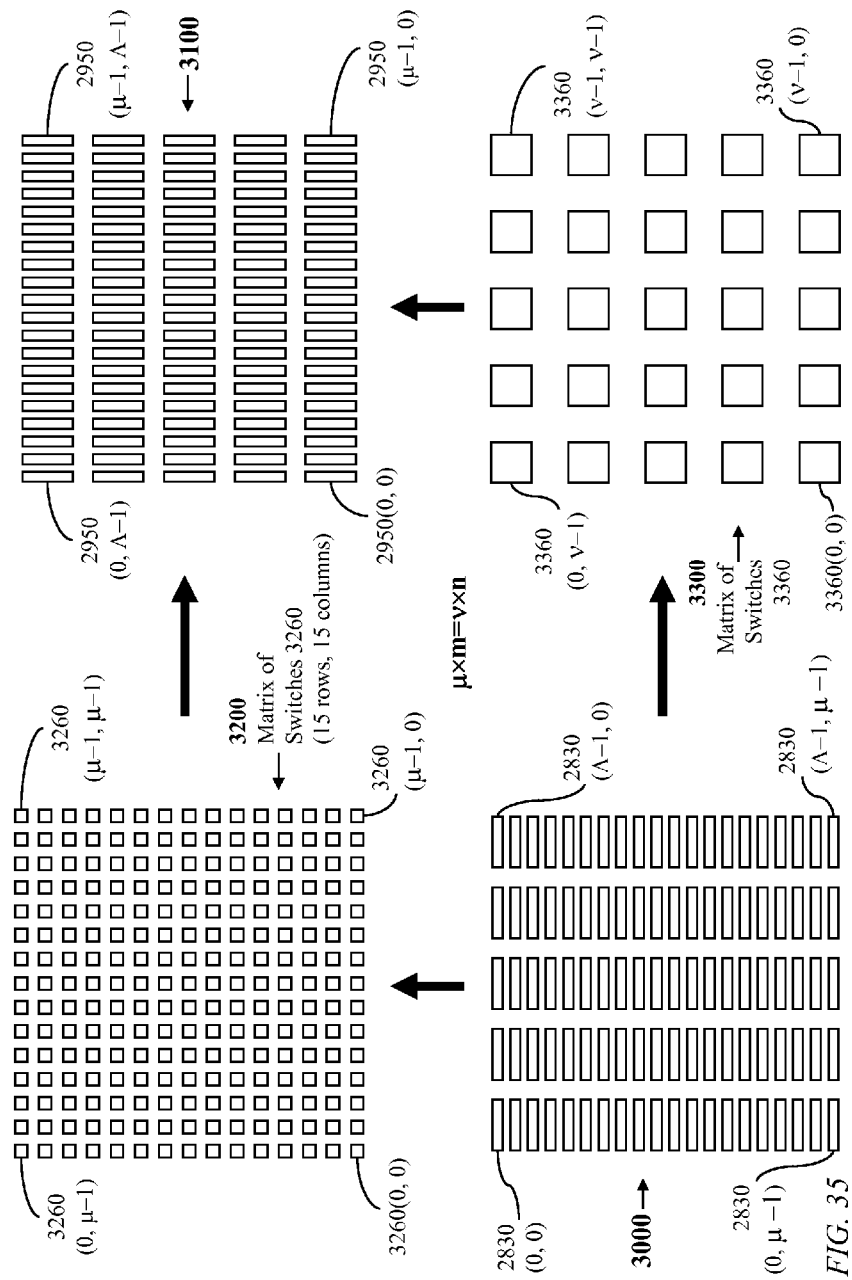
FIG. 35 illustrates an arrangement of the upstream spectral routers of FIG. 30, the first matrix of switches of FIG. 32, the second matrix of switches of FIG. 33, and the downstream spectral routers of FIG. 31, in accordance with an embodiment of the present invention.

FIG. 35 illustrates an arrangement of: a matrix 3000 of upstream spectral routers 2830; a matrix 3200 of switches 3260; a matrix 3300 of switches 3360; and matrix 3100 of downstream spectral routers 2950, forming a network core interconnecting edge nodes 120. Each switch 3260 is of dimension m×m and each switch 3360 is of dimension n×n. The W output WDM links 2820 of an upstream spectral router 2830 are divided into $\Omega_1$ links directed to switches 3260 of matrix 3200 and $\Omega_2$ links directed to switches 3360 of matrix 3300 so that $\Omega_1 \times m = \Omega_2 \times n$. The number μ of switches 3260 per row in matrix 3200 is μ=(Λ×$\Omega_1$) and the number ν of switches 3360 per row in matrix 3300 is ν=(Λ×$\Omega_2$). FIG. 35 illustrates an arrangement where Λ=5, W=4, m=4, n=12, $\Omega_1$=3, $\Omega_2$=1. Thus μ=15 and ν=5.

Figure 36:
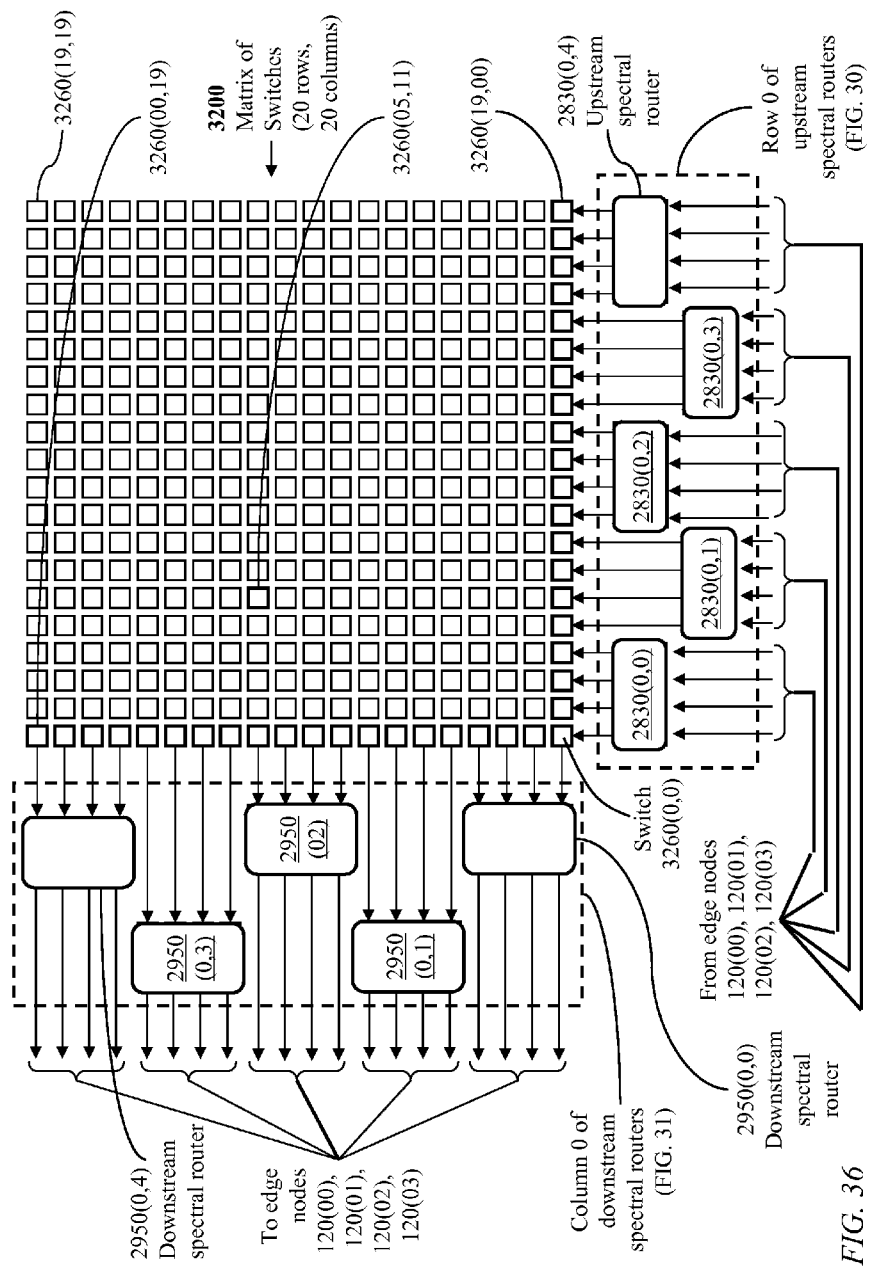
FIGS. 36 to 38 illustrate connectivity patterns of upstream spectral routers to a matrix of switches and connectivity patterns of the matrix of switches to downstream spectral routers, in a network having switches arranged in a single matrix, in accordance with an embodiment of the present invention.

FIG. 36 illustrates an array of upstream spectral routers {2830(0,0), to 2830(4,0)} connecting a set of edge nodes {120(0) to 120(3)} to a first row of switches {160(0,0) to 160(19,0)} of a matrix of switches having 20 rows and 20 columns and a set of downstream spectral routers {2950(0,0) to 2950(0,4)} connecting switches of a first column of the matrix of switches to the set of edge nodes {120(0) to 120(3)}.

Figure 37:
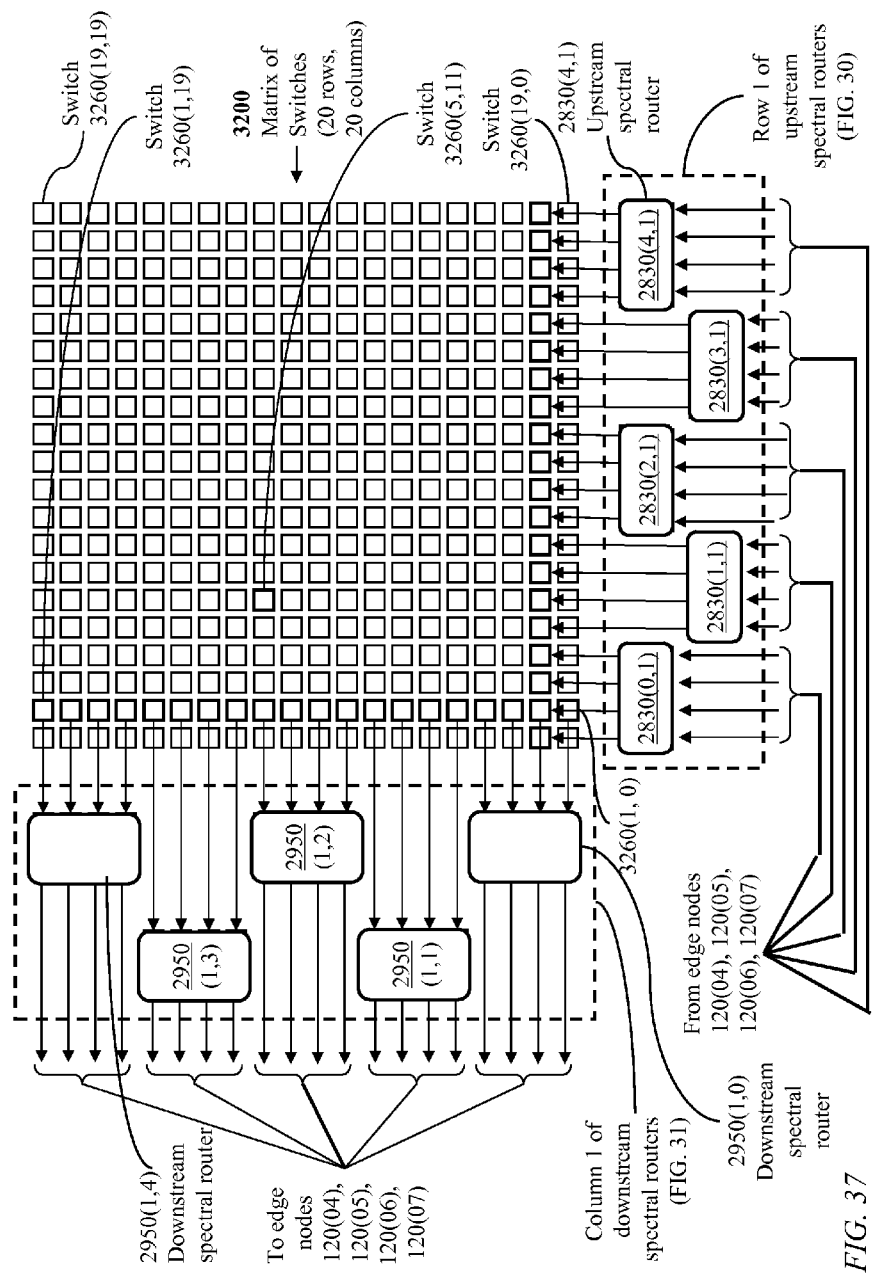

FIG. 37 illustrates an array of upstream spectral routers {2830(0,1), to 2830(4,1)} connecting a set of edge nodes {120(4) to 120(7)} to a second row of switches of the matrix of switches of FIG. 36, and a set of downstream spectral routers {2950(1,0) to 2950(1,4)} connecting switches of a second column of the matrix of switches to the set of edge nodes {120(4) to 120(7)}.

Figure 38:
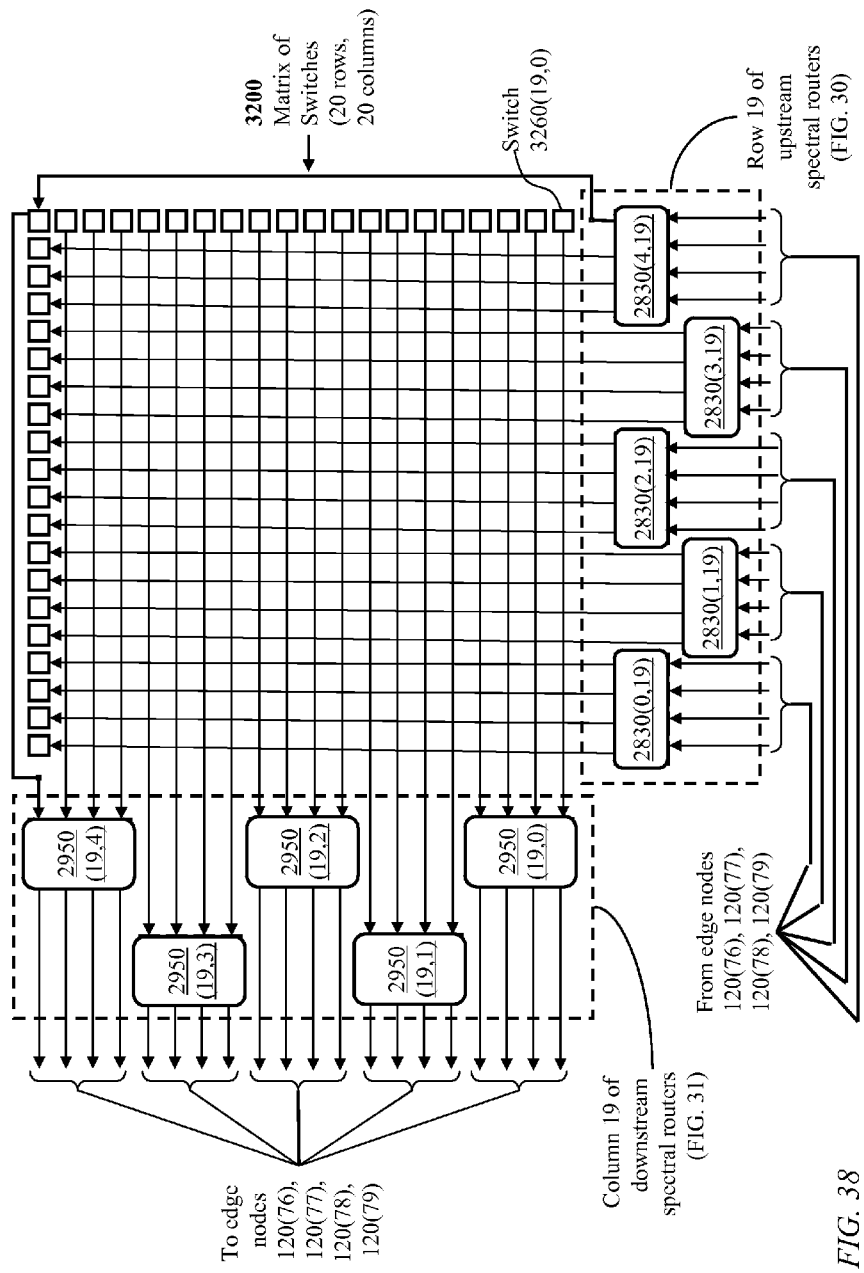

FIG. 38 illustrates an array of upstream spectral routers {2830(0,19), to 2830(4,19)} connecting a set of edge nodes {120(76) to 120(79)} to a last row of switches of the matrix of switches of FIG. 36, and a set of downstream spectral routers {2950(19,0) to 2950(19,4)} connecting switches of a last column of the matrix of switches to the set of edge nodes {120(76) to 120(79)}.

Figure 39:
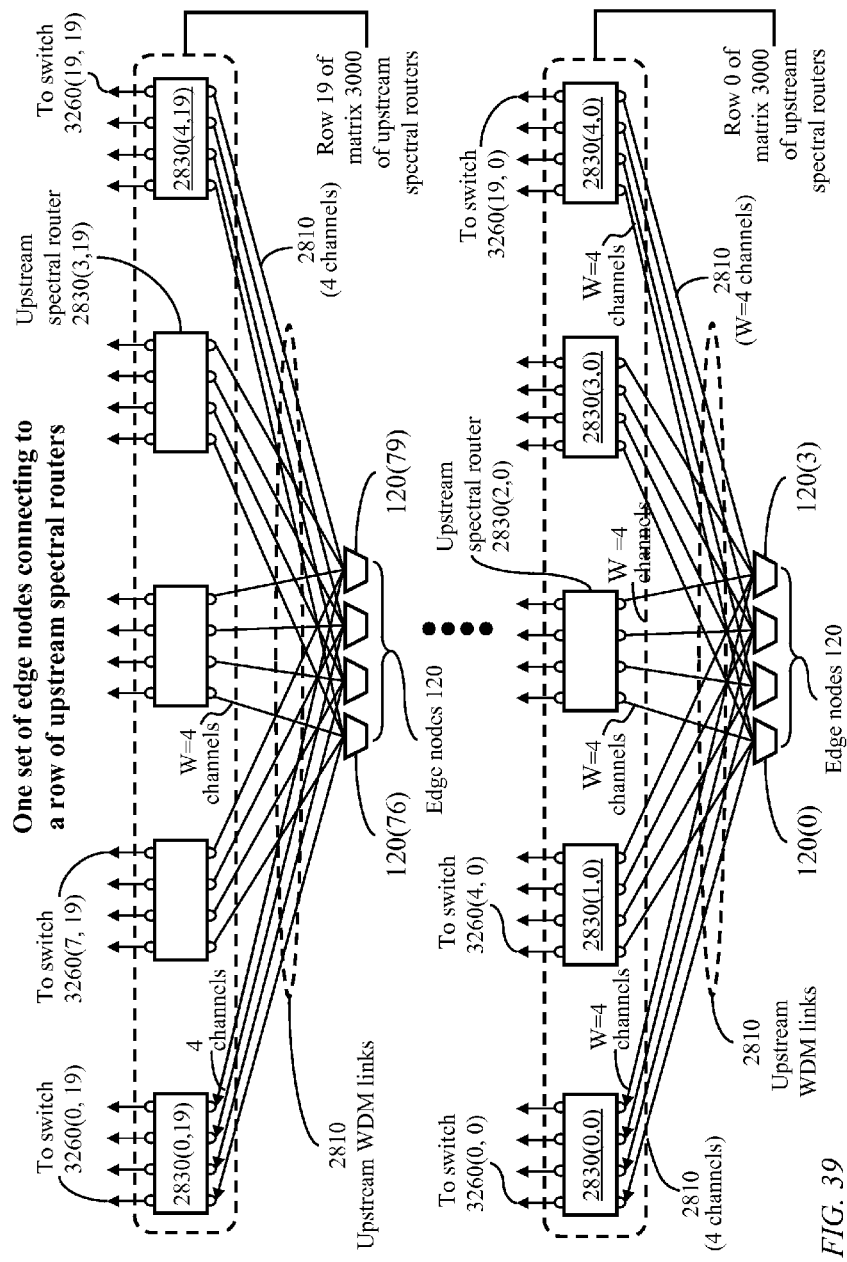
FIG. 39 illustrates connectivity patterns of edge nodes to upstream spectral routers, and upstream spectral routers to switches, in a network having switches arranged in a single matrix, in accordance with an embodiment of the present invention.

FIG. 39 illustrates connectivity patterns of edge nodes 120 to upstream spectral routers 2830 where all upstream spectral routers 2830 of a same row of matrix 3000 connect to a same set of edge nodes 120. For example, edge nodes {120(0) to 120(3)} connect to upstream spectral routers {2830(0,0) to 2830(4,0)}, and edge nodes {120(76) to 120(79)} connect to upstream spectral routers {2830(0,19) to 2830(4,19)}. Thus, each output WDM link 2820 of each upstream spectral router 2830 of a same row of matrix 3000 carries m wavelength channels from a same set of edge nodes. A disadvantage of such a connectivity pattern is a potential uneven distribution of upstream data among the switches 160. The spectral routers connect to switches 160 arranged in a single matrix.

Figure 40:
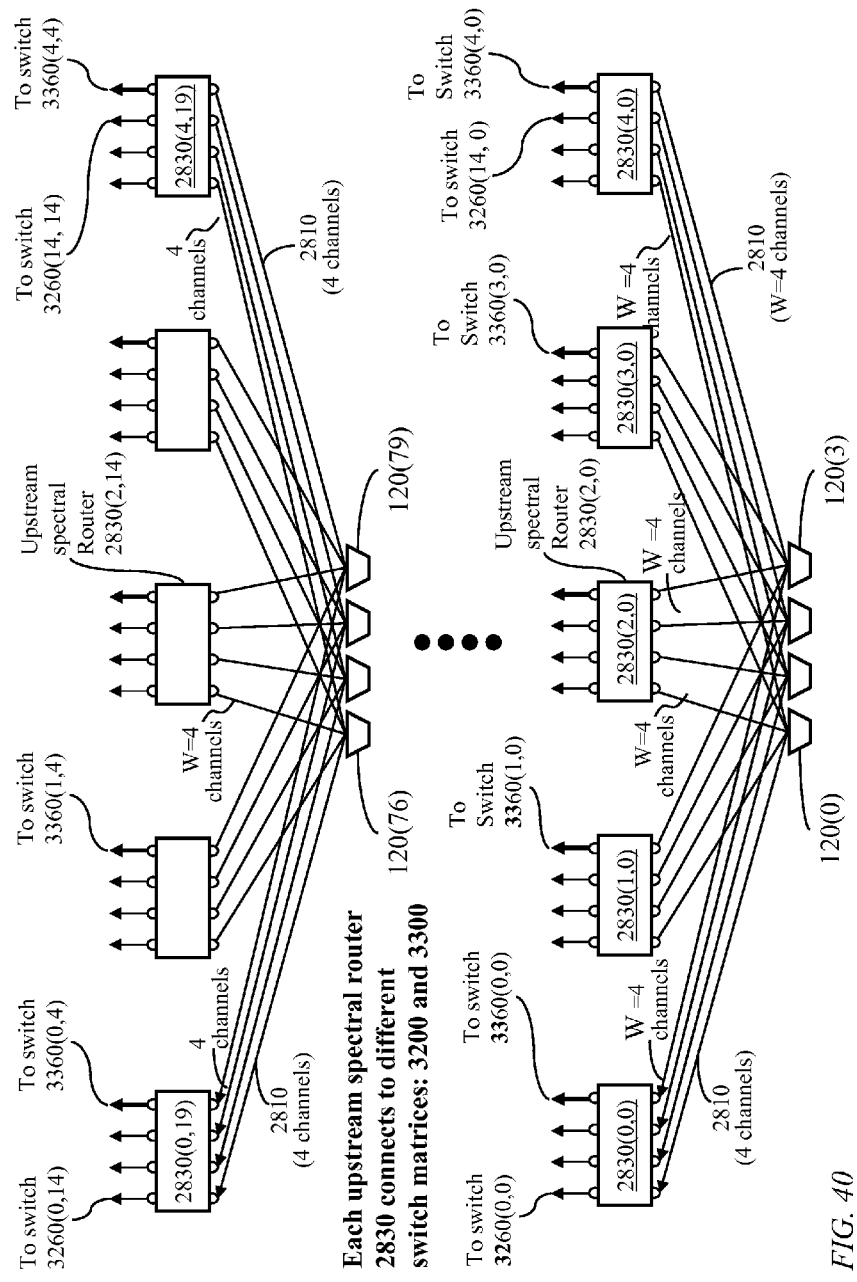
FIG. 40 illustrates connectivity patterns of edge nodes to upstream spectral routers, and upstream spectral routers to switches, in a network having switches arranged in two matrices, in accordance with an embodiment of the present invention.

FIG. 40 illustrates connectivity patterns of edge nodes 120 to upstream spectral routers 2830 where all upstream spectral routers 2830 of a same row of matrix 3000 connect to a same set of edge nodes 120 as in the connectivity patterns of FIG. 39. However, the spectral routers 2830 connect to switches 160 arranged in a first matrix and switches 560 arranged in a second matrix. Thus, the output WDM links of each spectral router are divided into two sets each directed to switches of a respective matrix. This arrangement is described below with reference to FIGS. 56 to 59.

Orthogonal Edge-Node Connectivity to Spectral Routers

As defined earlier, any two sets of edge nodes are said to be orthogonal if the two sets have a number of common edge nodes not exceeding a predefined upper bound called an orthogonality index.

The connection of edge nodes 120 to switches 160 (FIGS. 1 to 4) or to switches 160 and 560 (FIGS. 5 to 11) may be determined in a manner which ensures that a set of edge nodes 120 connecting to any switch 160 or 560 has a relatively small number (preferably at most one) of edge nodes in common with a set of edge nodes connecting to any other switch 160 or 560.

If the edge nodes 120 are connected directly to the switches 160 through upstream channels 122 and downstream channels 124, in the network configuration of FIGS. 1 to 4, and with each edge node having μ upstream channels, then orthogonal connectivity with an orthogonality index not exceeding ⌈m/μ⌉ for a matrix of switches 160 of μ columns and μ rows where each switch 160 is of dimension m×m (i.e., having m inlets and m outlets per switch) can be realized.

With Q(c, r) denoting a set of edge nodes 120 connecting to a switch in column c, 0≤c<μ, and row r, 0≤r<μ, and selecting μ to be a prime number, orthogonal sets of edge nodes, Q(c, r), 0≤c<μ, 0≤r<μ, of an orthogonality index of ⌈m/μ⌉, may be formed with set Q(c, r) comprising edge nodes 120 of indices:

$\{j\times(1+m\times c)+m\times r\}_{modulo\ S}, 0\le j<m,$ where $S=m\times\mu$ is the number of edge nodes 120, the edge nodes being indexed sequentially between 0 and (S−1).

If the edge nodes 120 are connected directly to the switches 160 and 560 (FIGS. 5 to 11) through upstream channels 521 and 522, and downstream channels 523 and 524, with each edge node having: μ upstream channels 521 to matrix 580 of switches 160; μ downstream channels 523 from matrix 580; ν upstream channels 522 to matrix 590 of switches 560; and ν downstream channels 524 from matrix 590, then the orthogonality index of edge node sets connecting to switches 160 of matrix 580 is ⌈m/μ⌉ and the orthogonality index of edge node sets connecting to switches 560 of matrix 590 is ⌈n/ν⌉. The parameters μ, m, ν, and n are selected so that μ×m=ν×n. For example, with μ=941, ν=61, m=61, and n=941, the orthogonality index of edge node sets connecting to switches 160 of matrix 580 is ⌈61/941⌉=1 while the orthogonality index of edge node sets connecting to switches 160 of matrix 590 is ⌈941/61⌉=16.

A set of m edge nodes connecting to a switch 160 of matrix 580 comprises edge nodes 120 of indices:

$\{j\times(1+m\times c)+m\times r\}_{modulo\ S}, 0\le j<m, 0\le c<\mu, 0\le r<\mu,$ where $S=m\times\mu=n\times\nu$ is the number of edge nodes, the edge nodes being indexed sequentially between 0 and (S−1).

Figure 45:
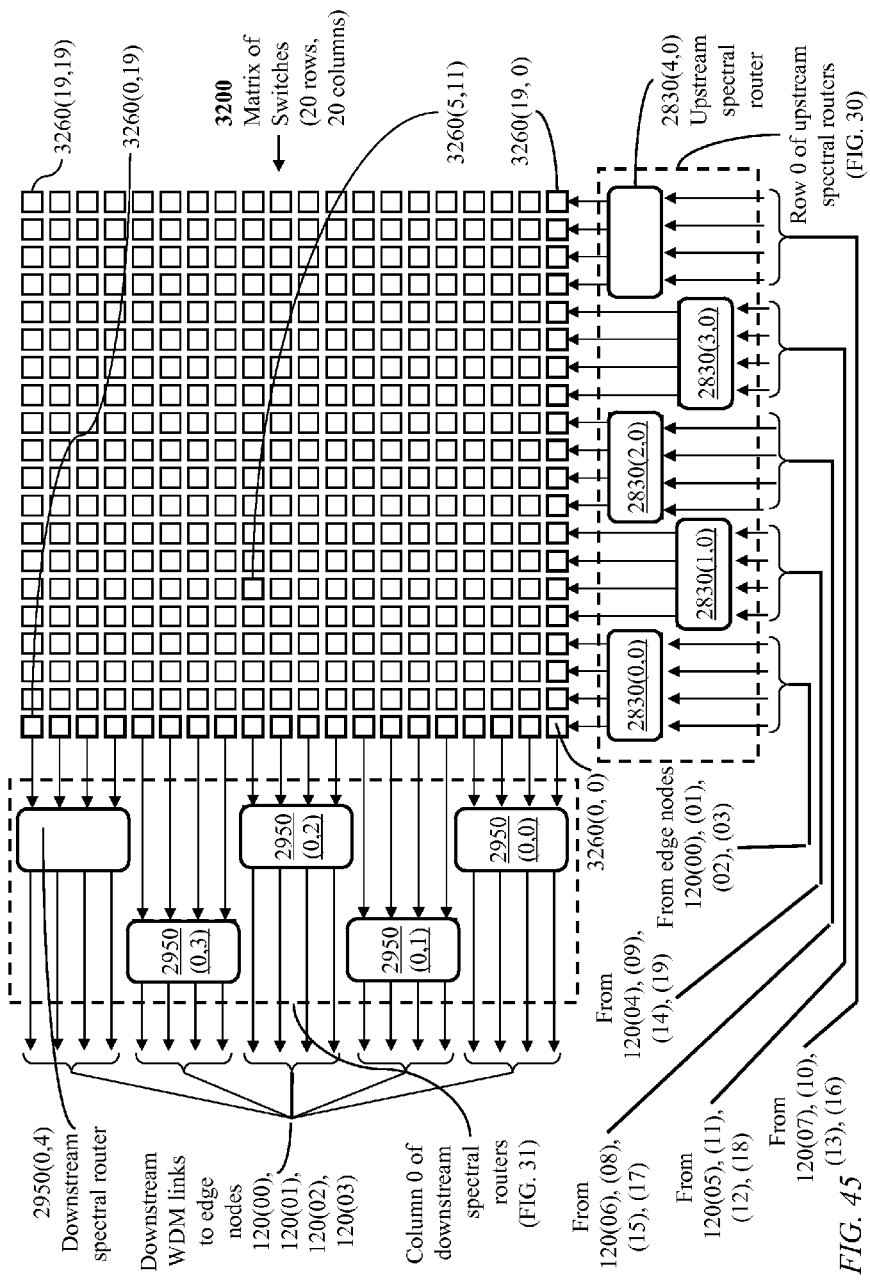
FIGS. 45 to 47 illustrate exemplary orthogonal upstream connectivity of edge nodes to upstream spectral routers, and connectivity of upstream spectral routers to a matrix of switches, in a network having switches arranged in a single matrix, in accordance with an embodiment of the present invention.
Figure 46:
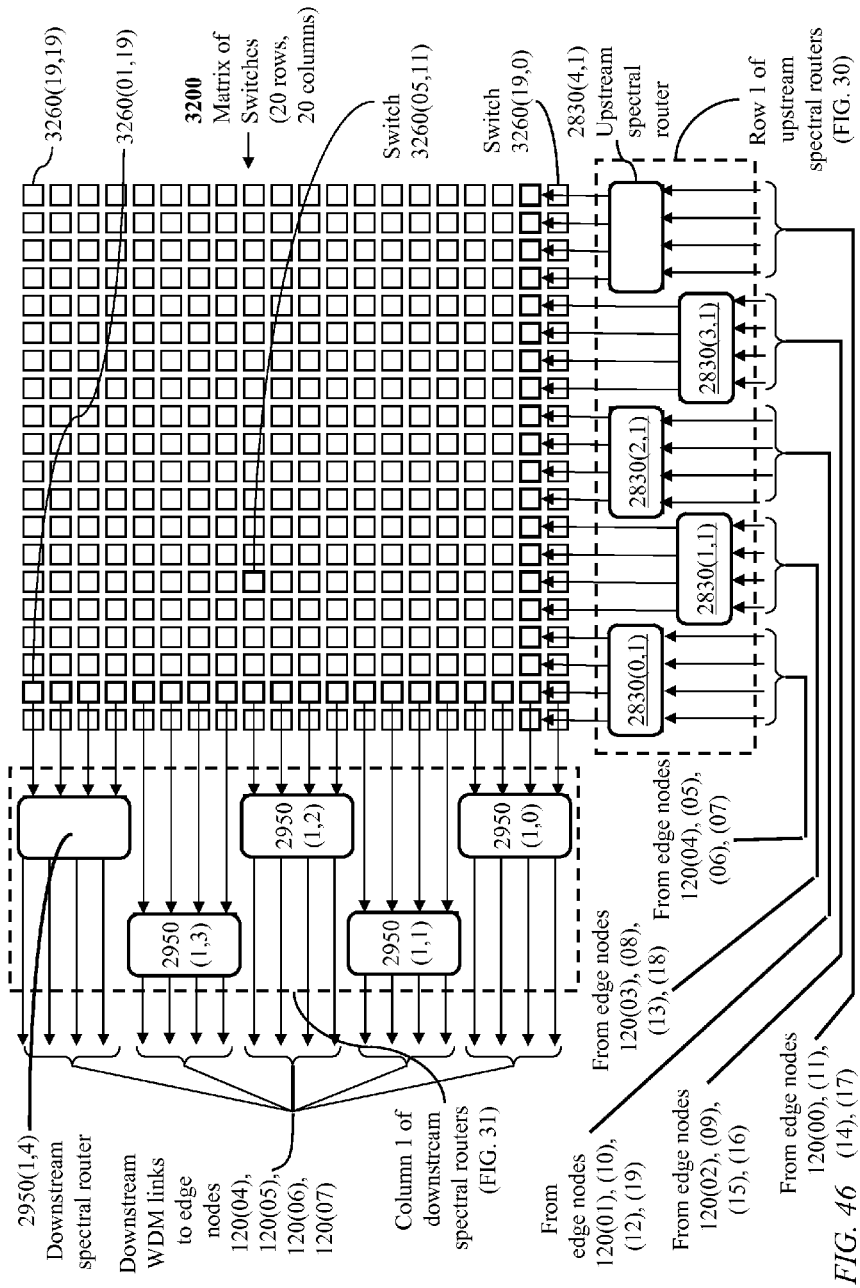
Figure 47:
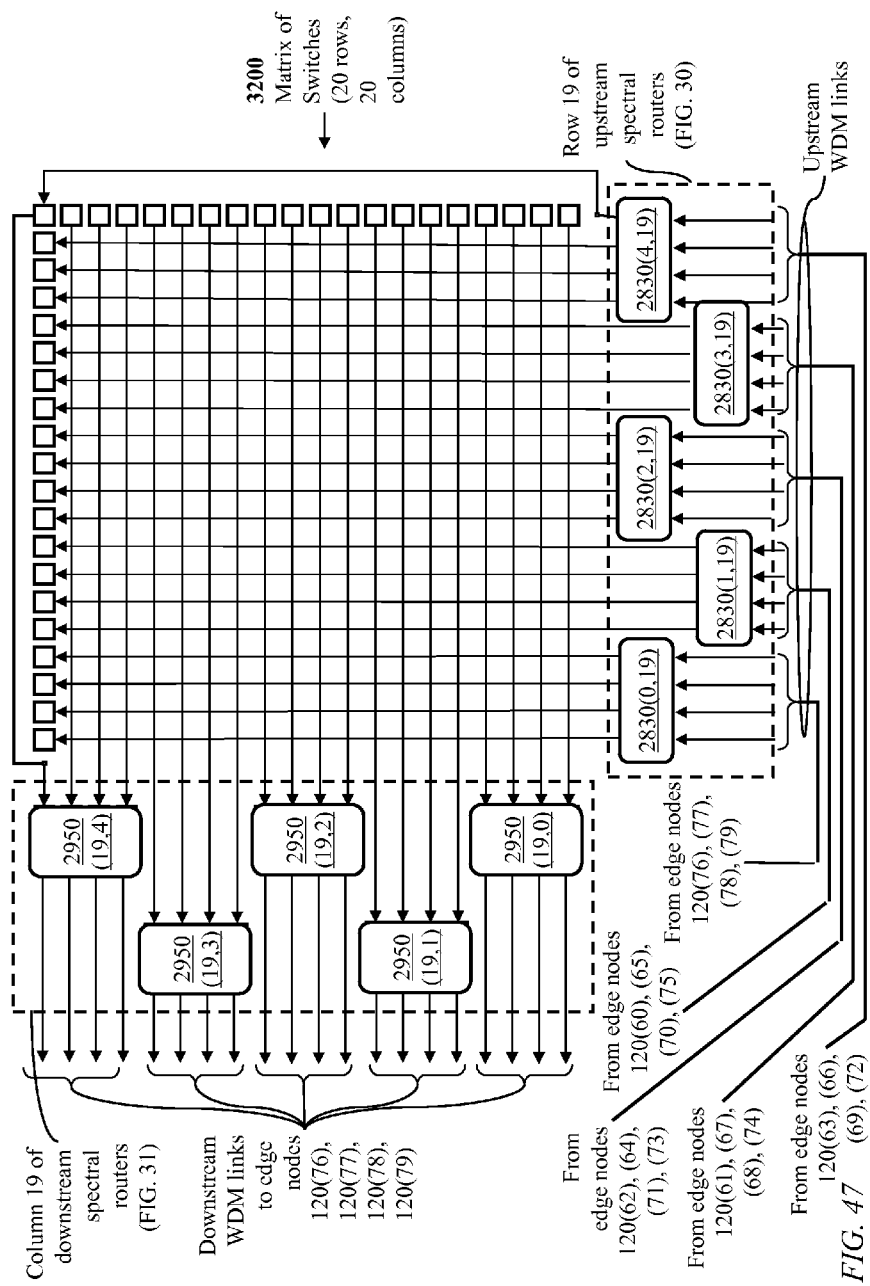

A set of n edge nodes connecting to a switch 160 of matrix 590 comprises edge nodes 120 of indices:

$\{j\times(1+n\times c)+n\times r\}_{modulo\ S}, 0\le j<n, 0\le c<\nu, 0\le r<\nu.$ Consider a network employing a single matrix 3200 of switches 3260 as illustrated in FIGS. 45 to 47. Each edge node 120 has Λ×W upstream wavelength channels individually connecting to Λ×W switches 3260 through Λ upstream spectral routers 2830 and Λ×W downstream wavelength channels from Λ×W switches 3260 through Λ downstream spectral routers 2950. Connecting the edge nodes 120 to the switches 3260 through spectral routers 2830 each having χ input WDM links 2810 and W output WDM links 2820 necessitates that W output WDM links individually connecting to W switches 3260 carry wavelength channels from a same set of χ edge nodes. Thus, the orthogonality index of edge-node sets connecting to switches 160 of matrix 3200 has a minimum value of W>1. To exploit the economical advantages of WDM transmission while still balancing the flow-rate loads of the (Λ×W)² switches 3260 of matrix 3200, orthogonal sets of edge nodes 120 may be connected to the upstream spectral routers 2830 of matrix 3000. The orthogonality index of the sets of edge nodes connecting to the upstream spectral routers 2830 equals ⌈W/Λ⌉. The number of columns Λ of matrix 3000 is preferably selected to be greater than or equal to W. Thus, the orthogonality index of edge nodes 120 connecting to spectral routers 2830 of matrix 3000 equals 1. Exemplary connectivity patterns of edge nodes 120 to upstream spectral routers 2830 are illustrated in FIGS. 41 to 50.

For a network employing a matrix 3200 of switches 3260 of dimension m×m each and a matrix 3300 of switches 3360 of dimension n×n each, where n≥m, the connectivity of edge nodes to the upstream spectral routers 2830 of matrix 3000 is similar to the connectivity for the case of a single matrix 3200 of switches 160. The connectivity of the upstream spectral routers 2830 to switches 3260 of matrix 3200 and switches 3360 of matrix 3300 differ according to the ratio of n/m as will be described with references to FIGS. 56 to 59.

FIGS. 41 to 44 define exemplary orthogonal upstream connectivity patterns of edge nodes 120 to matrix 3000 having Λ columns and W×Λ rows of upstream spectral routers 2830, with Λ=5 and W=4. The number of upstream spectral routers 2830 in matrix 3000 is W×Λ²=100. The number of edge nodes connecting to upstream spectral routers 2830 is m×W×Λ=80. The upstream spectral routers are indexed as 2830(c, r), 0≤c<Λ and 0≤r<W×Λ. The edge nodes 120 are indexed sequentially as 0 and (Λ×m×W−1). Each rectangle in FIGS. 41 to 44 corresponds to a respective upstream spectral router 2830 and indicates the sequential numbers of a set of edge nodes 120 each having an upstream WDM link to the respective upstream spectral router 2830. The sets of edge nodes connecting to the upstream spectral routers are mutually orthogonal with an orthogonality index of 1.

Numerical methods may be used to generate the sets of orthogonal sets of edge nodes connecting to the upstream spectral routers 2830. If the number of columns Λ is selected to be a prime number, the indices of m edge nodes connecting to an upstream spectral router 2830(c, r) of column c, 0≤c<Λ, and row r, 0≤r<(Λ×W), of matrix 3000 may be determined as:

$$S \times \lfloor r/\Lambda \rfloor + \{j \times (1+m \times c) + m \times (\rho + c)\}_{modulo\ S}, 0 \leq j < m,$$

where S=Λ×m, and ρ=$r_{modulo\ \Lambda}$.

FIGS. 41 to 44 relate to a configuration of parameters Λ=5, W=χ=m=4, thus S=20.

Figure 41:
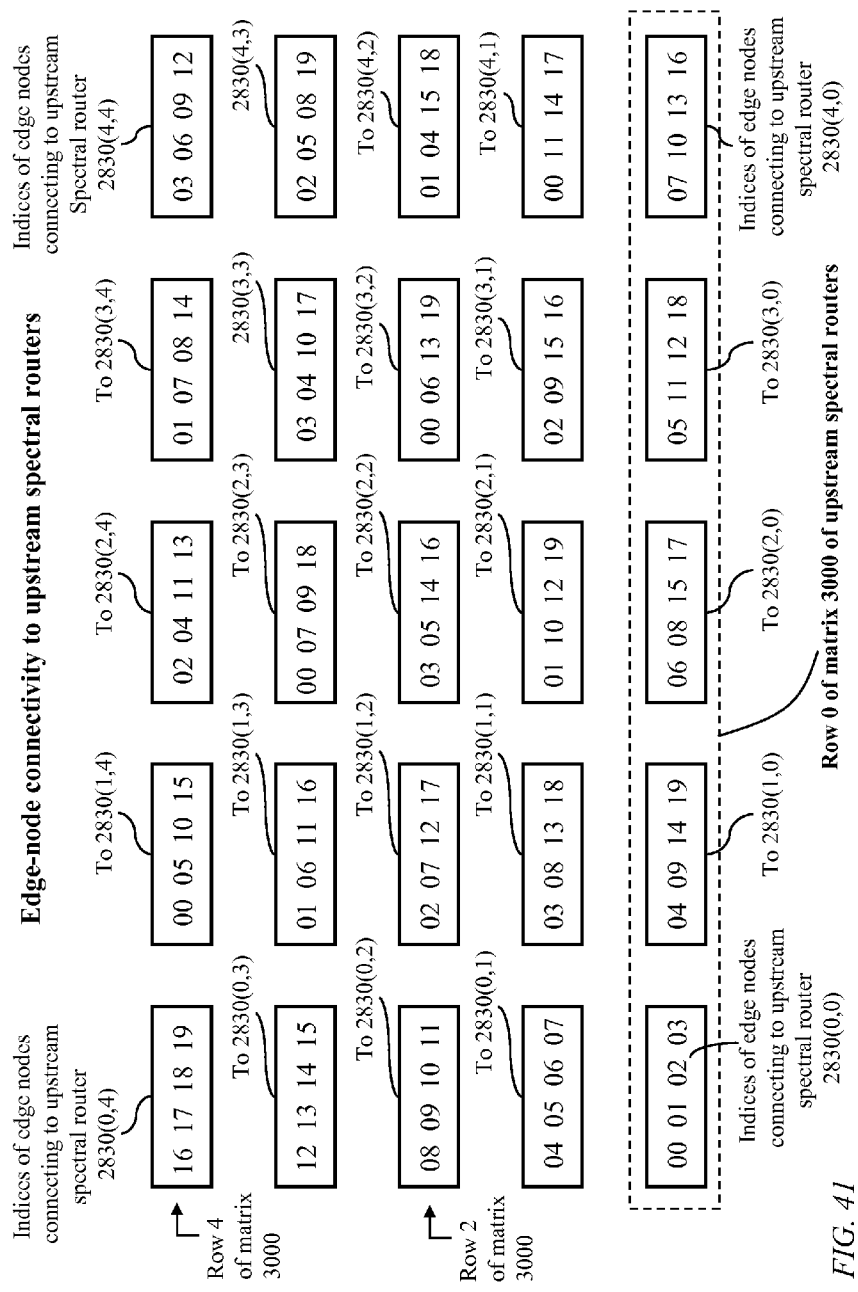

For an upstream spectral router 2830 of indices c=2 and r=3, the above expression yields 20×⌊3/5⌋×{9×j+4×(3+2)}$_{modulo\ 20}$, i.e., {9×j+20}$_{modulo\ 20}$, i.e., {9×j}$_{modulo\ 20}$, 0≤j<4, which yields {0}$_{modulo\ 20}$, {9}$_{modulo\ 20}$, {18}$_{modulo\ 20}$, {27}$_{modulo\ 20}$, i.e., 0, 9, 18, and 7 for j=0, 1, 2, and 3, respectively, as indicated in FIG. 41.

For an upstream spectral router of indices c=2 and r=18, the above expression yields 20×⌊18/5⌋×{9×j+4×(3+2)}$_{modulo\ 20}$, i.e., 60+{9×j+20}$_{modulo\ 20}$, i.e., 60+{9×j}$_{modulo\ 20}$, 0≤j<4, which yields 60+{0}$_{modulo\ 20}$, 60+{9}$_{modulo\ 20}$, 60+{18}$_{modulo\ 20}$, 60+{27}$_{modulo\ 20}$, i.e., 60, 69, 78, and 67 for j=0, 1, 2, and 3, respectively, as indicated in FIG. 44.

An upstream spectral router of column c, 0≤c<Λ, and row r, 0≤r<(Λ×W), of matrix 3000 may connect to a set of W switches in consecutive columns {c×W} to {(c×W)+W−1} of the matrix 3200 of switches 3260; the columns of the matrix 3200 of switches 3260 may be indexed sequentially between 0 and (Λ×W−1) and the rows of the matrix of switches may be indexed sequentially between 0 and (Λ×W−1).

FIGS. 45 to 47 illustrate exemplary orthogonal upstream connectivity of edge nodes 120 to upstream spectral routers 2830, according to the pattern of FIGS. 41 to 44, and connectivity of the upstream spectral routers 2830 to the matrix 3200 of switches 3260. In the arrangement of FIGS. 36 to 38, each upstream spectral router 2830 of a row of matrix 3000 connects to the same set of edge nodes according to the connectivity pattern of FIG. 39. In the arrangement of FIGS. 45 to 47, the upstream spectral routers 2830 of a row of matrix 3000 connect to disjoint (non-intersecting) sets of edge nodes. The connectivity patterns of downstream spectral routers 2950 in the arrangements of FIGS. 45 to 47 are respectively the same as in the arrangements of FIGS. 36 to 38.

FIG. 45 illustrates an array of upstream spectral routers {2830(0,0), to 2830(4,0)} connecting different sets of edge nodes to a row of switches {160(0,0) to 160(19,0)} of the matrix of switches of FIG. 36. The edge-node sets of FIG. 45 are the edge-node sets indicated in the bottom row (row 0) of FIG. 41. Edge nodes {120(0), 120(1), 120(2), 120(03)} connect to upstream spectral router 2830(0), edge nodes {120(4), 120(9), 120(14), 120(19)} connect to upstream spectral router 2830(1), edge nodes {120(6), 120(8), 120 (15), 120(17)} connect to upstream spectral router 2830(2), edge nodes {120(5), 120(11), 120(12), 120(18)} connect to upstream spectral router 2830(3), edge nodes {120(7), 120 (10), 120(13), 120(16)} connect to upstream spectral router 2830(4).

FIG. 46 illustrates an array of upstream spectral routers {2830(0,1), to 2830(4,1)} connecting orthogonal (and non intersecting) sets of edge nodes to a row of switches {160 (0,1) to 160(19,1)} and FIG. 47 illustrates an array of upstream spectral routers {2830(0,19), to 2830(4,19)} connecting orthogonal (and non intersecting) sets of edge nodes to a row of switches {160(0,19) to 160(19,19)} of the matrix of switches of FIG. 36. The edge-node sets of FIG. 46 are the edge-node sets indicated in the second row (row 1) of FIG. 41 and the edge-node sets of FIG. 47 are the edge-node sets indicated in the top row (row 19) of FIG. 44.

Figure 48:
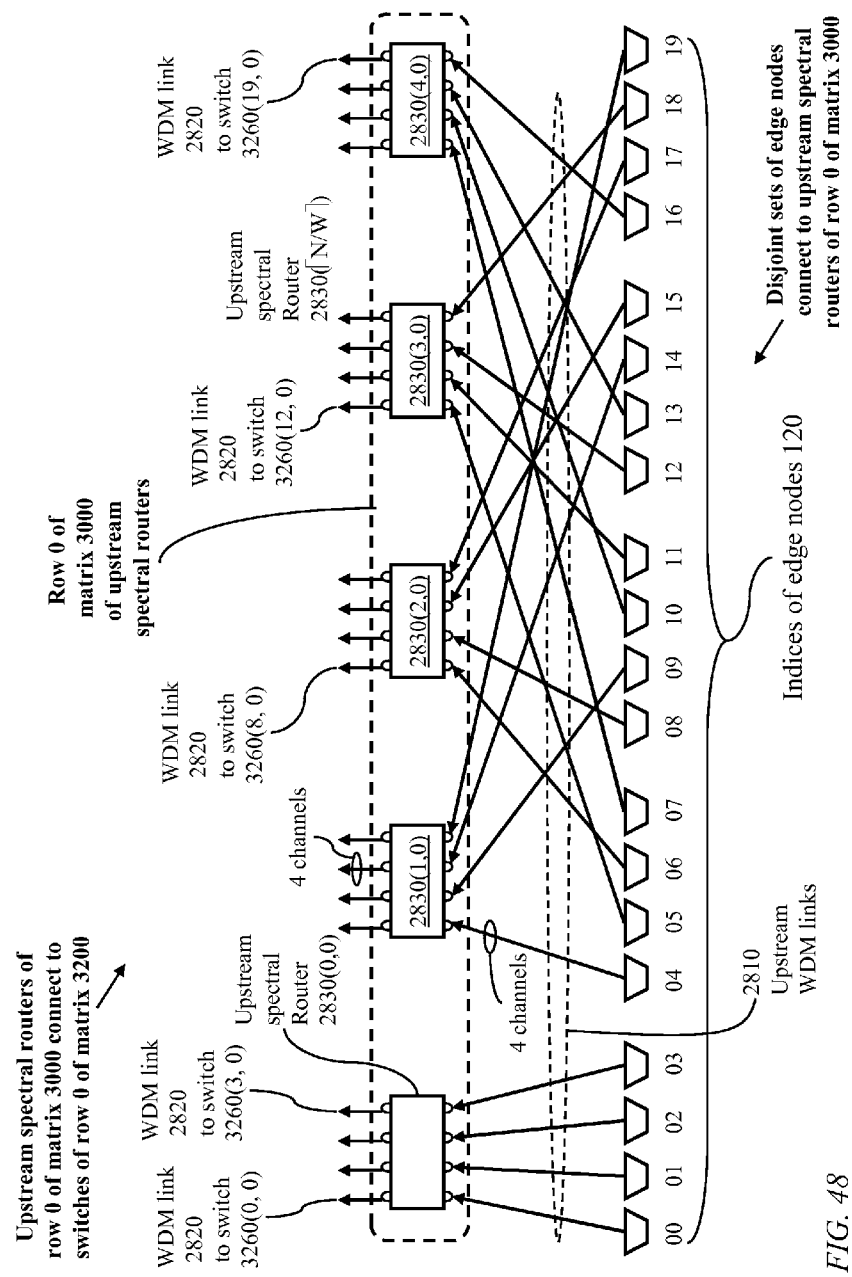
FIGS. 48 to 50 illustrate further details of the upstream connectivity patterns of FIG. 45, FIG. 46, and FIG. 47.
Figure 49:
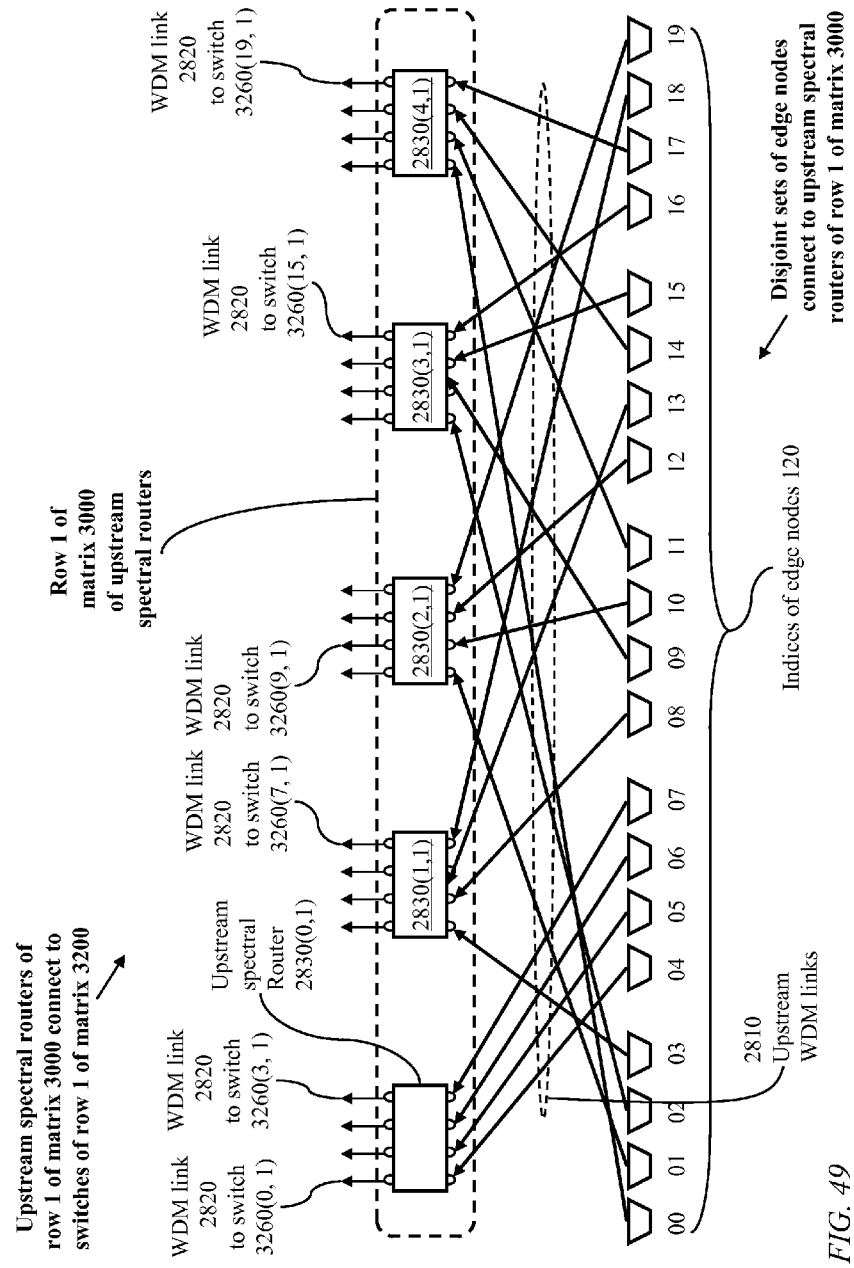
Figure 50:
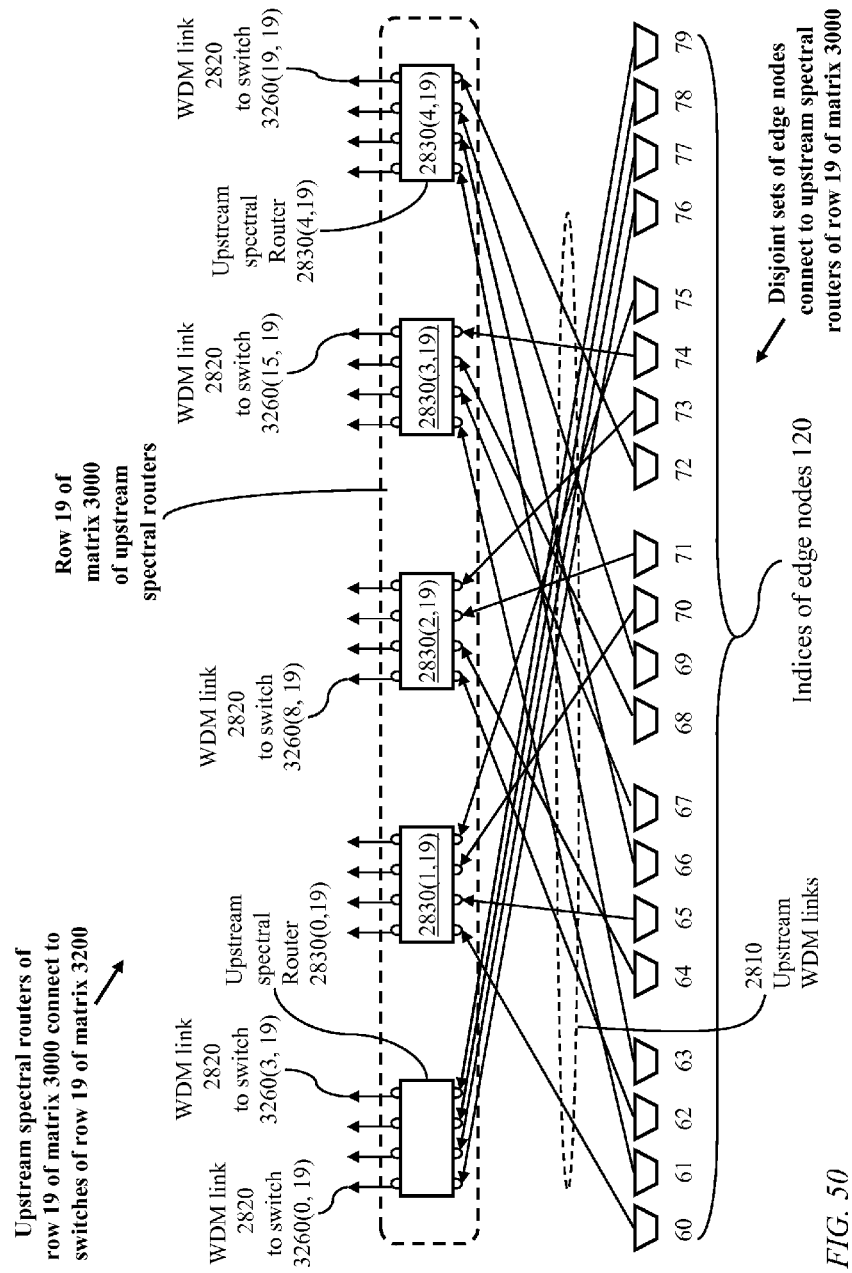

FIGS. 48 to 50 illustrate further details of the upstream connectivity, corresponding to FIG. 45, FIG. 46, and FIG. 47, of edge nodes 120 to upstream spectral routers 2830. Comparing the connectivity pattern of FIG. 48 to the connectivity pattern of FIG. 39, it is seen that the upstream spectral routers 2830(0,0) to 2830(4,0) connect to the same set of four edge nodes {120(0) to 120(3)} in the arrangement of FIG. 39 but connect to 20 different edge nodes {120(0) to 120(19)} in the arrangement of FIG. 48. Likewise, the upstream spectral routers 2830(0,19) to 2830(4,19) connect to the same set of four edge nodes {120(76) to 120(79)} in the arrangement of FIG. 39 but connect to 20 different edge nodes {120(60) to 120(79)} in the arrangement of FIG. 50.

In the configurations of FIGS. 45 to 47, orthogonal sets of edge nodes connect to upstream spectral routers 2830 where an edge node 120 has an upstream link to upstream spectral routers of different columns and different rows of matrix 3000. However, there is a one-to-one correspondence between rows of the matrix 3000 of upstream spectral routers and the rows of the matrix 3200 of switches 160. The upstream spectral routers 2830 of a row of matrix 3000 may connect to switches of a respective row of the matrix of switches.

Figure 51:
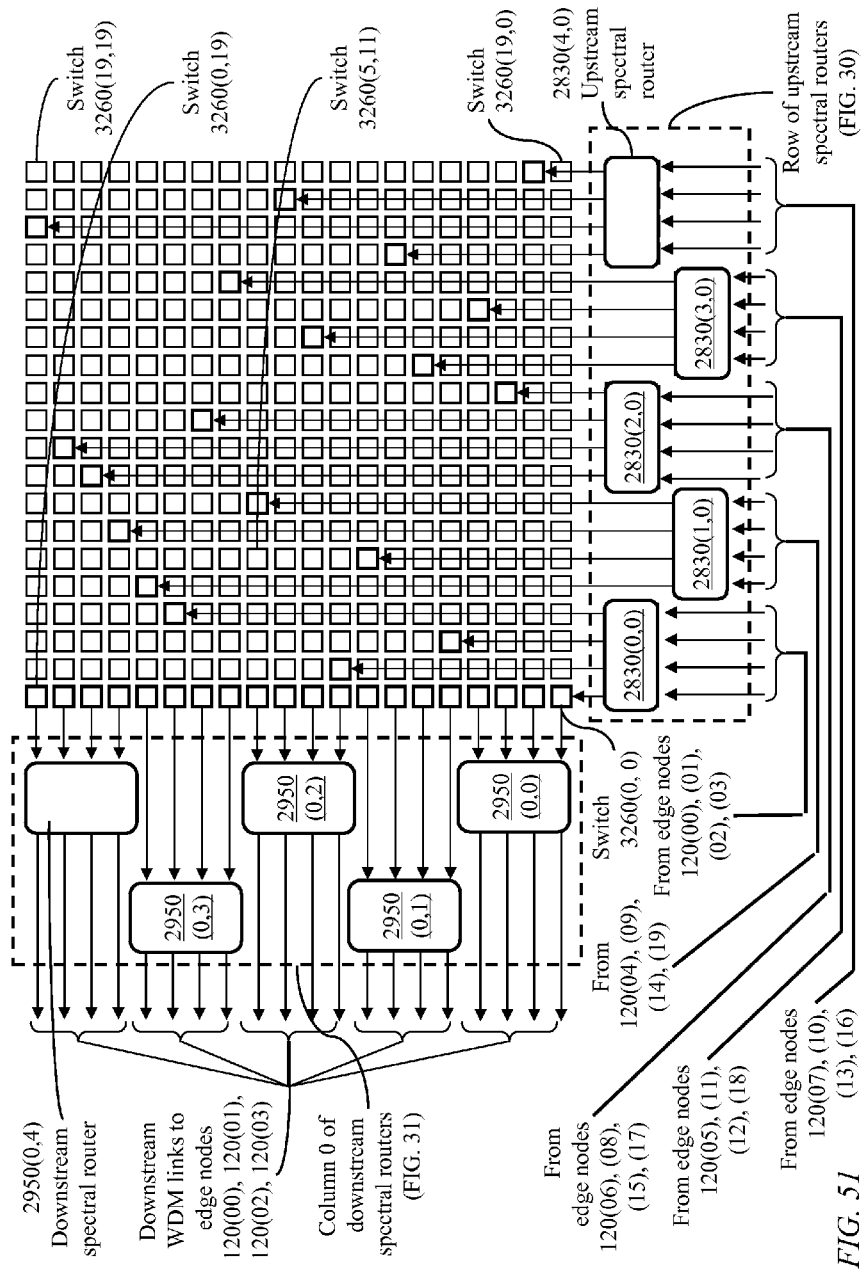
FIG. 51 illustrates an alternative connectivity pattern of upstream spectral routers to switches, in accordance with an embodiment of the present invention.

Connecting orthogonal sets of edge nodes to upstream spectral routers balances the traffic load of the downstream channels from the switches to the edge nodes. However, upstream spectral routers of a row of the matrix 3000 of upstream spectral routers connect to switches of different columns but arbitrarily selected rows of the matrix of switches as illustrated in FIG. 51.

For ease of addressing, switches 3260 or 3360 of each column of the matrix of switches 3200 or 3300 connect to downstream spectral routers 2950 of a respective column of the matrix 3100 of downstream spectral routers which, in turn, connect to a same set of edge nodes 120. Thus, each edge node 120 may be associated with a single column of the matrix of switches 3200 and a single column of the matrix of switches 3300.

Figure 52:
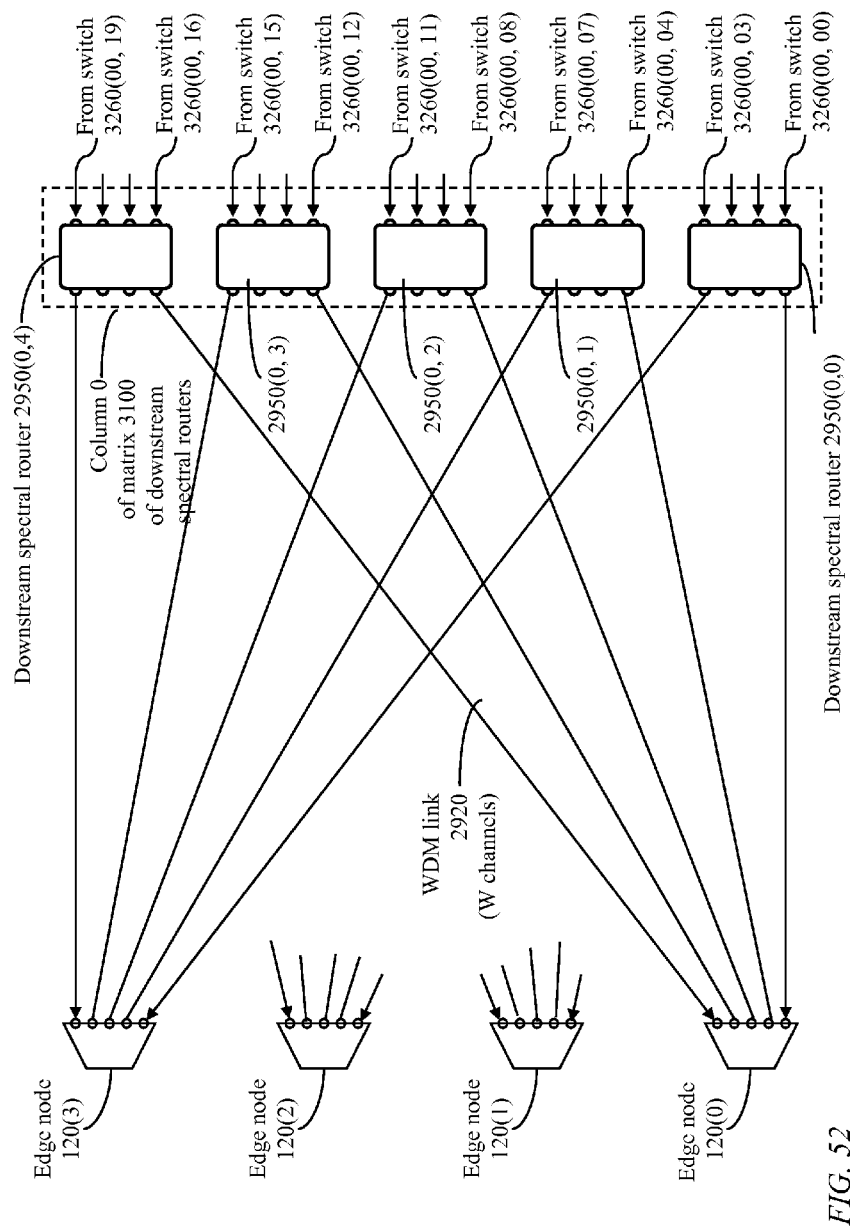
FIGS. 52 to 55 illustrate downstream connectivity patterns in a network having switches arranged in a single matrix, in accordance with an embodiment of the present invention.
Figure 53:
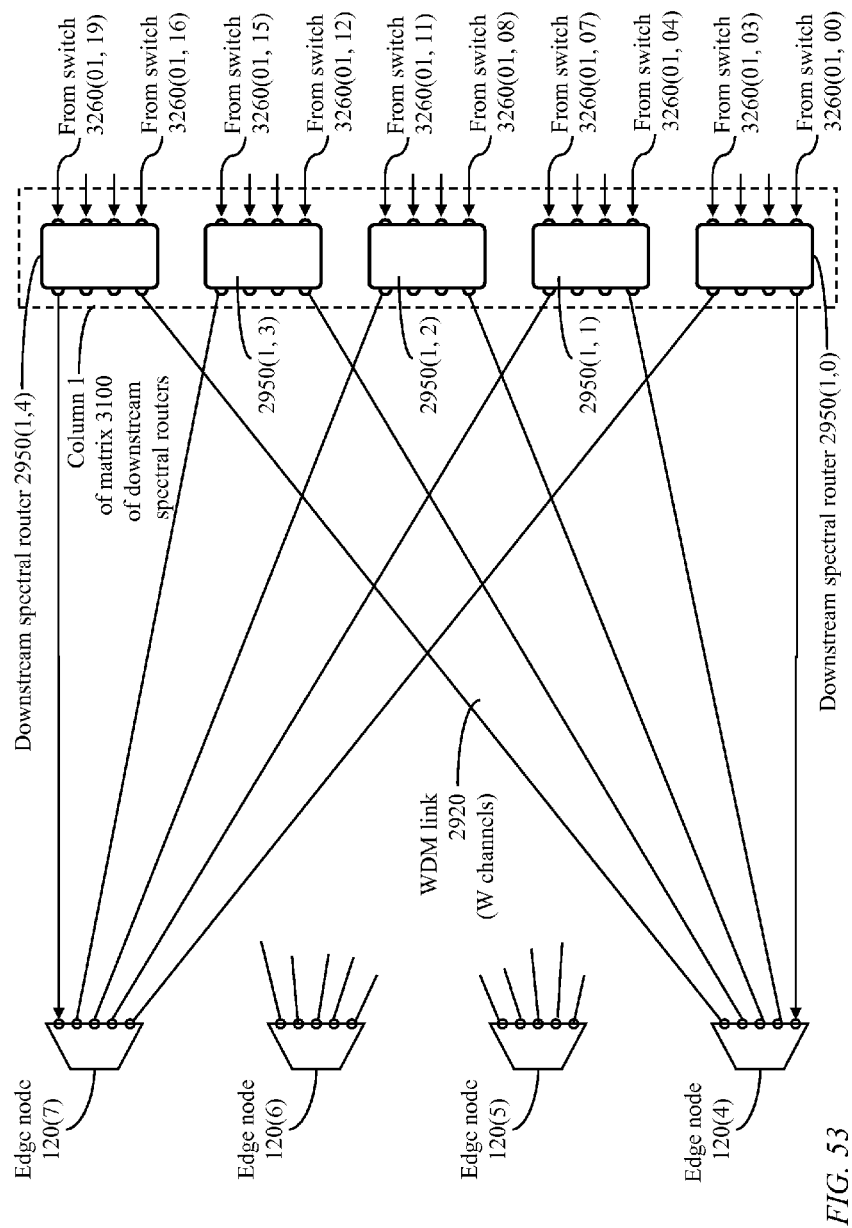
Figure 54:
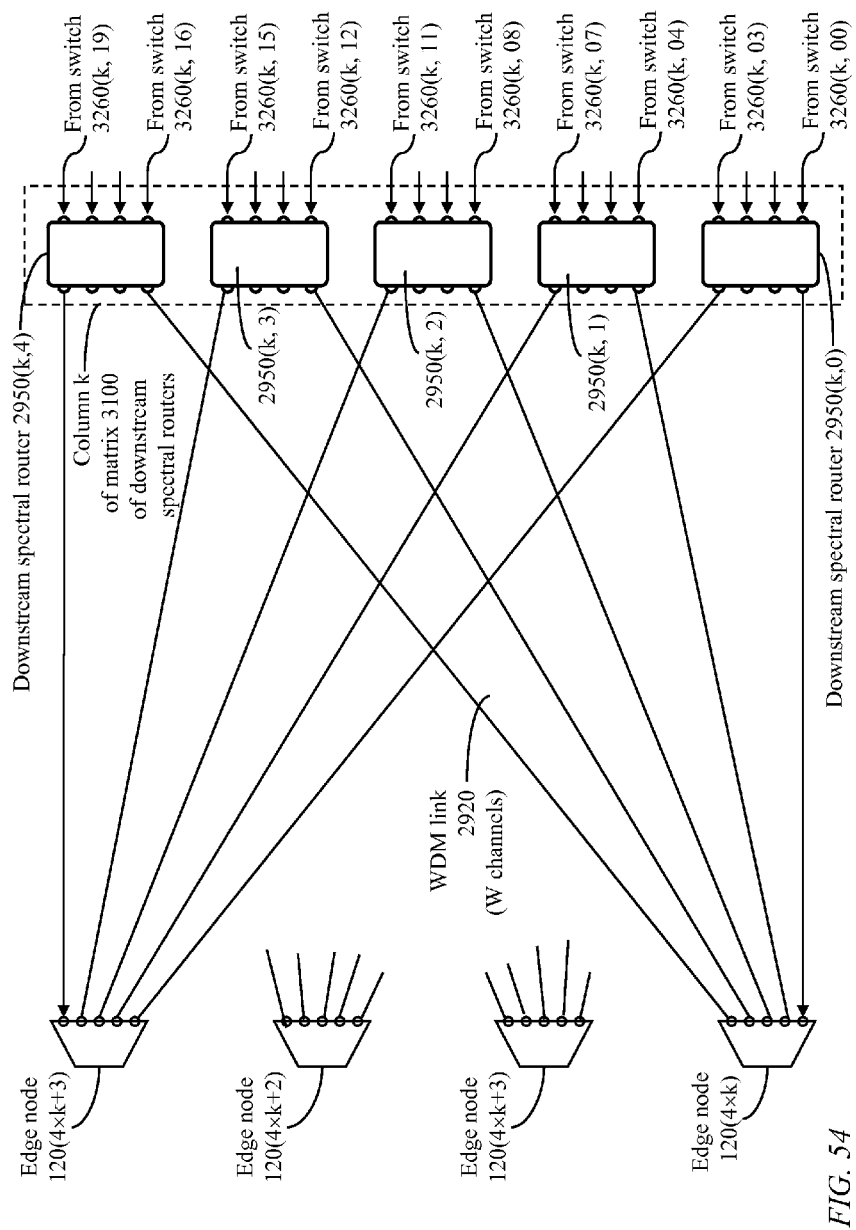
Figure 55:
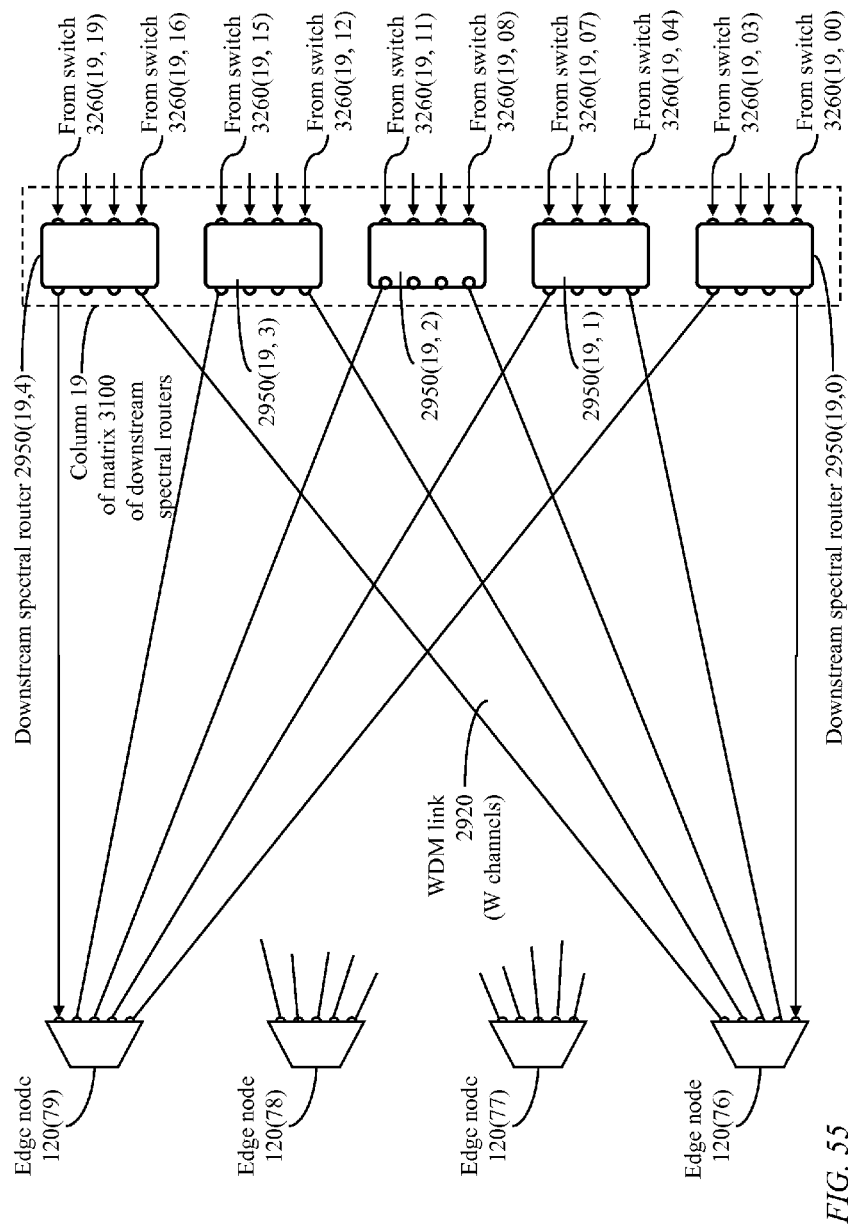

The columns of the matrix 3200 of switches 3260 are indexed as 0 to (Λ×W−1) and the columns of the matrix 3100 of downstream spectral routers 2950 are indexed as 0 to (Λ×W−1). As illustrated in FIG. 52, switches of the column of index 0 connect to the downstream spectral routers of column 0 of the matrix 3100 of downstream spectral routers 2950 which, with χ=m=4, connect to edge nodes 120(0) to 120(3). Switches of the column of index 1 connect to the downstream spectral routers of column 1 of the matrix of downstream spectral routers which connect to edge nodes 120(4) to 120(7) as illustrated in FIG. 53. Switches of the column of index k, 0≤k<Λ×W, connect to the downstream spectral routers of column k of the matrix of downstream spectral routers which connect to edge nodes 120(m×k) to 120(m×k−m−1) as illustrated in FIG. 54. For k=19, switches of the column of index 19, connect to the downstream spectral routers of column 19 of the matrix of downstream spectral routers which connect to edge nodes 120(76) to 120(79) as illustrated in FIG. 55.

Exemplary Network Configuration

An edge node 120 comprises a source node and a sink node. The source node and said sink node may share a respective edge controller and may share a switching fabric. Each edge node has Λ upstream WDM links to upstream spectral routers 2830 in different columns of the matrix 3000 of upstream spectral routers. As discussed earlier, the upstream spectral routers to which an edge node connects are preferably selected so that all sets of edge nodes connecting to the upstream spectral routers are mutually orthogonal. Each edge node has a downstream link from a downstream spectral router 2950 in each row of the matrix 3100 of downstream spectral routers.

In one embodiment, the edge nodes may be assigned to upstream spectral routers 2830 so that all sets of edge nodes connecting to upstream spectral routers 2830 of a same row of matrix 3000 are also mutually disjoint as illustrated in FIGS. 41 to 44.

The matrix 3200 of switches may comprise optical switches, electronic switches, or a combination of optical and electronic switches. It may be desirable to provide two matrices of switches, one containing only optical (photonic) switches and the other containing electronic switches. The two matrices of switches may still be connected to the edge nodes through matrix 3000 of upstream spectral routers 2830 and matrix 3100 of downstream spectral routers 2950. An electronic switch may be a conventional space switch or a single-rotator latent space switch as described below with reference to FIG. 84. Each inlet port of an electronic switch is preceded by an optical-to-electrical converter and each outlet port of the electronic switch succeeded by an electrical-to-optical converter as illustrated in FIG. 26. An edge node 120 employs an electronic switch fabric preferably configured as a single-rotator circulating switch as illustrated in FIGS. 64 to 72.

Multiple Matrices of Switches

The network of FIGS. 45 to 47 employs a single matrix of switches connecting to upstream spectral routers arranged in Λ columns and Λ×W rows and downstream spectral routers arranged in Λ rows and Λ×W columns. It may be desirable to configure the network to have more than one switching matrix. For example, a network may employ a matrix 3200 of fast optical switches, each of a relatively small dimension, and a matrix 3300 of electronic switches, each of a relatively large dimension, as illustrated in FIG. 35. An upstream spectral router 2830 would then connect χ edge nodes to W switches 3260 of the matrix 3200 of optical switches and switches 3360 of the matrix 3300 of electronic switches as illustrated in FIG. 28.

The edge node would still connect to the upstream spectral routers 2830 and the downstream spectral routers 2950 in a manner similar to that of the network of FIGS. 45 to 47. As in the network configuration of one matrix of switches, all sets of edge nodes connecting to the upstream spectral routers are preferably mutually orthogonal.

The W output WDM links 2820 of an upstream spectral router 2830 would then be divided into a set 2822 of $\Omega_1$ links 2820 connecting to switches 3260 of different columns of the first matrix 3200 of switches 3260 and a set 2826 of $\Omega_2$ links connecting to switches of different columns of the second matrix 3300 of switches 3360 as illustrated in FIG. 28. The first matrix 3200 of switches would then have $\Lambda \times \Omega_1$ columns of switches and $\Lambda \times \Omega_1$ rows of switches 3260 and the second matrix 3300 of switches would then have $\Lambda \times \Omega_2$ columns of switches and $\Lambda \times \Omega_2$ rows of switches 3360. For the case where $\Lambda=5$, $W=4$, $\Omega_1=3$ and $\Omega_2=1$, the first matrix of switches would have 15 columns and 15 rows of switches and the second matrix would have 5 columns of switches and 5 rows of switches. Each downstream spectral router 2950 connects to a respective set of $\Omega_1$ switches 3260 of a respective column of matrix 3200 and a respective set of $\Omega_2$ of switches 3360 of a respective column of matrix 3300 as illustrated in FIG. 29.

Figure 56:
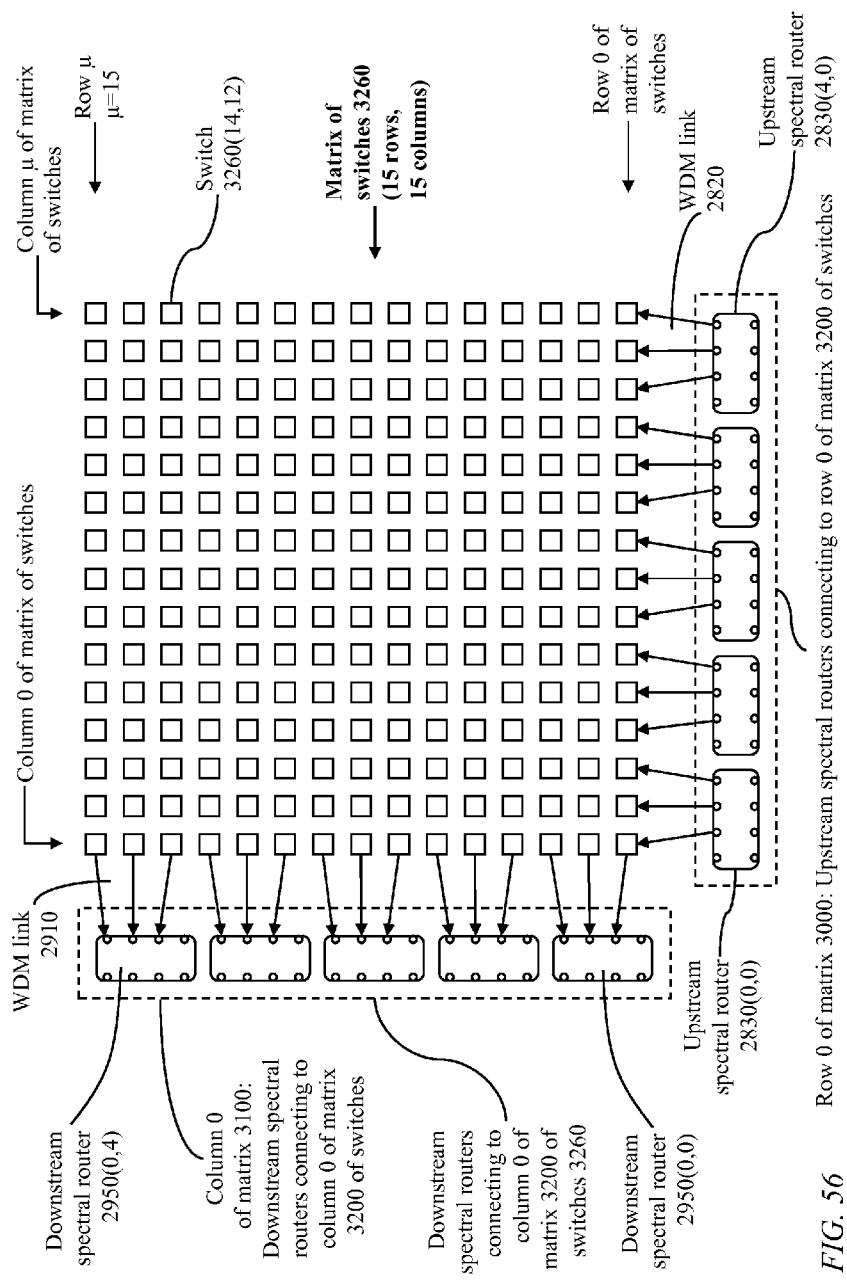
FIG. 56 illustrates connectivity of upstream spectral routers to switches of a row of a first matrix in a network having switches arranged in two matrices, in accordance with an embodiment of the present invention.

FIG. 56 illustrates connectivity of upstream spectral routers 2830 connecting 4 input WDM links 2810 (χ=4) to W output WDM links (W=4). The output WDM links 2820 are divided into three WDM links connecting to switches 3260 of a first matrix 3200 of switches and one WDM link connecting to a switch 3360 of a second matrix 3300 of switches 3360 ($\Omega_1=3$ and $\Omega_2=1$). Each upstream spectral router 2830 has $\Omega_1$ WDM links to $\Omega_1$ switches 3260 of different columns of matrix 3200. Each downstream spectral router 2950 has $\Omega_1$ WDM links from $\Omega_1$ switches 3260 of a same column of matrix 3200. FIG. 56 illustrates a network configuration where each switch 3260 in a row of matrix 3200 has a WDM link from only one upstream spectral router. This corresponds to a case where the number χ of wavelength channels in an output link 2820 of an upstream spectral router equals the number m of inlet ports of a switch 3260. In a case where m=2×χ, for example, each switch 3260 may connect to two output WDM links 2820.

Figure 57:
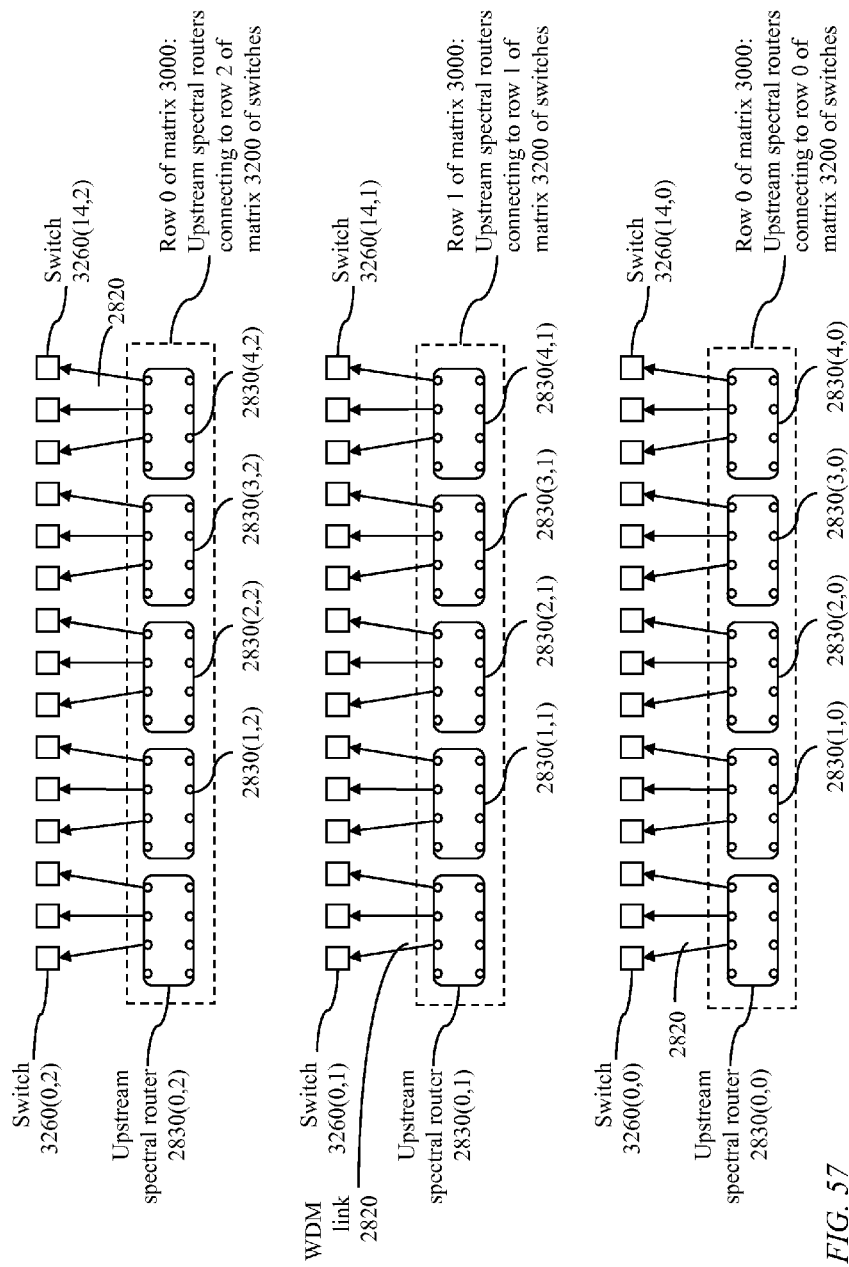
FIG. 57 illustrates connectivity of upstream spectral routers to switches of multiple rows of the first matrix in the network of FIG. 56, in accordance with an embodiment of the present invention.

FIG. 57 illustrates connectivity of upstream spectral routers 2830 of matrix 3000 to switches 3260 of three rows of the first matrix 3200 of switches 3260 in the network of FIG. 56 with each row of upstream spectral routers 2830 of matrix 3000 connecting to switches 3260 of different columns of matrix 3200.

Figure 58:
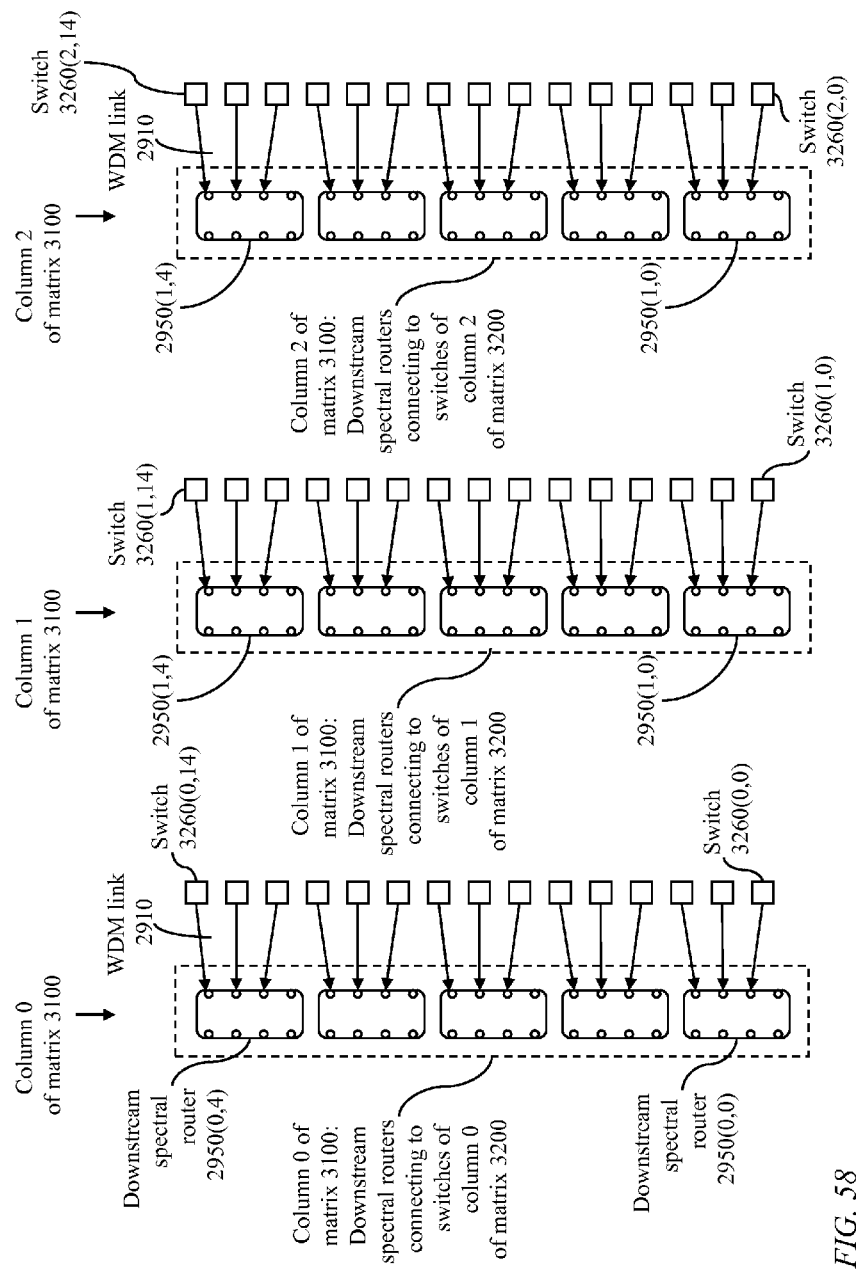
FIG. 58 illustrates connectivity of switches of multiple columns to respective downstream spectral routers, in accordance with an embodiment of the present invention.

FIG. 58 illustrates connectivity of switches 3260 of three columns of the first matrix 3200 of switches 3260 to downstream spectral routers 2950 in the network of FIG. 56 with switches of each column of matrix 3200 connecting to downstream spectral routers 2950 of a respective column of matrix 3100.

Figure 59:
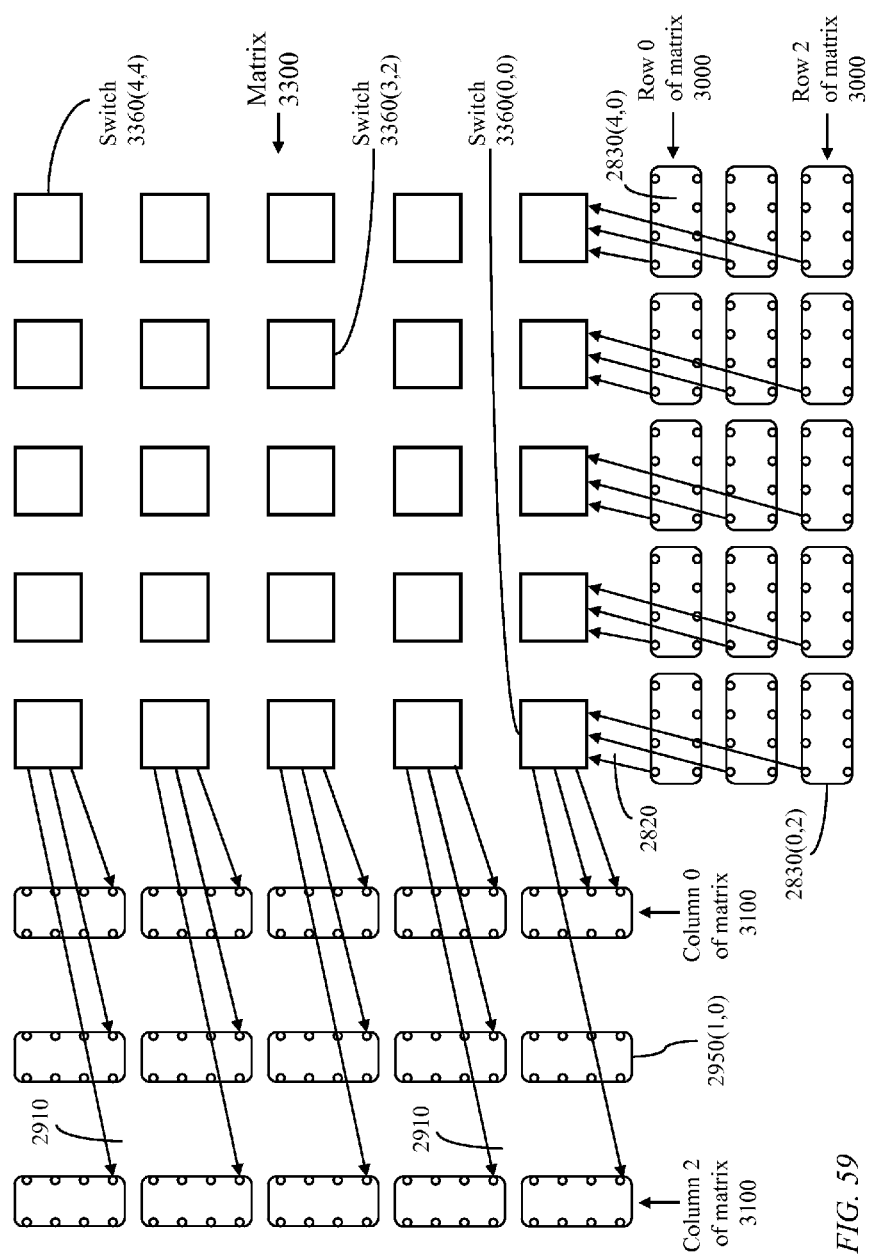
FIG. 59 illustrates connectivity of upstream spectral routers to switches of a row of a second matrix of switches, and connectivity of switches of one column of the second matrix of switches to downstream spectral routers, in accordance with an embodiment of the present invention.

FIG. 59 illustrates connectivity of the upstream spectral routers 2830 of FIG. 28 to switches 3360 of one row ($\chi_2=1$) of switches 3360 of matrix 3360, and connectivity of switches 3360 of one column ($\chi_2=1$) of switches 3360 of matrix 3360 to downstream spectral routers 2950 of matrix 3100. In this example, $\Omega_1=3$, $\Omega_2=1$, and χ=m. Since $\Omega_1 \times m = \Omega_2 \times n$, then n=3×m=3×χ and each n×n switch 3360 may connect to three output WDM links 2820 from different upstream spectral routers.

In summary, the m inlet ports of an upstream spectral router 2830 connect to m edge nodes as in the network configuration employing one matrix of switches. The W outlet ports of an upstream spectral router 2830 would be divided into a first group of $\Omega_1$ outlet ports connecting to switches of matrix 3200 and a second group of $\Omega_2$ outlet ports connecting to switches of the matrix 3300 of electronic switches ($\Omega_1+\Omega_2=W$). An upstream link from an edge node carries multiple upstream wavelength channels individually connecting to switches 3260 of matrix 3200 and switches 3360 of matrix 3300 through Λ upstream spectral routers. An edge node 120 connects to $\Omega_1 \times \Lambda$ switches 3260 of matrix 3200 and $\Omega_2 \times \Lambda$ switches 3360 of matrix 3300 and is time-locked to a time indicator of each switch 3260 or 3360 to which the edge node connects.

With each switch 3260 of matrix 3200 having m inlets and m outlets, each switch 3360 of matrix 3300 having n inlets and n outlets, n>1, m>1, $\Omega_1$>1, $\Omega_2$>1, the values of m, n, $\Omega_1$, and $\Omega_2$ are selected so that $m \times \Omega_1 = n \times \Omega_2$. The number of edge nodes of the network is limited to $\Lambda \times \Omega_1 \times m = \Lambda \times \Omega_2 \times n$.

Matrix 3200 has $\Lambda \times \Omega_1$ columns of switches 3260 and $\Lambda \times \Omega_1$ rows of switches 3260, to a total of $(\Lambda^2 \times \Omega_1^2)$ switches 3260. Matrix 3300 has $\Lambda \times \Omega_2$ columns of switches 3360 and $\Lambda \times \Omega_2$ rows of switches 3360, to a total of $(\Lambda^2 \times \Omega_2^2)$ switches 3360.

Without loss of generality, $\Omega_1$ may be selected to be greater than or equal to $\Omega_2$. With each upstream spectral router 2830 connecting to switches 3260 and 3360 of the two matrices of switches, matrix 3000 of upstream spectral routers would have $\Lambda$ columns and $\Lambda \times \Omega_1$ rows. The total number of output WDM links 2820 of the upstream spectral routers 2830 of matrix 3000 is $\Lambda^2 \times \Omega_1 \times (\Omega_1 + \Omega_2)$ of which $(\Lambda^2 \times \Omega_1^2)$ WDM links connect to switches 3260 and $(\Lambda^2 \times \Omega_1 \times \Omega_2)$ WDM links connect to switches 3360. A switch 3260 of matrix 3200 would then have a WDM link from one upstream spectral router 2830 while a switch 3360 of matrix 3300 may have WDM links from three upstream spectral routers 2830.

Likewise, with each downstream spectral router 2950 connecting to switches 3260 and 3360 of the two matrices of switches, matrix 3100 of downstream spectral routers would have $\Lambda$ rows and $\Lambda \times \Omega_1$ columns. The total number of input WDM links 2910 of the downstream spectral routers 2950 of matrix 3100 is $\Lambda^2 \times \Omega_1 \times (\Omega_1 + \Omega_2)$ of which $(\Lambda^2 \times \Omega_1^2)$ WDM links emanate from switches 3260 and $(\Lambda^2 \times \Omega_1 \times \Omega_2)$ WDM links emanate from switches 3360. A switch 3260 of matrix 3200 would then have a WDM link to one downstream spectral router 2950 while a switch 3360 of matrix 3300 may have WDM links to three downstream spectral routers 2950.

Orthogonal Upstream Connectivity to Spectral Routers

Selecting $\Lambda$ as a prime number, with the edge nodes indexed sequentially between 0 and $(\Lambda \times \Omega_1 \times m - 1)$, indices of mutually orthogonal sets of edge nodes connecting to the upstream spectral routers 3260 of matrix 3200, the sets of edge nodes having an orthogonal connectivity $\lceil n/\Lambda \rceil$ where $\lceil \alpha \rceil$ is the nearest integer higher than or equal to a real number "$\alpha$", may be determined as:

$$S \times \lfloor r/\Lambda \rfloor + \{j \times (1 + m \times c) + m \times (\rho + c)\}_{modulo\ S}, 0 \leq j < m,$$

where c and r identify an upstream spectral router in column c, $0 \leq c < \Lambda$, and row r, $0 \leq r < (\Lambda \times \Omega_1)$, where $S = \Lambda \times m$, and $\rho = r_{modulo\ \Lambda}$.

An upstream spectral router 2830 may connect to switches of any row in matrix 3200 or matrix 3300. For example, upstream spectral routers 2830 of a same row of matrix 3000 may connect to switches 3260 of a same row of matrix 3200. Preferably, switches of a same column of matrix 3200 connect to downstream spectral routers 2950 of a same column of matrix 3100 to simplify addressing and routing.

With $\Omega1 > \Omega2$, the number of rows of matrix 3300 would be less than the number of rows of matrix 3000, a switch 3360 may connect to WDM links from more than one upstream spectral router 2830. If $\Omega_1$ is an integer multiple of $\Omega_2$, hence n is an integer multiple of m since $m \times \Omega_1 = n \times \Omega_2$, then upstream spectral routers of (n/m) rows of matrix 3000 may connect to switches of a same row of matrix 3300. Likewise, downstream spectral routers 2950 of (n/m) columns of matrix 3100 may connect to WDM links from a same column of matrix 3300 of switches 3360. For example, upstream spectral routers 2830 of a row of index r of matrix 3000, $0 \leq r < (\Lambda \times \Omega_1)$, may connect to switches 3360 of a row of index $\lfloor r \times m/n \rfloor = \lfloor r \times \Omega_2/\Omega_1 \rfloor$ of matrix 3300 of switches 3360 and downstream spectral routers 2950 of a column of index c of matrix 3100, $0 \leq c < (\Lambda \times \Omega_1)$, may connect to switches of a column of index $\lfloor c \times m/n \rfloor$ of said matrix 3300 of switches 3360, where $\lfloor \alpha \rfloor$ is the nearest integer lower than or equal to a real number "$\alpha$". For example, for $\Lambda$=19, W=32, $\Omega_1$=28, $\Omega_2$=4, m=$\chi$=W=64, n=448, the number of rows of matrix 3000 is $\Lambda \times \Omega 1$=532. The number of rows or columns of matrix 3200 is 532 and the number of rows or columns of matrix 3300 is 76. For rows of indices $0 \leq r < 7$ of the matrix 3000 of upstream spectral routers 2830, $\lfloor r \times m/n \rfloor$=0. For rows $7 \leq r < 14$ of matrix 3000 $\lfloor r \times m/n \rfloor$=1. For rows $0 \leq r < 532$ of matrix 3000 $\lfloor r \times m/n \rfloor$=75. Thus, upstream spectral routers of rows 0 to 6 of matrix 3000 connect to row 0 of matrix 3300, upstream spectral routers of rows 6 to 13 of matrix 3000 connect to row 1 of matrix 3300, and upstream spectral routers of rows 525 to 531 of matrix 3000 connect to row 75 of matrix 3300.

Likewise, switches 3360 of column 0 of matrix 3300 connect to downstream spectral routers 2950 of columns 0 to 6 of matrix 3100, switches 3360 of column 1 of matrix 3300 connect to downstream spectral routers 2950 of columns 7 to 13 of matrix 3100, and switches 3360 of column 75 of matrix 3300 connect to downstream spectral routers 2950 of columns 525 to 531 of matrix 3100.

As described earlier (FIG. 25 and FIG. 26), each switch 3260 of matrix 3200 comprises a switch fabric preceded by a spectral demultiplexer connected to a WDM link from an upstream spectral router and succeeded by a spectral multiplexer connected to a WDM link to a downstream spectral router 2950.

Alternate Network Configuration

In the configurations of FIG. 36, FIG. 45, and FIG. 51, each upstream spectral router 2830 has upstream WDM links 2820 to a respective set of W switches 3260 of W different columns of matrix 3200, W>1. Additionally, the WDM links 2820 of upstream spectral routers 2830 of a same column of matrix 3000 connect to switches 3260 of a respective set of W columns of matrix 3200. For example, if upstream spectral router 2830(0, 0) of column 0 and row 0 of matrix 3000 connects to switches 3260 of a specific set of W columns, such as columns 0 to (W−1), of matrix 3200, then all upstream spectral routers 2830(0, 1), 2830(0, 2), ..., 2830(0, $\Lambda \times$W−1) connect to the same switches 3260 of the same specific set of W columns of matrix 3200. This condition ensures that each edge node 120 has an upstream wavelength channel to one switch 3260 in each column of matrix 3200. To provide a simple path from any edge node 120 to any other edge node 120 traversing only one switch 3260, switches 3260 of a same column of matrix 3200 connect to WDM links 2910 directed to downstream spectral routers 2950 of a respective one column of matrix 3100. Preferably, all sets of edge nodes connecting to the upstream spectral routers 2830 are mutually orthogonal to induce data traffic-load balancing.

In an alternate configuration, each downstream spectral router 2950 connects, at input, to WDM links 2910 from a respective set of W switches 3260 of W different rows of matrix 3200. Additionally, the input WDM links 2910 to downstream spectral routers 2950 of a same row of matrix 3100 connect to switches 3260 of a respective set of W rows of matrix 3200. For example, if downstream spectral router 2950 (0, 0) of column 0 and row 0 of matrix 3100 connects to switches 3260 of a specific set of W rows, such as rows 0 to (W−1), of matrix 3200, then all downstream spectral router 2950(1, 0), 2950(2, 0), . . . , 2950(Λ×W−1, 0) connect to the same switches 3260 of the same specific set of W rows of matrix 3200. This condition ensures that each edge node 120 has a downstream wavelength channel from one switch 3260 in each row of matrix 3200. To provide a simple path from any edge node 120 to any other edge node 120 traversing only one switch 3260, upstream spectral routers 2830 of a same row of matrix 3000 have upstream WDM links 2820 to switches 3260 of a same row of matrix 3200.

In the alternate configuration, each upstream spectral router 2830 has a WDM link to a respective set of switches 3260 of a respective row of the matrix 3200 of switches. Each edge node has a WDM link to each upstream spectral router 2830 of a same row of matrix 3000. Thus, upstream spectral routers 2830 of a same row of the matrix 3000 connect to a same set of edge nodes. Preferably, all sets of edge nodes connecting to the downstream spectral routers 2950 are mutually orthogonal to induce data traffic-load balancing. The edge nodes may be assigned to the downstream spectral routers so that all sets of edge nodes connecting to downstream spectral routers 2950 of a same column of the matrix 3100 are also mutually disjoint.

Scalability

The network of FIGS. 36 to 38, or 45 to 47, scales to capacities significantly higher than the capacities of current networks while providing high performance. An edge node 120 implemented as a single-rotator circulating switch, described below with reference to FIGS. 64 to 72, scales gracefully to a large dimension, for example 8192×8192, at a data rate of at least 10 Gb/s (Gigabits/second) per port. The input ports of an edge node includes ingress ports receiving data from data sources and inbound ports receiving data from switches through a downstream spectral router 2950. The output ports of an edge node includes egress ports transmitting data to data sinks and outbound ports transmitting data to switches through an upstream spectral router 2830. Using edge nodes each having 512 ingress/egress ports and 1024 inbound/outbound ports, and switches 3260 of a dimension of 64×64 each, yields a network having 512×1024×64 access ports (ingress/egress ports). With a port capacity of 10 Gb/s, the total access capacity would be approximately 335 petabits/second (335×10$^{15}$ bits/second).

Exemplary Edge-Node Structure

Figure 60:
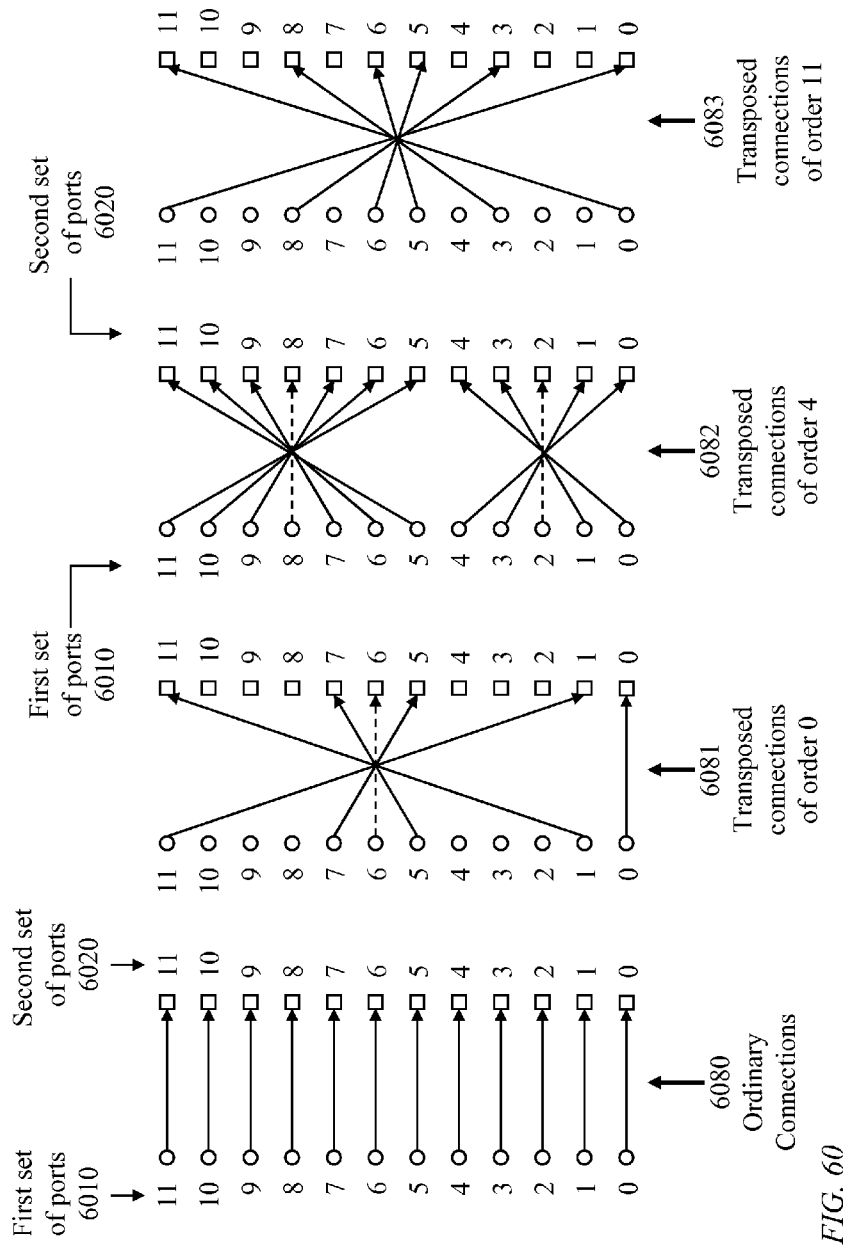
FIG. 60 illustrates ordinary and transposed connections used in switch configurations in accordance with an embodiment of the present invention.

FIG. 60 illustrates ordinary and transposed connections of a first set of ports 6010 having a number N>2 of ports and a second set of ports 6020 having N ports; N equals 12 in the exemplary case of FIG. 60. The N ports of the first set are indexed as 0, 1, . . . , (N−1), and the N ports of the second set are likewise indexed as 0, 1, . . . , (N−1). Thus, the ports of the first set are individually identified as {6010(0), 6010(1), . . . , (6010(N−1)} and the ports of the second set are individually identified as {6010(0), 6010(1), . . . , (6010(N−1)}. The ports of the first set have one-to-one static connections to the ports of the second set. The first set of ports is said to have ordinary connections to the second set of ports if each port 6010(j) is connected to a likewise indexed port 6020(j), 0≤j<N. The first set of ports is said to have transposed connections of order L to the second set of ports if each port 6010(j) is connected to a port 6020|L−j|, 0≤j<N, 0≤L<N, where |X| denotes $X_{modulo\ N}$, i.e., |X|=X, if X≥0, and X=(N−X), if X<0. Thus, |−j|=L−j, if L≥j, and |L−j|=(N−L+j), if L<j.

Four connection patterns are illustrated in FIG. 60. In a first pattern, the first set of ports 6010 has ordinary connections 6080 to the second set of ports 6020. In a second pattern, the first set of ports 6010 has transposed connections 6081 of order 0 to the second set of ports 6020. In a third pattern, the first set of ports 6010 has transposed connections 6082 of order 4 to the second set of ports 6020. In a fourth pattern, the first set of ports 6010 has transposed connections 6083 of order (N−1) to the second set of ports 6020.

Single-Rotator Circulating Switch

Figure 61:
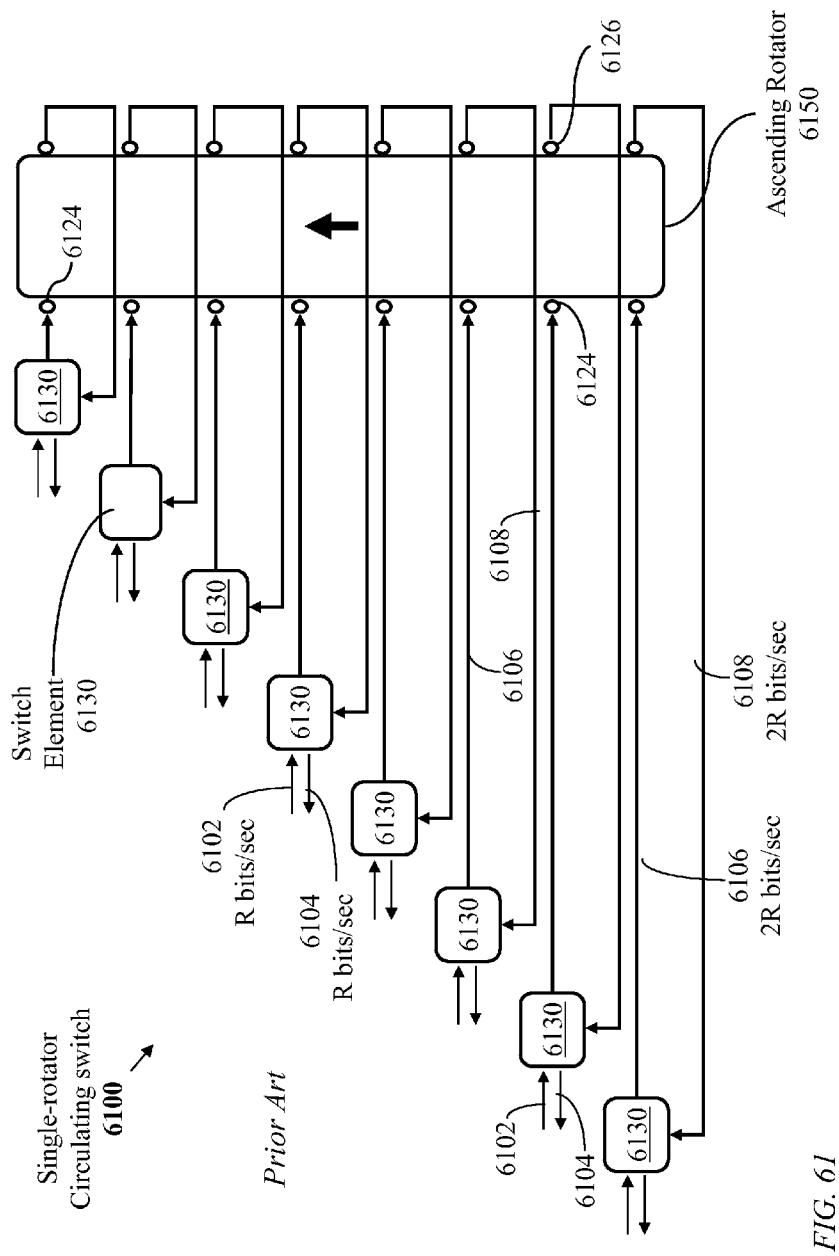
FIG. 61 illustrates a prior art single-rotator circulating switch which requires reordering of switched data segments of a data stream.

FIG. 61 illustrates an exemplary single-rotator circulating switch 6100 disclosed in U.S. Pat. No. 7,567,556. Circulating switch 6100 comprises eight switch elements 6130 and a single rotator 6150 having eight inlets 6124 and eight outlets 6126. Each switch element 6130 receives data from data sources (not illustrated) through an ingress channel 6102 and transmits data to data sinks (not illustrated) through an egress channel 6104. Each switch element connects to a respective inlet 6124 of rotator 6150 through an output channel 6106 and connects to a respective outlet 6126 of rotator 6150 through an input channel 6108. Each ingress channel 6102 has a capacity R bits per second, each egress channel 6104 has a capacity R, each output channel 6106 has a capacity of 2R and each input channel 6108 has a capacity of 2R. A typical value of R is 10 gigabits per second (Gb/s).

Switch elements 6130 are individually identified by indices 0, 1, . . . , (N−1), where N=8 in the exemplary circulating switch 6100. An inlet 6124 connecting to a switch element of index j, 0≤j<N is further identified by the index j as 6124(j) and an outlet 6126 connecting to a switch element of index j is further identified by the index j as 6126(j). Thus the inlets 6124 are referenced as 6124(0) to 6124(N−1) and the outlets 6126 are referenced as 6126(0) to 6126(N−1). For brevity, a switch element 6130 of index j may be referenced as switch element j, an inlet 6124 of index j may be referenced as inlet j, and an outlet 6126 of index j may be referenced as outlet j.

Rotator 6150 may be an ascending rotator or a descending rotator. An ascending rotator 6150 connects an inlet j to an outlet $\{j+t\}_{modulo\ N}$ during time slot t of a repetitive time frame organized into N time slots. A descending rotator 6150 connects an inlet j to an outlet $\{j-t\}_{modulo\ N}$ during time slot t.

During time slot t, a switch element of index j may transfer data to a switch element $\chi=\{j+t\}_{modulo\ N}$ through an ascending rotator 6150. Thus, $t=\{\chi-j\}_{modulo\ N}$. If the transferred data is destined to a switch element k, k≠χ, the data is held in switch element χ until inlet χ connects to outlet k. Thus, a data unit written in switch element χ during time slot t is transferred to switch element k during a time slot τ where $\tau=\{k-\chi\}_{modulo\ N}$, and the delay D in transit switch element χ is determined as $D=\tau-t=(k+j-2\Omega)_{modulo\ N}$. Thus, data transferred from switch element j to switch element k may be held in a transit switch element χ for a period of time determined by j, k, and χ. A transit switch element 6130(χ) may be any switch element 6130 other than the originating switch element 6130(j) and the destination switch element 6130(k). Data units of a data stream from switch element j to switch element k may use more than one transit switch element χ and because of the dependency of the delay D on the transit switch elements, the data units may not be received at switch element k in the order in which the data units were sent from switch element j. Thus, data reordering at a receiving switch element 6130 is needed as described in the aforementioned U.S. Pat. No. 7,567,556.

Figure 62:
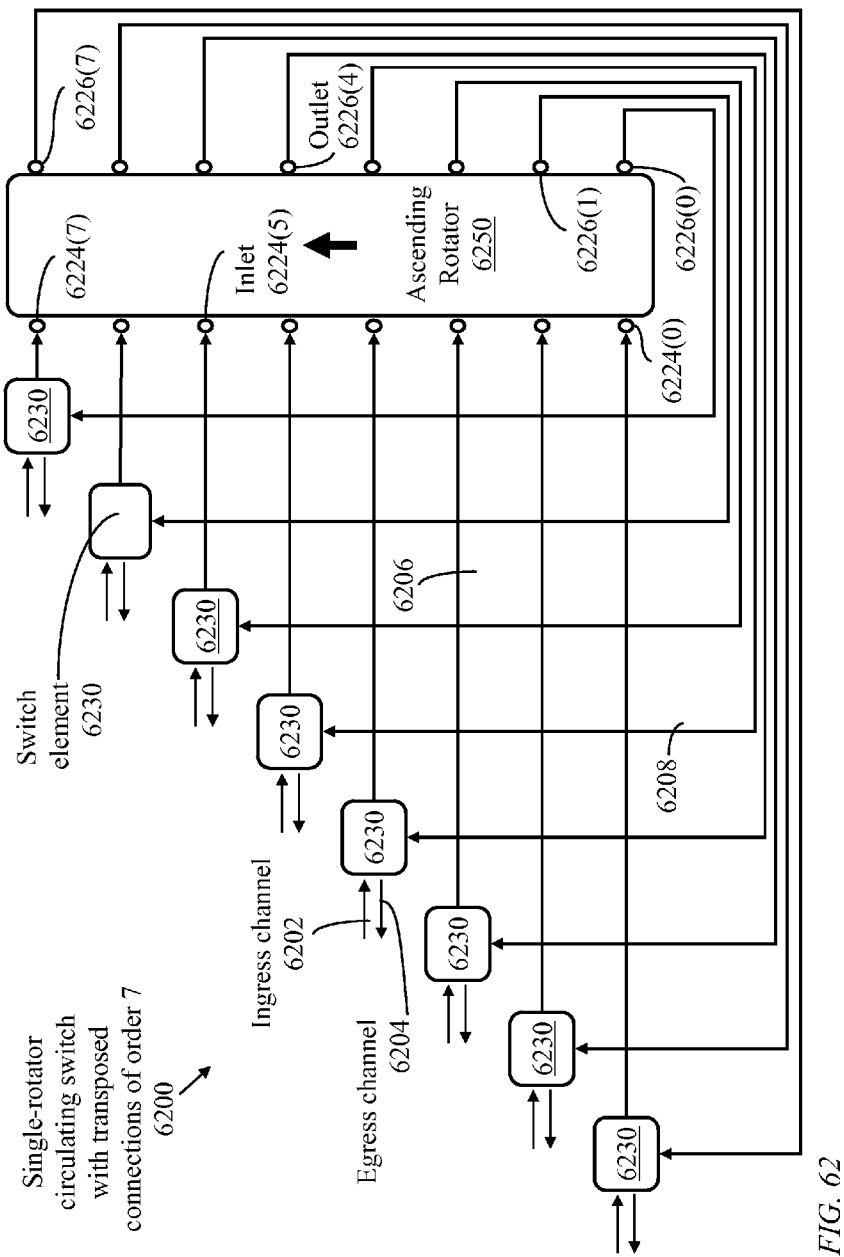
FIG. 62 illustrates a first configuration of a single-rotator circulating switch employing transposed connections for preserving sequential order of data segments of each data stream in accordance with an embodiment of the present invention.

FIG. 62 illustrates a first configuration of a single-rotator circulating switch 6200 employing transposed connections in order to preserve sequential order of data segments of each data stream. Circulating switch 6200 comprises eight switch elements 6230 and a single rotator 6250 having eight inlets 6224 and eight outlets 6226. Each switch element 6230 receives data from data sources (not illustrated) through an ingress channel 6202 and transmits data to data sinks (not illustrated) through an egress channel 6204. Each switch element 6230 connects to a respective inlet 6224 of rotator 6150 through an output channel 6206 and connects to a respective outlet 6226 of rotator 6250 through an input channel 6208. Each ingress channel 6202 has a capacity R, each egress channel 6204 has a capacity R, each output channel 6206 has a capacity of 2R and each input channel 6208 has a capacity of 2R.

Switch elements 6230 are individually identified by indices 0, 1, . . . , (N−1), where N=8 in the exemplary circulating switch 6200. An inlet 6224 connecting to a switch element of index j, 0≤j<N is further identified by the index j as 6224(j) and an outlet 6226 connecting to a switch element of index j is further identified by the index j as 6226(j). Thus the inlets 6224 are referenced as 6224(0) to 6224(N−1) and the outlets 6226 are referenced as 6226(0) to 6226(N−1).

Switch elements 6230 have ordinary connections to inlets 6224 where a switch element 6230(j) connects to inlet 6224(j), 0≤j<N. However, outlets 6226 have transposed connections to switch elements 6230 where an outlet 6226(j) connects to switch element 6230 of index $(L-j)_{modulo\ N}$, 0≤j<N, where L=7 in the exemplary circulating-switch configuration 6200. The use of the transposed connections ensures proper sequential order of data segments of each data stream, where a data stream is defined according to an originating switch element 6230 and a terminating switch element 6230.

Figure 63:
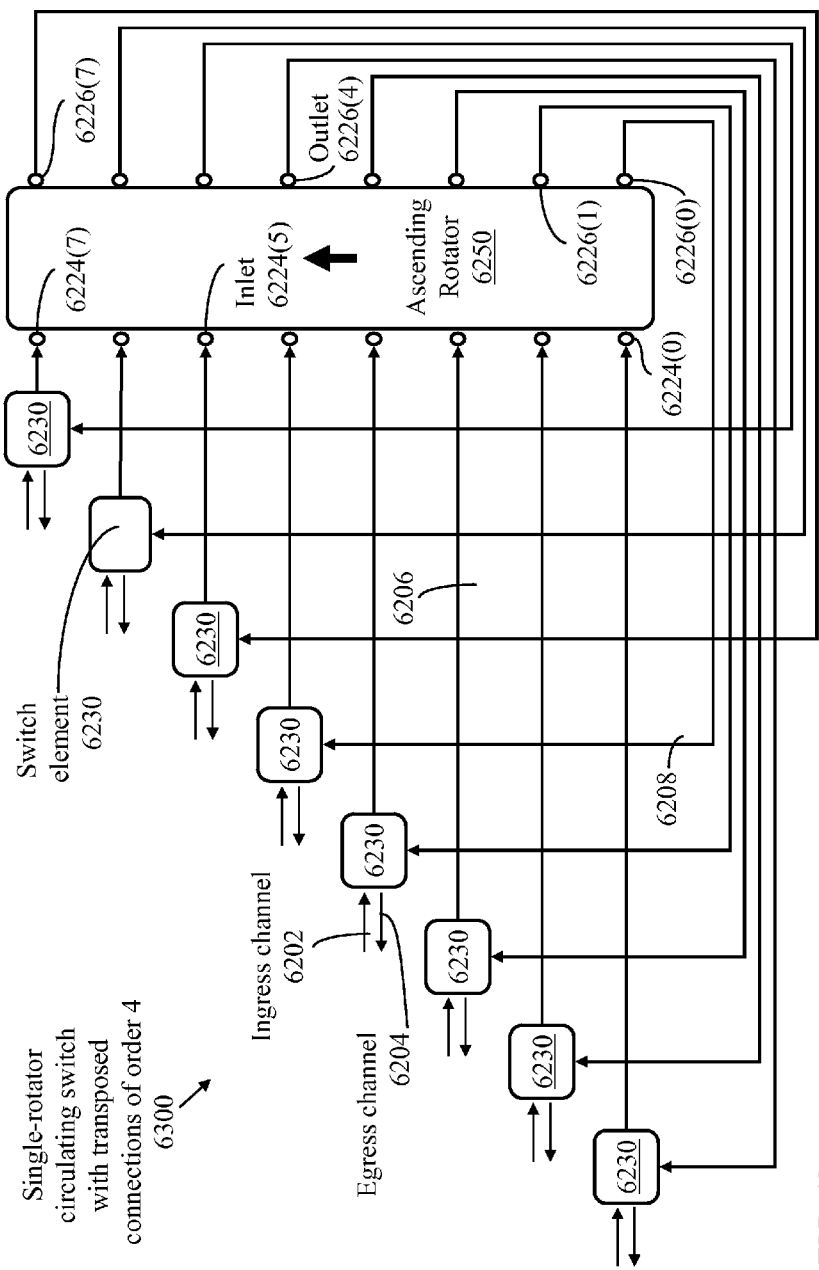
FIG. 63 illustrates a second configuration of a single-rotator circulating switch employing transposed connections for preserving sequential order of data segments of each data stream in accordance with an embodiment of the present invention.

FIG. 63 illustrates a configuration of a single-rotator circulating switch 6300 in which switch elements 6230 have transposed connections to inlets 6224 where a switch element 6230(j) connects to inlet 6224 of index $(L-j)_{modulo\ N}$, 0≤j<N, L=7. However, outlets 6226 have ordinary connections to switch elements 6230 where an outlet 6226(j) connects to switch element 6230(j), 0≤j<N. The use of the transposed connections ensures proper sequential order of data segments of each data stream.

Figure 64:
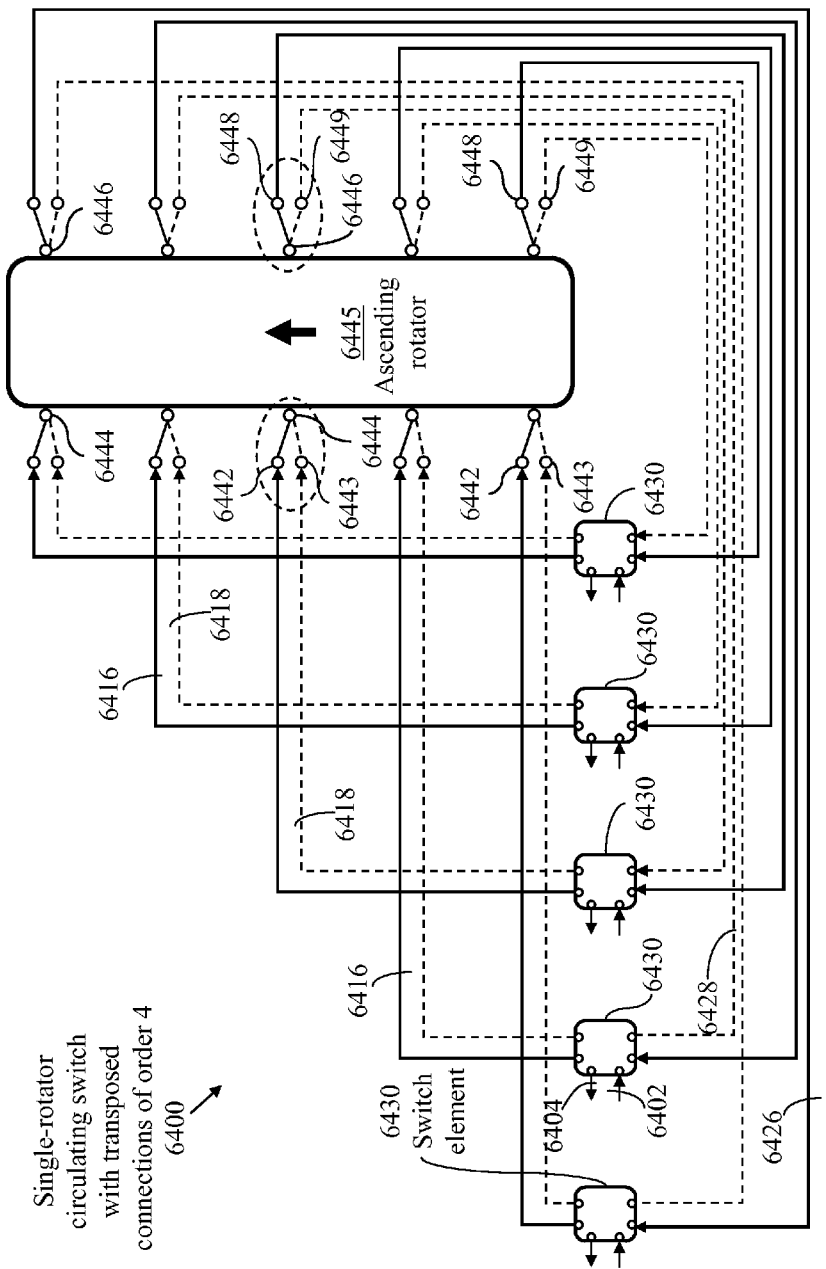
FIG. 64 illustrates a configuration of a uniphase single-rotator circulating switch employing transposed connections for preserving sequential order of data segments of each data stream, where switch elements connect to a single rotator through inlet selectors and outlet selectors, for use as an edge node in any of the networks of FIG. 1, FIG. 3, FIG. 5, FIG. 7, FIG. 12 and FIG. 13, in accordance with an embodiment of the present invention.

FIG. 64 illustrates an exemplary single-rotator circulating switch 6400 which comprises five switch elements 6430 and a single rotator 6445 having five inlets 6444 and five outlets 6446. Each switch element 6430 receives data from data sources (not illustrated) through an external input channel 6402 and transmits data to data sinks (not illustrated) through an external output channel 6404. Each switch element connects to a respective inlet 6444 of rotator 6445 through two internal output channels 6416 and 6418, and connects to a respective outlet 6446 through two internal input channels 6426 and 6428. Each of external input channels 6402, external output channels 6404, internal output channels 6416, 6418, and internal input channels 6426, 6428 has the same capacity of R bits/second (for example R=10 Gb/s). Each switch element 6430 has an external input port for receiving data through external channel 6402, an external output port for transmitting data through external channel 6404, two internal output ports for transmitting data through internal output channels 6416 and 6418, and two internal input ports for receiving data through internal input channels 6426 and 6428. Each port of a switch element may include a short buffer sufficient to hold one data unit (data segment).

An inlet selector 6435 is provided at each inlet 6444 and an output selector 6455 is provided at each outlet 6446. An inlet selector 6435 has two inlet ports 6442 and 6443 alternately connecting one of two channels 6416 and 6418 originating from a respective switch element 6430 to an inlet 6444. An outlet selector 6455 has two outlet ports 6448 and 6449 alternately connecting an outlet 6446 to one of two channels 6426 and 6428 terminating on a respective switch element 6430.

Switch elements 6430 are individually identified by indices 0, 1, . . . , (N−1), where N=8 in the exemplary circulating switch 6400. In general, the number N of switch elements exceeds 2 and may have an upper bound dictated by transit delay. A practical upper bound of N would be of the order of 2000. An inlet 6444 connecting to a switch element of index j, 0≤j<N is identified by the index j as 6444(j) and an outlet 6446 connecting to a switch element of index j is identified by the index j as 6446(j).

The switch elements 6430 have ordinary connections to the inlets 6444 so that a switch element 6430(j) connects to a selector 6435 of inlet 6444(j). The outlets 6446 have transposed connections to the switch elements 6430 so that a selector 6455 of outlet $(L-j)_{modulo\ N}$ connects to switch element 6430(j). In the exemplary configuration of FIG. 64, 0≤j<N, 0≤j<N, and L=7. For brevity, hereinafter, a switch element 6430 of index j may be referenced as switch element j, an inlet 6444 of index j may be referenced as inlet j, and an outlet 6446 of index j may be referenced as outlet j.

Using an ascending rotator 6445, inlet j connects to outlet χ, where $\chi = \{j+t\}_{modulo\ N}$ during time slot t. Thus, $t=\{\chi-j\}_{modulo\ N}$. Outlet χ connects to switch element (L−χ). During time slot t, switch element j may transfer data to a switch element (L−χ). If the transferred data is destined to a switch element k, k≠χ, the data is held in switch element (L−χ) until inlet (L−χ) connects to outlet (L−k), noting that outlet (L−k) connects to switch element k. Thus, a data unit written in switch element (L−χ) during time slot t is transferred to outlet (L−k) during a time slot τ where $\tau=\{\chi-k\}_{modulo\ N}$. The delay D in transit switch element χ is determined as $D=\tau-t=(j-k)_{modulo\ N}$. Thus, data transferred from switch element j to outlet k may be held in a transit switch element (N−χ) for a period of time D which is independent of χ and determined only by j and k.

Data units of a data stream from switch element j to switch element k may use more than one transit switch element χ and because of the independence of the transit delay D of the transit switch element χ used, data units from switch element j are received at switch element k in the order in which the data units were sent from switch element j.

Notably, in the configuration of FIG. 64, switch element j connects to both inlet ports 6442 and 6443 of an inlet selector 6435 of inlet j and switch element j connects to both outlet ports 6448 and 6449 of an outlet selector 6455 of outlet (N−j). A data stream from switch element j to switch element k, 0≤j<N, 0≤k<N, k≠j, may be routed through either of two simple paths. A first simple path traverses a channel 6416 to inlet j and a channel 6426 from outlet (L−k) to switch element k. A second simple path traverses a channel 6418 to inlet j and a channel 6428 from outlet (L−k) to switch element k. The two simple connections take place during time slot $t=\{L-j-k\}_{modulo\ N}$. The data stream from switch element j to a switch element k may also be routed through either of two sets of compound paths. A path in the first set traverses a channel 6416 from switch element j to inlet j, a channel 6426 from an outlet χ, 0≤χ<N, χ≠j, to switch element (L−χ), a channel 6416 from switch element (L−χ) to inlet (L−χ), and a channel 6426 from outlet (L−k) to switch element k. A path in the second set traverses a channel 6418 from switch element j to inlet j, a channel 6428 from outlet χ to switch element (L−χ), a channel 6418 from switch element (L−χ) to inlet (L−χ), and a channel 6428 from outlet (L−k) to switch element k. The transit delay D is determined as D={j−k}$_{modulo\ N}$ for either of the two paths and the configuration 6400 provides uniphase paths for a pair of originating and destination switch elements 6430.

Figure 65:
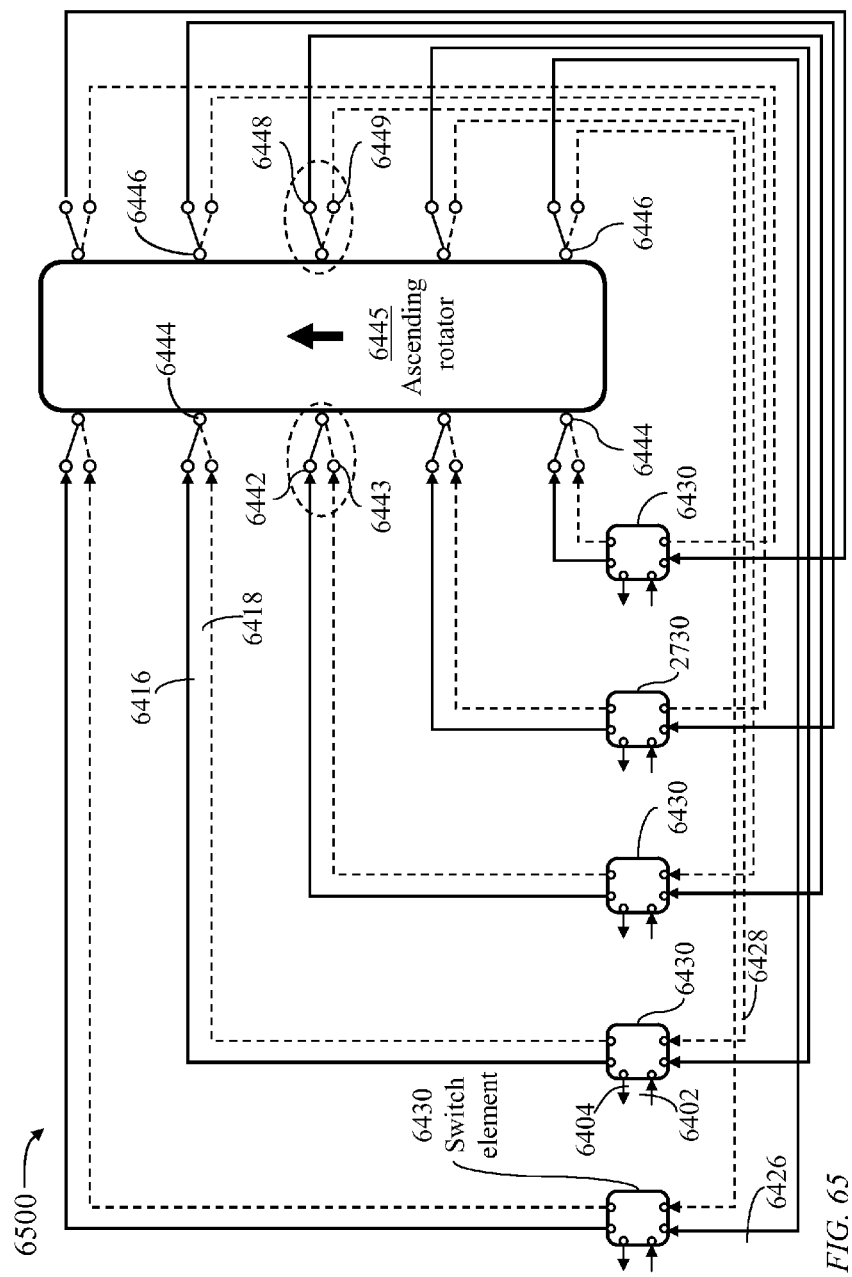
FIG. 65 illustrates an alternate configuration of the uniphase single-rotator circulating switch of FIG. 64, in accordance with an embodiment of the present invention.

FIG. 65 illustrates an alternate configuration of the uniphase single-rotator circulating switch of FIG. 64 where the switch elements 6430 have transposed connections to the inlets 6444 so that a switch element 6430(j) connects to a selector 6435 of inlet 6444 of index (L−j)$_{modulo\ N}$. In the exemplary configuration of FIG. 65, 0≤j<N, 0≤L<N, and L=7. The outlets 6446 have ordinary connections to the switch elements 6430 so that a selector 6455 of outlet (j) connects to switch element 6430(j).

Figure 66:
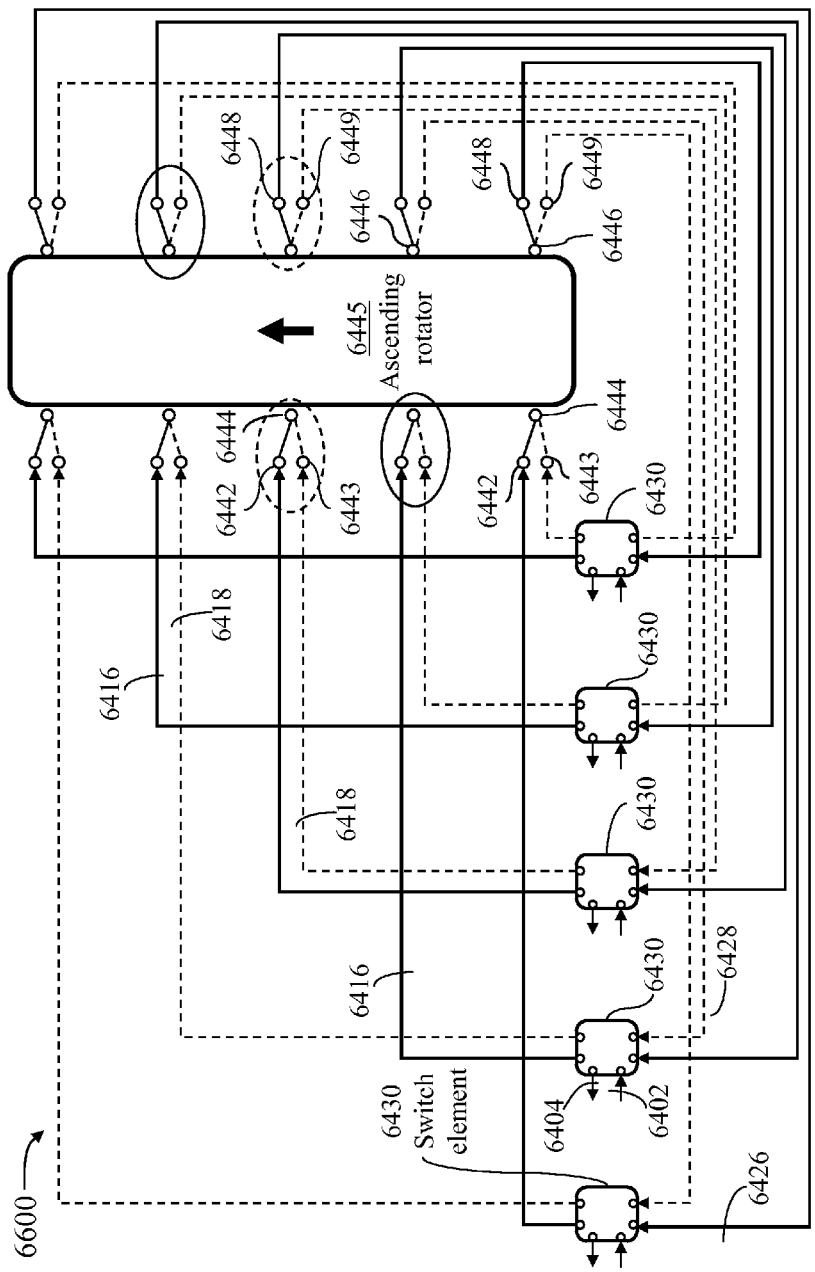
FIG. 66 illustrates a two-phase single-rotator circulating switch derived from the uniphase single-rotator circulating switch of FIG. 64 by rearranging switch-element connectivity to the inlet selectors and outlet selectors, in accordance with an embodiment of the present invention.

FIG. 66 illustrates a configuration 6600 in which the switch elements 6430 have ordinary connections to inlet ports 6442 of inlet selectors 6435 and transposed connections to inlet ports 6443 of inlet selectors 6435. Outlet ports 6448 of outlet selectors 6455 have transposed connections to the switch elements 6430 and outlet ports 6449 of outlet selectors 6455 have ordinary connections to the switch elements 6430. Thus, a switch element 6430(j) connects to inlet port 6442 of an inlet selector 6435 of inlet 6444(j) through a channel 6416 and inlet port 6423 of inlet selector 6435 of inlet 6444|L−j|, where |L−j| denotes (L−j)$_{modulo\ N}$, through a channel 6418, 0≤j<N, L=7. Outlet port 6448 of an outlet selector 6455 of outlet 6446(j) connects to switch element 6430|L−j| through a channel 6426 and outlet port 6449 of an outlet selector of outlet 6446(j) connects to switch element 1830(j) through a channel 6428.

A data stream from switch element j to switch element k, 0≤j<N, 0≤k<N, k≠j, may be routed through either of two simple paths. A first simple path traverses a channel 6416 to inlet j and a channel 6426 from outlet (L−k) to switch element k. A second simple path traverses a channel 6418 to inlet (L−j) and a channel 6428 from outlet k to switch element k. The first simple connection takes place during time slot t={L−j−k}$_{modulo\ N}$ and the second simple connections takes place during time slot t={j+k−L}$_{modulo\ N}$. The data stream from switch element j to a switch element k may also be routed through either of two sets of compound paths. A path in the first set traverses a channel 6416 from switch element j to inlet j, a channel 6426 from an outlet x, 0≤χ<N, χ≠j, to switch element (L−χ), a channel 6416 from switch element (L−χ) to inlet (L−χ), and a channel 6426 from outlet (L−k) to switch element k. A path in the second set traverses a channel 6418 from switch element j to inlet (L−j), a channel from an outlet χ to switch element (L−χ), a channel 6418 from switch element (L−χ) to inlet x, and a channel 6428 from outlet (L−k) to switch element k. The transit delay is D={j−k}$_{modulo\ N}$ for the first path and D={k−j}$_{modulo\ N}$ for the second phase. Thus configuration 6600 provides two-phase paths for each pair of originating and destination switch elements 6430 and a controller of the originating switch element 6430 may select a path of lower transit delay. The first set of path is preferred if {j−k}$_{modulo\ N}$ is less than ⌊(N+1)/2⌋, where ⌊y⌋ denotes the integer part of any real number y; otherwise the second set of paths is preferred. For example, with j=6 and k=0, any compound path in the first set of paths has a transit delay D$_1$={6−0}$_{modulo\ 8}$=6 time slots and any compound path in the second set of paths has a transit delay D$_1$={0−6}$_{modulo\ 8}$=2 time slots; the second path may be selected.

Figure 67:
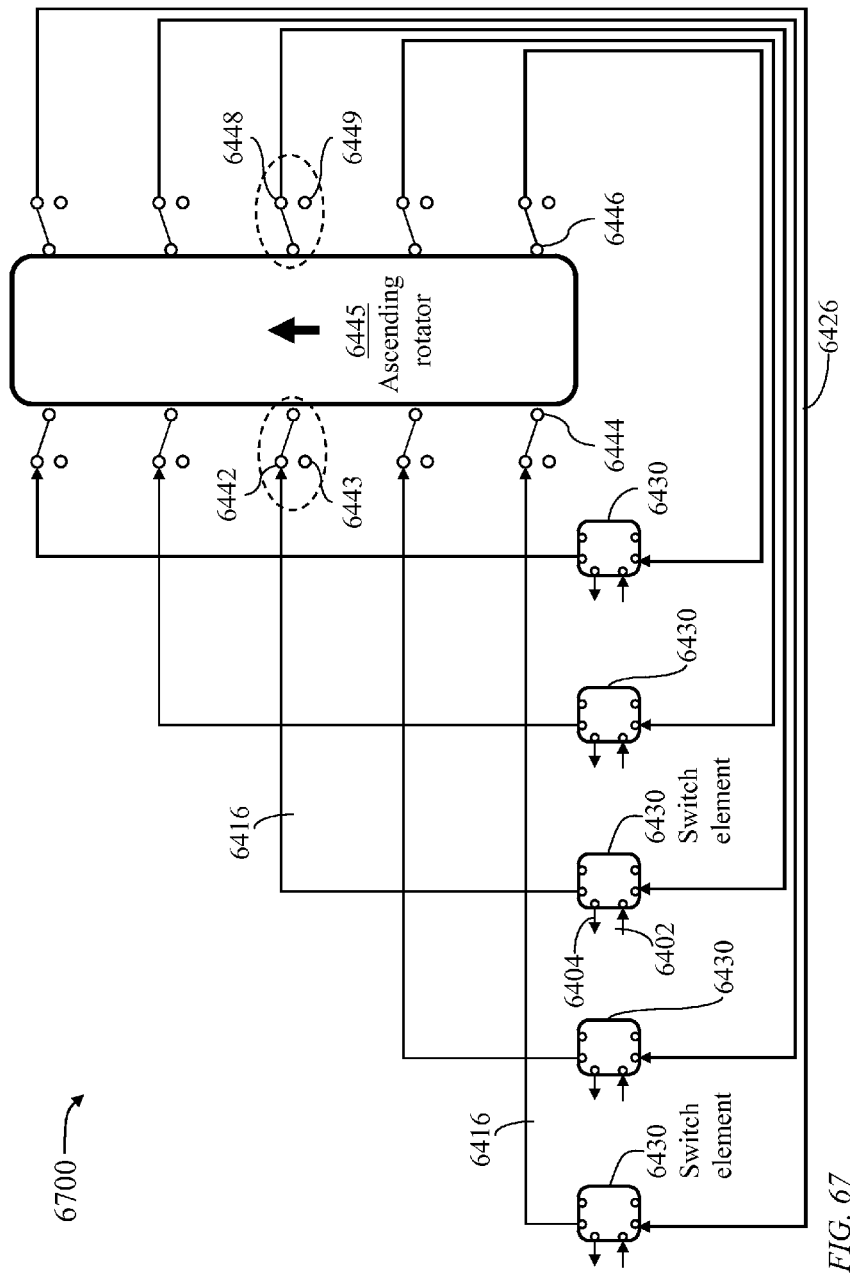
FIG. 67 illustrates connectivity of the two-phase single-rotator circulating switch of FIG. 66 during a first part of a time slot.

FIG. 67 illustrates a first connectivity of the two-phase single-rotator circulating switch of FIG. 66 sustaining the first set of compound paths described above. The first connectivity is effective during a first part of a time slot.

Figure 68:
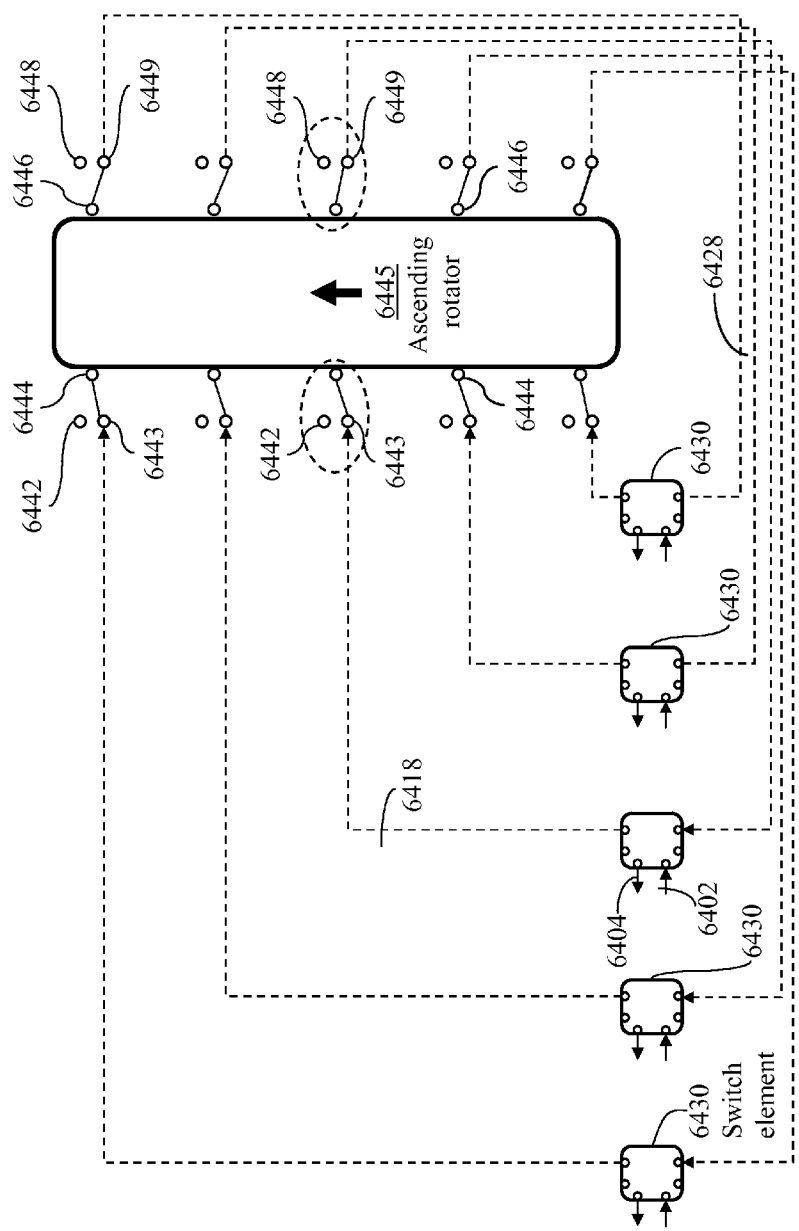
FIG. 68 illustrates connectivity of the two-phase single-rotator circulating switch of FIG. 66 during a second part of a time slot.

FIG. 68 illustrates a second connectivity of the two-phase single-rotator circulating switch of FIG. 66 sustaining the second set of compound paths described above. The second connectivity is effective during a second part of a time slot.

Figure 69:
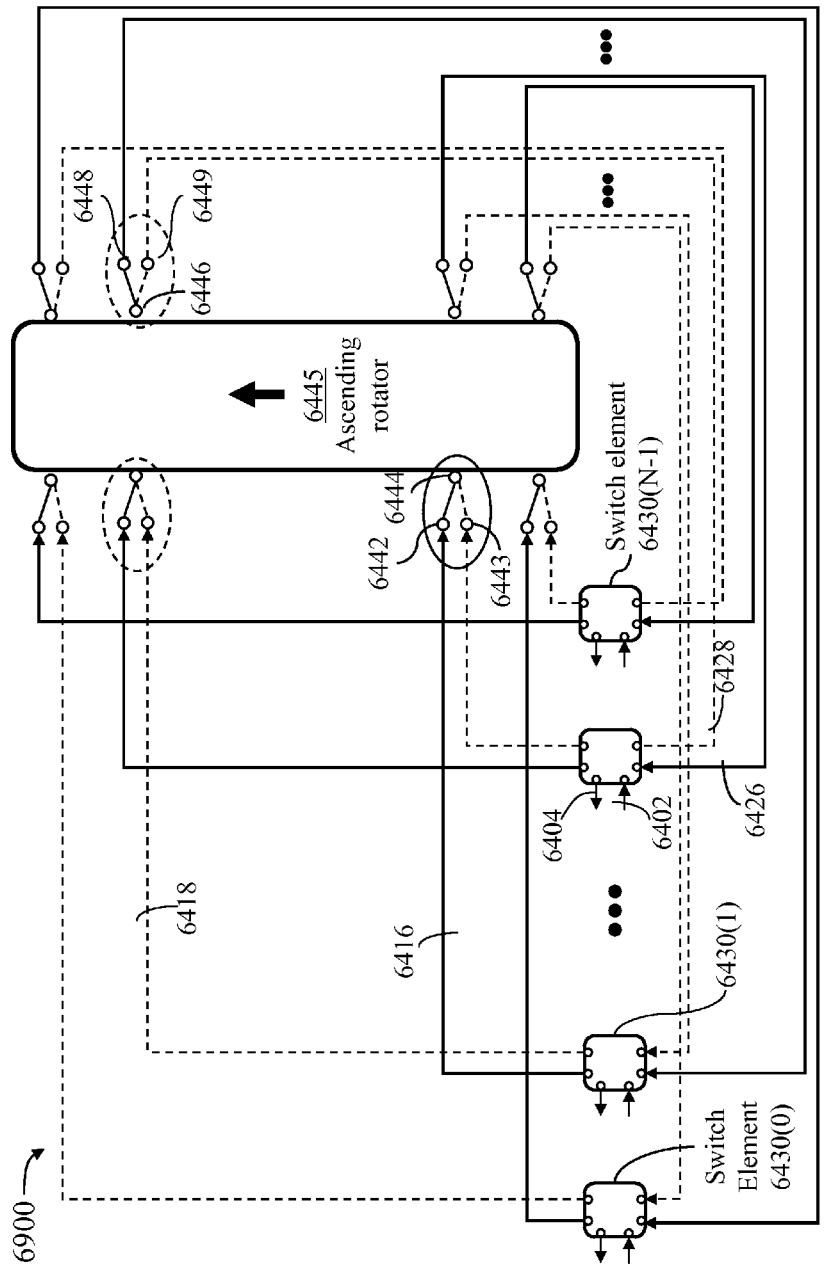
FIG. 69 illustrates a two-phase single-rotator circulating switch having an arbitrary number of switch elements and preserving sequential order of data segments of each data stream, in accordance with an embodiment of the present invention.

FIG. 69 illustrates a two-phase single-rotator circulating switch 6900 having an arbitrary number N>2 of switch elements and preserving sequential order of data segments of each data stream. The N switch elements has ordinary connections to N inlet ports 6442, transposed connections to N inlet ports 6443, transposed connections from N outlet ports 6448, and ordinary connections from outlet ports 6449.

Figure 70:
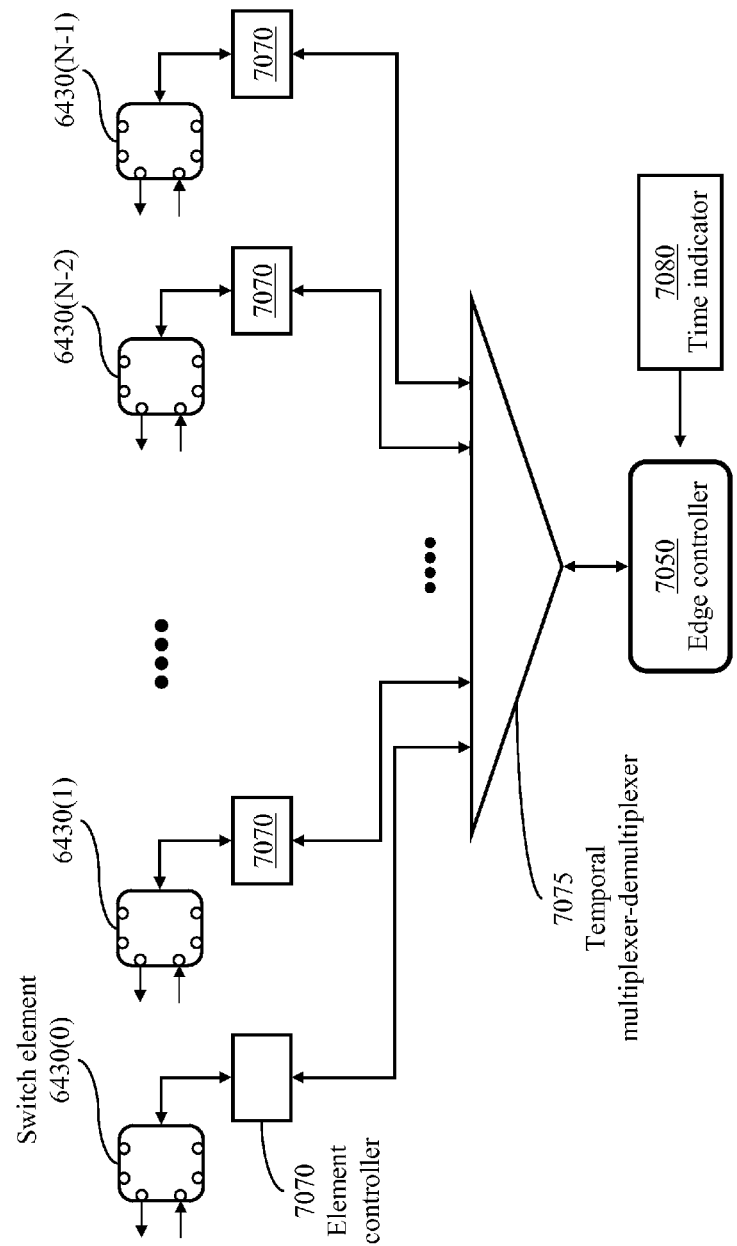
FIG. 70 illustrates a control system of the single-rotator circulating switch of FIG. 69.

FIG. 70 illustrates a control system of the single-rotator circulating switch of FIG. 69. Each switch element 6430 has an element controller 7070 which communicates with an edge controller 7050. A control time frame is organized into N control time slots of equal durations with each control time slot allocated to a respective switch-element controller 7070 for two-way communications with the edge controller 7050 through a temporal multiplexer-demultiplexer 7075. A switch element controller 7070 may be allocated a specific control time slot for transmitting control signals to the edge controller 7050 and a different control time slot for receiving control signals from the edge controller 7050. The edge controller 7050 is coupled to a time indicator 7080.

Figure 71:
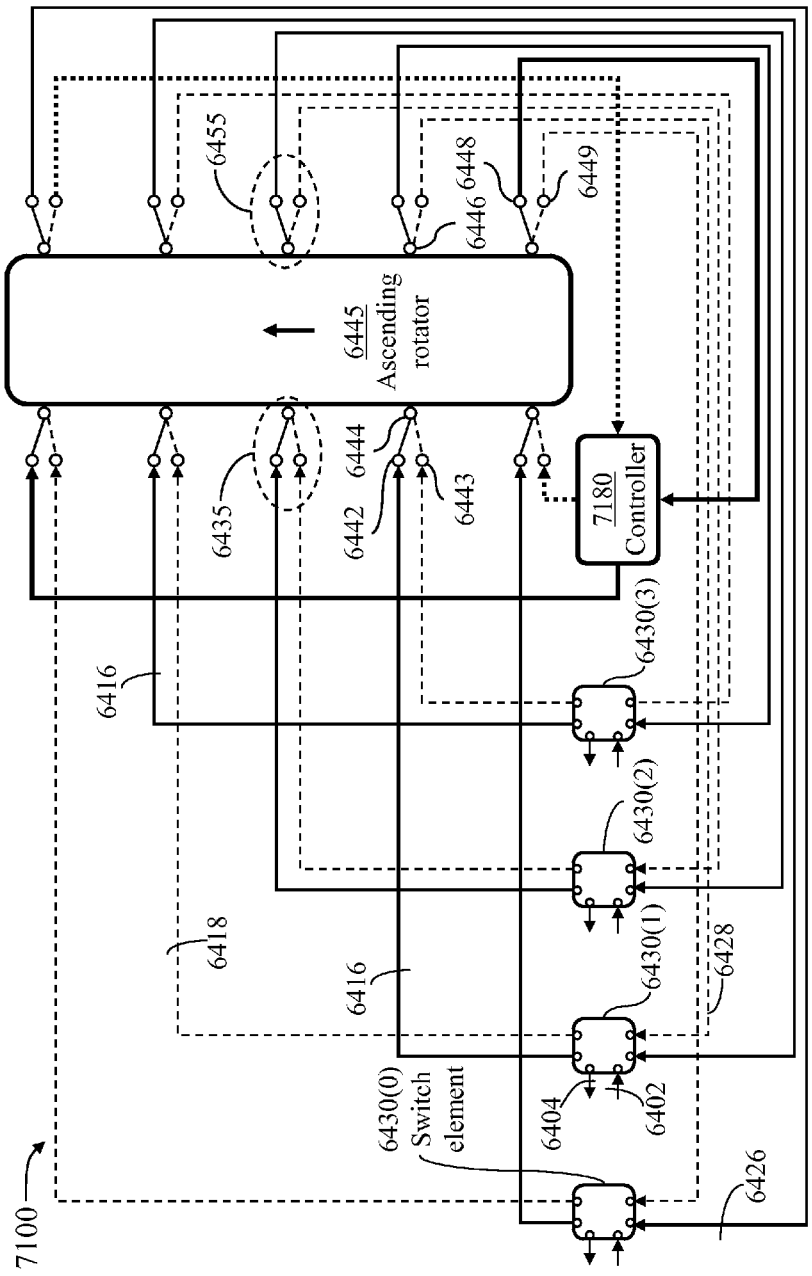
FIG. 71 illustrates a two-phase single-rotator circulating switch having transposed connections to a single rotator and employing a controller accessible through the single rotator, in accordance with an embodiment of the present invention.

FIG. 71 illustrates a two-phase single-rotator circulating switch having five switch elements 6430 with transposed connections of order 4, and employing a controller 7180 accessible through the single rotator. Each switch element is allocated a time slot for communicating with the controller 7180.

Figure 72:
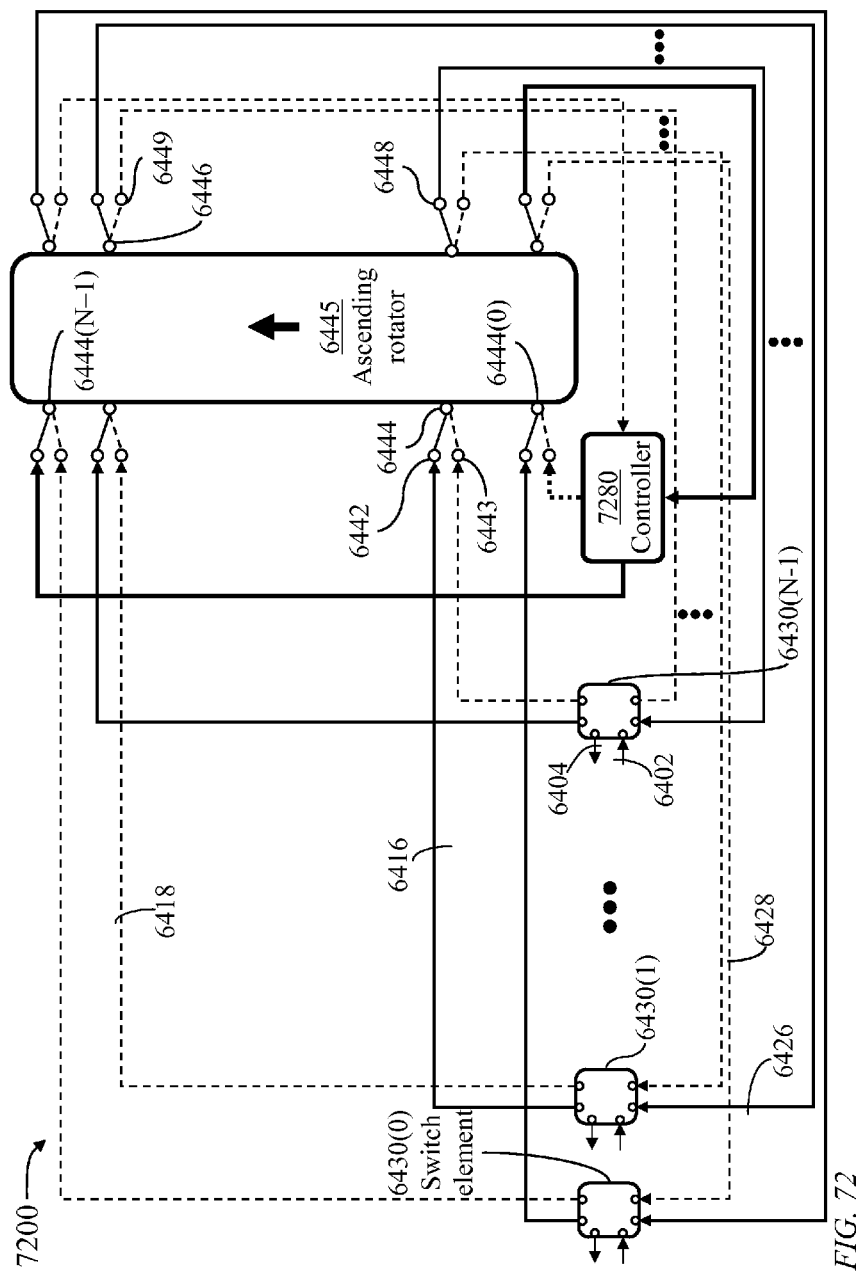
FIG. 72 illustrates a two-phase single-rotator circulating switch, with an arbitrary number of switch elements, having transposed connections to a single rotator and employing a controller accessible through the single rotator, in accordance with an embodiment of the present invention.

FIG. 72 illustrates a two-phase single-rotator circulating switch with an arbitrary number N>2 of switch elements having transposed connections of order L=(N−1) and employing a controller accessible through the single rotator. Each switch element is allocated a time slot for communicating with the controller 7280.

FIG. 73 tabulates data-transfer timing of the two-phase single-rotator circulating switch of FIG. 69. With static ordinary connections from the switch elements to single rotator and static transposed connections from the single rotator to the switch elements, a switch element j connects to inlet j (inlet port 6442(j)) and with an ascending rotator 6445, inlet j connects to outlet (j+t$_1$) during a first part of a time slot t$_1$, 0≤t$_1$<N. Outlet (j+t$_1$) connects to a transit (intermediate) switch element 6430 of index (L−(j+t$_1$)). Switch element (L−(j−t$_1$)) has a channel to inlet port 6442 of inlet (L−(j+t$_1$)). In order to reach destination switch element 6430(k), transit data in switch element (L−(j+t$_1$)) is transferred from inlet (L−(j+t$_1$)) to outlet (L−k) during a time slot t$_2$=(L−k)−(L=(j+t$_1$))=(j=k+t$_1$). Thus, the transit delay is t$_2$−t$_1$=j−k.

Likewise, with static transposed connections from the switch elements to single rotator and static ordinary connections from the single rotator to the switch elements, a switch element j connects to inlet (L−j) and with an ascending rotator 6445, inlet (L−j) connects to outlet (L−j+t$_1$) during a first part of a time slot t$_1$, 0≤t$_1$<N. Outlet (L−j+t$_1$) connects to a transit (intermediate) switch element 6430 of index (L−j+t$_1$). Switch element (L−j+t$_1$) has a channel to inlet port 6442 of inlet (j−$t_1$). In order to reach destination switch element 6430(k), transit data in switch element (L−j+$t_1$) is transferred from inlet (j−$t_1$) to outlet k during a time slot $t_2$=k−j+$t_1$. Thus, the transit delay is $t_2$−$t_1$=k−j.

During a rotation cycle, each inlet of rotator 6445 connects to each outlet during a time slot of predefined duration. Thus, rotator 6445 completes a rotation cycle of N time slots. Controller 7280 receives control signals from the switch elements 6430, schedules exchange of data among the switch elements, and communicates data-transfer schedules to the switch elements 6430. A scheduling time frame having a number Γ of time slots may be used to facilitate data-transfer scheduling. The number Γ is at least equal to the number N of rotator inlets which is also the number of time slots in a rotation cycle. To simplify communications between controller 7280 and individual controllers (not illustrated) of the switch elements 6430, the switch elements may be allocated non-overlapping control time slots within the scheduling time frame. With a large value of N, 1024 for example, the number Γ of time slots in a scheduling time frame may be selected to equal the number N of time slots of the rotation cycle. However, the number Γ may be any arbitrary integer exceeding N, and may substantially exceed N.

Figure 74:
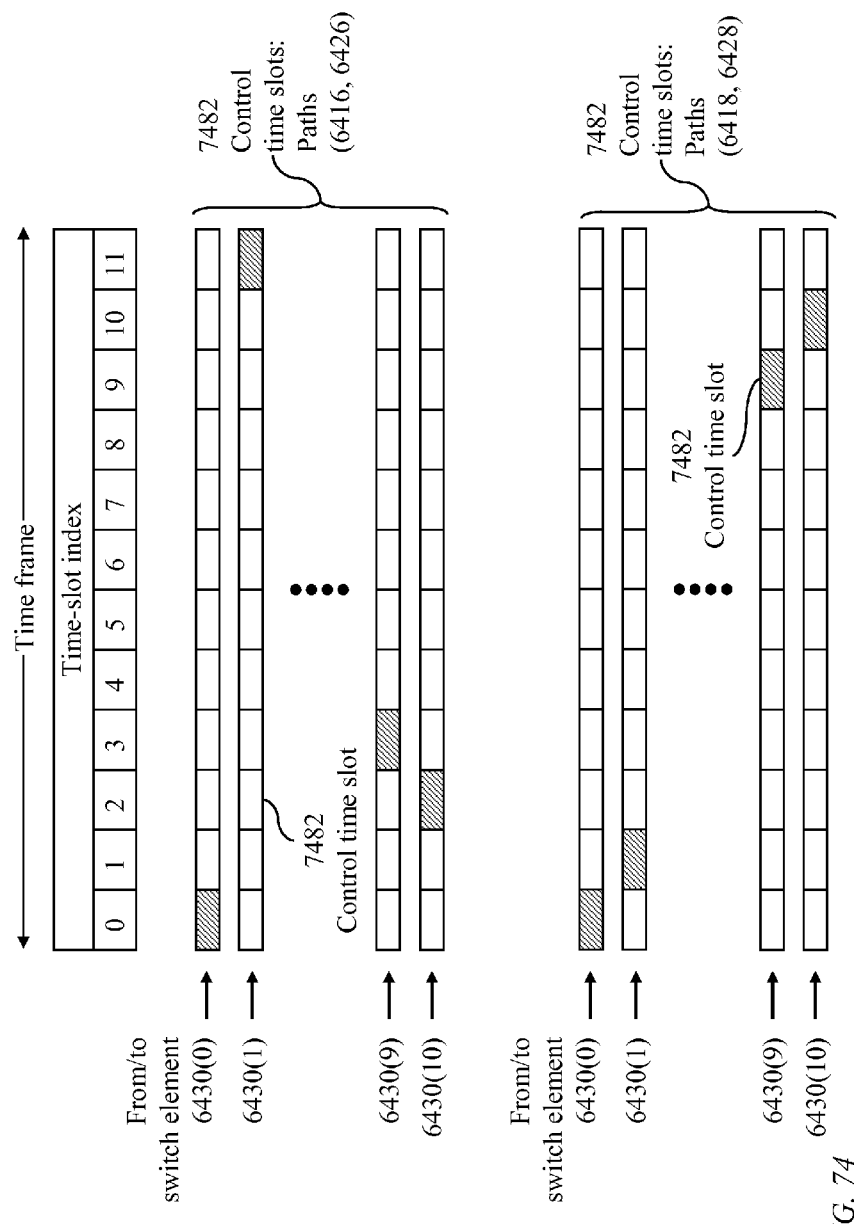
FIG. 74 illustrates allocation of control time slots for the two-phase single-rotator circulating switch of FIG. 69, in accordance with an embodiment of the present invention.

FIG. 74 illustrates an exemplary allocation of control time slots for the two-phase single-rotator circulating switch of FIG. 72 for a case where Γ=N=12. The controller 7280 has a channel 6416 to inlet 6444(N−1), a channel 6418 to inlet 6444(0), a channel 6426 from outlet 6446(0), and a channel 6428 from outlet 6446(N−1). Controller 7280 replaces switch element 6430(N−1). Each switch element 6430(j), 0≤j<(N−2), has a first path to controller 7280 traversing channels 6416 and 6426, and a second path traversing channels 6418 and 6428. As illustrated in FIG. 73, a switch element 6430(j) has a first path to a switch element 6430 of index $\{L-j-t_1\}_{modulo\ N}$, and a second path to a switch element 6430 of index $\{L-j+t_1\}_{modulo\ N}$, during a time slot $t_1$, 0≤$t_1$<N.

The time slot τ during which the first path from switch element 6430(j) to the controller 7280 is established is determined from $\{L-j-\tau\}_{modulo\ N}$=(N−1). The configuration of FIG. 72 uses transposed connections of order L=(N−1). Thus, $\tau=\{-j\}_{modulo\ N}$=(N−j). The time slot ξ during which the second path from switch element 6430(j) to the controller 7280 is established is determined from $\{L-j+\xi\}_{modulo\ N}$=(N−1). Thus, ξ=j. Time slot τ is allocated as a control time slot 7482 and time slot ξ is allocated as a control time slot for switch element 6430(j). Thus, switch elements 6430(0), 6430(1), 6430(2), . . . , 6430(N−3), and 6430(N−2), have paths through channels 6416 and 6426 to the controller 7280, during control time slots 7482 of indices 0, (N−1), (N−2), . . . , 3, and 2, respectively, and paths through channels 6418 and 6428 to the controller 7280 during control time slots 7484 of indices 0, 1, 2, . . . , (N−2), and (N−1), respectively.

Single-Rotator Latent-Space Switch

Figure 75:
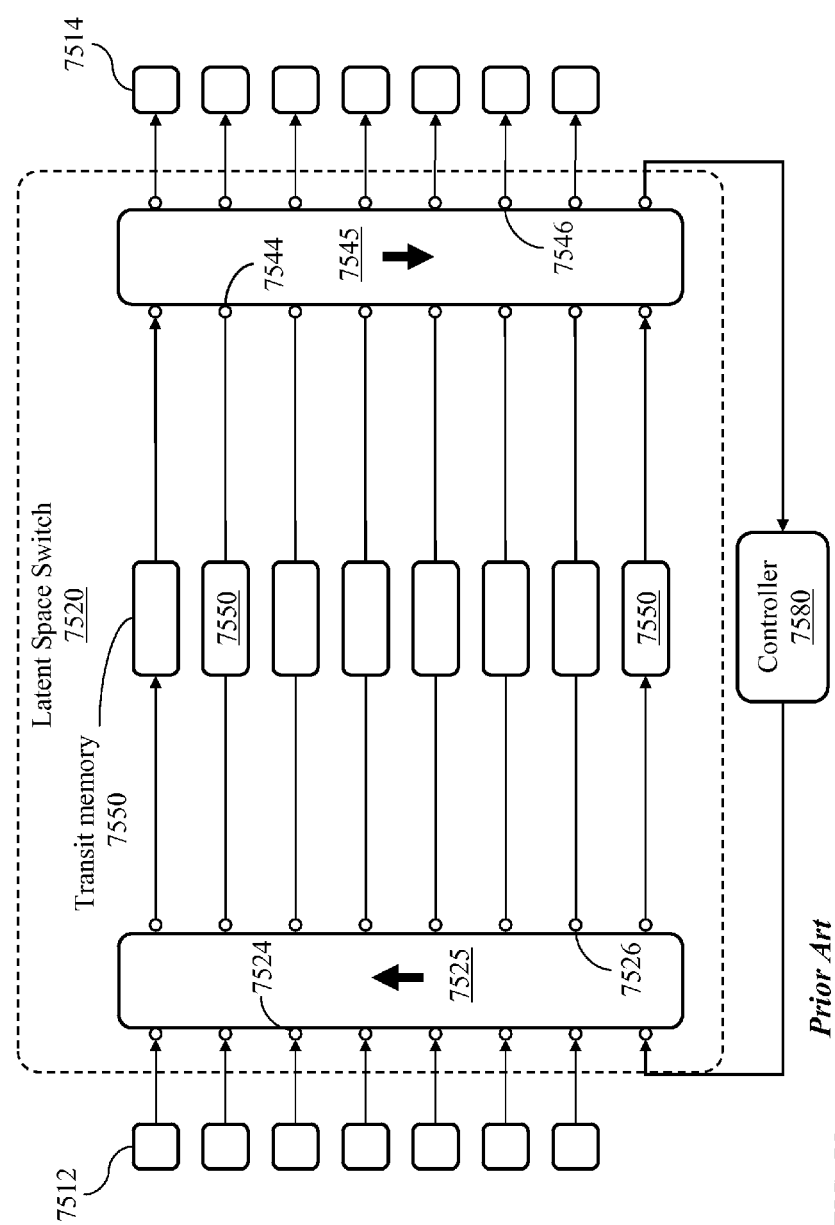
FIG. 75 illustrates a prior art latent space switch comprising a bank of transit memory devices between a first rotator and a second rotator and a controller connecting to an inlet of the first rotator and an outlet of the second rotator, where the first and second rotators are of opposite rotation directions so that the switching delay for a connection is independent of the transit memory device used.

FIG. 75 illustrates a known rotating access packet switch (U.S. Pat. Nos. 5,168,492, 5,745,486, and Publication 2006/0123162) comprising a latent space switch 7520, input buffers 7512 and output buffers 7514. The latent space switch 7520 comprises an input rotator 7525 having N inlets 7524 and N outlets 7526 and an output rotator 7545 having N inlets 7544 and N outlets 7546; N=8 in the illustrated exemplary rotating-access switch. A bank of N transit memory devices 7550 connects to the N outlets 7526 of input rotators 7525 and N inlets 7544 of output rotator 7545. A controller 7580 is connected to an outlet 7546 of output rotator 7545 and an inlet 7524 of input rotator 7525 leaving (N−1) inlets 7524 of input rotator 7525 to connect to (N−1) input buffers 7512 and (N−1) outlets 7546 of output rotator 7545 to connect to (N−1) output buffers 7514. One of the two rotators 7525 and 7545 is an ascending rotator and the other is a descending rotator. The input buffers are individually identified as 7512(j), 0≤j<N. Likewise output buffers 7514 are individually identified as 7514(j) and transit memory devices 7550 are individually identified as 7550(j), 0≤j<N. During a time slot t in a repetitive time frame having N time slots, input rotator 7525 connects input buffer j to transit memory device $\{j+\beta \times t\}_{modulo\ N}$, and output rotator 7545 connects transit memory device j to output buffer $(j-\beta \times t)_{modulo\ N}$ where β=1 if rotator 7525 is an ascending rotator and rotator 7545 is a descending rotator and β=−1 if rotator 7525 is a descending rotator and rotator 7545 is an ascending rotator. A data unit transferred from an input buffer 7512(j) to an output buffer 7514(k) through any transit memory device 7550 is delayed in the transit memory device 7550 for a period of $\{j-k\}_{modulo\ N}$, if rotator 7525 is an ascending rotator and rotator 7545 is a descending rotator, or delayed for a period of $\{k-j\}_{modulo\ N}$, if rotator 7525 is a descending rotator and rotator 7545 is an ascending rotator.

Figure 76:
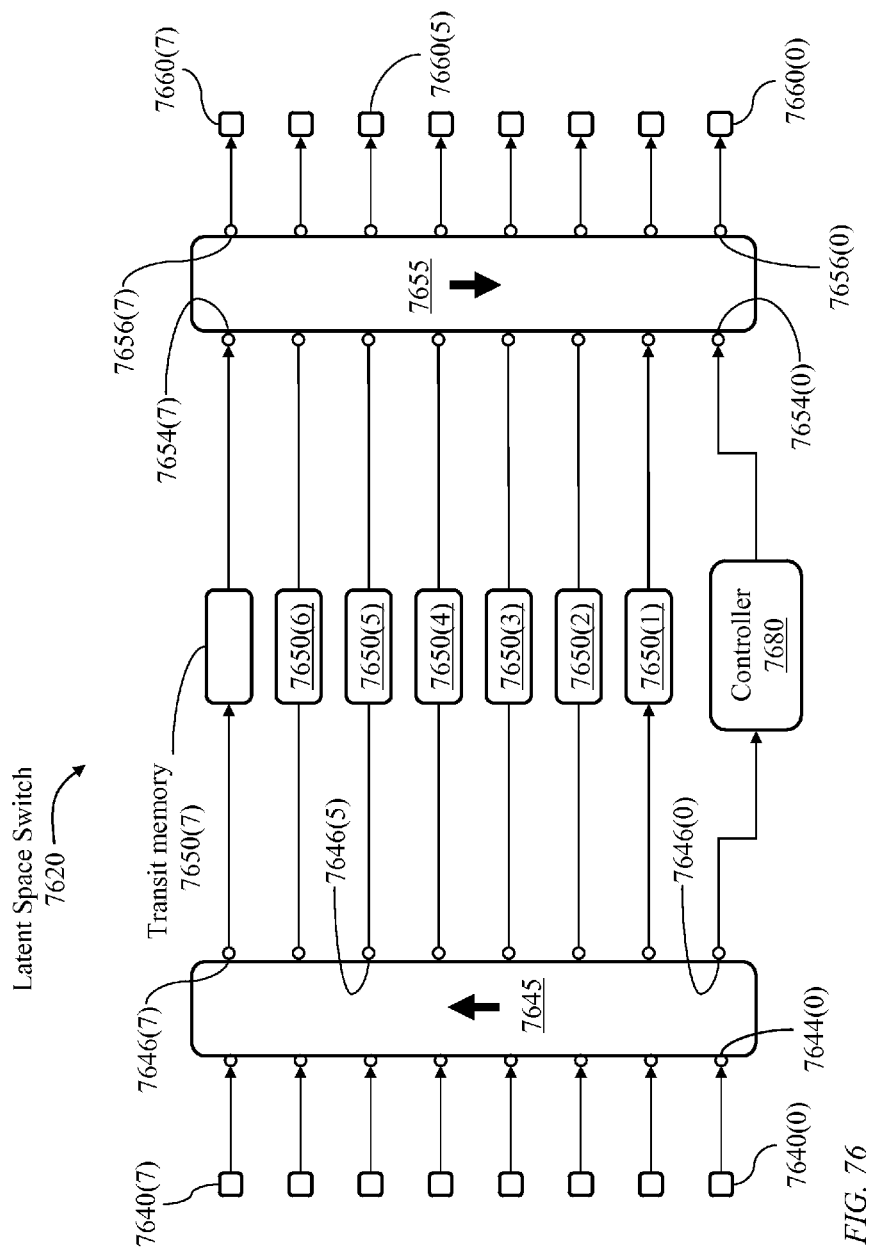
FIG. 76 illustrates a latent space switch comprising a bank of transit memory devices between a first rotator and a second rotator and a controller connecting to an outlet of the first rotator and an inlet of the second rotator, where the first and second rotators are of opposite rotation directions so that the switching delay for a connection is independent of the transit memory device used, in accordance with an embodiment of the present invention.

FIG. 76 illustrates a latent space switch 7620 comprising an input rotator 7645 having N inlets 7644 and N outlets 7646 and an output rotator 7655 having N inlets 7654 and N outlets 7656; N=8 in the illustrated latent space switch. A bank of (N−1) transit memory devices 7650 connects to (N−1) outlets 7646 of input rotator 7645 and (N−1) inlets 7654 of output rotator 7655. A controller 7680 is connected to an outlet 7646 of input rotator 7645 and an inlet 7654 of output rotator 7655. As in latent-space switch 7520, one of the two rotators 7645 and 7655 is an ascending rotator and the other is a descending rotator. The inlets 7644 are individually identified as 7644(j), 0≤j<N. Likewise outlets 7656 are individually identified as 7656(j) and transit memory devices 7650 are individually identified as 7650(j), 0≤j<N. During a time slot t in a repetitive time frame having N time slots, input rotator 7645 connects inlet 7644(j) to transit memory device $\{j+\beta \times t\}_{modulo\ N}$, and output rotator 7655 connects transit memory device j to outlet 7656(k), k=$\{j-\beta \times t\}_{modulo\ N}$, where β=1 if rotator 7645 is an ascending rotator and rotator 7655 is a descending rotator and β=−1 if rotator 7645 is a descending rotator and rotator 7655 is an ascending rotator. A data unit transferred from an inlet 7644(j) to an outlet 7656(k) through any transit memory device 7650 is delayed in the transit memory device 7650 for a period of $\{j-k\}_{modulo\ N}$, if rotator 7645 is an ascending rotator and rotator 7655 is a descending rotator, or delayed for a period of $\{k-j\}_{modulo\ N}$, if rotator 7645 is a descending rotator and rotator 7645 is an ascending rotator.

An ingress port 7640 connecting to inlet 7644 dedicates a time slot within the time frame for receiving control signals from respective external sources and transferring the control signals to controller 7680. An egress port 7660 connecting to an outlet 7656 dedicates a time slot within the time frame for transmitting control signals from controller 7680 to respective external sinks.

Latent space switch 7520 uses N transit memory devices 7550 and supports (N−1) ingress ports and (N−1) egress ports. A control data unit transferred from an ingress port to controller 7580 is first written in a transit memory device 7550 then transferred to controller 7580. A control data unit transferred from controller 7580 to an egress port is first written in a transit memory device 7550 then transferred to the egress port. Latent space switch 7620 uses (N−1) transit memory devices 7650, supports N ingress ports and N egress ports, and simplifies access to the controller 7680.

During a first part of a time slot, data is transferred from inlets 7644 to controller 7680 and to transit memory devices 7650 through input rotator 7645. During a second part of the time slot, data is transferred from controller 7680 and transit memory devices 7650 to outlets 7656 through output rotator 7655. The two rotators 7645 and 7655 may, therefore, be replaced by a single rotator. However, rotators 7645 and 7655 should rotate in opposite directions, one being an ascending rotator and the other a descending rotator, in order to guarantee a transit delay for a path from an inlet 7644($j$) to an outlet 7656($k$) which is independent of the transit memory device 7650 used and depends only on the indices j and k.

A single rotator may be devised to be an ascending rotator during a first part of each time slot and a descending rotator during a second part of each time slot. Preferably, in accordance with an embodiment of the present invention, the connectivity of the transit memory devices to the input side and output side of a single rotator rotating in one direction, either ascending or descending, may be configured to realize delay independence of the transit memory devices traversed by a data stream.

Figure 77:
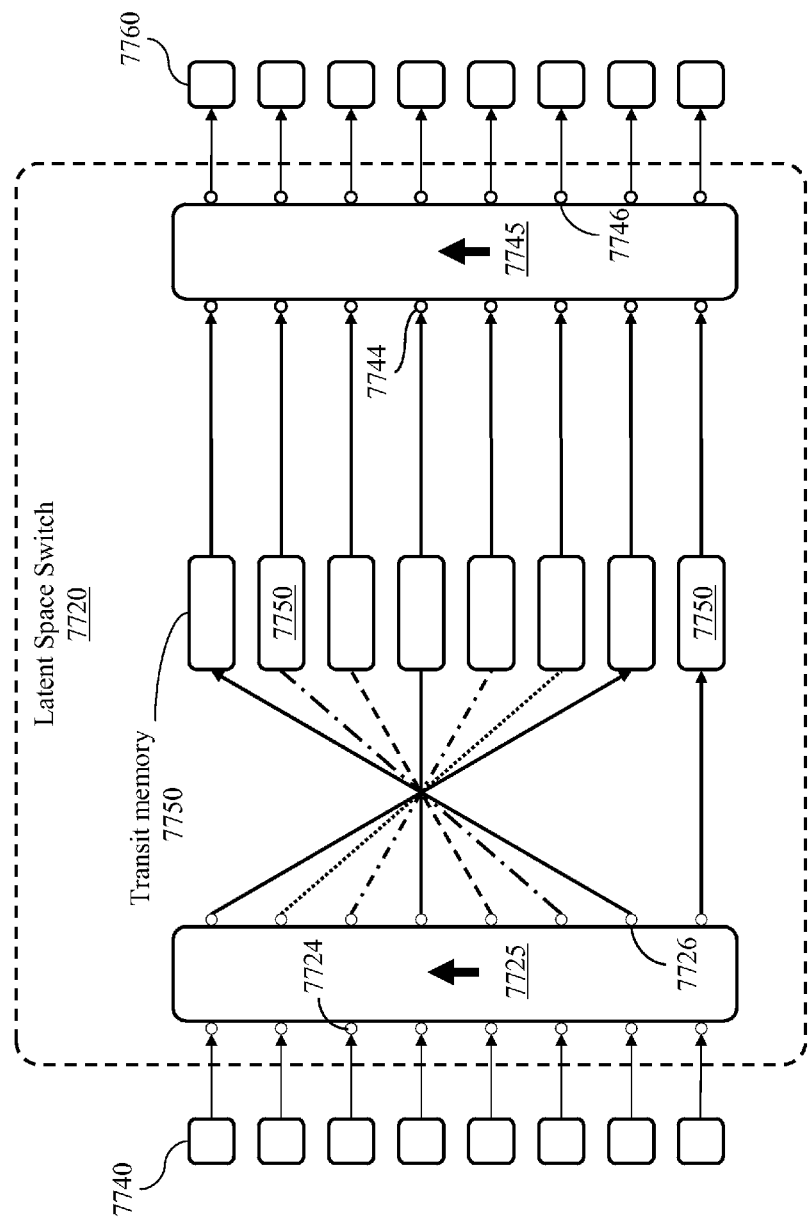
FIG. 77 illustrates a latent space switch comprising a first ascending rotator having transposed connections of order 0 to a bank of eight transit memory devices with the bank of transit memory devices having ordinary connection to a second ascending rotator, so that the switching delay for a connection is independent of the transit memory device used, in accordance with an embodiment of the present invention.

FIG. 77 illustrates a latent space switch 7720 comprising a first ascending rotator 7725 having eight inlets 7724 and eight outlets 7726, a bank of eight transit memory devices 7750, and a second ascending rotator 7745 having eight inlets 7744 and eight outlets 7746. The eight outlets 7726 of the first ascending rotator have static transposed connections of order 0 to the bank of transit memory devices 7750, and the bank of transit memory devices 7750 has ordinary connection to the inlets 7744 of the second ascending rotator. The inlets 7724 of the first ascending rotator may have ordinary connections to ingress ports 7740 and the outlets 7746 of the second ascending rotator may have ordinary connections to egress ports 7760.

An inlet 7724($j$) of the first ascending rotator connects to outlet 7726$|j+t_1|$, where $|j+t_1|$ denotes $(j+t_1)_{modulo\ N}$, during a time slot $t_1$, $0 \le t_1 < N$. Outlet 7726$|j+t_1|$ connects to a transit memory device 7750$|L-(j+t_1)|$. Transit memory device $|L-(j+t_1)|$ connects to inlet 7744$|L-(j+t_1)|$ of the second ascending rotator. In order to reach outlet 7746($k$) of the second ascending rotator, transit data in transit memory device 7750$|L-(j+t_1)|$ is transferred from inlet 7744$|L-(j+t_1)|$ to outlet 7746($k$) during a time slot $t_2 = |k - (L-(j-t_1))| = |j+k-L+t_1|$. Thus, the transit delay is $t_2 - t_1 = |j+k-L|$, which is independent of the transit memory device used. The transit delay depends on the indices j and k of the ingress and egress ports and the order L, $0 \le L < N$, of the transposed connection, which is a fixed parameter for a specific configuration of a latent space switch 7720. The value of L is 0 in the configuration of FIG. 77.

To render the delay from an ingress port 7740($j$) to an egress port 7760($k$), $0 \le j < N$, $0 \le k < N$, independent of the transposition order L, the outlets 7746 of the second ascending rotator may have transposed connections of the same order L to the egress ports. Thus, in order to reach egress port 7760($k$), transit data in transit memory device 7750$|L-(j+t_1)|$ is transferred from inlet 7744$|L-(j+t_1)|$ to outlet 7746$|L-k|$ during a time slot $t_2 = |(L-k)-(L-(j+t_1))| = |j-k+t_1|$, and the transit delay is $t_2 - t_1 = |j-k|$, which is independent of the transposition order L.

Figure 78:
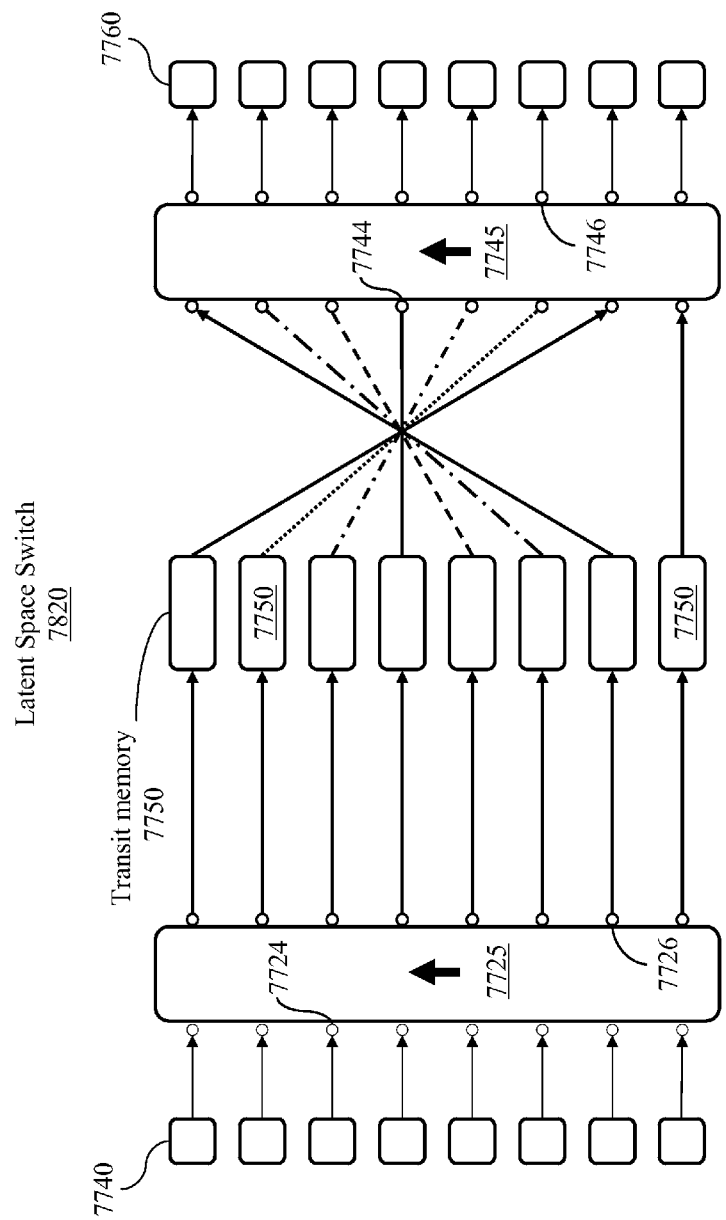
FIG. 78 illustrates a latent space switch comprising a first ascending rotator having ordinary connections to a bank of eight transit memory devices with the bank of transit memory devices having transposed connections of order 0 to a second ascending rotator, so that the switching delay for a connection is independent of the transit memory device used, in accordance with an embodiment of the present invention.

FIG. 78 illustrates a latent space switch 7820 comprising a first ascending rotator 7725 having eight inlets 7724 and eight outlets 7726, a bank of eight transit memory devices 7750, and a second ascending rotator 7745 having eight inlets 7744 and eight outlets 7746. The eight outlets 7726 of the first ascending rotator have static ordinary connections to the bank of transit memory devices 7750, and the bank of transit memory devices 7750 has transposed connections to the inlets 7744 of the second ascending rotator. The inlets 7724 of the first ascending rotator may have ordinary connections from ingress ports 7740 and the outlets 7746 of the second ascending rotator may have ordinary connections to egress ports 7760.

An inlet 7724($j$) of the first ascending rotator connects to outlet 7726$|j+t_1|$ during a time slot $t_1$, $0 \le t_1 < N$. Outlet 7726$|j+t_1|$ connects to a transit memory device 7750$|j+t_1|$. Transit memory device 7750$|j+t_1|$ connects to inlet 7744$|L-(j+t_1)|$ of the second ascending rotator. In order to reach outlet 7746($k$), transit data in transit memory device 7750$|j+t_1|$ is transferred from inlet 7744$|L-(j+t_1)|$ to outlet 7746($k$) during a time slot $t_2 = |k-(L-(j+t_1))| = |j+k-L+t_1|$. Thus, the transit delay is $t_2 - t_1 = |j+k-L|$. The value of L is 0 in the configuration of FIG. 78.

To render the delay from an ingress port 7740($j$) to an egress port 7760($k$), $0 \le j < N$, $0 \le k < N$, independent of the transposition order L, the outlets 7746 of the second ascending rotator may have transposed connections of the same order L to the egress ports 7760, resulting in a transit delay of $|j-k|$.

Figure 79:
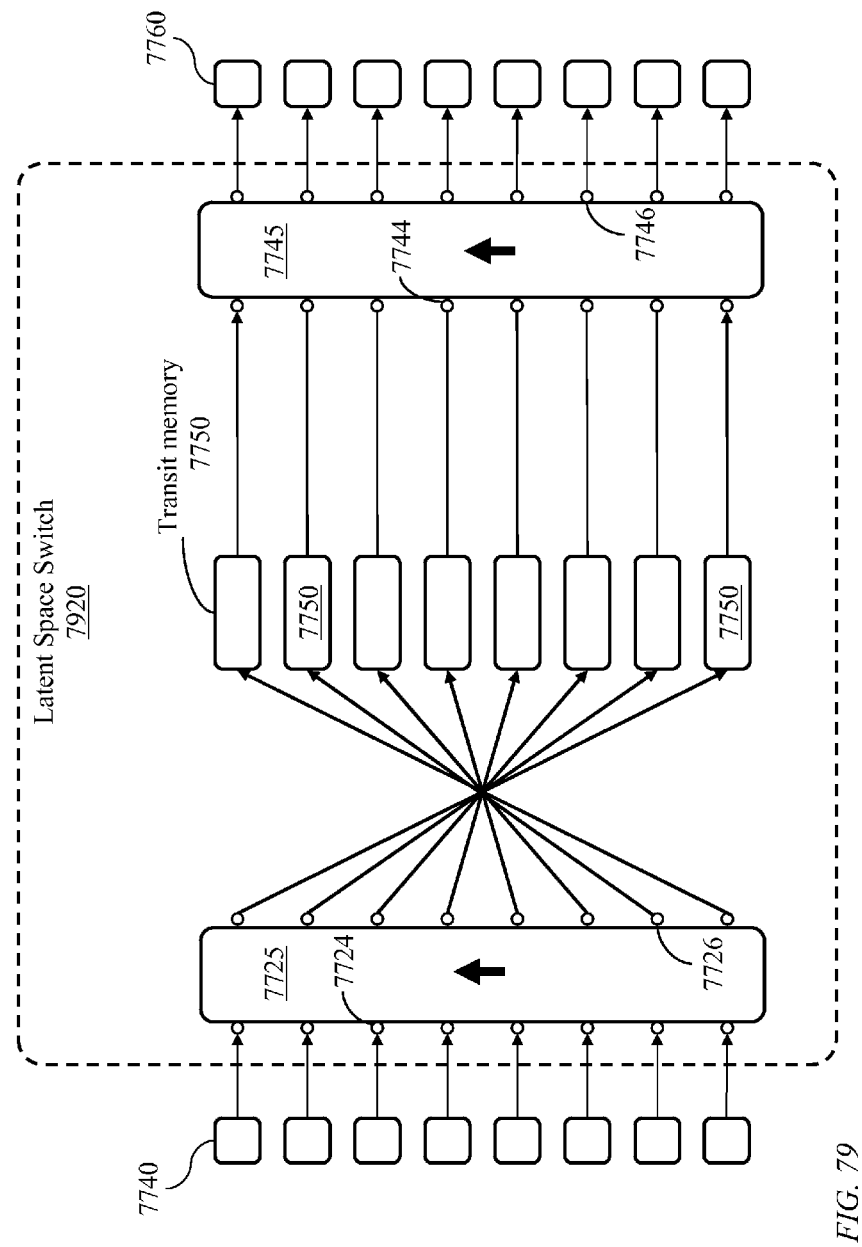
FIG. 79 illustrates a latent space switch similar to the latent space switch of FIG. 77 but with the first ascending rotator having transposed connections of order 7 to a bank of transit memory devices.

FIG. 79 illustrates a latent space switch similar to the latent space switch of FIG. 77 but with the first ascending rotator having transposed connections of order 7 to a bank of transit memory devices. The transit delay for a connection from an ingress port 7740($j$) to an egress port 7760($k$) is then $|j+k-7|$ if the outlets 7746 of the second ascending rotator have ordinary connections to the egress ports 7760. With transposed connections of order 7 from the outlets 7746 of the second ascending rotator to the egress ports 7760, the transition delay from an ingress port 7740($j$) to an egress port 7760($k$) is $|j-k|$.

Figure 80:
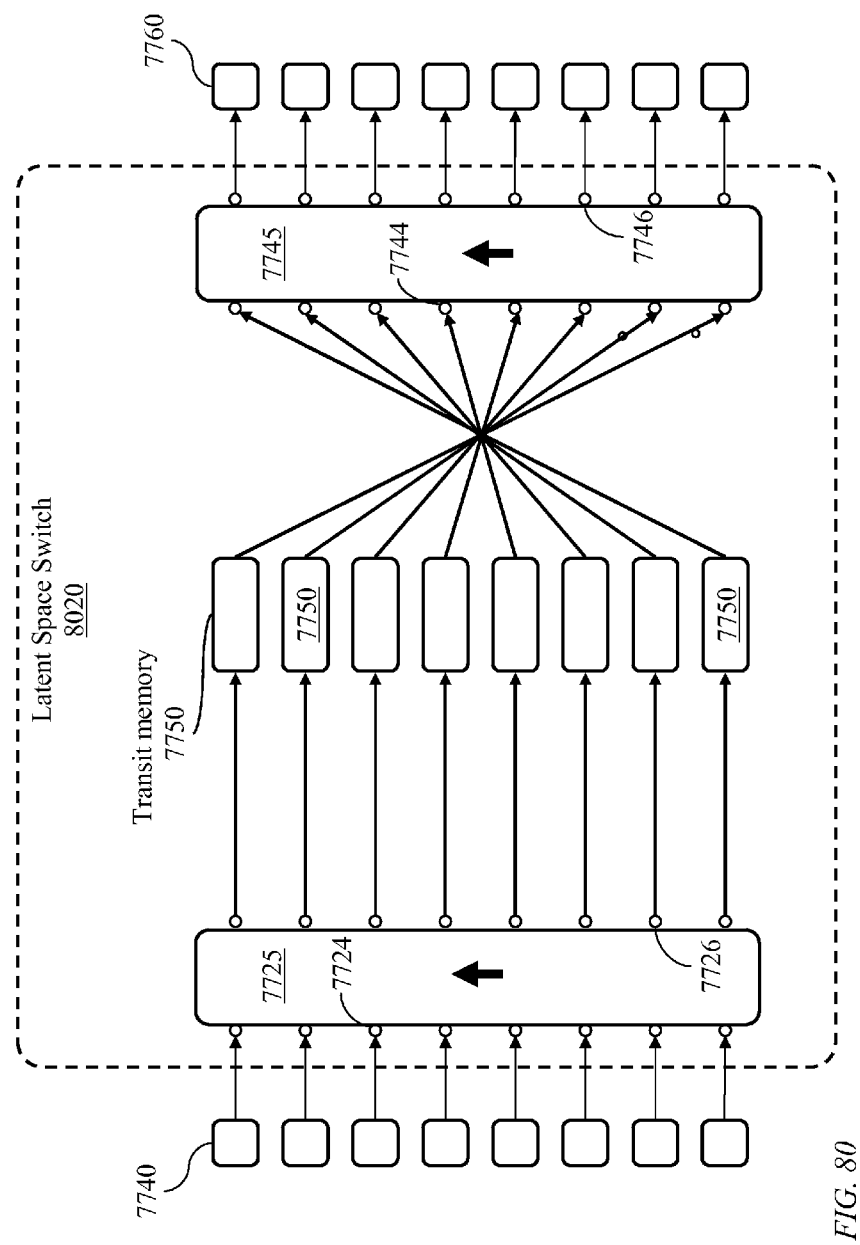
FIG. 80 illustrates a latent space switch similar to the latent space switch of FIG. 78 but with the bank of transit memory devices having transposed connections of order 7 to the second ascending rotator.

FIG. 80 illustrates a latent space switch similar to the latent space switch of FIG. 78 but with the bank of transit memory devices having transposed connections of order 7 to the inlets 7744 of the second ascending rotator. The transit delay for a connection from an ingress port 7740($j$) to an egress port 7760($k$) is then $|j+k-7|$ if the outlets 7746 of the second ascending rotator have ordinary connections to the egress ports 7760. With transposed connections of order L from the outlets 7746 of the second ascending rotator to the egress ports 7760, the transition delay from an ingress port 7740($j$) to an egress port 7760($k$) is $|j-k|$.

Figure 81:
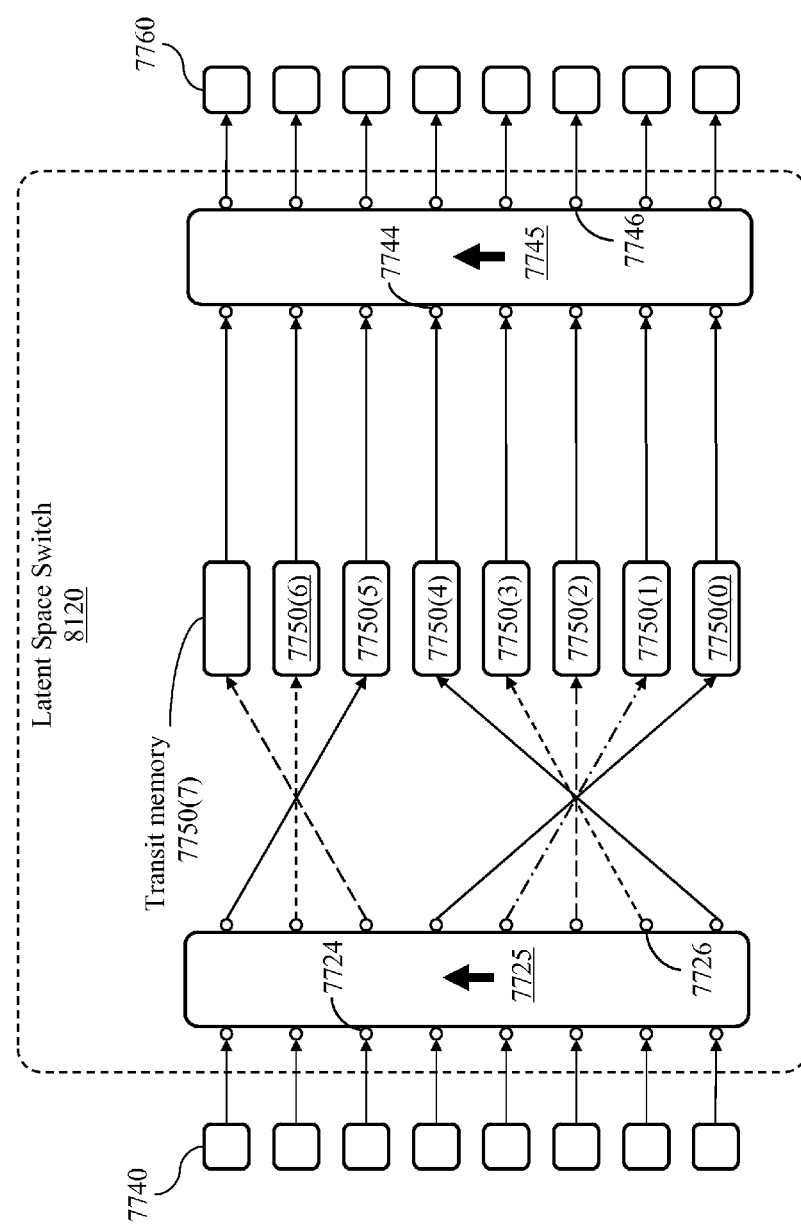
FIG. 81 illustrates a latent space switch similar to the latent space switch of FIG. 77 but with the first ascending rotator having transposed connections of order 4 to a bank of transit memory devices.

FIG. 81 illustrates a latent space switch similar to the latent space switch of FIG. 77 but with the first ascending rotator having transposed connections of order 4 to a bank of transit memory devices. The transit delay for a connection from an ingress port 7740($j$) to an egress port 7760($k$) is then $|j+k-4|$ if the outlets 7746 of the second ascending rotator have ordinary connections to the egress ports 7760. With transposed connections of order 4 from the outlets 7746 of the second ascending rotator to the egress ports 7760, the transition delay from an ingress port 7740($j$) to an egress port 7760($k$) is $|j-k|$.

Figure 82:
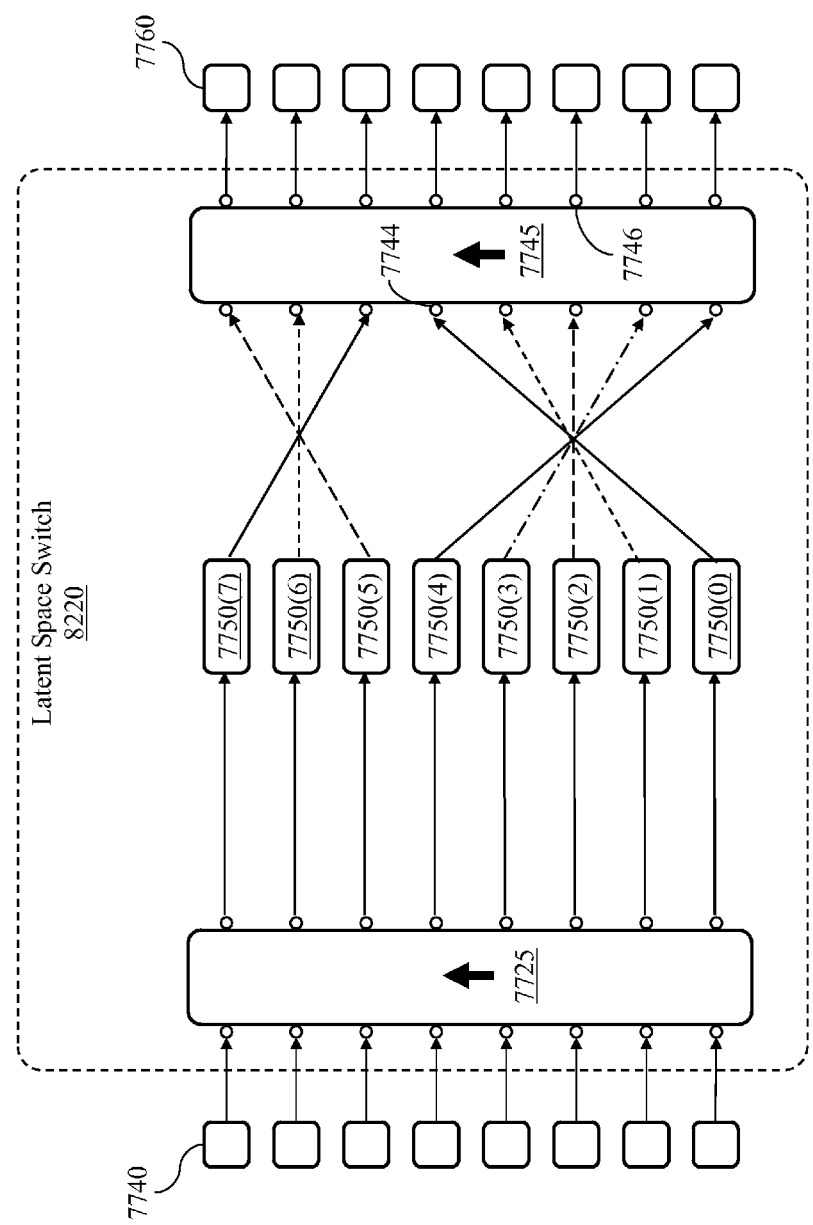
FIG. 82 illustrates a latent space switch similar to the latent space switch of FIG. 78 but with the bank of transit memory devices having transposed connections of order 4 to the second ascending rotator.

FIG. 82 illustrates a latent space switch similar to the latent space switch of FIG. 78 but with the bank of transit memory devices having transposed connections of order 4 to the inlets 7744 of the second ascending rotator. The transit delay for a connection from an ingress port 7740($j$) to an egress port 7760($k$) is then $|j+k-4|$ if the outlets 7746 of the second ascending rotator have ordinary connections to the egress ports 7760. With transposed connections of order L from the outlets 7746 of the second ascending rotator to the egress ports 7760, the transition delay from an ingress port 7740(*j*) to an egress port 7760(*k*) is |j−k|.

FIG. 83 tabulates data-transfer timing of a latent space switch of the type illustrated in FIG. 77 to FIG. 82, with an arbitrary number of ports and an arbitrary value of the order of transposed connections.

The two rotators 7725 and 7745 of latent space switches 7720, 7820, 7920, 8020, 8120, and 8220 are of the same rotation direction and they are not active simultaneously. Thus, they may be replaced with a single rotator.

Transposing Rotator Versus Uniform Rotator

A rotator is a device connecting a number of inlets to a number of outlets where each inlet connects to each outlet during a rotation cycle. With N inlets and N outlets, N>1, the period of a rotation cycle may be divided into N time slots and the inlet-outlet connectivity of the rotator changes during successive time slots.

Several inlet-outlet rotator connectivity patterns may be devised and a rotator may be classified accordingly. The connectivity pattern may be characterized according to rotation order, rotation direction, and rotation step as described below. To facilitate defining the different patterns, the inlets are indexed as inlets 0 to (N−1) and the outlets are indexed as outlets 0 to (N−1).

The rotation order may be categorized as "uniform" or "transposing". With uniform rotation, a "uniform" rotator connects an inlet of index j, 0≤j<N, to an outlet of index $(j+\beta \times t+\Theta)_{modulo\ N}$, during a time slot t, 0≤t<N, of a repetitive time frame of N time slots. Θ is an arbitrary integer which may be set to equal zero without loss of generality. With "transposing" rotation, a "transposing" rotator connects an inlet of index j, 0≤j<N, to an outlet of index $(L-j+\beta \times t)_{modulo\ N}$, during a time slot t, 0≤t<N, of the repetitive time frame, where L is a predetermined transposition order L, 0≤L<N. The parameter β is an integer, not equal to zero, which defines rotation direction and rotation step.

Regardless of the value of β, a uniform rotator connects consecutive inlets to consecutive outlets of a same order during any time slot t while a transposing rotator connects consecutive inlets to outlets of a reversed order. For example, with N=8, L=7, β=1, two inlets of indices 3 and 4 connect to outlets of indices 5 and 6, respectively, during time slot t=2, in a uniform rotator but connect to outlets of indices 6 and 5, respectively, in a transposing rotator.

The sign of β defines rotation direction and the magnitude of β defines a rotation step. A positive value of β defines the rotation direction as "ascending" because the index of an outlet to which a specific inlet connects increases as the value of t increases. A negative value of β defines the rotation direction as "descending" because the index of an outlet to which a specific inlet connects decreases as t increases. The magnitude of β defines a rotation step which is selected to equal 1 in all latent-space switch configurations disclosed herein.

Figure 84:
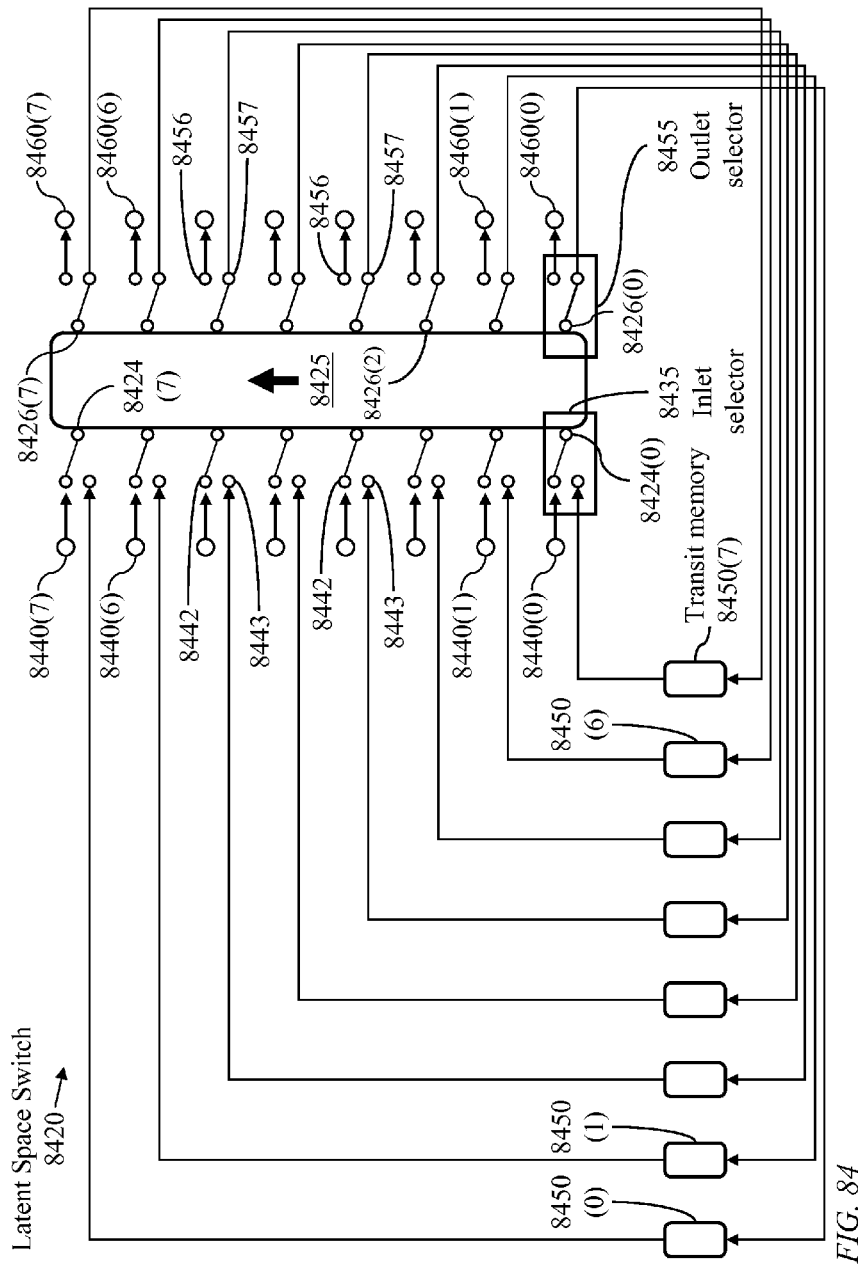
FIG. 84 illustrates a single-rotator latent space switch, in accordance with an embodiment of the present invention, comprising a bank of eight transit memory devices connecting to inlet selectors and outlet selectors of a single rotator with transposed connections of order 7 from the transit memory devices to the inlet selectors and ordinary connections from the transit memory devices to the outlet selector, thus realizing a constant switching delay from an ingress port to an egress port, the figure illustrates a setting of the selectors during data transfer from data sources to the transit memory devices.

FIG. 84 illustrates a latent space switch 8420 having a single rotator 8425 with N inlets, individually or collectively referenced as 8424, and N outlets, individually or collectively referenced as 8426; N=8 in the exemplary configuration of FIG. 84. Each inlet 8424(*j*) is provided with an inlet selector 8435(*j*), 0≤j<N. An inlet selector 8435(*j*) has one inlet-selector port 8442 connecting to ingress port 8440(*j*) and one inlet-selector port 8443 connecting to transit memory device 8450|L−j| (|L−j| denotes $(L-j)_{modulo\ N}$; L=N−1. Each outlet 8426(*j*) is provided with an outlet selector 8455(χ), 0≤χ<N. An outlet selector 8455(χ) has one outlet-selector port 8456 connecting to egress port 8460(χ) and one outlet-selector port 8457 connecting to transit memory device 8450(χ). Thus, the transit memory devices 8450 have transposed connections of order (N−1), to the single rotator 8425 and ordinary connections from the single rotator. Notably, an ingress port 8440 may have a short buffer for holding a data unit received from an external source and an egress port may have a short buffer for holding a data unit to be transmitted to an external sink. An inlet selector 8435 is a 2:1 selector and an outlet selector 8455 is a 1:2 selector.

Figure 85:
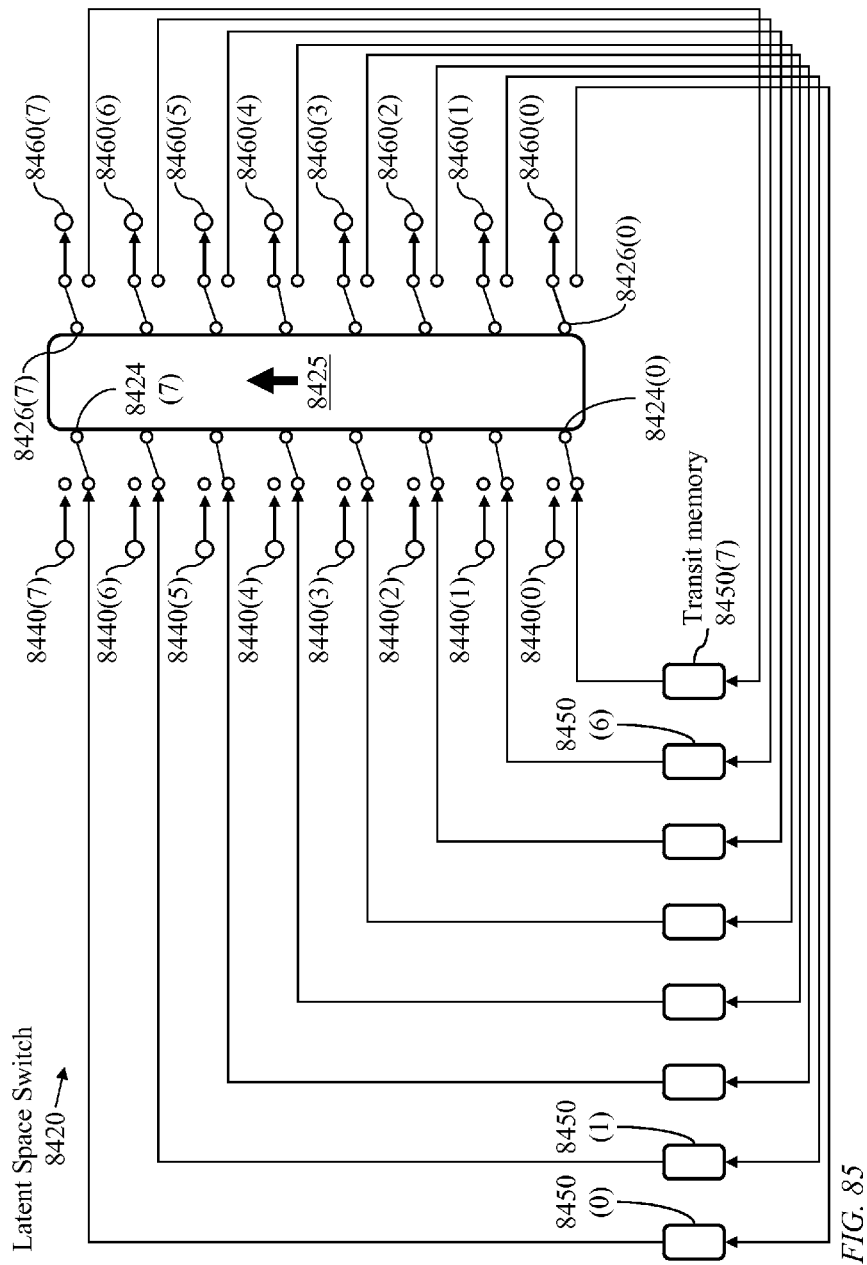
FIG. 85 illustrates a setting of the selectors in the latent space switch of FIG. 84 during data transfer from the transit memory devices to data sinks.

The transit delay (also called systematic switching delay) for data units received at an ingress port 8440(*x*) and destined to egress port 8460(*y*) is |x+y−L| (i.e., $(x+y-L)_{modulo\ N}$) if rotator 8425 is an ascending rotator or |L−x−y| (i.e., $(L-x-y)_{modulo\ N}$) if rotator 8425 is a descending rotator. FIG. 84 illustrates the states of the selectors 8435 and 8455 during a first part of a time slot. FIG. 85 illustrates the states of the selectors 8435 and 8455 of switch 8420 during a second part of a time slot. During the first part of the time slot, data is transferred from ingress ports 8440 to the transit memory devices 8450 and data is transferred from egress ports 8460 to respective external sinks. During the second part of the time slot, data is transferred from the transit memory devices 8450 to the egress ports 8460 and data is received at the ingress ports 8440 from respective external sources.

Figure 86:
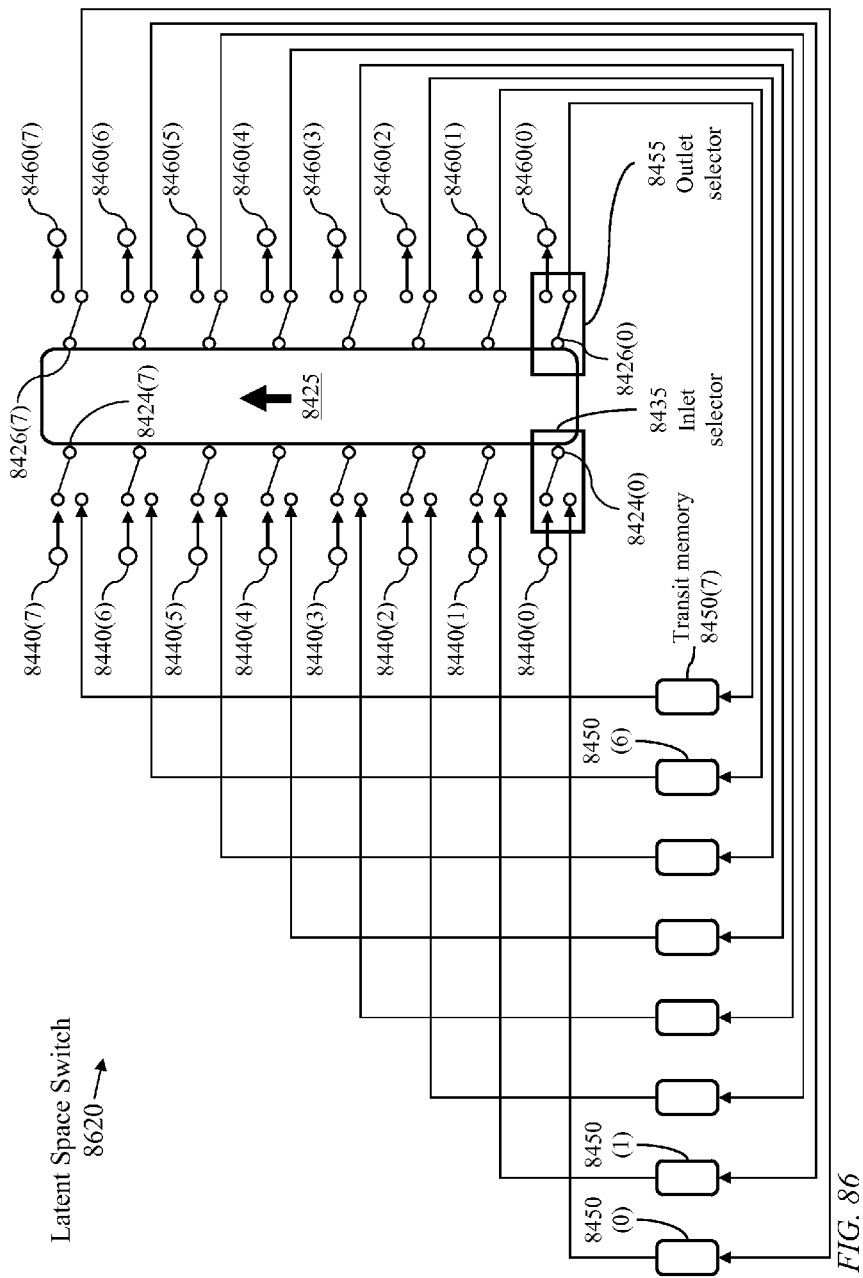
FIG. 86 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 7 from the transit memory devices to the outlet selector, thus realizing a constant switching delay from an ingress port to an egress port, the figure illustrates a setting of the selectors during data transfer from data sources to the transit memory devices.

FIG. 86 illustrates a single-rotator latent space switch 8620 having the same single rotator, the same inlet selectors 8435, the same outlet selectors 8455, and the same transit-memory devices 8450, of switch 8420 of FIG. 84. However, the transit memory devices 8450 have ordinary connections to the single rotator and transposed connections of order (N−1) from the rotator. FIG. 86 indicates the states of the selectors 8435 and 8455 during a first part of a time slot, i.e. during data transfer from external data sources to the transit memory devices.

Figure 87:
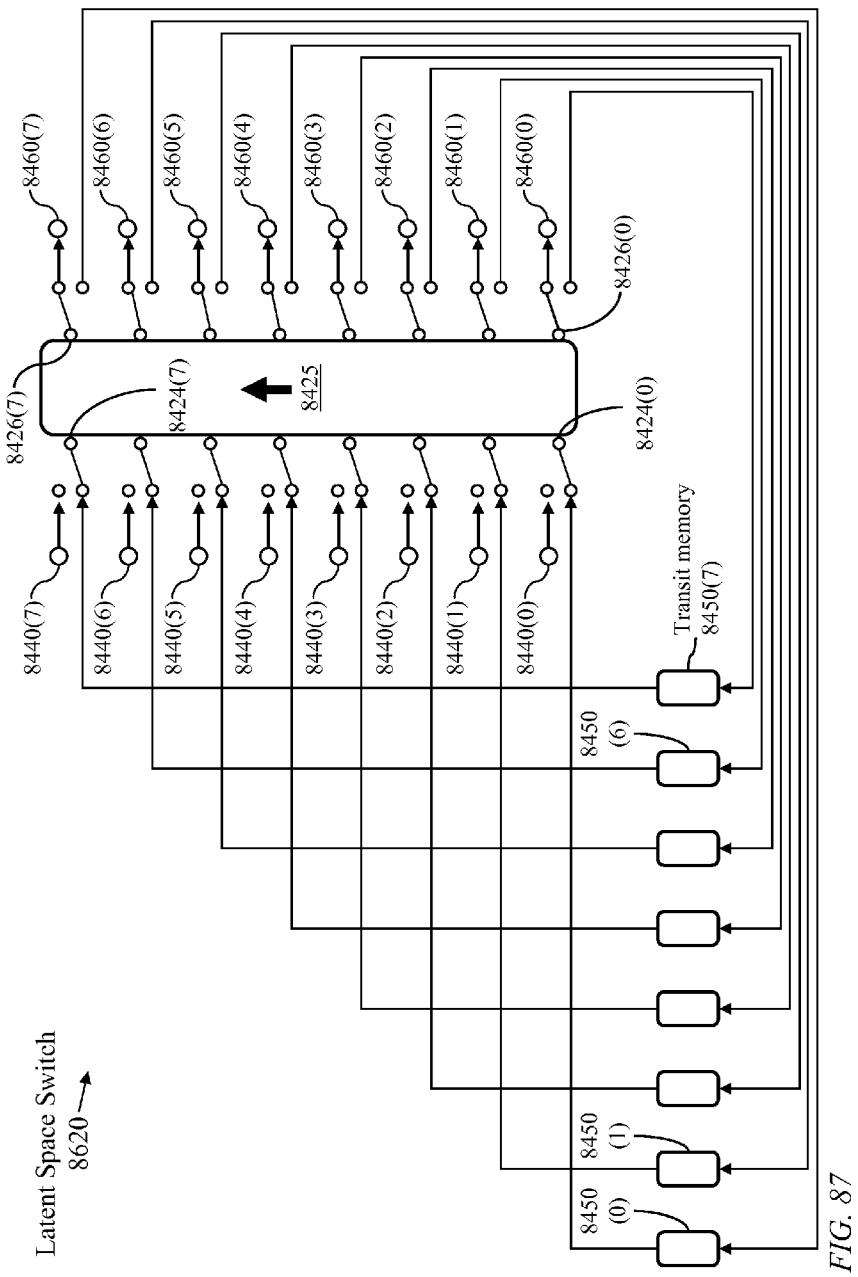
FIG. 87 illustrates a setting of the selectors in the latent space switch of FIG. 86 during data transfer from the transit memory devices to data sinks.

FIG. 87 illustrates the states of the selectors 8435 and 8455 of switch 8620 during a second part of a time slot, i.e. during data transfer from the transit memory devices to external data sinks.

Figure 88:
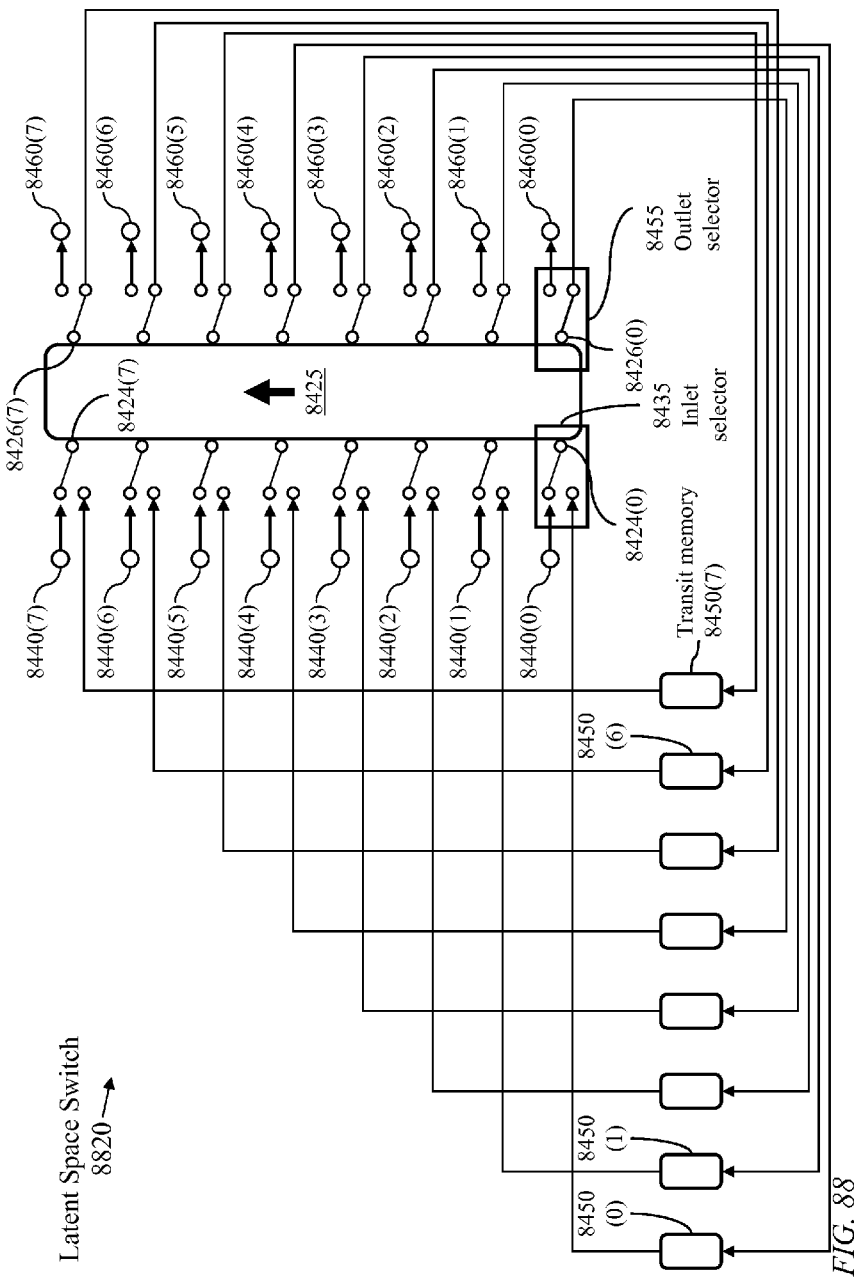
FIG. 88 illustrates a single-rotator latent space switch, in accordance with an embodiment of the present invention, comprising a bank of eight transit memory devices connecting to inlet selectors and outlet selectors of a single rotator with ordinary connections from the transit memory devices to the inlet selectors and transposed connections of order 4 from the transit memory devices to the outlet selector, thus realizing a constant switching delay from an ingress port to an egress port, the figure illustrates a setting of the selectors during data transfer from data sources to the transit memory devices.

FIG. 88 illustrates a single-rotator latent space switch 8820 having the same single rotator, the same inlet selectors 8435, the same outlet selectors 8455, and the same transit-memory devices 8450, of switch 8620 of FIG. 86. However, the transit memory devices 8450 have transposed connections of order 4 from the single rotator.

Figure 89:
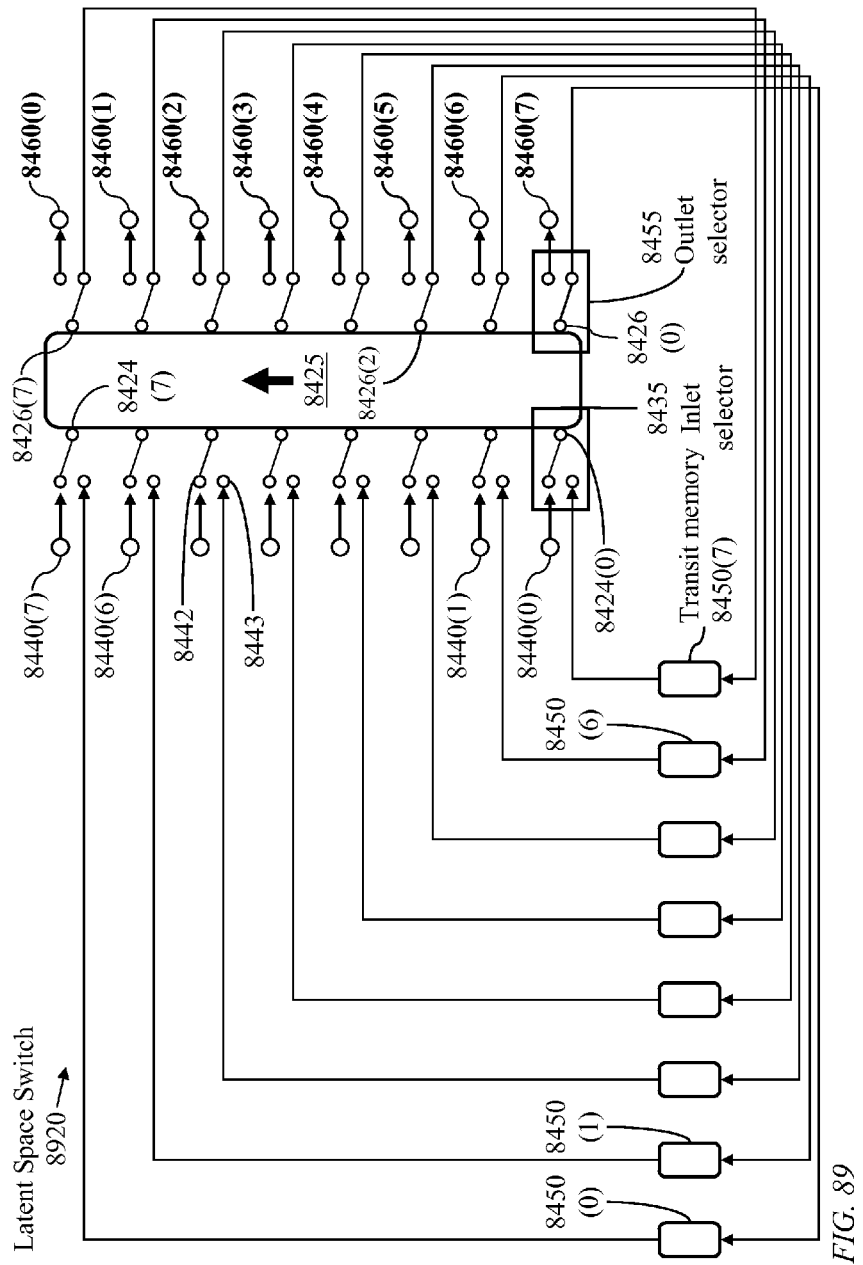
FIG. 89 illustrates a single-rotator space switch similar to the latent space switch of FIG. 84 but with transposed egress ports, in accordance with an embodiment of the present invention.

FIG. 89 illustrates a single-rotator space switch 8920 similar to the latent space switch of FIG. 84 but with transposed egress ports. This results in a transit delay which is independent of the transposition order as indicated in FIG. 94.

Figure 90:
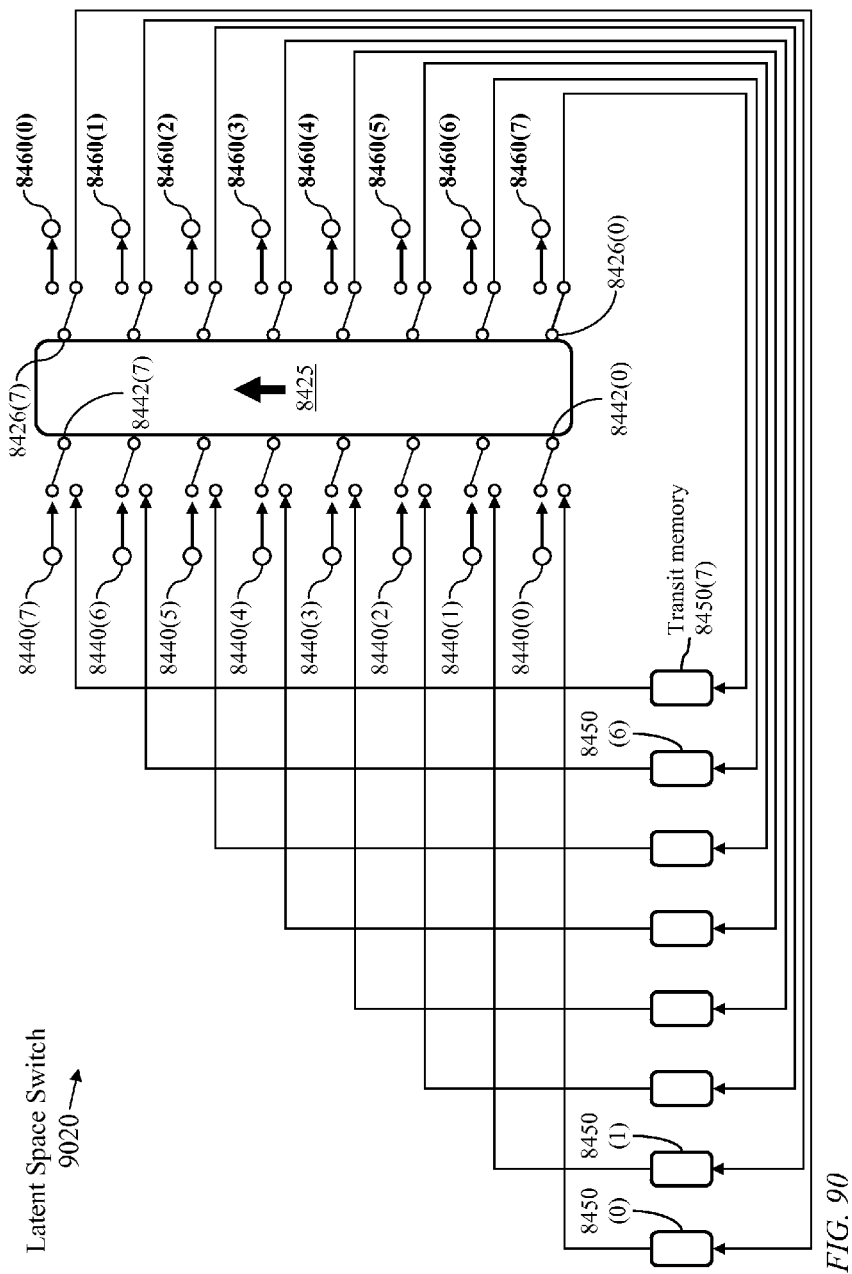
FIG. 90 illustrates a single-rotator space switch similar to the latent space switch of FIG. 86 but with transposed egress ports, in accordance with an embodiment of the present invention.

FIG. 90 illustrates a single-rotator space switch 9020 similar to the latent space switch of FIG. 86 but with transposed egress ports. This results in a transit delay which is independent of the transposition order as indicated in FIG. 94.

Figure 91:
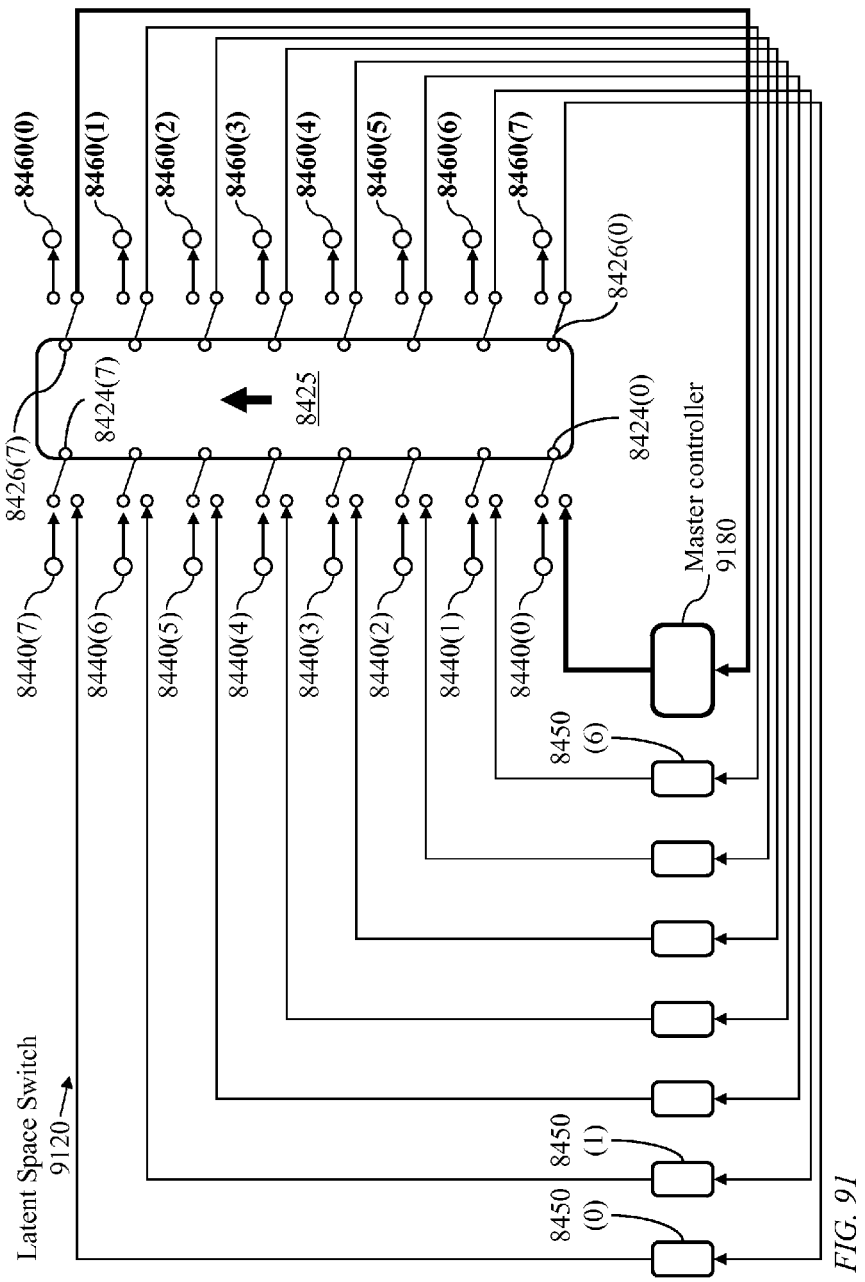
FIG. 91 illustrates the latent space switch of FIG. 84 comprising a controller connecting to an inlet and an outlet of the single rotator in accordance with an embodiment of the present invention.

FIG. 91 illustrates a latent space switch 9120 similar to latent space switch 8420 of FIG. 84 but with a master controller 9180 replacing transit memory device 8450(7).

Figure 92:
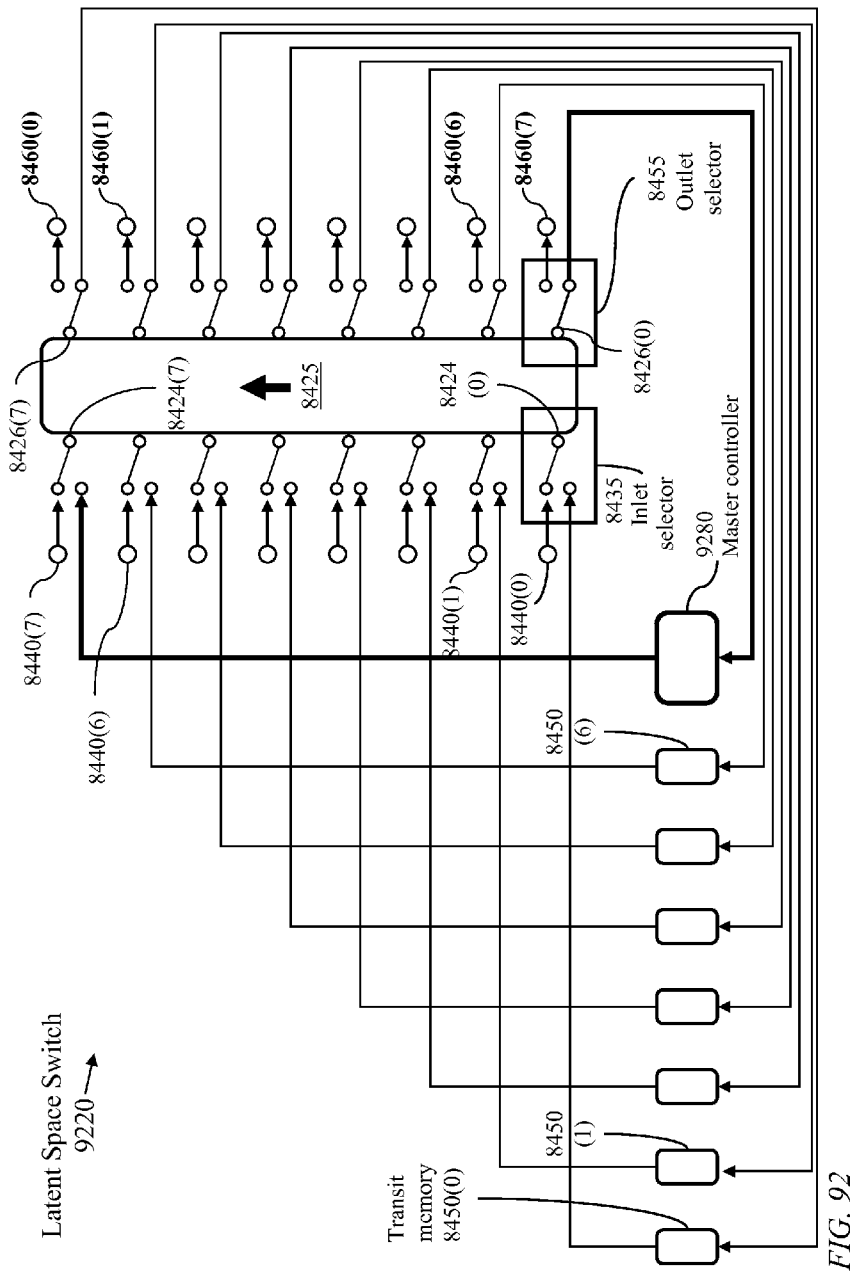
FIG. 92 illustrates the latent space switch of FIG. 86 comprising a controller connecting to an inlet and an outlet of the single rotator in accordance with an embodiment of the present invention.

FIG. 92 illustrates a latent space switch 9220 similar to latent space switch 8620 of FIG. 86 but with a master controller 9280 replacing transit memory device 8450(7).

FIG. 93 tabulates data-transfer timing of a single-rotator latent space switch of the type illustrated in FIG. 84, FIG. 86, and FIG. 88, with an ascending rotator having an arbitrary number N of inlets or outlets and with an arbitrary value L of the order of transposed connections.

Referring to FIG. 84, ingress port 8440(j) connects to outlet |j+$t_1$| during a first part of a time slot $t_1$, 0≤$t_1$<N. With static ordinary connections from the ascending rotator 8425 to the transit memory devices, outlet |j+$t_1$| connects to a transit memory device 8450|j+$t_1$|. With static transposed connections of order L (L=7, N=8) from the transit memory devices 8450 to the ascending rotator 8425, a transit memory device 8450|j+$t_1$| connects to inlet |L−j−$t_1$| of the ascending rotator 8425. In order to reach egress port 8460(k), transit data in transit memory device 8450|j+$t_1$| is transferred from inlet |L−j−$t_1$| to outlet k during a time slot $t_2$=|k−(L−j−$t_1$))|=|(j+k−L+$t_1$)|. Thus, the transit delay is $t_2$−$t_1$=|j+k−L|.

Referring to FIG. 86 and FIG. 88, ingress port 8440(j) connects to outlet |j+$t_1$| during a first part of a time slot $t_1$, 0≤$t_1$<N. With static transposed connections of order L (L=7 in latent space switch 8620 and L=4 in latent space switch 8820) from the ascending rotator 8425 to the transit memory devices, outlet |j+$t_1$| connects to a transit memory device 8450|L−j−$t_1$|. With static ordinary connections from the transit memory devices 8450 to the ascending rotator 8425, a transit memory device 8450|L−j−$t_1$| connects to inlet |L−j−$t_1$| of the ascending rotator 8425. In order to reach egress port 8460(k), transit data in transit memory device 8450|L−j−$t_1$| is transferred from inlet |L−j−$t_1$| to outlet k during a time slot $t_2$=|k−(L−j−$t_1$))|=|j+k−L+$t_1$|. Thus, the transit delay is $t_2$−$t_1$=|j+k−L|, as in the configuration of FIG. 84.

To render the delay from an ingress port 8440(j) to an egress port 8460(k), 0≤j<N, 0≤k<N, independent of the transposition order L, the outlets 8426 of the ascending rotator 8425 may have transposed connections of the same order L to the egress ports 8460. Thus, in order to reach egress port 8460(k), transit data is transferred from inlet 8424|L−j−$t_1$| to outlet 8426|L−k|, hence to egress port 8460(k), during a time slot $t_2$=|(L−k)−(L−(j+$t_1$))|=|j−k+$t_1$|, and the transit delay is $t_2$−$t_1$=|j−k|, which is independent of the transposition order L.

FIG. 94 tabulates data-transfer timing of a single-rotator latent space switch of the type illustrated in FIG. 89 and FIG. 90, using an ascending rotator having an arbitrary number of inlets, with transposed connections from the outlets 8426 of the single rotator 8425 to the egress ports 8460, and with an arbitrary value of the order of transposed connections. In the latent space switches 8420, 8620, 8820, egress port 8460(k) connects to outlet 8426(k), 0≤k<N. In the latent space switches 8920 and 9020, egress port 8460(k) connects to outlet 8426|L−k|. This results in a transit delay, for a given data stream, which depends only on the indices of an ingress port 8440 and an egress port 8460 as indicated in FIG. 94.

FIG. 95 tabulates data-transfer timing of a single-rotator latent space switch of the type illustrated in FIG. 84, FIG. 86, and FIG. 88, with a descending rotator having an arbitrary number N of inlets or outlets and with an arbitrary value L of the order of transposed connections.

FIG. 96 tabulates data-transfer timing of a single-rotator latent space switch of the type illustrated in FIG. 89 and FIG. 90, using a descending rotator having an arbitrary number of inlets, with transposed connections from the outlets 8426 of the single rotator 8425 to the egress ports 8460, and with an arbitrary value of the order of transposed connections.

Scheduling Cycle Versus Rotation Cycle

During a rotation cycle of N time slots, rotator 8425 connects each inlet 8424(j) to each outlet 8426(k), 0≤j<N, 0≤k<N. In the exemplary configuration of FIG. 91, N=8 and the master controller 9180 has a channel to inlet 8424(0) of rotator 8425 and a channel from outlet 8426(7) of rotator 8425. An ingress port 8440(j), 0≤j<8, connects to the master controller 9180 once per rotation cycle, during every relative time slot |7−j| of a rotation cycle, i.e., during absolute time slots (7−j)+8×χ, 0≤χ<∞. The master controller 9180 connects to an egress port 8460(k), 0≤k<N, once per rotation cycle, during every relative time slot k, i.e., during absolute time slots (k+8×χ), 0≤χ<∞. The master controller 9180 receives control signals from ingress port 8440(j) during time slots (7−j)+8×χ and transmits control signal to egress port k during time slots (k+8×χ), 0≤χ<∞. Preferably, each egress port is integrated with an ingress port so that master controller 9180 may send control data, including data transfer schedules, to a specific ingress port through an egress port integrated with the specific ingress port.

Master controller 9180 receives control signals from the ingress ports 8440 and schedules transfer of data from ingress ports 8440(j) to egress ports 8460(k), 0≤j<N, 0≤k<N, over a predefined scheduling time frame. The scheduling time frame is preferably selected to cover an integer number, exceeding zero, of rotation-cycle periods. However, the scheduling cycle may have any number of time slots, greater than or equal to N, that need not be an integer multiple of N.

Figure 97:
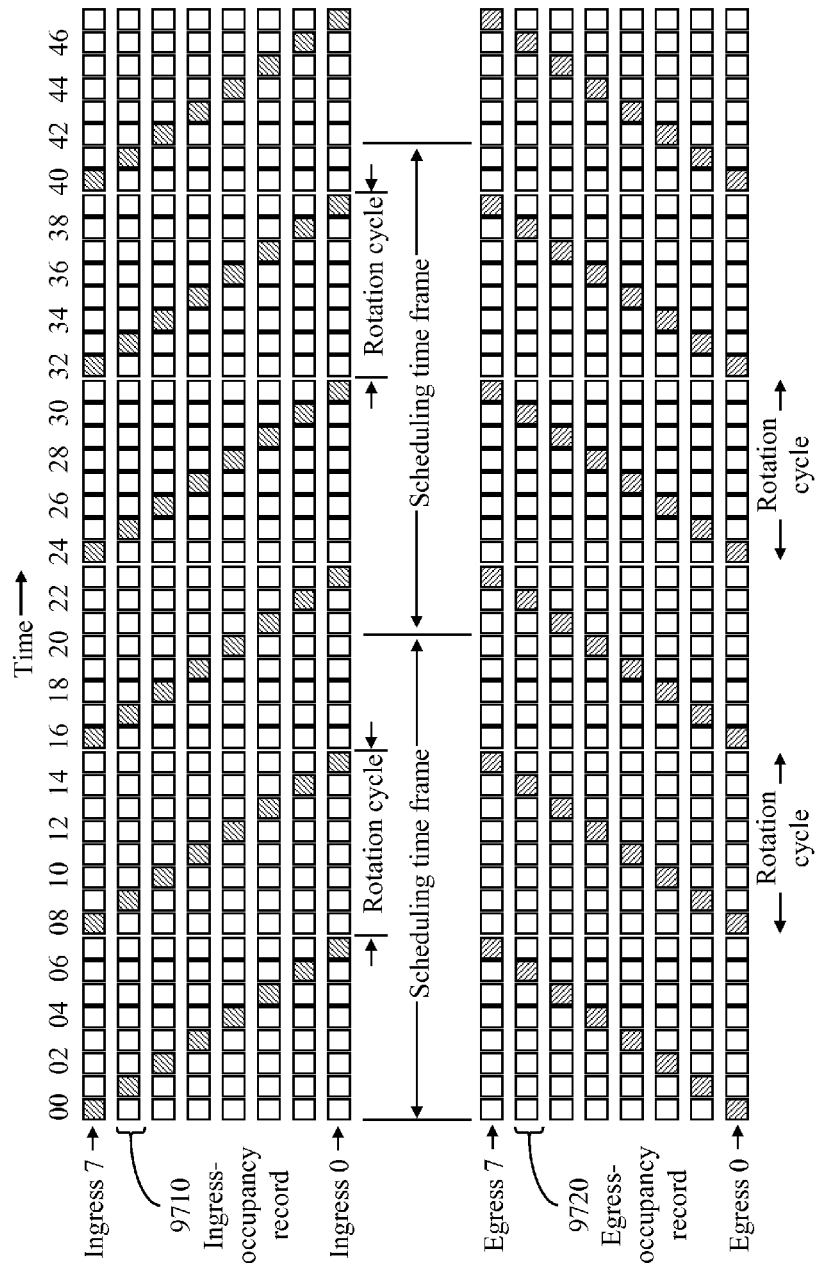
FIG. 97 illustrates occupancy records, over a scheduling time frame, used for scheduling data transfer in the latent space switch of FIG. 91 in accordance with an embodiment of the present invention.

The transfer of payload data from an ingress port to an egress port is subject to contention, hence the need for scheduling. FIG. 97 illustrates an exemplary scheduling frame of 21 time slots. The master controller maintains an ingress occupancy record (or a vacancy record) 9710 for each ingress port 8440 and an egress occupancy record (or vacancy record) 9720 for each egress port 8460. As indicated in FIG. 91, a data segment transferred from an ingress port 8440(j) at time $t_1$ relative to a rotation cycle is transferred to an egress port 8460(k) during a time slot $t_2$, relative to a rotation cycle, where $t_2$={j+k−L+$t_1$}$_{modulo\ N}$, where L=7 in the exemplary configuration of FIG. 84. Thus, to establish a connection from ingress port 8440(j) to egress port 8460(k), the master controller examines the occupancy state of ingress port 8440(j) during time slot $t_1$ and the occupancy state egress port 8460(k) during time slot $t_2$.

Preferably, the exchange of control data between the master controller 9180 and controllers of the ingress ports 8440 and egress ports 8460 take place during dedicated time slots. Each ingress port 8440(j) is preferably integrated with a corresponding egress port, such as egress port 8460(j), in order to simplify exchange of control data.

As illustrated, ingress port 8440(0) connects to the master controller 9180 during time slots {7, 15, 23, 31, . . . }, ingress port 8440(1) connects to the master controller during time slots {6, 14, 22, 30, . . . }, and ingress port 8440(7) connects to the master controller during time slots {0, 8, 16, 24, . . . }. The master controller 9180 connects to egress port 8460(0) during time slots {0, 8, 16, 24, . . . }, connects to egress port 8460(1) during time slots {1, 9, 17, 25, . . . }, and connects to egress port 8460(7) during time slots {7, 15, 23, 30, . . . }.

Figure 98:
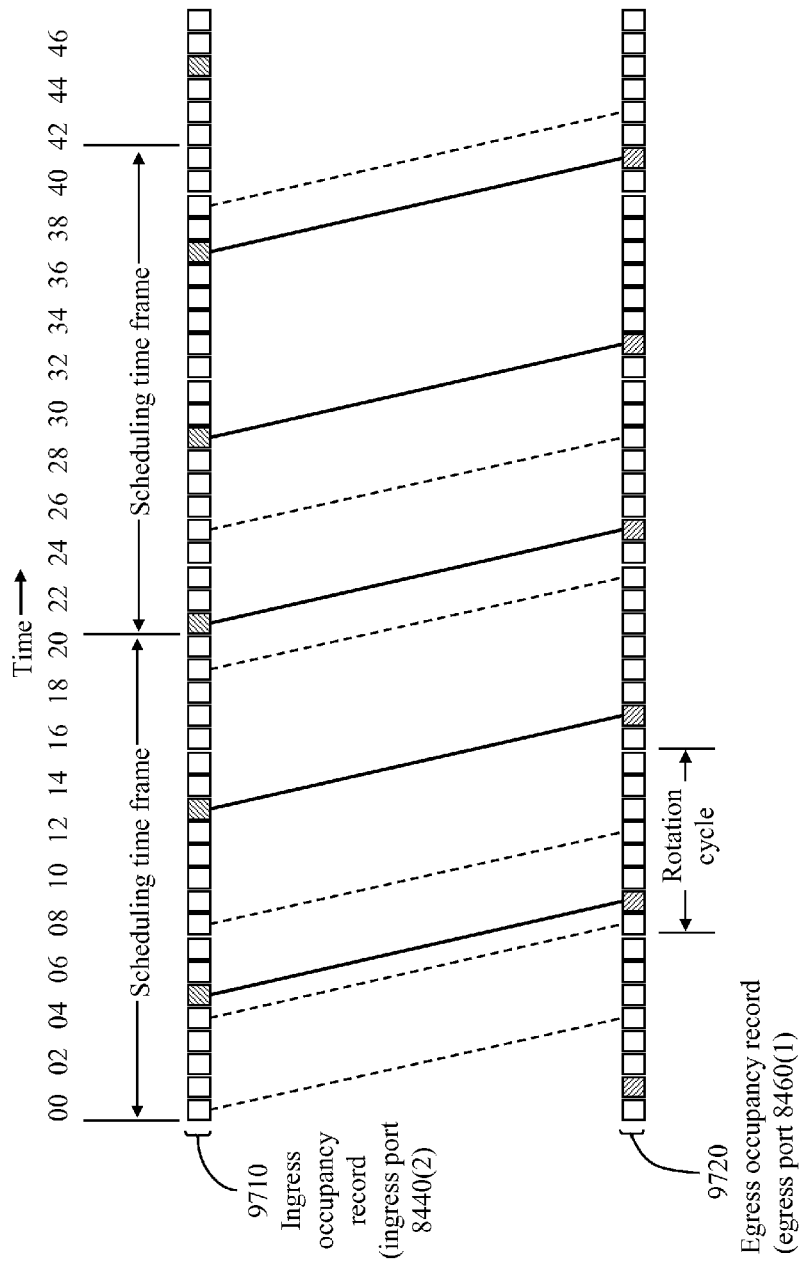
FIG. 98 illustrates a time-slot-matching process for scheduling a connection from an ingress port to an egress port in the latent space switch of FIG. 91 in accordance with an embodiment of the present invention.

FIG. 98 illustrates an ingress occupancy record 9710 of ingress port 8440(2) and egress occupancy record 9720 of egress port 8460(1) of latent space switch 9120 of FIG. 91. Each occupancy record has a number of entries equal to the number of time slots per scheduling time frame. A data segment received at an ingress port 8440(j) at time $t_1$ is delivered to an egress port 8460(k) during a time slot $t_2$=($t_1$+j+k−L)$_{modulo\ N}$, where N is the number of ingress ports (or egress ports) and L is the transposition order as described earlier. In the configuration of FIG. 91, N=8 and L=7. A data segment received during time slot $t_1$ is delivered to egress 8460(1) during time slot $t_2=t_1+4$. Corresponding values of $t_1$ and $t_2$ are indicated in FIG. 98. A path from ingress port 8440(2) to egress port 8460(1) is available for a new connection request when ingress port 8440(2) is free (i.e., not in use and not reserved) during a time slot $t_1$ and egress port 8460(1) is free during time slot=$t_1+4$. To establish a connection, requiring a number σ>0 of time slots per scheduling frame, any ingress port 8440 to any egress port 8460, a number a of available paths need be reserved. When a path is reserved, corresponding entries in an ingress occupancy record 9710 and an egress occupancy record are marked as busy. When the path is released, the corresponding entries are marked as available.

Figure 99:
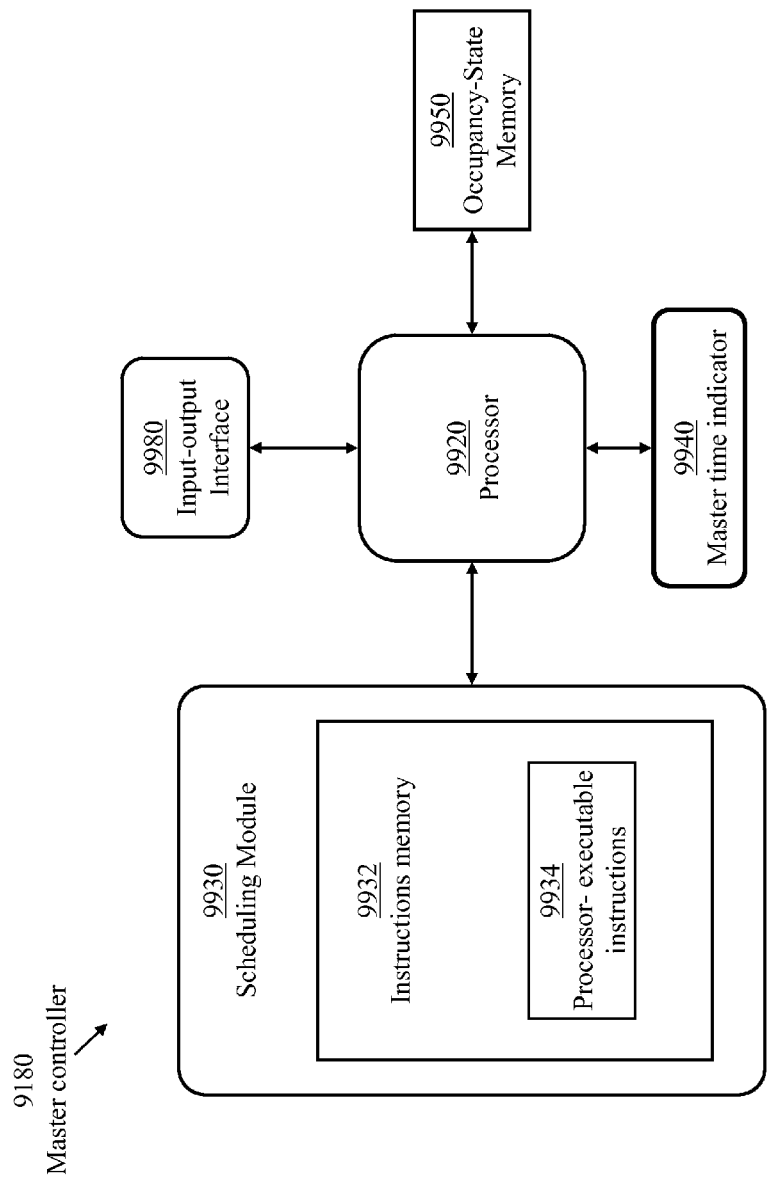
FIG. 99 details a master controller of the latent space switch of FIG. 91 in accordance with an embodiment of the present invention.

FIG. 99 illustrates a master controller 9180 of a latent space switch 9120 (FIG. 91). The master controller 9180 has a processor 9920 and a scheduling module 9930 which includes a memory device 9932 storing processor executable instructions 9934 which cause the processor to implement the time-locking and scheduling functions described above. Processor 9920 communicates with input and output ports of the latent space switch through an input-output interface 9980. Upon receiving a time indication from an edge controller of an edge node 120, processor 9920 communicates a corresponding reading of the master time indicator 9940 to the edge node. The edge controller then determines a reference time for an outbound port of the edge node leading to the master controller of the latent space switch 9120. A memory device 9950 stores current occupancy states of all inlets and all outlets during all time slots of a time frame.

Configuration Details

The N inlets 8424 of a rotator 8425 are indexed as 0 to (N−1) and are individually referenced as 8424(0), 8424(1), ..., 8424(N−1). Likewise, the N outlets 8426 of the rotator 8425 are indexed as 0 to (N−1) and are individually referenced as 8426(0), 8426(1), ..., 8426(N−1). The N transit memory devices 8450 are indexed as 0 to (N−1) and are individually referenced as 8450(0), 8450(1), ..., 8450(N−1).

If the rotator is an ascending rotator, then during a time slot t, 0≤t<N, an inlet of index j, 0≤j<N, connects through the rotator to an outlet of index k, 0≤k<N, determined as: $k=\{j+t+\Theta\}_{modulo\ N}$, where Θ (an integer) is an arbitrary offset.

If the rotator is a descending rotator, then during a time slot t, 0≤t<N, the rotator connects an inlet of index j, 0≤j<N to an outlet of index k, 0≤k<N, determined as: $k=\{j-t+\Theta\}_{modulo\ N}$. Without loss of generality, the offset Θ may be set to zero.

In view of the description above, it will be understood that modifications and variations of the described and illustrated embodiments may be made within the scope of the inventive concepts.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A time-coherent network comprising:
    a plurality of edge nodes, each edge node comprising an edge controller;
    a plurality of switches, none of said switches directly connecting to any other switch, arranged as a matrix of switches having μ columns and μ rows, μ>2, each switch of said plurality of switches comprising a switch controller;
    a plurality of upstream spectral routers arranged in a first matrix having Λ columns and μ rows, Λ>1, and configured to provide an upstream channel from said each edge node to a preselected switch in each column; and
    a plurality of downstream spectral routers arranged in a second matrix having μ columns and Λ rows and configured to provide a downstream channel to said each edge node from each switch of one of said μ columns;
    said each edge node coupled to:
        an upstream multi-channel link to a designated upstream spectral router in each column of said first matrix; and
        a downstream multi-channel link from each downstream spectral router of a designated column of said second matrix;
    wherein all sets of edge nodes connecting to upstream spectral routers of any row of said first matrix are mutually disjoint.

2. The time-coherent network of claim 1 wherein said each switch of said plurality of switches is coupled to:
    a spectral demultiplexer connected to a wavelength-division-multiplexed link originating from an upstream spectral router; and
    a spectral multiplexer connected to a wavelength-division-multiplexed link directed to a downstream spectral router.

3. The time-coherent network of claim 1 wherein:
    said each switch of said plurality of switches comprises a time indicator; and
    said upstream channel is time locked to a time indicator of said preselected switch.

4. The time-coherent network of claim 1 wherein said each edge node comprises a source node receiving data from data sources and a sink node transmitting data to data sinks, said source node and said sink node sharing said edge controller and a switch fabric.

5. The time-coherent network of claim 1 wherein at least one switch in said plurality of switches is an optical switch.

6. The time-coherent network of claim 1 wherein at least one switch in said plurality of switches is an electronic space switch having a plurality of inlets and a plurality of outlets, each inlet preceded by an optical-to-electrical converter and each outlet succeeded by an electrical-to-optical converter.

7. The time-coherent network of claim 1 wherein at least one switch in said plurality of switches is configured as a single-rotator latent space switch comprising:
    a plurality of memory devices;
    a plurality of ingress ports, each for receiving data from one of said edge nodes;
    a plurality of egress ports, each for transmitting data to one of said edge nodes;
    and
    a single rotator having a plurality of inlets and a plurality of outlets, said single rotator connecting each inlet to each outlet during a time frame organized into a number of time slots;
    wherein during each time slot of said time frame:
        said each inlet alternately connects to a respective ingress port and a respective memory device; and
        a transposed outlet of said each inlet alternately connects to said respective memory device and a respective egress port.

8. The time-coherent network of claim 1 wherein at least one edge node of said plurality of edge nodes is configured as a single-rotator circulating switch comprising:
 a single rotator comprising a plurality of inlets and a plurality of outlets, each inlet connecting to each outlet during a time frame organized into a number of time slots, said each inlet coupled to a corresponding receiving selector and said each outlet coupled to a corresponding sending selector;
 a plurality of switch elements each switch element comprising:
  two internal output ports alternately connecting to an inlet of said single rotator through a receiving selector during each time slot of said time frame;
  two internal input ports alternately connecting to a transposed outlet of said inlet through a sending selector during each time slot of said time frame;
  an external input port for receiving data from external data sources; and
  an external output port for transmitting data to external data sinks.

9. The time-coherent network of claim 1 wherein said each switch of said plurality of switches comprises m input ports, m>1, and said plurality of edge nodes comprises at most μ×m edge nodes.

10. The time-coherent network of claim 1 wherein:
 said each switch of said plurality of switches has m input ports and m output ports, m>1;
 each upstream spectral router has an upstream link to each switch of a corresponding set of W switches of W different columns of said matrix of switches, 1<W≤μ; and
 each downstream spectral router of a column of said second matrix has a downstream link from each switch of a set of W switches of a corresponding column of said matrix of switches;
 thereby said plurality of edge nodes comprises at most Λ×W×m edge nodes.

11. The time-coherent network of claim 10 wherein Λ is selected as a prime number and an upstream spectral router in column c, 0≤c<Λ, and row r, 0≤r<(Λ×W), of said first matrix connects to a set of m edge nodes of indices:

$$S \times \lfloor r/\Lambda \rfloor + \{j \times (1 + m \times c) + m \times (\rho + c)\}_{modulo\ S},\ 0 \le j < m,$$

where S=Λ×m, and $\rho = r_{modulo\ \Lambda}$, the edge nodes of said plurality of edge nodes being indexed sequentially between 0 and (Λ×m×W−1).

12. The time-coherent network of claim 10 wherein an upstream spectral router of column c, 0≤c<Λ, and row r, 0≤r<(Λ×W), of said first matrix connects to a set of W switches in columns {c×W} to {(c×W)+W−1} of said matrix of switches, the columns of said matrix of switches being indexed sequentially between 0 and (Λ×W−1).

13. The time-coherent network of claim 1 wherein:
 upstream spectral routers of each row of said first matrix connect to switches of a corresponding row of said matrix of switches; and
 all switches of each column of said matrix of switches connect to downstream spectral routers of a corresponding column of said second matrix.

14. The time-coherent network of claim 9 wherein said each switch of said plurality of switches further comprises at least one dual control port coupled to said switch controller.

15. The time-coherent network of claim 1 wherein said upstream channel carries upstream payload data and upstream control signals and said downstream channel carries downstream payload data and downstream control signals.

16. The time-coherent network of claim 1 wherein:
 said switch controller of said each switch of said plurality of switches comprises a switch time indicator; and
 said upstream channel is time locked to said switch time indicator.

17. The time-coherent network of claim 1 wherein said edge controller is coupled to an edge time-indicator, said switch controller is coupled to a switch time indicator, and said edge controller is configured to exchange timing data with said switch controller to enable coherent switching at said each switch.

18. A method of signal switching comprising:
 arranging a plurality of switches, none of said switches directly connecting to any other switch, as a matrix of switches of μ columns and μ rows, μ>2, each switch of said plurality of switches comprising a switch controller;
 arranging a plurality of upstream spectral routers in a first matrix of Λ columns and μ rows, Λ>1, providing an upstream channel from each edge node of a plurality of edge nodes to a preselected switch in each column of said matrix of switches, said each edge node comprising an edge controller;
 arranging a plurality of downstream spectral routers in a second matrix of μ columns and Λ rows providing a downstream channel to said each edge node from every switch of one of said μ columns;
 transmitting upstream signals from said each edge node to said preselected switch through said upstream channel; and
 transmitting downstream signals from said every switch to said each edge node through said downstream channel;
 wherein all sets of edge nodes connecting to upstream spectral routers of any row of said first matrix are mutually disjoint.

19. The method of claim 18 further comprising:
 providing an upstream link carrying multiple upstream channels from said each edge node to a designated upstream spectral router in each column of said first matrix; and
 linking upstream spectral routers of each row of said first matrix to switches of a corresponding row of said matrix of switches.

20. The method of claim 18 further comprising:
 linking all switches of each column of said matrix of switches to downstream spectral routers of a corresponding column of said second matrix; and
 providing a downstream link carrying multiple downstream channels to said each edge node from each downstream spectral router of one column of said second matrix.

21. The method of claim 18 wherein said upstream signals comprise payload data and control data, said control data comprising: connection requests and timing data.

22. The method of claim 19 further comprising selecting said designated upstream spectral router so that a first set of edge nodes connecting to any upstream spectral router is orthogonal to a second set of edge nodes connecting to any other upstream spectral router of said plurality of upstream spectral routers.

23. A method of signal switching comprising:
 arranging a plurality of switches as a matrix of switches having μ columns and μ rows, μ>2;

linking upstream spectral routers of each row of a first matrix of upstream spectral routers to switches of a corresponding row of said matrix of switches;

linking each edge node of a plurality of edge nodes to a designated upstream spectral router in each column of said first matrix so that upstream spectral routers of each row of said first matrix connect to disjoint sets of edge nodes;

configuring said plurality of upstream spectral routers to provide an upstream channel from said each edge node to a preselected switch in each column of said matrix of switches;

configuring a plurality of downstream spectral routers to provide a downstream channel from every switch of one of said μ columns to said each edge node;

transmitting upstream signals from said each edge node to said preselected switch through said upstream channel; and transmitting downstream signals from said every switch to said each edge node through said downstream channel.

24. The method of claim 19 further comprising selecting said designated upstream spectral router so that an upstream spectral router in column c, $0 \le c < \Lambda$, and row r, $0 \le r < \Lambda \times m$, of said first matrix connects to edge nodes of indices E(c, r, m) determined as:

$$E(c,r,m) = S \times \lfloor r/\Lambda \rfloor + \{j \times (1 + m \times c) + m \times (\rho + c)\}_{modulo\ S},$$
$$0 \le j < m,$$

where m is a number of inlets of said each switch of said plurality of switches, $S = \Lambda \times m$, $\rho = r_{modulo\ \Lambda}$, and the edge nodes of the network are indexed sequentially between 0 and $(\Lambda \times m \times W - 1)$.

* * * * *